US007715643B2

(12) United States Patent
Kondo et al.

(10) Patent No.: US 7,715,643 B2
(45) Date of Patent: May 11, 2010

(54) IMAGE PROCESSING APPARATUS AND METHOD, AND IMAGE PICKUP APPARATUS

(75) Inventors: Tetsujiro Kondo, Tokyo (JP); Junichi Ishibashi, Saitama (JP); Takashi Sawao, Tokyo (JP); Naoki Fujiwara, Tokyo (JP); Takahiro Nagano, Kanagawa (JP); Seiji Wada, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 1231 days.

(21) Appl. No.: 10/344,568

(22) PCT Filed: Jun. 13, 2002

(86) PCT No.: PCT/JP02/05876

§ 371 (c)(1),
(2), (4) Date: Aug. 11, 2003

(87) PCT Pub. No.: WO02/103636

PCT Pub. Date: Dec. 27, 2002

(65) Prior Publication Data

US 2004/0047513 A1 Mar. 11, 2004

(30) Foreign Application Priority Data

Jun. 15, 2001 (JP) ............................ 2001-181394
Jun. 15, 2001 (JP) ............................ 2001-181396

(51) Int. Cl.
*G06K 9/42* (2006.01)

(52) U.S. Cl. ........................ 382/254; 382/132; 348/700

(58) Field of Classification Search ................. 382/254, 382/132, 270, 279, 163, 261, 107, 284; 348/240.14
See application file for complete search history.

(56) References Cited

U.S. PATENT DOCUMENTS 5,268,967 A * 12/1993 Jang et al. ................... 382/132
5,630,037 A * 5/1997 Schindler .................... 345/592

(Continued)

FOREIGN PATENT DOCUMENTS

EP 0 771 107 5/1997

(Continued)

*Primary Examiner*—Daniel G Mariam
*Assistant Examiner*—Aklilu K Woldemariam
(74) *Attorney, Agent, or Firm*—Frommer Lawrence & Haug LLP; William S. Frommer; Thomas F. Presson

(57) ABSTRACT

An image processing device for processing images of background images and moving objects. A region specifying unit specifies a mixed region made up of a mixture of a foreground object component and a background object component, and a non-mixed region made up of one or the other of a foreground object component and a background object component, and outputs region information corresponding to the specifying results. A foreground/background separation unit separates the input image into foreground component images and background component images, corresponding to the region information. A separated image processing unit processes the foreground component images and background component images individually, corresponding to the results of separation.

29 Claims, 150 Drawing Sheets

U.S. PATENT DOCUMENTS

| | | | | |
|---|---|---|---|---|
| 5,768,441 | A * | 6/1998 | Yoshizawa et al. | 382/270 |
| 5,937,104 | A * | 8/1999 | Henderson et al. | 382/279 |
| 6,008,865 | A * | 12/1999 | Fogel | 348/700 |
| 6,031,575 | A * | 2/2000 | Suzuki et al. | 375/240.14 |
| 6,078,619 | A * | 6/2000 | Monro et al. | 375/240 |
| 6,134,346 | A | 10/2000 | Berman et al. | |
| 6,151,416 | A | 11/2000 | Kondo et al. | |
| 6,219,436 | B1 | 4/2001 | De Haan et al. | |
| 6,337,925 | B1 * | 1/2002 | Cohen et al. | 382/199 |
| 6,496,598 | B1 * | 12/2002 | Harman | 382/154 |
| 6,587,599 | B1 * | 7/2003 | Huang | 382/284 |
| 6,741,755 | B1 * | 5/2004 | Blake et al. | 382/284 |
| 7,058,221 | B1 * | 6/2006 | Shikata | 382/169 |
| 7,272,250 | B2 * | 9/2007 | Schneider et al. | 382/128 |
| 2001/0028735 | A1 * | 10/2001 | Pettigrew et al. | 382/162 |
| 2003/0103682 | A1 * | 6/2003 | Blake et al. | 382/282 |

FOREIGN PATENT DOCUMENTS

| | | |
|---|---|---|
| EP | 0 933 727 | 8/1999 |
| EP | 1 061 473 | 12/2000 |
| EP | 1 164 545 | 12/2001 |
| EP | 1 292 129 | 3/2003 |
| EP | 1 361 540 | 11/2003 |
| EP | 1 361 542 | 11/2003 |
| EP | 1 379 080 | 1/2004 |
| EP | 1 411 473 | 4/2004 |
| JP | 7-336688 | 12/1995 |
| JP | 10-164436 | 6/1998 |
| JP | 2002-30040 | 1/2000 |
| JP | 2001-250119 | 9/2001 |
| JP | 2002-190015 | 7/2002 |
| JP | 2002-190016 | 7/2002 |
| JP | 2002-190028 | 7/2002 |
| WO | WO 02 085001 | 10/2002 |

* cited by examiner

| REGION | | DESCRIPTION |
|---|---|---|
| BACKGROUND REGION | | STILL REGION |
| FOREGROUND REGION | | MOVING REGION |
| MIXED REGION | COVERED BACKGROUND REGION | PORTION WHICH CHANGES FROM BACKGROUND TO FOREGROUND |
| | UNCOVERED BACKGROUND REGION | PORTION WHICH CHANGES FROM FOREGROUND TO BACKGROUND |

FIG. 37

| REGION JUDGEMENT | STILL/MOTION JUDGEMENT IN FRAME #n-2 AND FRAME #n-1 | STILL/MOTION JUDGEMENT IN FRAME #n-1 AND FRAME #n | STILL/MOTION JUDGEMENT IN FRAME #n AND FRAME #n+1 | STILL/MOTION JUDGEMENT IN FRAME #n+1 AND FRAME #n+2 |
|---|---|---|---|---|
| COVERED BACKGROUND REGION JUDGEMENT | STILL | MOTION | — | — |
| STILL REGION JUDGEMENT | — | STILL | STILL | — |
| MOVING REGION JUDGEMENT | — | MOTION | MOTION | — |
| UNCOVERED BACKGROUND REGION JUDGEMENT | — | — | MOTION | STILL |

FIG. 45A

| | | |
|---|---|---|
| $X_0$ | $X_1$ | $X_2$ |
| $X_3$ | $X_4$ | $X_5$ |
| $X_6$ | $X_7$ | $X_8$ |

FIG. 45B

| | | |
|---|---|---|
| $Y_0$ | $Y_1$ | $Y_2$ |
| $Y_3$ | $Y_4$ | $Y_5$ |
| $Y_6$ | $Y_7$ | $Y_8$ |

FIG. 46A

| | | |
|---|---|---|
| $X_0$ | $X_1$ | $X_2$ |
| $X_3$ | $X_4$ | $X_5$ |
| $X_6$ | $X_7$ | $X_8$ |

FIG. 46B

| | | |
|---|---|---|
| $Y_0$ | $Y_1$ | $Y_2$ |
| $Y_3$ | $Y_4$ | $Y_5$ |
| $Y_6$ | $Y_7$ | $Y_8$ |

FIG. 49

| | BACKGROUND REGION | FOREGROUND REGION | COVERED BACKGROUND REGION | UNCOVERED BACKGROUND REGION |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 105

| PIXEL POSITION | COEFFICIENT |
|---|---|
| +15 | 3.9273163E−04 |
| +14 | −2.2540586E−04 |
| +13 | −2.4369121E−03 |
| +12 | −3.0052194E−03 |
| +11 | 3.2160638E−03 |
| +10 | 1.2793610E−02 |
| +9 | 9.5612411E−03 |
| +8 | −1.6360431E−02 |
| +7 | −4.1575930E−02 |
| +6 | −1.9544066E−02 |
| +5 | 5.8311635E−02 |
| +4 | 1.1389413E−01 |
| +3 | 2.9084732E−02 |
| +2 | −2.2739914E−01 |
| +1 | −5.2530356E−01 |
| PIXEL OF INTEREST | 1.2169396E+00 |
| −1 | −5.2530356E−01 |
| −2 | −2.2739914E−01 |
| −3 | 2.9084732E−02 |
| −4 | 1.1389413E−01 |
| −5 | 5.8311635E−02 |
| −6 | −1.9544066E−02 |
| −7 | −4.1575930E−02 |
| −8 | −1.6360431E−02 |
| −9 | 9.5612411E−03 |
| −10 | 1.2793610E−02 |
| −11 | 3.2160638E−03 |
| −12 | −3.0052194E−03 |
| −13 | −2.4369121E−03 |
| −14 | −2.2540586E−04 |
| −15 | 3.9273163E−04 |

FIG. 107

| PIXEL POSITION | COEFFICIENT |
|---|---|
| +15 | 3.1418530E−04 |
| +14 | −1.8032469E−04 |
| +13 | −1.9495297E−03 |
| +12 | −2.4041755E−03 |
| +11 | 2.5728510E−03 |
| +10 | 1.0234888E−02 |
| +9 | 7.6489929E−03 |
| +8 | −1.3088345E−02 |
| +7 | −3.3260744E−02 |
| +6 | −1.5635253E−02 |
| +5 | 4.6649308E−02 |
| +4 | 9.1115302E−02 |
| +3 | 2.3267786E−02 |
| +2 | −1.8191931E−01 |
| +1 | −4.2024285E−01 |
| PIXEL OF INTEREST | 9.7355170E−01 |
| −1 | −4.2024285E−01 |
| −2 | −1.8191931E−01 |
| −3 | 2.3267786E−02 |
| −4 | 9.1115302E−02 |
| −5 | 4.6649308E−02 |
| −6 | −1.5635253E−02 |
| −7 | −3.3260744E−02 |
| −8 | −1.3088345E−02 |
| −9 | 7.6489929E−03 |
| −10 | 1.0234888E−02 |
| −11 | 2.5728510E−03 |
| −12 | −2.4041755E−03 |
| −13 | −1.9495297E−03 |
| −14 | −1.8032469E−04 |
| −15 | 3.1418530E−04 |

FIG. 110

| PIXEL POSITION | COEFFICIENT |
|---|---|
| +15 | 3.9273163E−04 |
| +14 | −2.2540586E−04 |
| +13 | −2.4369121E−03 |
| +12 | −3.0052194E−03 |
| +11 | 3.2160638E−03 |
| +10 | 1.2793610E−02 |
| +9 | 9.5612411E−03 |
| +8 | −1.6360431E−02 |
| +7 | −4.1575930E−02 |
| +6 | −1.9544066E−02 |
| +5 | 5.8311635E−02 |
| +4 | 1.1389413E−01 |
| +3 | 2.9084732E−02 |
| +2 | −2.2739914E−01 |
| +1 | −5.2530356E−01 |
| PIXEL OF INTEREST | 2.2169369E+00 |
| −1 | −5.2530356E−01 |
| −2 | −2.2739914E−01 |
| −3 | 2.9084732E−02 |
| −4 | 1.1389413E−01 |
| −5 | 5.8311635E−02 |
| −6 | −1.9544066E−02 |
| −7 | −4.1575930E−02 |
| −8 | −1.6360431E−02 |
| −9 | 9.5612411E−03 |
| −10 | 1.2793610E−02 |
| −11 | 3.2160638E−03 |
| −12 | −3.0052194E−03 |
| −13 | −2.4369121E−03 |
| −14 | −2.2540586E−04 |
| −15 | 3.9273163E−04 |

FIG. 112

| PIXEL POSITION | COEFFICIENT |
|---|---|
| +15 | 3.1418530E−04 |
| +14 | −1.8032469E−04 |
| +13 | −1.9495297E−03 |
| +12 | −2.4041755E−03 |
| +11 | 2.5728510E−03 |
| +10 | 1.0234888E−02 |
| +9 | 7.6489929E−03 |
| +8 | −1.3088345E−02 |
| +7 | −3.3260744E−02 |
| +6 | −1.5635253E−02 |
| +5 | 4.6649308E−02 |
| +4 | 9.1115302E−02 |
| +3 | 2.3267786E−02 |
| +2 | −1.8191931E−01 |
| +1 | −4.2024285E−01 |
| PIXEL OF INTEREST | 1.9735517E+00 |
| −1 | −4.2024285E−01 |
| −2 | −1.8191931E−01 |
| −3 | 2.3267786E−02 |
| −4 | 9.1115302E−02 |
| −5 | 4.6649308E−02 |
| −6 | −1.5635253E−02 |
| −7 | −3.3260744E−02 |
| −8 | −1.3088345E−02 |
| −9 | 7.6489929E−03 |
| −10 | 1.0234888E−02 |
| −11 | 2.5728510E−03 |
| −12 | −2.4041755E−03 |
| −13 | −1.9495297E−03 |
| −14 | −1.8032469E−04 |
| −15 | 3.1418530E−04 |

IMAGE PROCESSING APPARATUS AND METHOD, AND IMAGE PICKUP APPARATUS

TECHNICAL FIELD

The present invention relates to an image processing device and method, and an image-taking device, and particularly relates to an image processing device and method, and an image-taking device, which take into consideration difference between signals detected by sensors and the real world.

BACKGROUND ART

One type of processing for generating images with higher resolution based on input images, is class classification adaptation processing. An example of class classification adaptation processing is processing wherein coefficients used in processing for generating images with higher resolution are generated beforehand, in the spatial direction, and images are generated with higher resolution in the spatial direction based on the generated coefficients.

FIG. 1 is a block diagram illustrating the configuration of a conventional image processing device for generating coefficients used in class classification adaptation processing for generating HD (High Definition) images from SD (Standard Definition) images.

Frame memory 11 stores input images, which are HD images, in increments of frames. The frame memory 11 supplies the stored HD images to a weighted averaging unit 12 and a corresponding pixel obtaining unit 16.

The weighted averaging unit 12 performs ¼ weighted averaging on the HD images stored in the frame memory 11, generates SD images, and supplies the generated SD images to the frame memory 13.

The frame memory 13 stores the SD images supplied from the weighted averaging unit 12 in increments of frames, and supplies the stored SD images to a class classification unit 14 and prediction tap obtaining unit 15.

The class classification unit 14 is configured of a class tap obtaining unit 21 and a waveform classification unit 22, and performs class classification of pixels of interest which are the pixel of interest in the SD images stored in the frame memory 13. The class tap obtaining unit 21 obtains a predetermined number of class taps which are pixels of the SD image corresponding to the pixel of interest from the frame memory 13, and supplies the obtained class taps to the waveform classification unit 22.

FIG. 2 is a diagram explaining the class taps obtained by the class tap obtaining unit 21. As shown in FIG. 2, the class tap obtaining unit 21 obtains eleven class taps at predetermined positions.

The waveform classification unit 22 classifies the pixel of interest into one class out of multiple classes, based on the class taps, and supplies a class No. corresponding to the classified class, to the prediction tap obtaining unit 15. The waveform classification unit 22 classifies the pixel of interest into one class out of 2048 classes, based on the eleven class taps.

The prediction tap obtaining unit 15 obtains a predetermined number of prediction taps which are pixels of the SD image, corresponding to the classified class from the frame memory 13, based on the class No., and supplies the obtained prediction taps and class Nos. to a corresponding pixel obtaining unit 16.

FIG. 3 is a diagram explaining prediction taps which the prediction tap obtaining unit 15 obtains. As shown in FIG. 3, the prediction tap obtaining unit 15 obtains nine prediction taps at predetermined locations.

The corresponding pixel obtaining unit 16 obtains, from the frame memory 11, pixels of the HD image corresponding to the pixel values to be predicted, based on the prediction taps and the class Nos., and supplies the prediction taps, class Nos., and the pixels of the HD image corresponding to the obtained pixel values to be predicted, to a normal equation generating unit 17.

The normal equation generating unit 17 generates normal equations corresponding to relationships between prediction taps and pixel values to be predicted, corresponding to the classes, based on the prediction taps, class Nos., and the obtained pixel values to be predicted, and supplies the generated normal equations corresponding to the classes, to a coefficient calculating unit 18.

The coefficient calculating unit 18 solves the normal equation supplied from the normal equation generating unit 17, calculates coefficient sets corresponding to each class, and supplies the calculated coefficient sets to coefficient set memory 19, along with the class Nos.

The coefficient set memory 19 stores the calculated coefficient sets corresponding to the classes, based on the class Nos.

FIG. 4 is a diagram explaining an overview of class classification adaptation processing. In class classification adaptation processing, a tutor image which is an HD image is used to generate a corresponding SD image, by ¼ weighted average processing. The generated SD image is called a student image.

Next, a coefficient set for generating an HD image from the SD image is generated, based on the tutor image which is the HD image and the student image which is the corresponding SD image. The coefficient set is configured of coefficients for generating an HD image from an SD image, by linear prediction and the like.

A quadruple-density image is generated from the coefficients set thus generated and the SD image, by linear prediction and the like. The processing for generating an image or the like with higher density, from a coefficient set and an input image, is also called mapping.

SNR comparison, or visual qualitative evaluation is performed, based on the generated quadruple-density image and a corresponding HD image.

A coefficient set generated from a particular tutor image and corresponding student image is called a self coefficient set of the particular tutor image and corresponding student image. Mapping using the self coefficient set is called self mapping. A coefficient set generated from multiple other tutor images and corresponding student images is called a cross coefficient set.

On the other hand, with images obtained by a video camera taking a foreground subject which moves across a predetermined stationary background, movement blurring occurs in the event that the speed of movement of the object is relatively fast, and mixing of the foreground and background occurs.

With conventional class classification adaptation processing, one set of coefficients is generated for all of the foreground, background, and portions where mixing between the foreground and background occurs, by learning processing such as described above, and mapping processing is executed based on the coefficient set.

The conventional learning processing for generating coefficients used in the processing for generating HD images from SD images will be described, with reference to the flowchart shown in FIG. 6. In Step S11, an image processing device judges whether or not there are unprocessed pixels in the student image, and in the event that judgment is made that there are unprocessed pixels in the student image, the flow proceeds to Step S12, and pixels of interest are obtained from the student image, in order of raster scan.

In Step S13, the class tap obtaining unit 21 of the class classification unit 14 obtains a class tap corresponding to the pixel of interest, from the student image stored in the frame memory 13. In Step S14, the waveform classification unit 22 of the class classification unit 14 performs class classification of the pixel of interest, based on the class tap. In Step S15, the prediction tap obtaining unit 15 obtains a prediction tap corresponding to the pixel of interest from the student image stored in the frame memory 13, based on the class into which classification has been made.

In Step S16, the corresponding pixel obtaining unit 16 obtains a pixel corresponding to a pixel value to be predicted, from tutor data stored in the frame memory 11, based on the class into which classification has been made.

In Step S17, the normal equation generating unit 17 adds a pixel value of a pixel corresponding to the prediction tap and pixel value to be predicted to the matrix for each class, based on the class into which classification has been made, the flow returns to Step S11, and the image processing device repeats judgment regarding whether or not there are unprocessed pixels. The matrixes for each class to which the pixel value of a pixel corresponding to the prediction tap and pixel value to be predicted are added, correspond to the normal equation for calculating coefficients for each class.

In the event that judgment is made in Step S11 that there are no unprocessed pixels in the student image, the flow proceeds to Step S18, wherein the normal equation generating unit 17 supplies the matrix for each class wherein a pixel value of a pixel corresponding to the prediction tap and pixel value to be predicted has been set, to the coefficient calculating unit 18. The coefficient calculating unit 18 solves the matrix for each class wherein a pixel value of a pixel corresponding to the prediction tap and pixel value to be predicted has been set, and calculates a coefficient set for each class.

In Step S19, the coefficient calculating unit 18 outputs the coefficient for each class that has been calculated, to the coefficient set memory 19. The coefficient set memory 19 stores a coefficient set for each class, and the processing ends.

FIG. 7 is a block diagram illustrating the configuration of a conventional image processing device for generating HD images from SD images, by class classification adaptation processing.

Frame memory 31 stores input images which are SD images, in increments of frames. The frame memory 31 supplies the stored SD images to a mapping unit 32.

The SD images input to the mapping unit 32 are supplied to a class classification unit 41 and a prediction tap obtaining unit 42.

The class classification unit 41 is configured of a class tap obtaining unit 51 and a waveform classification unit 52, and performs class classification of pixels of interest which are the pixel of interest in the SD images stored in the frame memory 31. The class tap obtaining unit 51 obtains from the frame memory 31 a predetermined number of class taps corresponding to the pixel of interest, and supplies the obtained class taps to the waveform classification unit 52.

The waveform classification unit 52 classifies the pixel of interest into one class out of multiple classes, based on the class taps, and supplies a class No. corresponding to the classified class, to the prediction tap obtaining unit 42.

The prediction tap obtaining unit 42 obtains from the input image stored in the frame memory 31 a predetermined number of prediction taps corresponding to the classified class, based on the class No., and supplies the obtained prediction taps and class Nos. to a prediction computation unit 43.

The prediction computation unit 43 obtains coefficient sets corresponding to classes from the coefficient sets stored in coefficient set memory 33, based on the class No. The prediction computation unit 43 predicts pixel values of predicted images by linear prediction, based on coefficient sets corresponding to classes, and prediction taps. The prediction computation unit 43 supplies the predicted pixel values to frame memory 34.

The frame memory 34 stores-predicted pixel values supplied from the prediction computation unit 43, and outputs an HD image wherein the predicted pixel values have been set.

FIG. 8 is a diagram illustrating the pixel values of the input image, and the pixel values of the output image generated by class classification adaptation processing. In FIG. 8, the white squares indicate input signals, and the solid circles indicate output signals. As shown in FIG. 8, the image generated by the class classification adaptation processing contains waveforms lost in the bandwidth restriction of the SD image. In this sense, it can be said that processing for generating an image with higher resolution by the class classification adaptation processing creates resolution.

The conventional processing for creating images, for generating HD images from SD image with an image processing device which executes processing for creating resolution by class classification adaptation processing, will be described with reference to the flowchart in FIG. 9.

In Step S31, the image processing device judges whether or not there are unprocessed pixels in the input image, and in the event that judgment is made that there are unprocessed pixels in the input image, the flow proceeds to Step S32, where the mapping unit 32 obtains a coefficient set stored in the coefficient set memory 33. In Step S33, the image processing device obtains pixels of interest from the input image in raster scan order.

In Step S34, the class tap obtaining unit 51 of the class classification unit 41 obtains a class tap corresponding to the pixel of interest, from the input image stored in the frame memory 31. In Step S35, the waveform classification unit 52 of the class classification unit 41 performs class classification of the pixel of interest into one class, based on the class tap.

In Step S36, the prediction tap obtaining unit 42 obtains a prediction tap corresponding to the pixel of interest from the input image stored in the frame memory 31, based on the class into which classification has been made.

In Step S37, the prediction computation unit 43 obtains a pixel value of a predicted image by linear prediction, based on the coefficient set corresponding to the class into which classification has been made, and the prediction tap.

In Step S38, the prediction computation unit 43 outputs the predicted pixel value to the frame memory 34. The frame memory 34 stores the pixel value supplied from the prediction computation unit 43. The procedures return to Step S31, and repeats judgement regarding whether or not there are unprocessed pixels.

In the event that judgment is made in Step S31 that there are no unprocessed pixels in an input image, the flow proceeds to Step S39, where the frame memory 34 outputs the stored predicted image wherein predicted values are set, and the processing ends.

Also, edge enhancing processing is used for converting the input image into an image with the sense-of-resolution enhanced even further. As with the class classification adaptation processing described above, the same processing is executed for the entire screen with the edge enhancement processing as well.

However, in the event that objects move in front of still backgrounds, movement blurring occurs not only due to mixture of the moving object images itself, but also due to mixture of the moving object images and the background images. Conventionally, processing images corresponding to the mixing of the background image and the image of the moving object had not been given thought.

DISCLOSURE OF INVENTION

The present invention has been made in light of the above, and it is an object thereof to enable processing of images corresponding to the mixing of background images and images of the moving objects.

An image processing device according to the present invention comprises: region specifying means for specifying, based on the input image data, one or the other of a mixed region made up of a mixture of a foreground object component configuring foreground objects and a background object component configuring background objects, and a non-mixed region made up of one of a foreground region made up of the foreground object component and a background region made up of a background object component configuring the background objects, and outputting region specifying information corresponding to the results of specifying; separating means for separating the input image data in at least the mixed region into the foreground object component and the background object component, corresponding to the region specifying information; and processing means for individually processing the foreground object component and the background object component, corresponding to the results of separation.

The image processing device may further comprise removing means for removing movement blurring of at least one of the foreground object component and the background object component, with the processing means individually processing the foreground object component and the background object component which have been subjected to movement blurring removal.

The region specifying means may further specify a covered background region and an uncovered background region, and output the region specifying information corresponding to the results of specifying, with the separating means separating the input image data into the foreground object component and the background object component in the covered background region and the uncovered background region.

The processing means may generate coefficients used for class classification adaptation processing, for each of the foreground object component and the background object component.

The processing means may generate output image data for each of the foreground object component and the background object component, by class classification adaptation processing.

The processing means may perform edge enhancement for each of the foreground object component and the background object component.

The image processing device may further comprise: foreground component image generating means for generating a foreground component image by synthesizing the foreground object component separated in the mixed region and the pixel data of the foreground region; and background component image generating means for generating a background component image by synthesizing the background object component separated in the mixed region and the pixel data of the background region; with the processing means individually processing the foreground component image and the background component image which are generated.

An image processing method according to the present invention comprises: a region specifying step for specifying, based on the input image data, one or the other of a mixed region made up of a mixture of a foreground object component configuring foreground objects and a background object component configuring background objects, and a non-mixed region made up of one of a foreground region made up of the foreground object component and a background region made up of a background object component configuring the background objects, and outputting region specifying information corresponding to the results of specifying; a separating step for separating the input image data in at least the mixed region into the foreground object component and the background object component, corresponding to the region specifying information; and a processing step for individually processing the foreground object component and the background object component, corresponding to the results of separation.

The image processing method may further comprise a removing step for removing movement blurring of at least one of the foreground object component and the background object component, with the foreground object component and the background object component which have been subjected to movement blurring removal being individually processed in the processing step.

In the region specifying step, a covered background region and an uncovered background region may be further specified, and the region specifying information corresponding to the results of specifying output, with the input image data being separated into the foreground object component and the background object component in the covered background region and the uncovered background region in the separating step.

In the processing step, coefficients used for class classification adaptation processing may be generated, for each of the foreground object component and the background object component.

In the processing step, output image data may be generated for each of the foreground object component and the background object component, by class classification adaptation processing.

In the processing step, edge enhancement may be performed for each of the foreground object component and the background object component.

The image processing method may further comprise: a foreground component image generating step for generating a foreground component image by synthesizing the foreground object component separated in the mixed region and the pixel data of the foreground region; and a background component image generating step for generating a background component image by synthesizing the background object component separated in the mixed region and the pixel data of the background region; with the foreground component image and the background component image which are generated, being individually processed in the processing step.

A program in a recording medium according to the present invention comprises: a region specifying step for specifying, based on the input image data, one or the other of a mixed region made up of a mixture of a foreground object component configuring foreground objects and a background object component configuring background objects, and a non-mixed region made up of one of a foreground region made up of the foreground object component and a background region made up of a background object component configuring the background objects, and outputting region specifying information corresponding to the results of specifying; a separating step for separating the input image data in at least the mixed region into the foreground object component and the background object component, corresponding to the region specifying information; and a processing step for individually processing the foreground object component and the background object component, corresponding to the results of separation.

The program in the recording medium may further comprise a removing step for removing movement blurring of at least one of the foreground object component and the background object component, with the foreground object component and the background object component which have been subjected to movement blurring removal being individually processed in the processing step.

In the region specifying step, a covered background region and an uncovered background region may be further specified, and the region specifying information corresponding to the results of specifying output, with the input image data being separated into the foreground object component and the background object component in the covered background region and the uncovered background region in the separating step.

In the processing step, coefficients used for class classification adaptation processing may be generated, for each of the foreground object component and the background object component.

In the processing step, output image data may be generated for each of the foreground object component and the background object component, by class classification adaptation processing.

In the processing step, edge enhancement may be performed for each of the foreground object component and the background object component.

The program in the recording medium may further comprise: a foreground component image generating step for generating a foreground component image by synthesizing the foreground object component separated in the mixed region and the pixel data of the foreground region; and a background component image generating step for generating a background component image by synthesizing the background object component separated in the mixed region and the pixel data of the background region; with the foreground component image and the background component image which are generated, being individually processed in the processing step.

A program according to the present invention causes a computer to execute: a region specifying step for specifying, based on the input image data, one or the other of a mixed region made up of a mixture of a foreground object component configuring foreground objects and a background object component configuring background objects, and a non-mixed region made up of one of a foreground region made up of the foreground object component and a background region made up of a background object component configuring the background objects, and outputting region specifying information corresponding to the results of specifying; a separating step for separating the input image data in at least the mixed region into the foreground object component and the background object component, corresponding to the region specifying information; and a processing step for individually processing the foreground object component and the background object component, corresponding to the results of separation.

The program may further comprise a removing step for removing movement blurring of at least one of the foreground object component and the background object component, with the foreground object component and the background object component which have been subjected to movement blurring removal being individually processed in the processing step.

In the region specifying step, a covered background region and an uncovered background region may be further specified, and the region specifying information corresponding to the results of specifying output, with the input image data being separated into the foreground object component and the background object component in the covered background region and the uncovered background region in the separating step.

In the processing step, coefficients used for class classification adaptation processing may be generated, for each of the foreground object component and the background object component.

In the processing step, output image data may be generated for each of the foreground object component and the background object component, by class classification adaptation processing.

In the processing step, edge enhancement may be performed for each of the foreground object component and the background object component.

The program may further comprise: a foreground component image generating step for generating a foreground component image by synthesizing the foreground object component separated in the mixed region and the pixel data of the foreground region; and a background component image generating step for generating a background component image by synthesizing the background object component separated in the mixed region and the pixel data of the background region; with the foreground component image and the background component image which are generated, being individually processed in the processing step.

An image-taking device according to the present invention comprises: image-taking means for outputting a subject image taken by an image-taking device having a predetermined number of pixels having time-integration effects as taken image data made up of a predetermined number of pieces of pixel data; region specifying means for specifying, based on the taken image data, one or the other of a mixed region made up of a mixture of a foreground object component configuring foreground objects and a background object component configuring background objects, and a non-mixed region made up of one of a foreground region made up of the foreground object component and a background region made up of a background object component configuring the background objects, and outputting region specifying information corresponding to the results of specifying; separating means for separating the taken image data in at least the mixed region into the foreground object component and the background object component, corresponding to the region specifying information; and processing means for individually processing the foreground object component and the background object component, corresponding to the results of separation.

The image-taking device may further comprise removing means for removing movement blurring of at least one of the foreground object component and the background object component, with the processing means individually processing the foreground object component and the background object component which have been subjected to movement blurring removal.

The region specifying means may further specify a covered background region and an uncovered background region, and output the region specifying information corresponding to the results of specifying, with the separating means separating the taken image data into the foreground object component and the background object component in the covered background region and the uncovered background region.

The processing means may generate coefficients used for class classification adaptation processing, for each of the foreground object component and the background object component.

The processing means may generate output image data for each of the foreground object component and the background object component, by class classification adaptation processing.

The processing means may perform edge enhancement for each of the foreground object component and the background object component.

The image-taking device may further comprise: foreground component image generating means for generating a foreground component image by synthesizing the foreground object component separated in the mixed region and the pixel data of the foreground region; and background component image generating means for generating a background component image by synthesizing the background object component separated in the mixed region and the pixel data of the background region, with the processing means individually processing the foreground component image and the background component image which are generated.

One or the other of a mixed region made up of a mixture of a foreground object component configuring foreground objects and a background object component configuring background objects, and a non-mixed region made up of one of a foreground region made up of the foreground object component and a background region made up of a background object component configuring the background objects, are specified, region specifying information corresponding to the results of specifying is output, the input image data in at least the mixed region is separated into the foreground object component and the background object component, corresponding to the region specifying information, and the foreground object component and the background object component are individually processed, corresponding to the results of separation.

Thus, in the event that a moving object is photographed, for example, images can be processed corresponding to the mixing of background images and moving object images.

BRIEF DESCRIPTION OF THE DRAWINGS

FIG. 37 is a diagram describing conditions for region judgment.

FIG. 45A is a diagram describing calculating of correlation values.

FIG. 45B is a diagram describing calculating of correlation values.

FIG. 46A is a diagram describing calculating of correlation values.

FIG. 46B is a diagram describing calculating of correlation values.

FIG. 49 is a diagram describing judgment of a region judgment unit 342.

FIG. 104B is a diagram describing the processing for edge enhancement.

FIG. 104C is a diagram describing the processing for edge enhancement.

FIG. 105 is a diagram illustrating filter coefficients.

FIG. 106 is a diagram explaining operation of a high-pass filter 921.

FIG. 107 is a diagram illustrating filter coefficients.

FIG. 108 is a diagram explaining operation of the high-pass filter 921.

FIG. 109 is a block diagram illustrating another configuration of the edge enhancing unit 907.

FIG. 110 is a diagram illustrating filter coefficients.

FIG. 111 is a diagram explaining operation of a filter 941.

FIG. 112 is a diagram illustrating filter coefficients.

FIG. 113 is a diagram explaining operation of the filter 941.

FIG. 114 is a diagram explaining the processing by the separated image processing unit 106.

Figure 115:
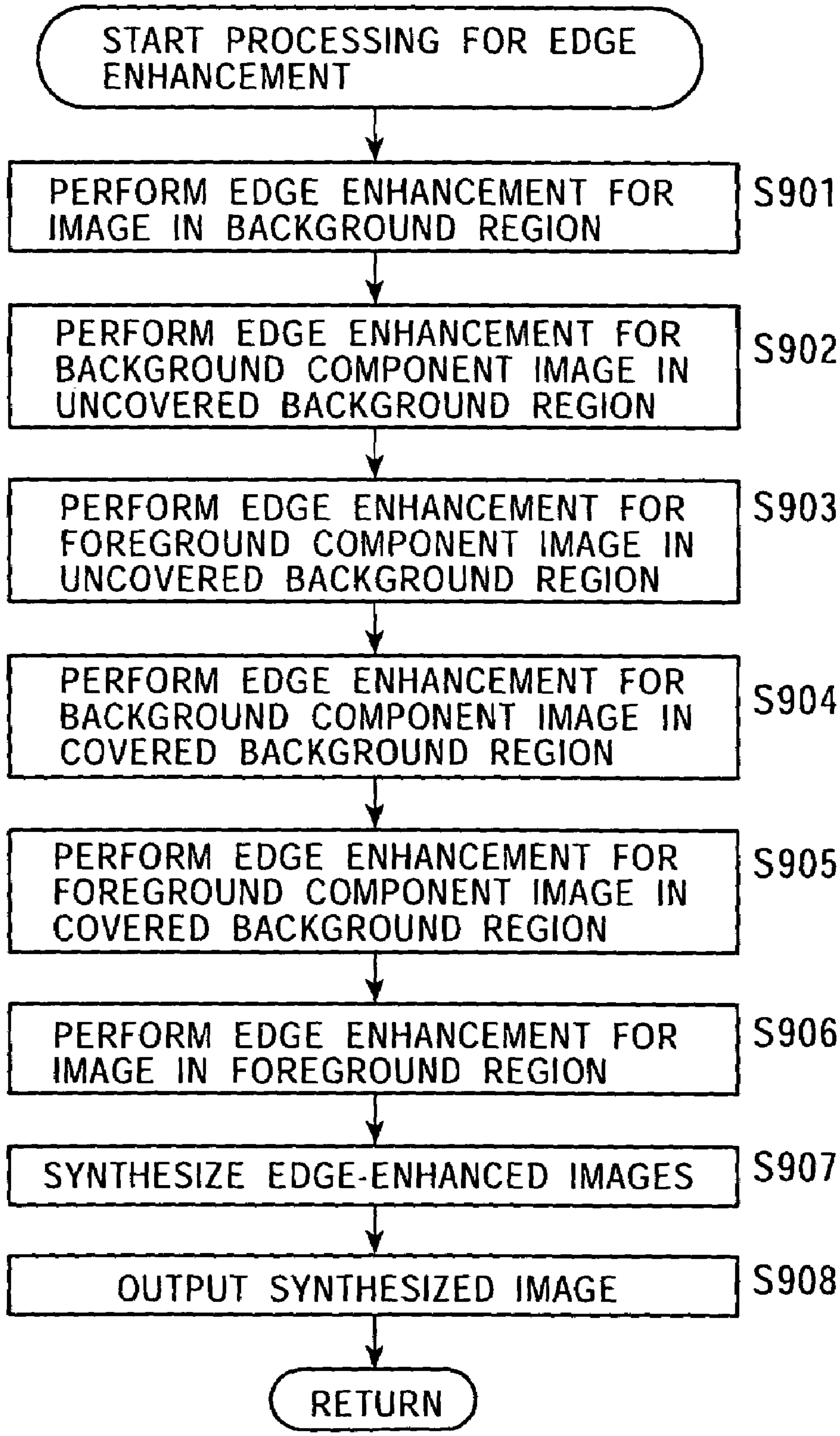

FIG. 115 is a flowchart explaining the processing of edge enhancement processing with the separated image processing unit 106.

Figure 116:
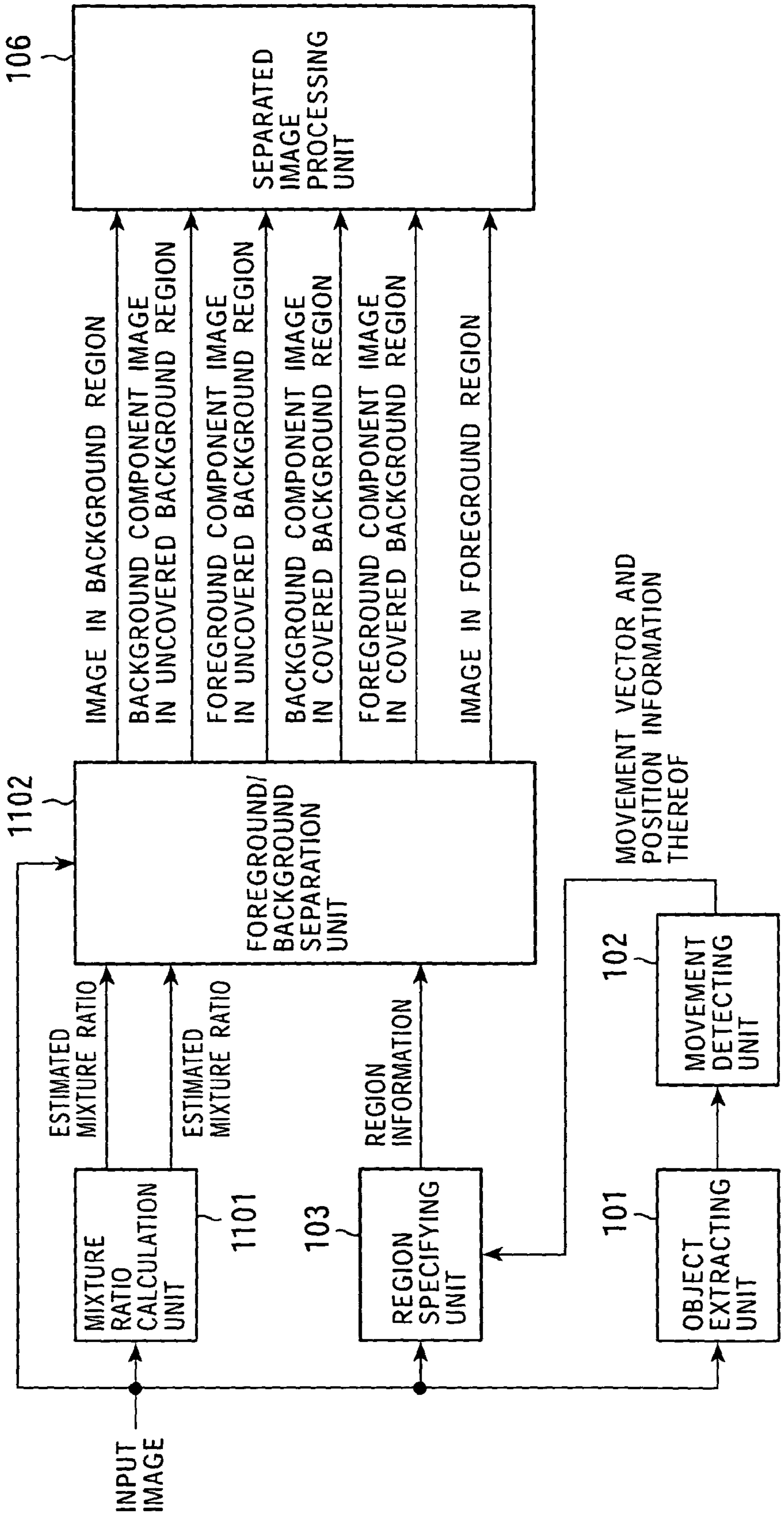

FIG. 116 is a block diagram illustrating another configuration of the functions of the image processing device.

Figure 117:
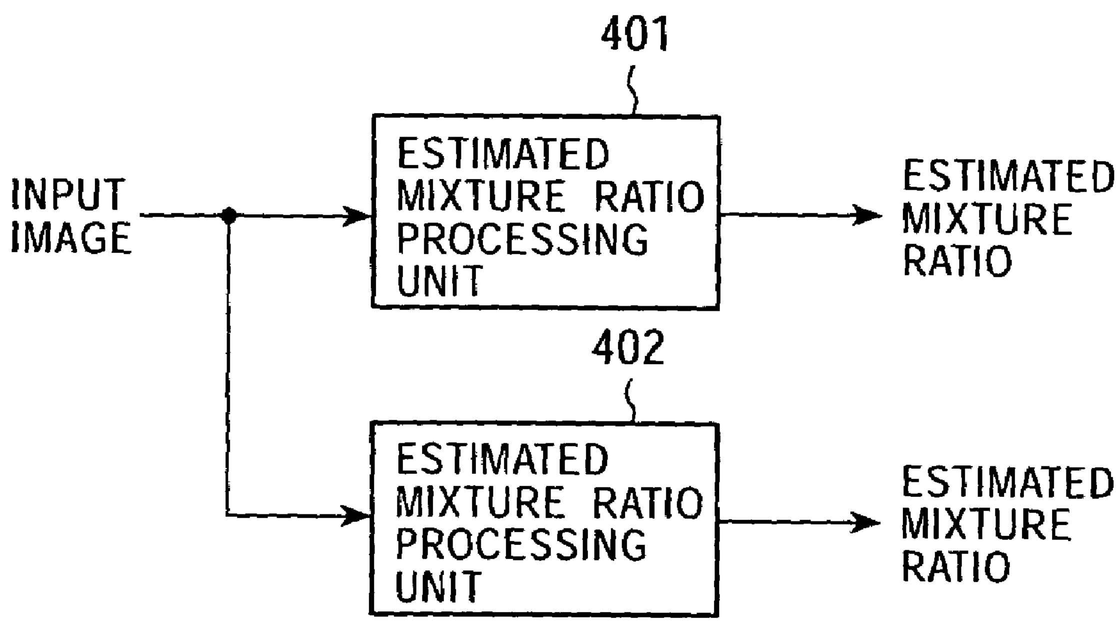

FIG. 117 is a block diagram illustrating an example of the configuration of a mixture ratio calculating unit 1101.

Figure 118:
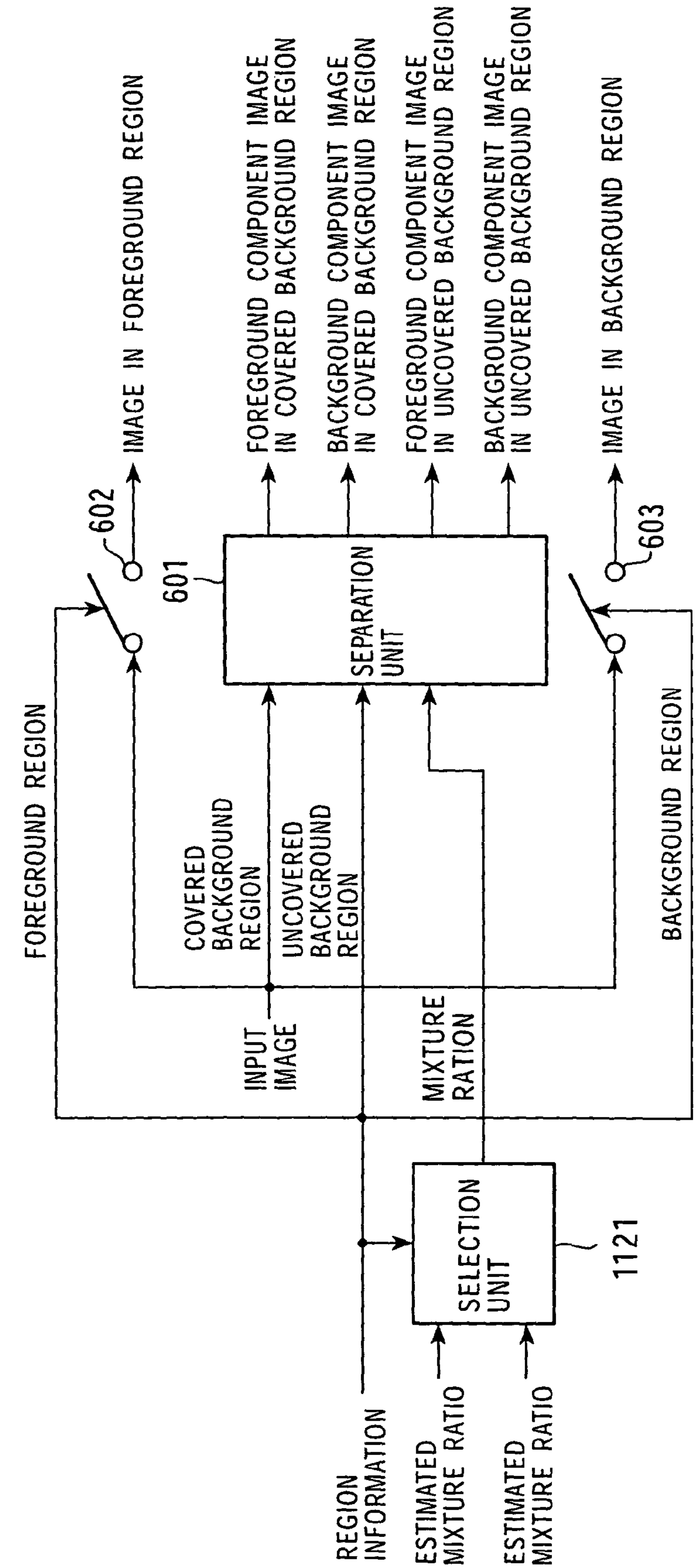

FIG. 118 is a block diagram illustrating an example of the configuration of a foreground/background separation unit 1102.

Figure 119:
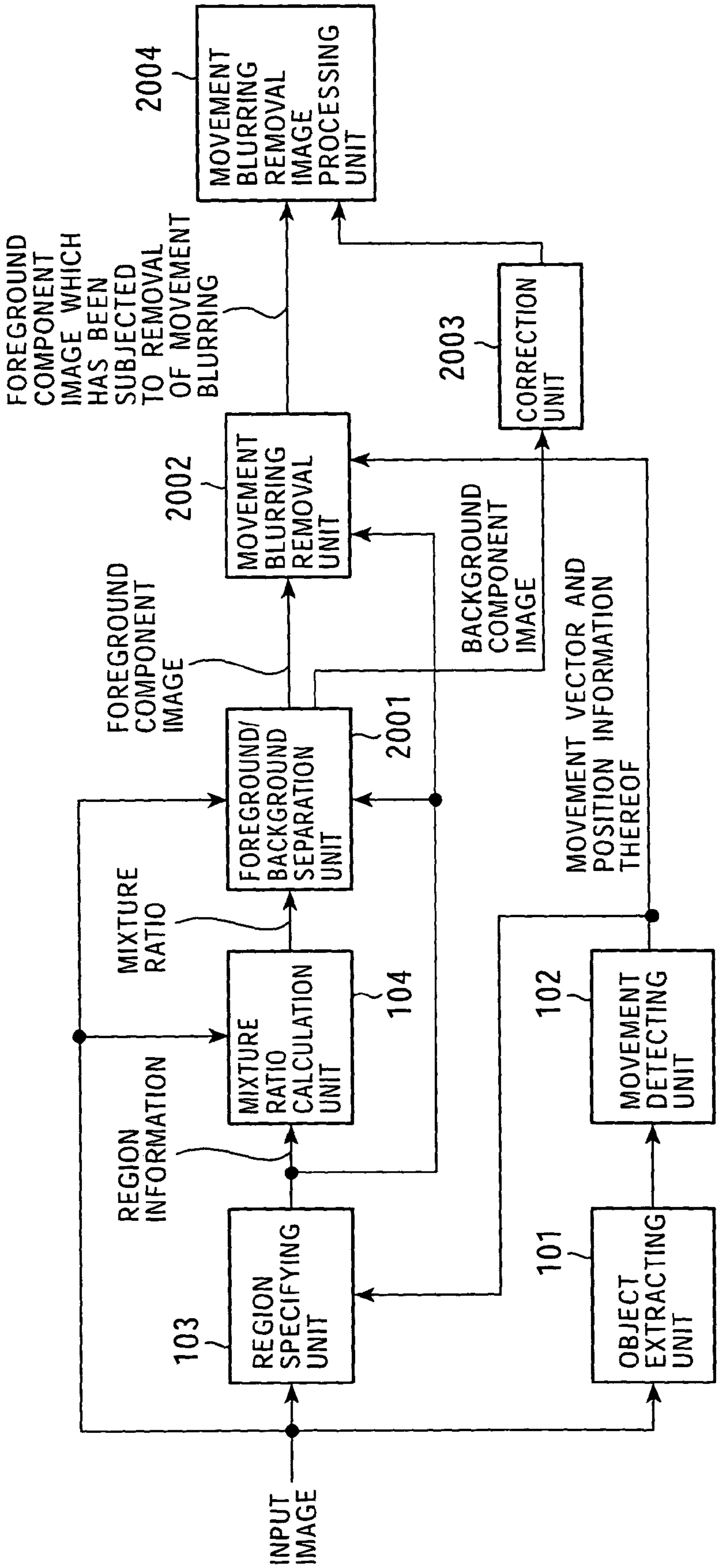

FIG. 119 is a block diagram illustrating another configuration of the functions of the image processing device.

Figure 120:
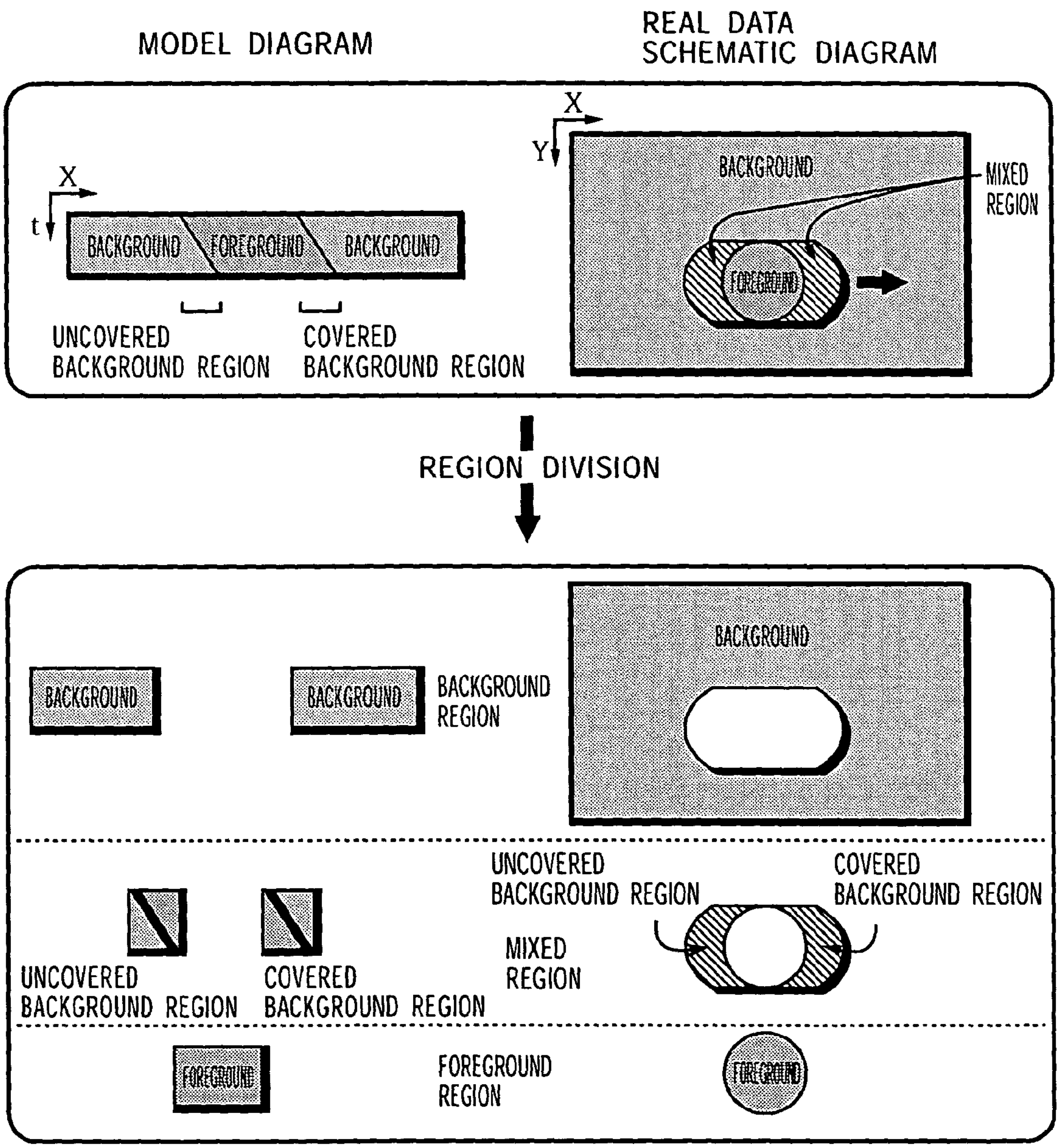

FIG. 120 is a diagram illustrating the correlation between a divided image, and a model diagram wherein the pixel values of pixels are developed over the time direction.

Figure 121:
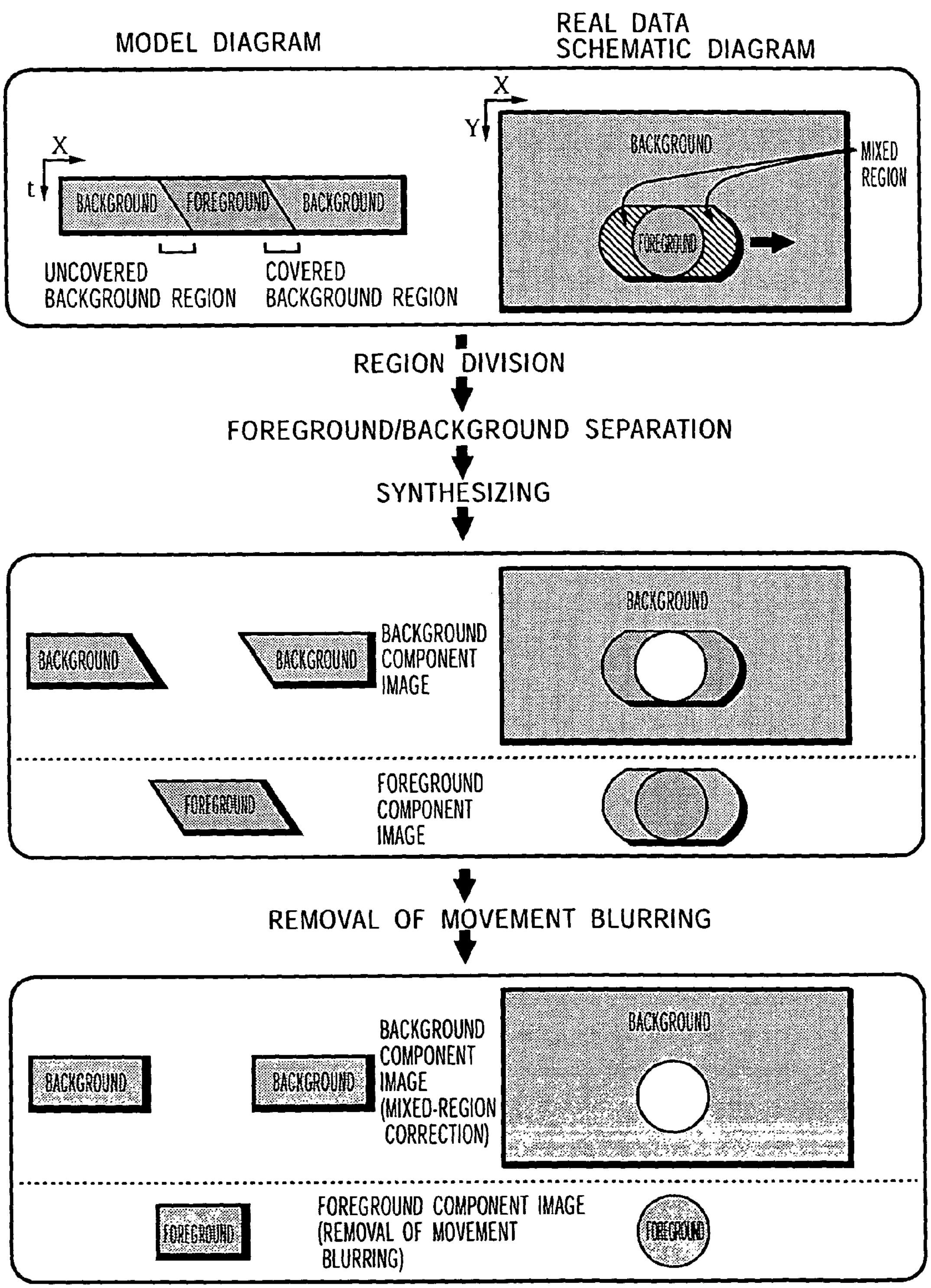

FIG. 121 is a diagram illustrating the correlation between an image wherein movement blurring has been removed, and a model diagram wherein the pixel values of pixels are developed over the time direction.

Figure 122:
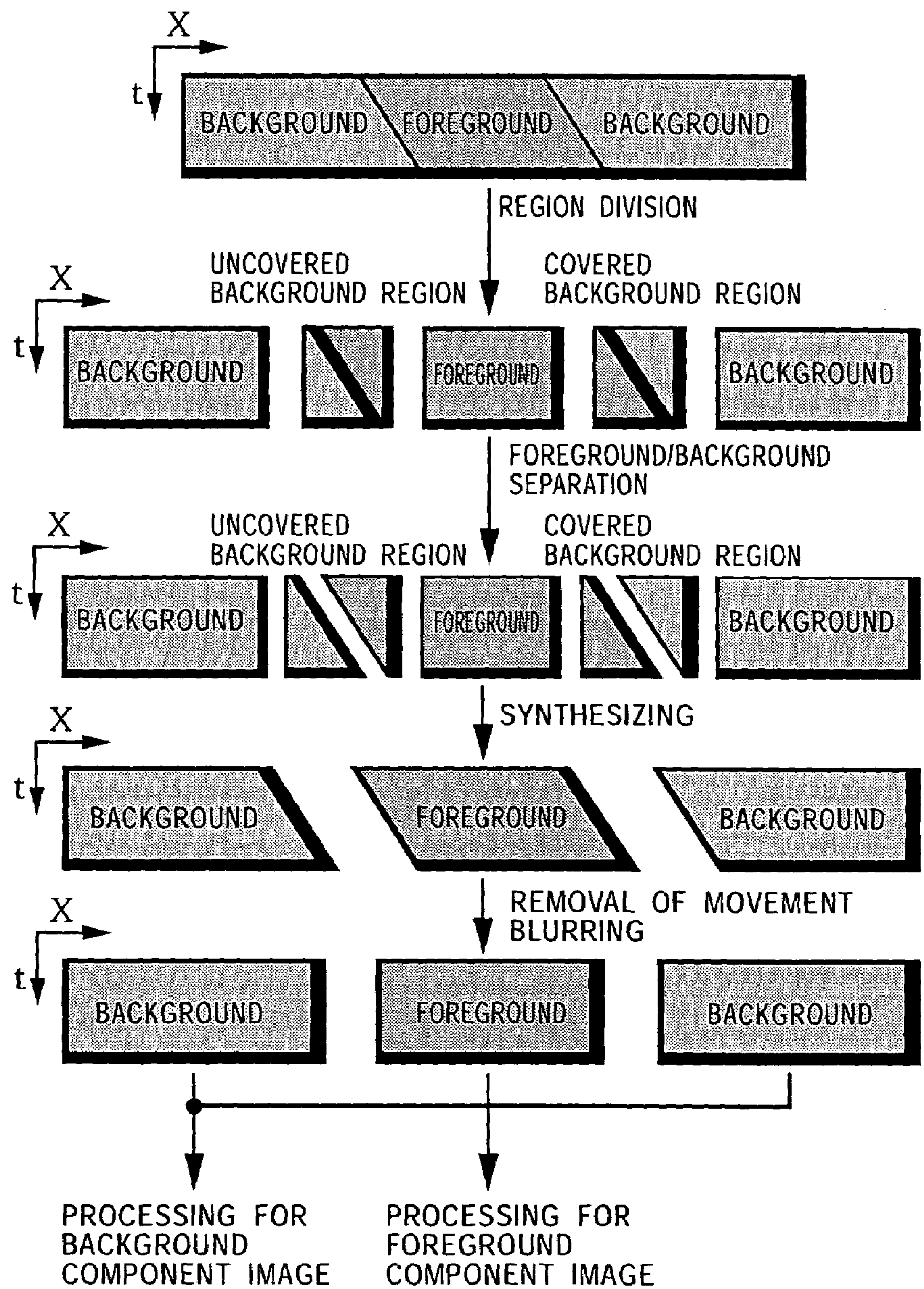

FIG. 122 is a diagram describing processing of the image processing device according to the present invention.

Figure 123:
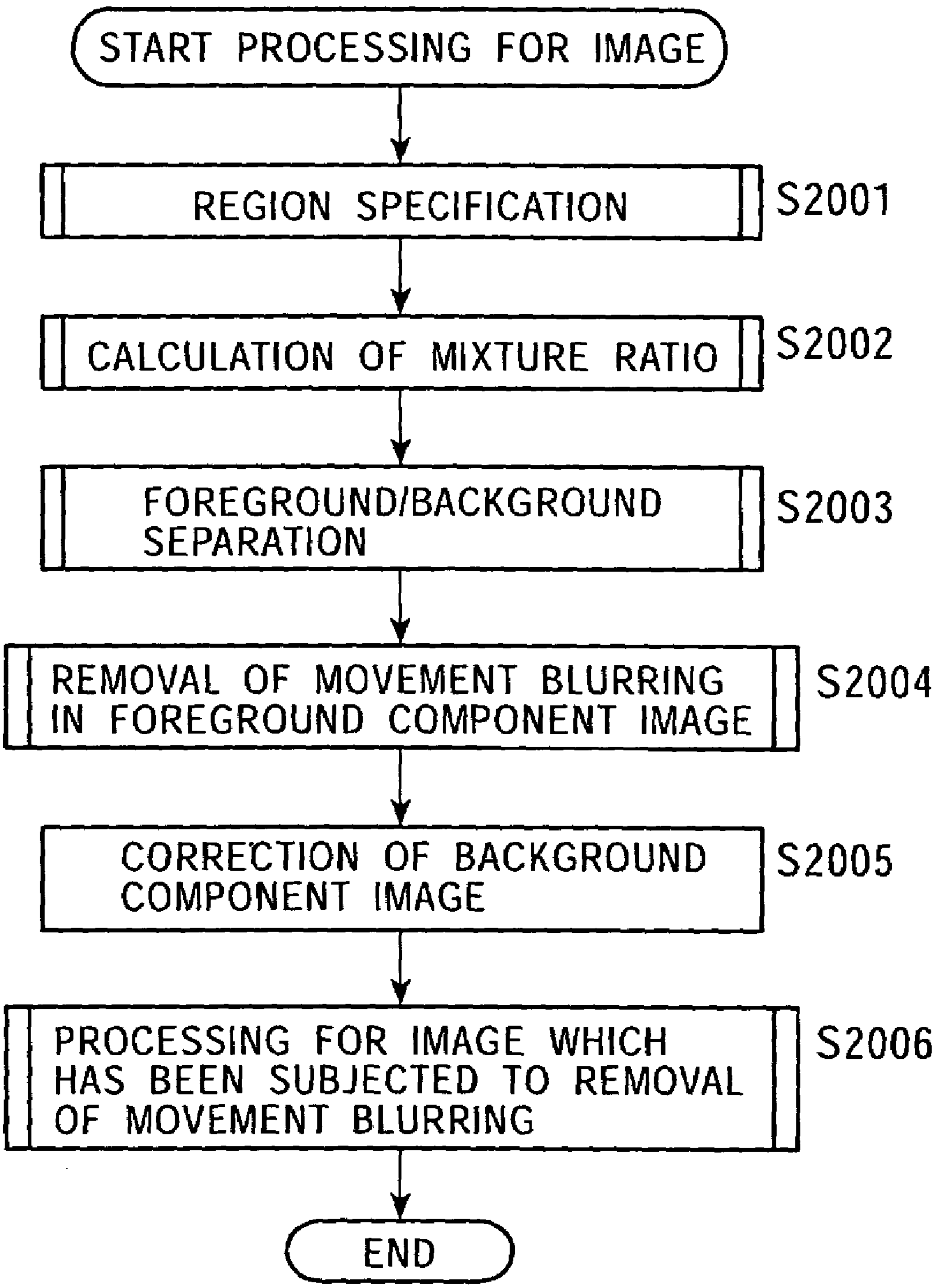

FIG. 123 is a flowchart explaining the processing of images with the image processing device according to the present invention.

Figure 124:
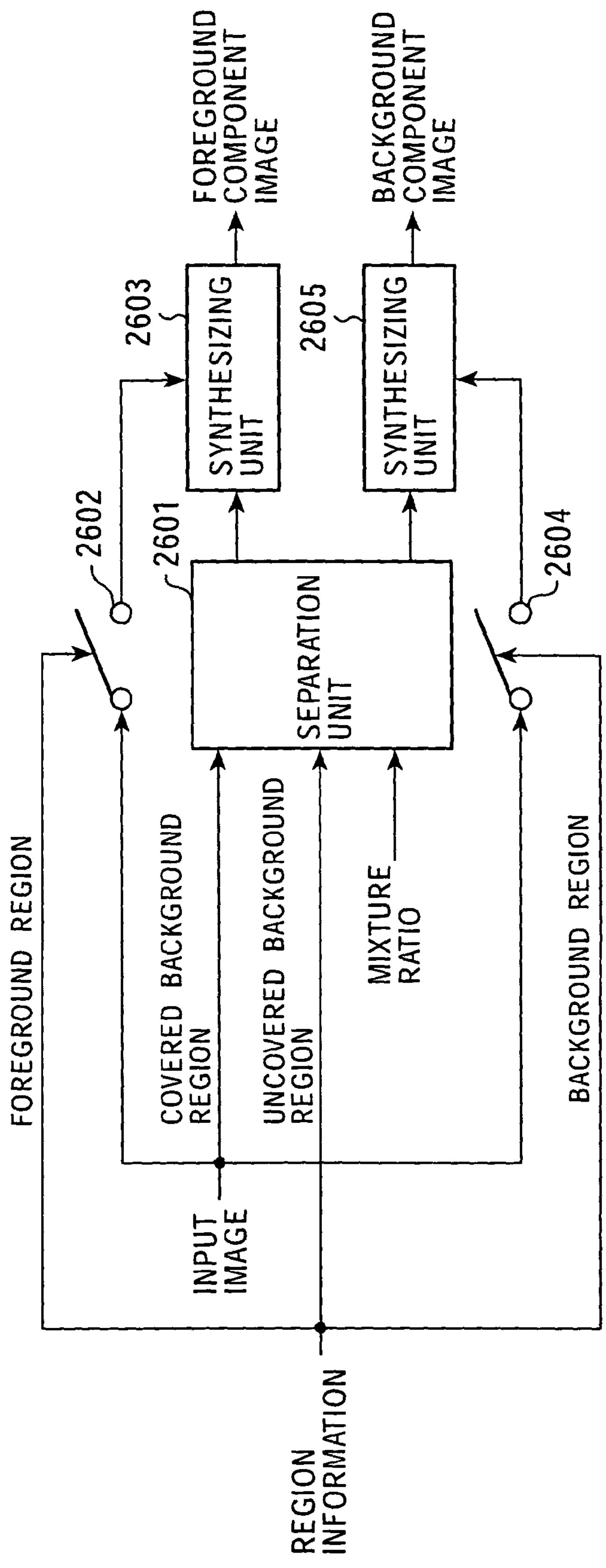

FIG. 124 is a block diagram illustrating an example of the configuration of a foreground/background separation unit 2001.

Figure 125A:
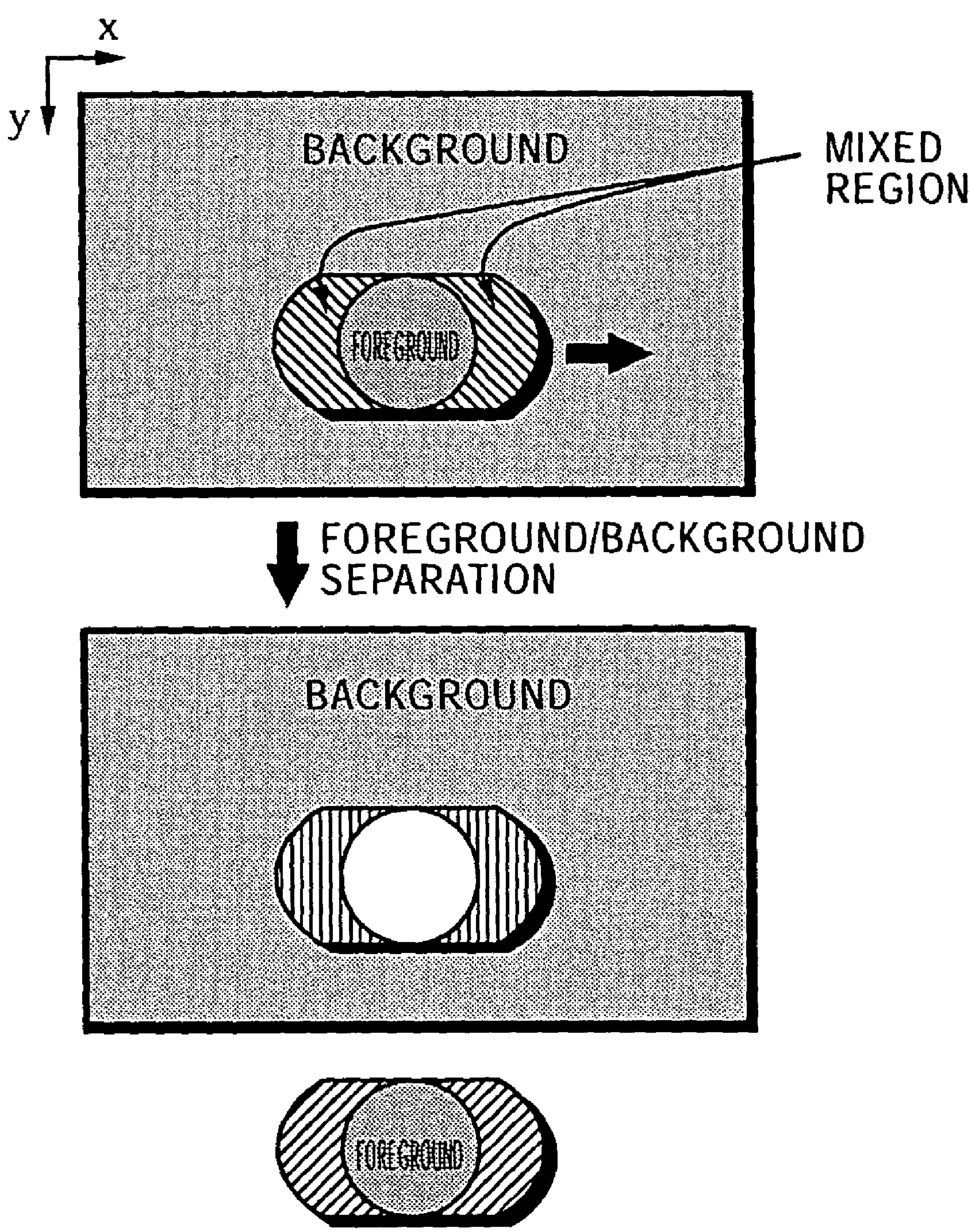

FIG. 125A is a diagram illustrating an input image, foreground component image, and background component image.

Figure 125B:
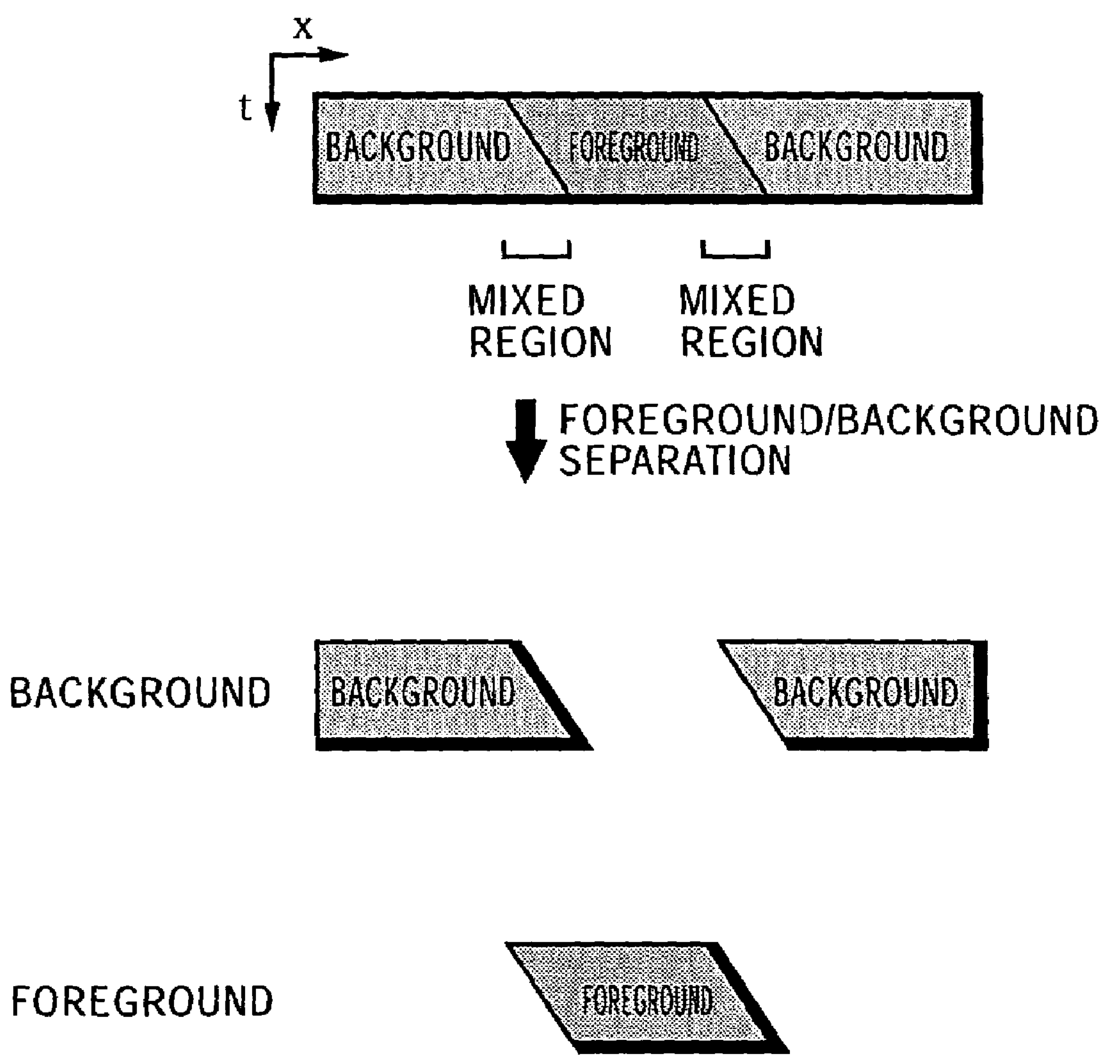

FIG. 125B is a model diagram corresponding to an input image, foreground component image, and background component image.

Figure 126:
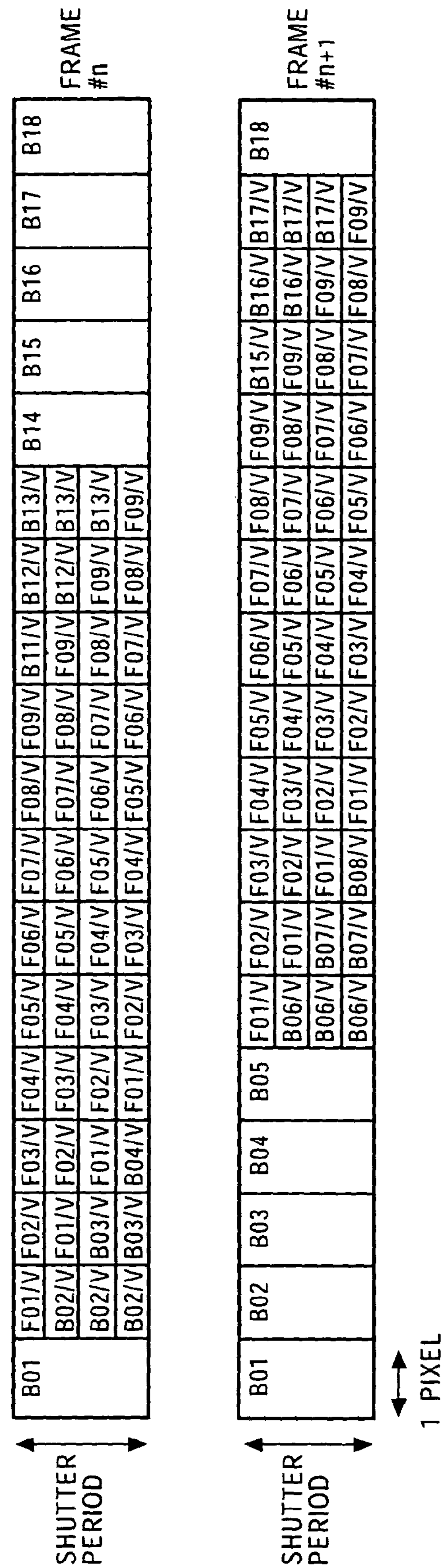

FIG. 126 is a model diagram wherein the pixel values are developed over the time direction, and periods corresponding to shutter time are divided.

Figure 127:
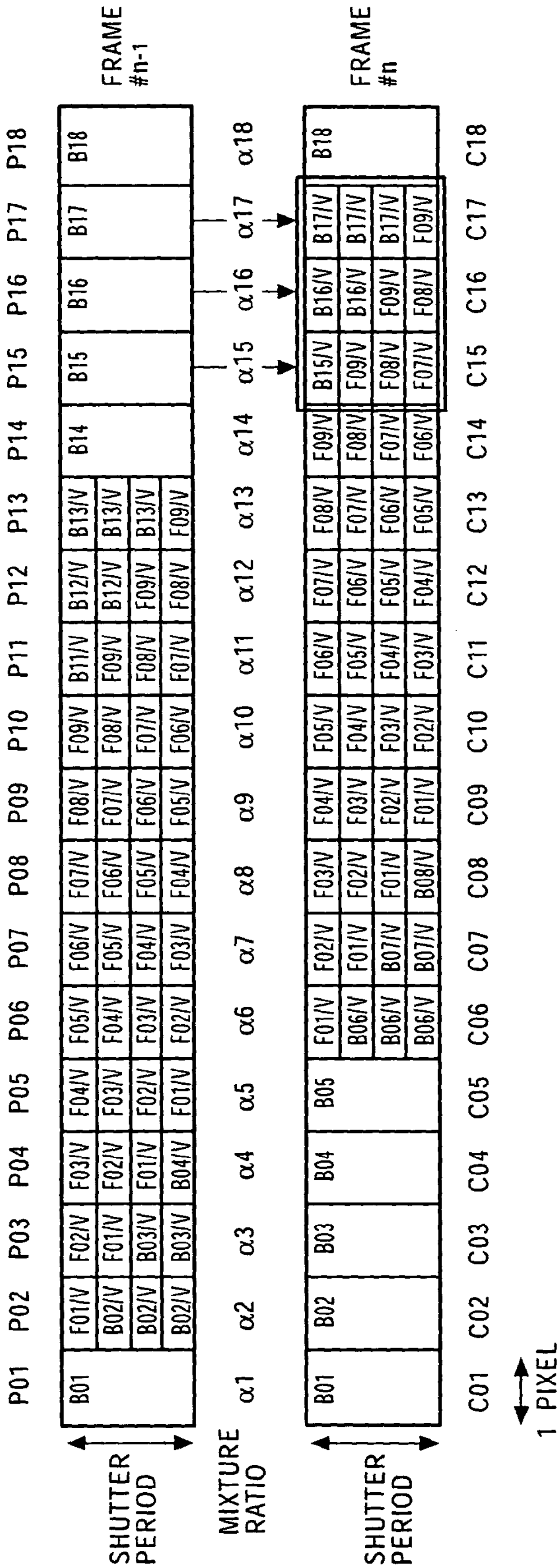

FIG. 127 is a model diagram wherein the pixel values are developed over the time direction, and periods corresponding to shutter time are divided.

Figure 128:
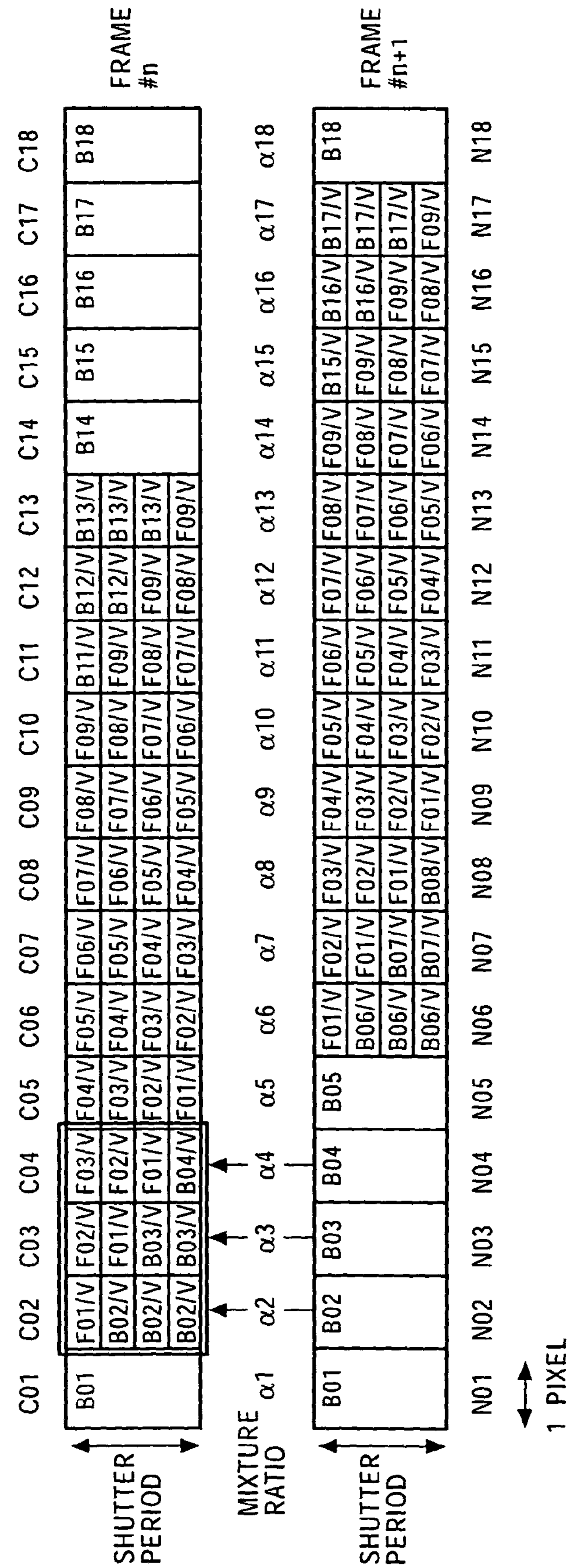

FIG. 128 is a model diagram wherein the pixel values are developed over the time direction, and periods corresponding to shutter time are divided.

Figure 129:
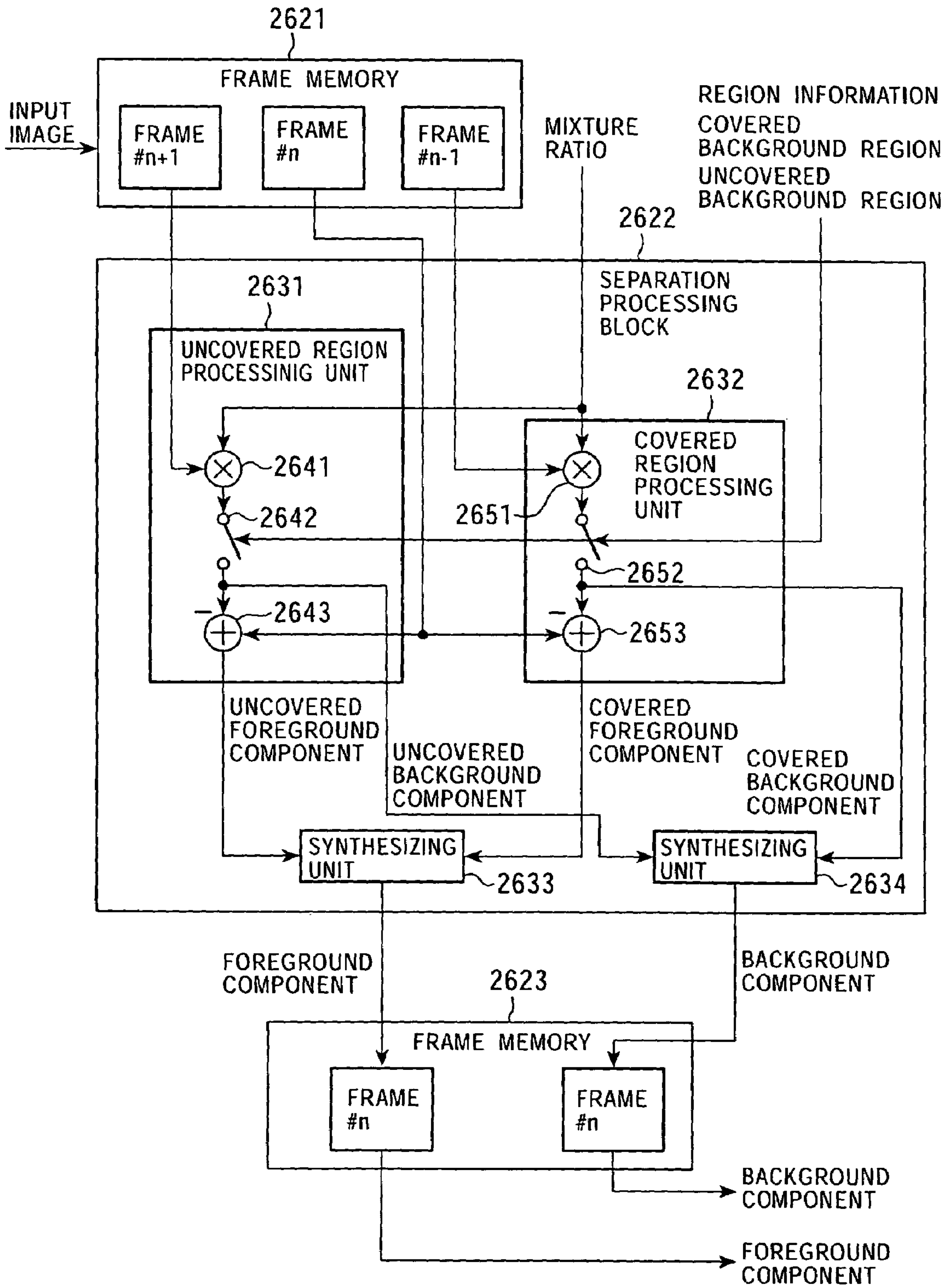

FIG. 129 is a block diagram illustrating an example of the configuration of a separating unit 2601.

Figure 130A:
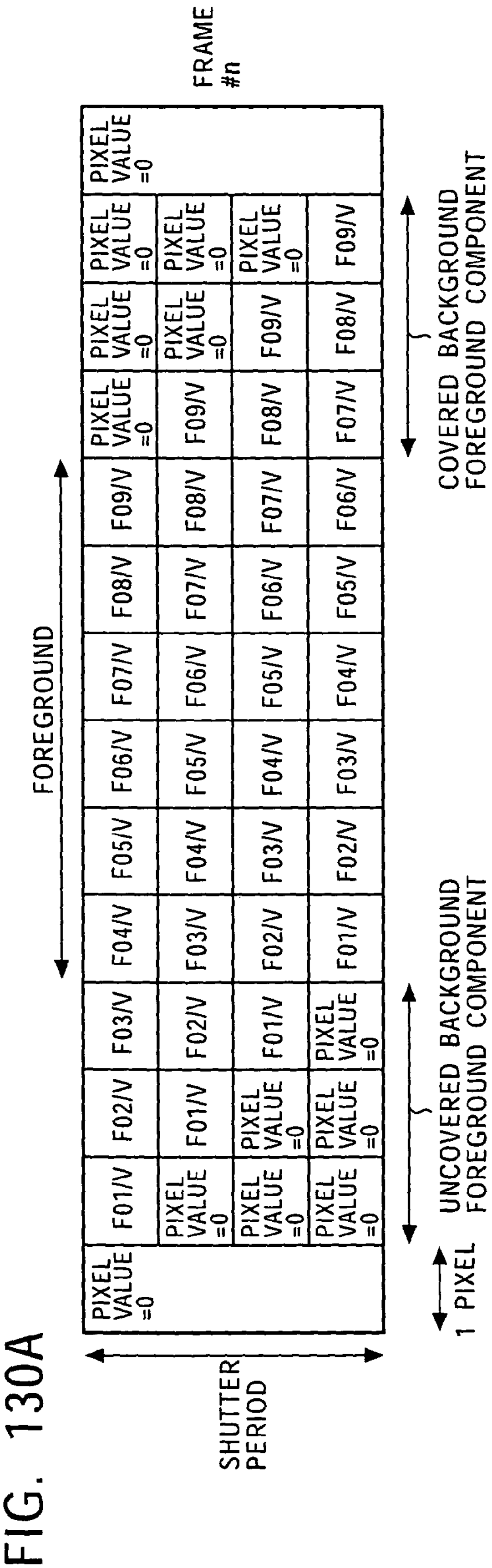

FIG. 130A is a diagram illustrating an example of a separated foreground component image.

Figure 130B:
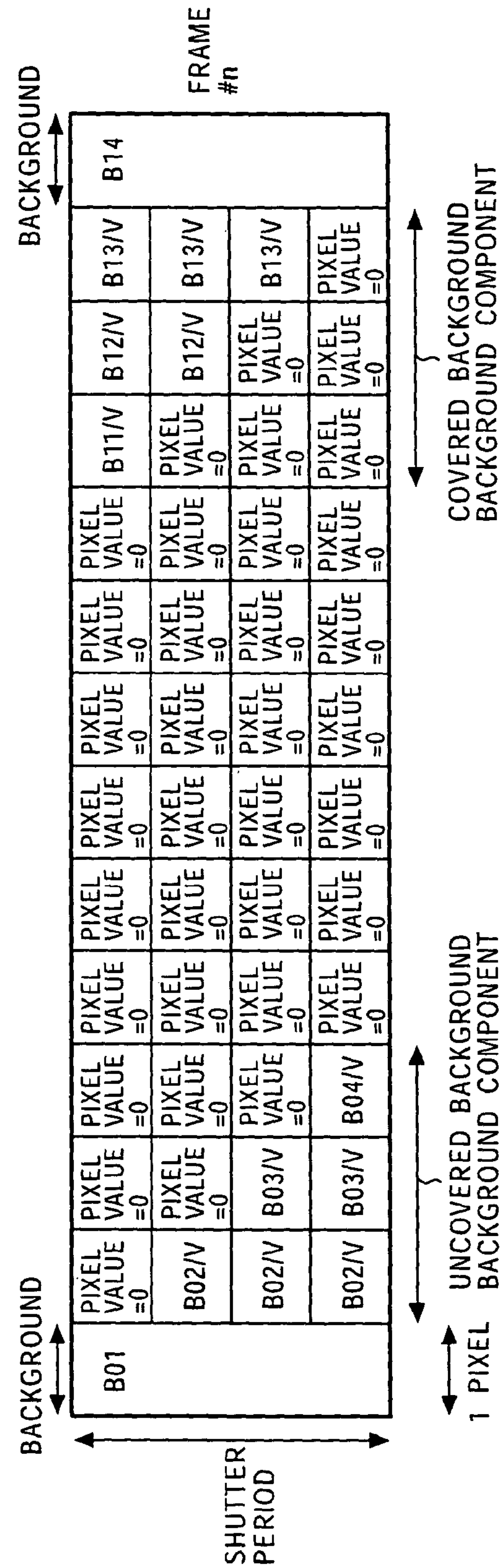

FIG. 130B is a diagram illustrating an example of a separated background component image.

Figure 131:
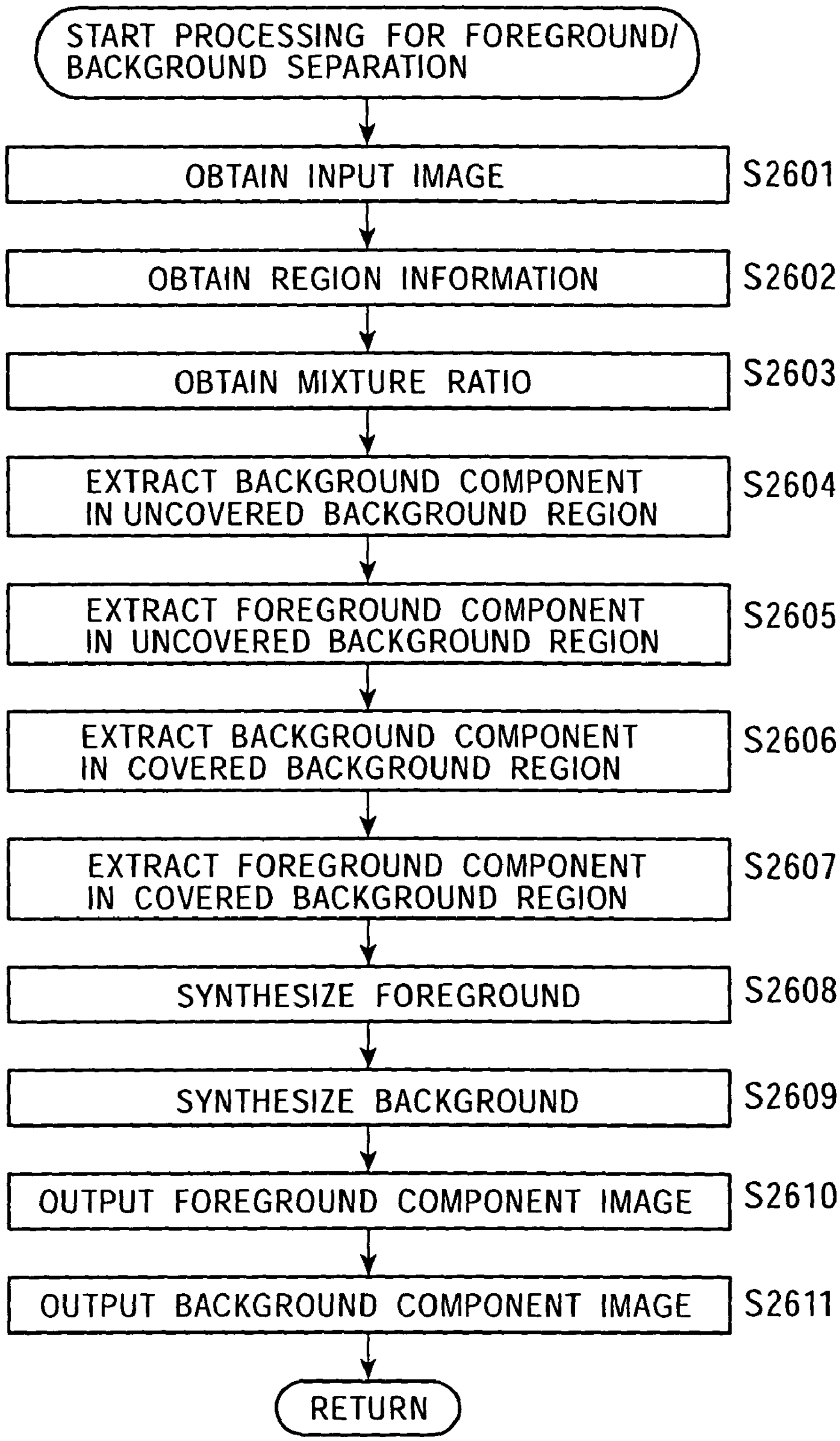

FIG. 131 is a flowchart describing the processing for separating the foreground and the background.

Figure 132:
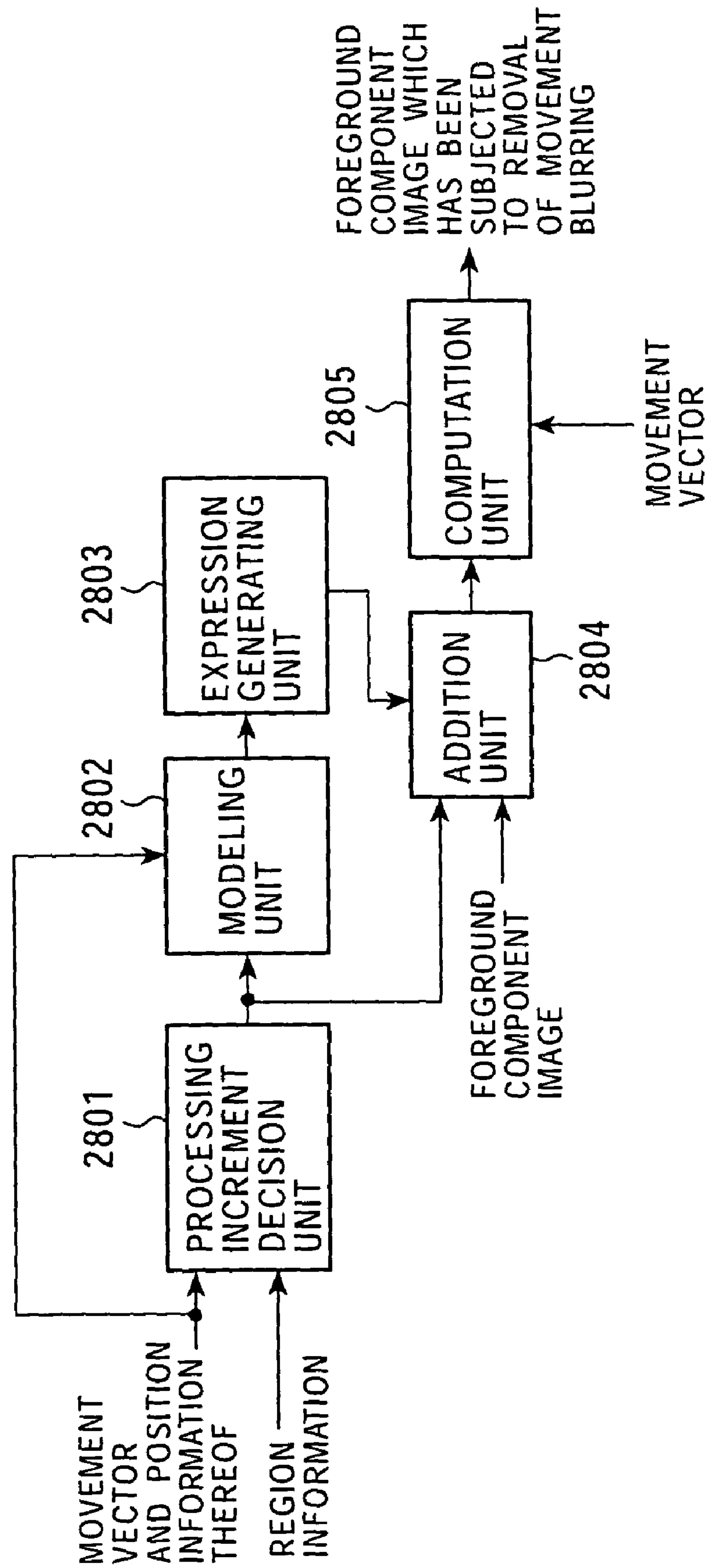

FIG. 132 is a block diagram illustrating an example of the configuration of a movement blurring removal unit 2002.

Figure 133:
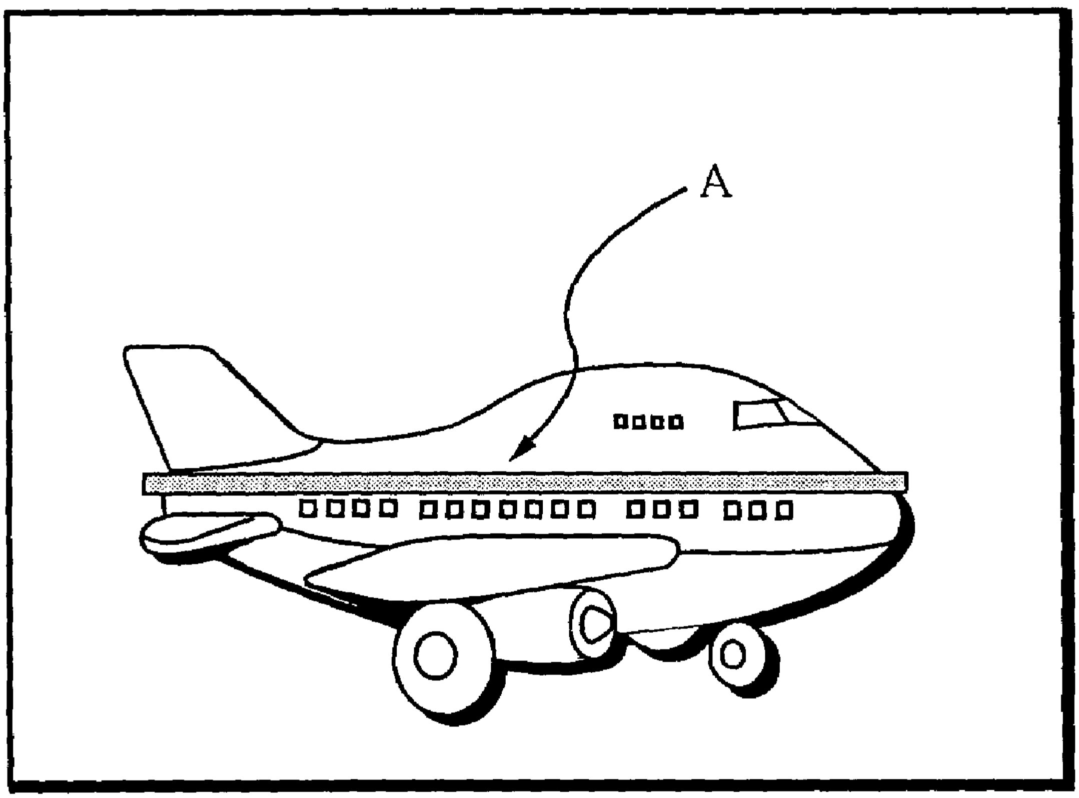

FIG. 133 is a diagram describing increments of processing.

Figure 134:
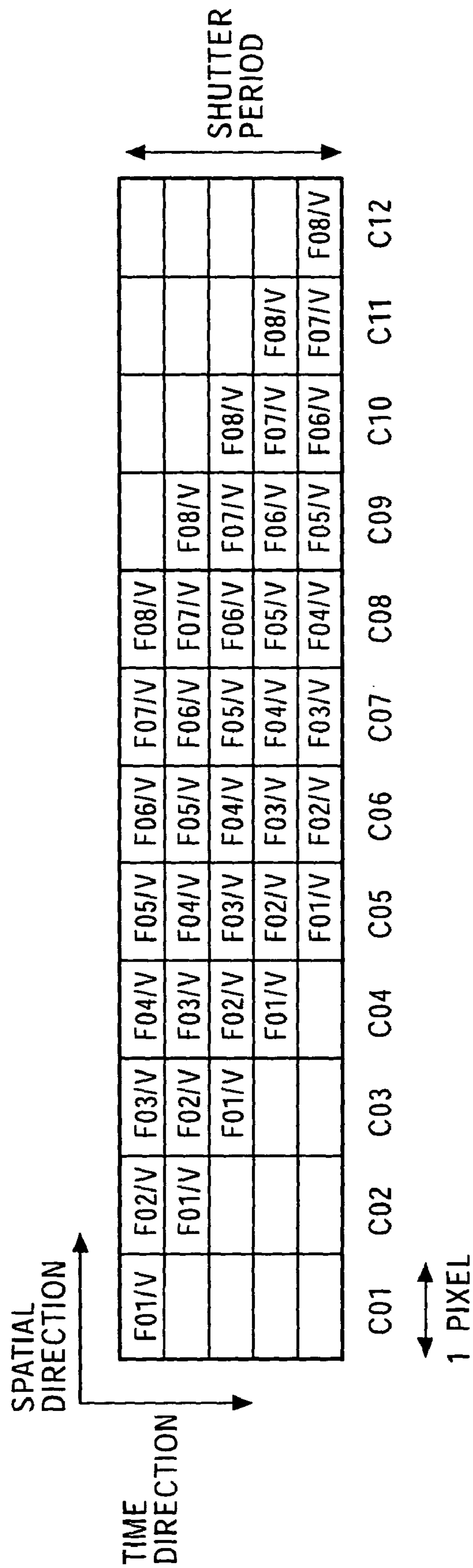

FIG. 134 is a model diagram wherein the pixel values of foreground component image are developed over the time direction, and periods corresponding to shutter time are divided.

Figure 135:
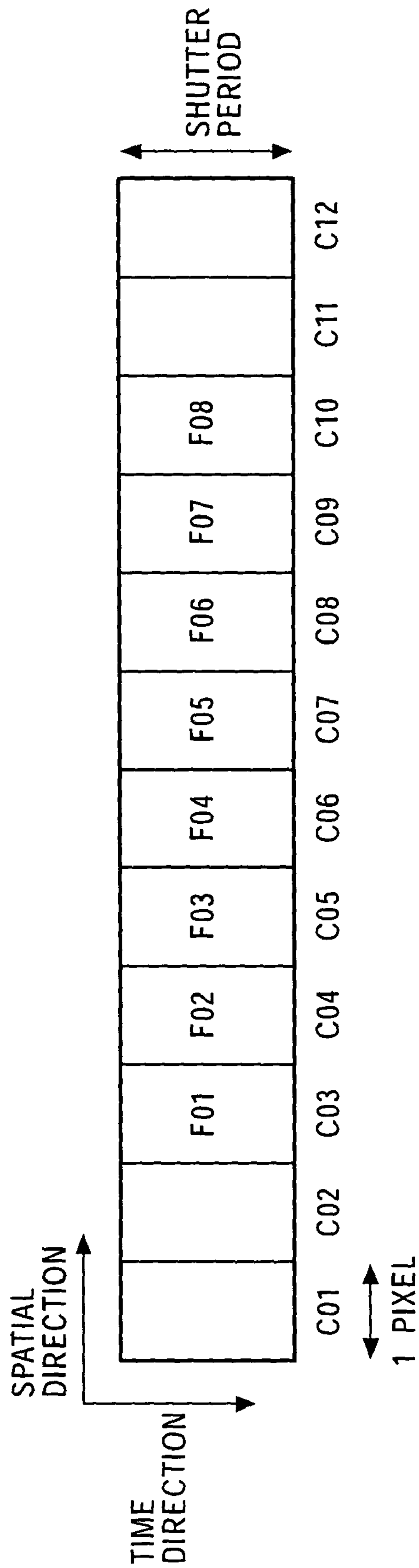

FIG. 135 is a model diagram wherein the pixel values of foreground component image are developed over the time direction, and periods corresponding to shutter time are divided.

Figure 136:
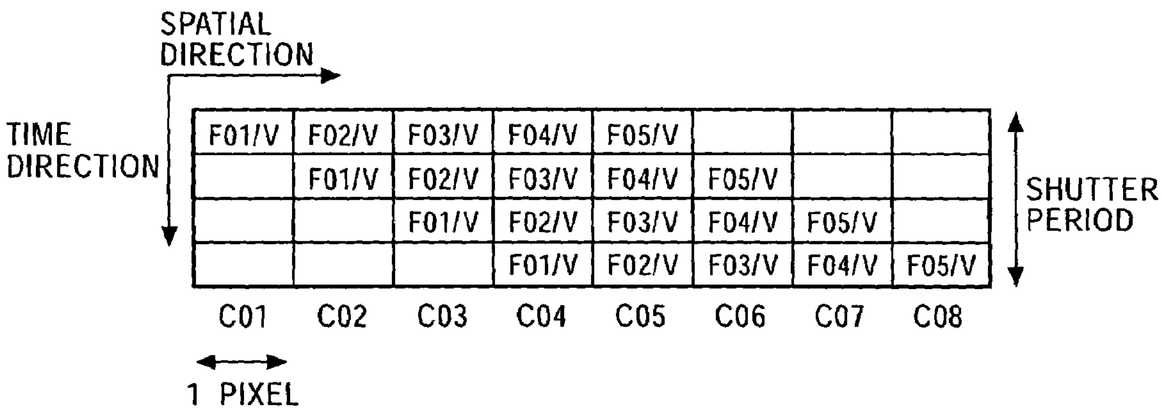

FIG. 136 is a model diagram wherein the pixel values of foreground component image are developed over the time direction, and periods corresponding to shutter time are divided.

Figure 137:
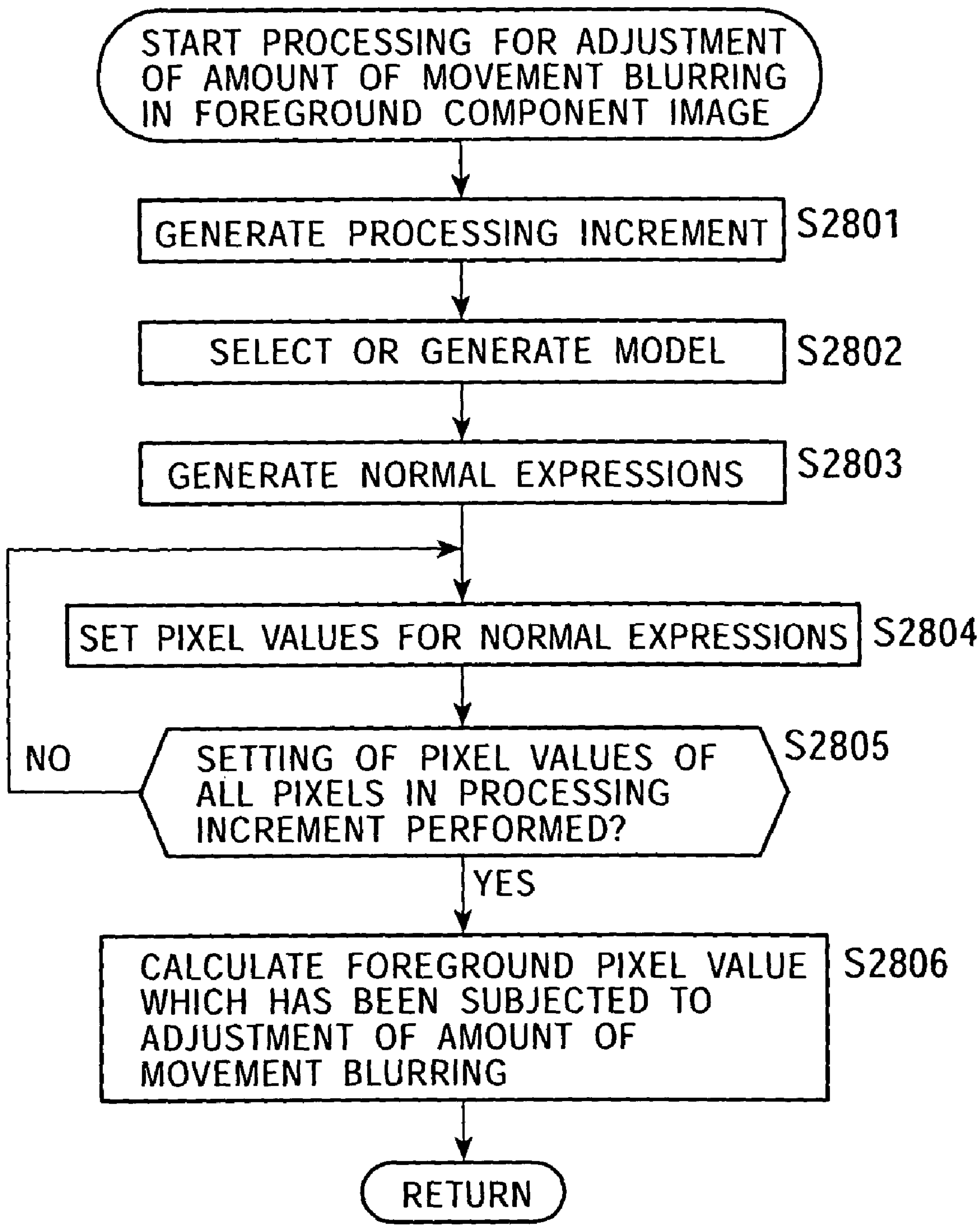

FIG. 137 is a flowchart explaining processing for removing movement blurring contained in the foreground component image by the movement blurring removal unit 2002.

Figure 138:
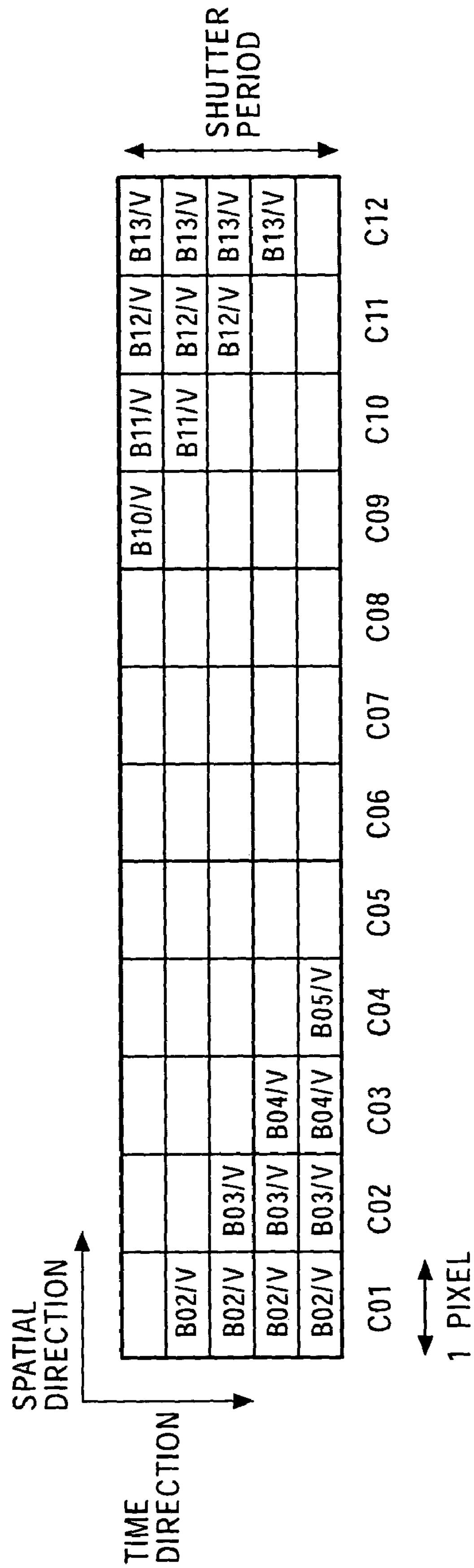

FIG. 138 is a diagram illustrating a model of a background component image.

Figure 139:
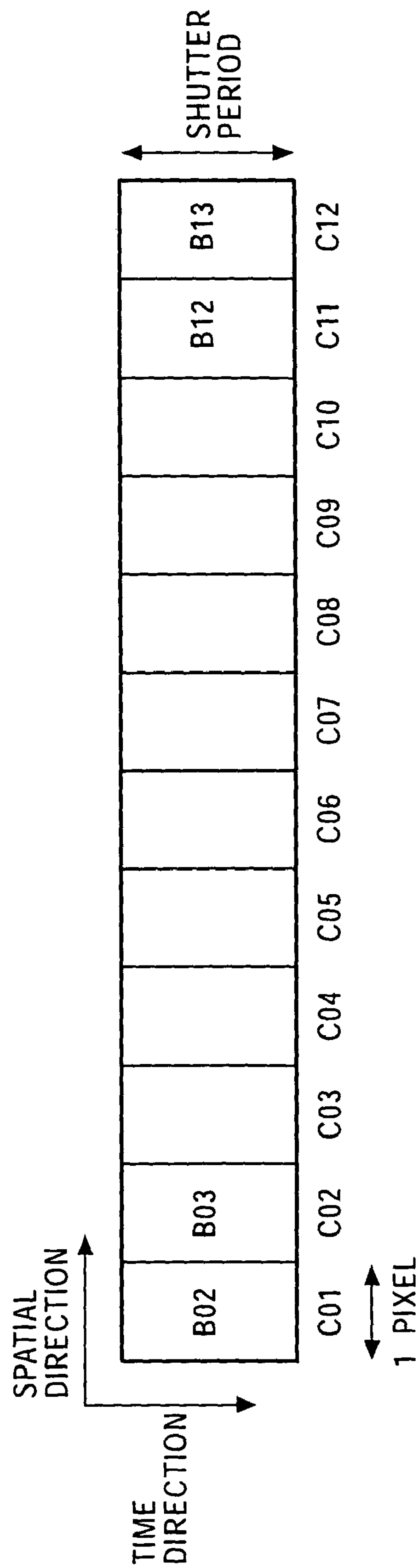

FIG. 139 is a diagram illustrating a model of a corrected background component image.

Figure 140:
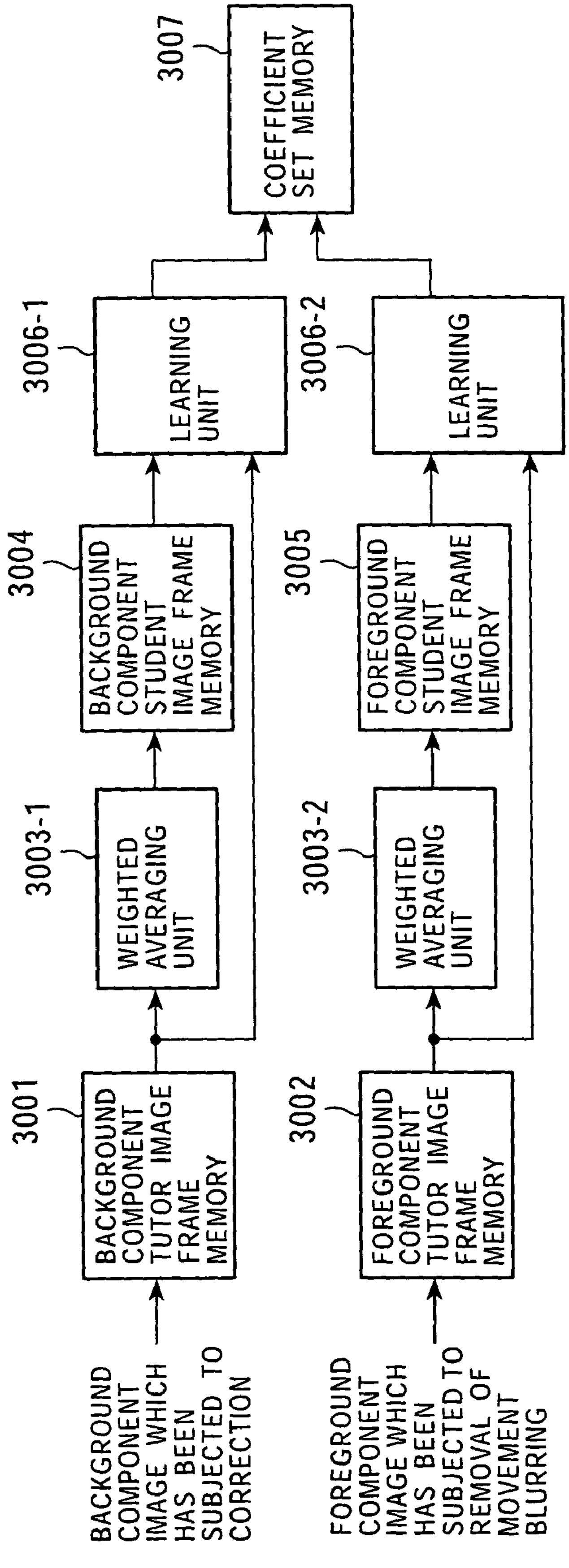

FIG. 140 is a block diagram illustrating the configuration of the movement-blurring-removed-image processing unit 2004 which generates coefficient sets.

Figure 141:
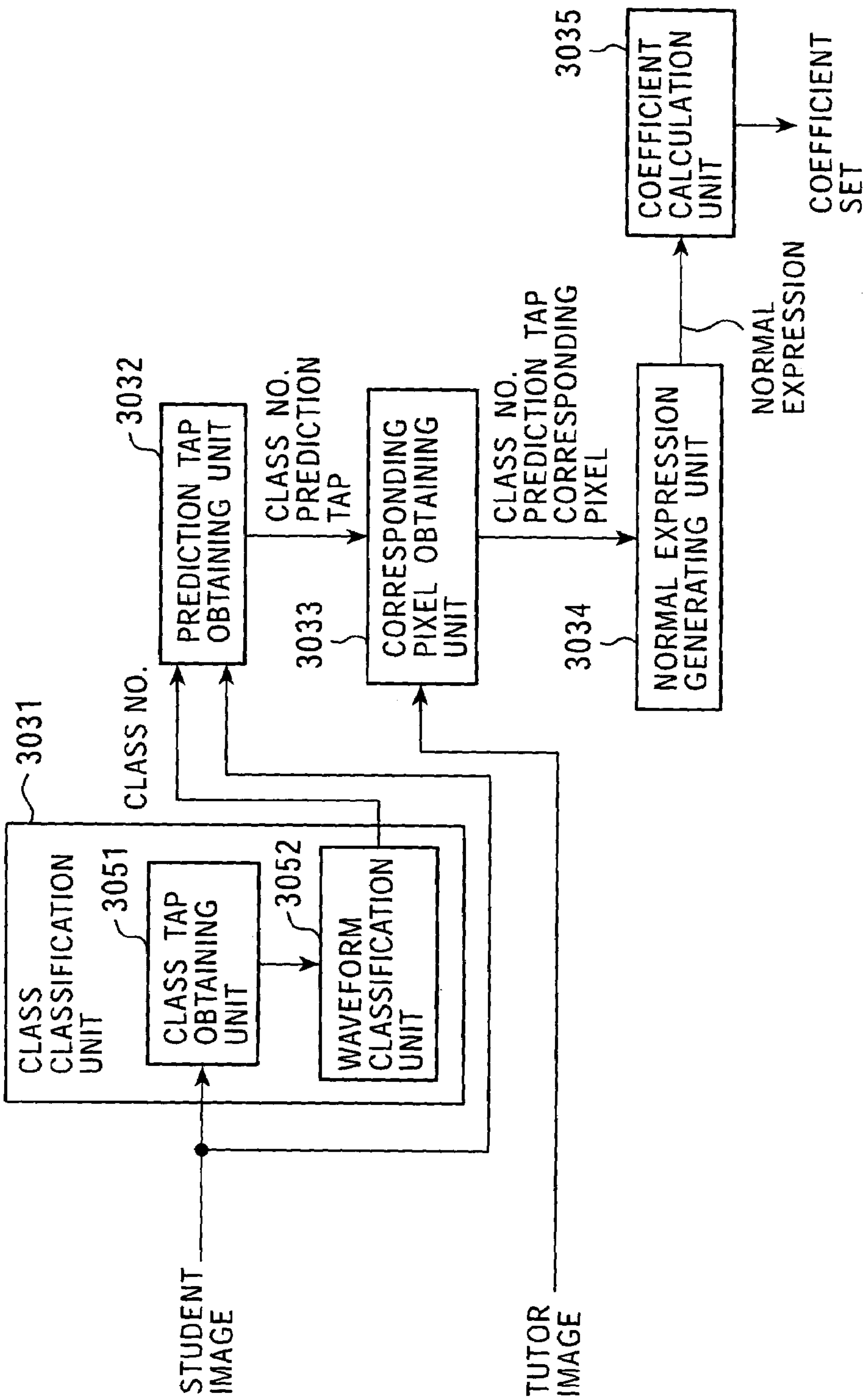

FIG. 141 is a block diagram illustrating the configuration of a learning unit 3006.

Figure 142:
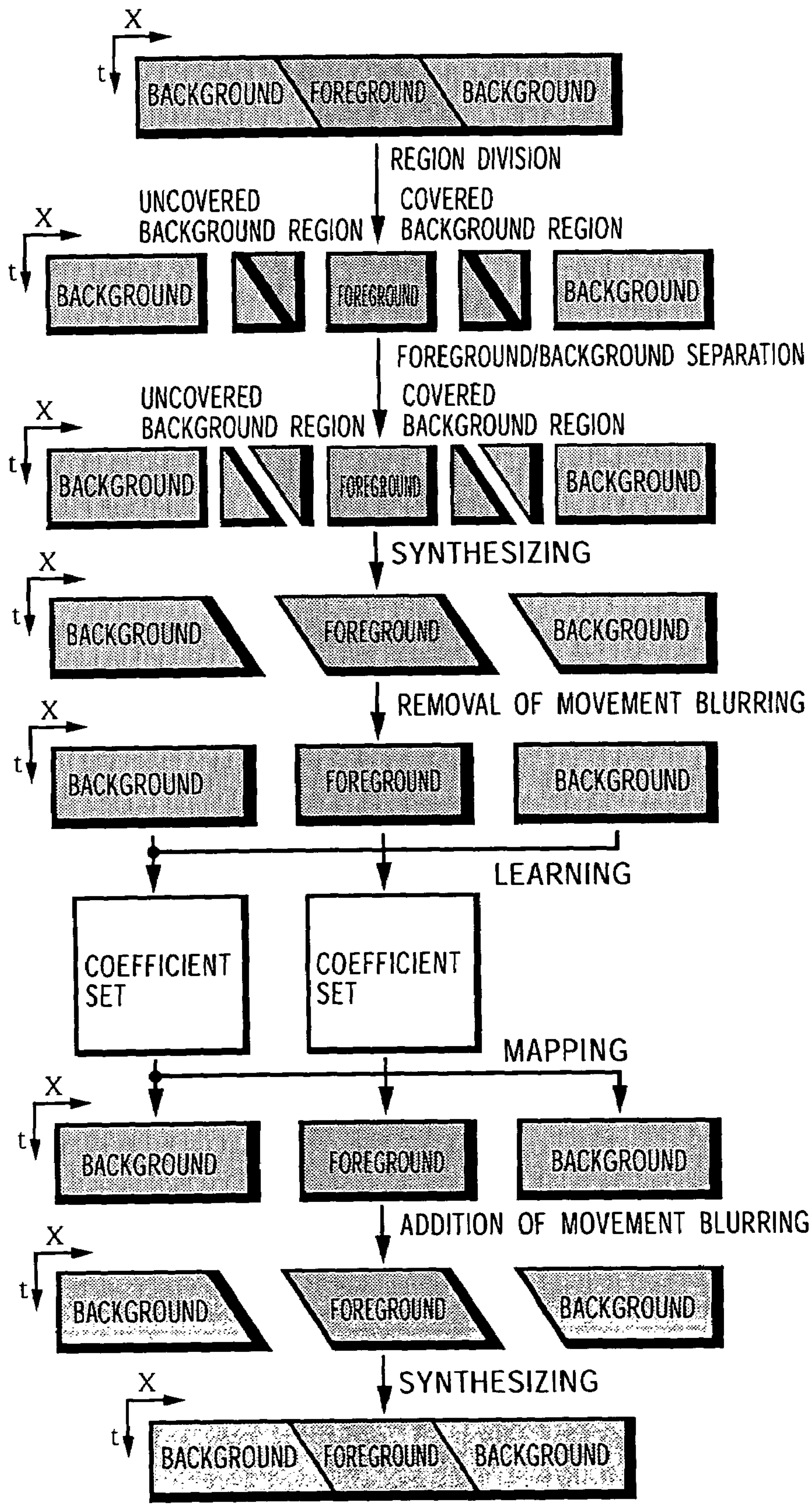

FIG. 142 is a diagram explaining coefficient sets which the movement-blurring-removed-image processing unit 2004 generates.

Figure 143:
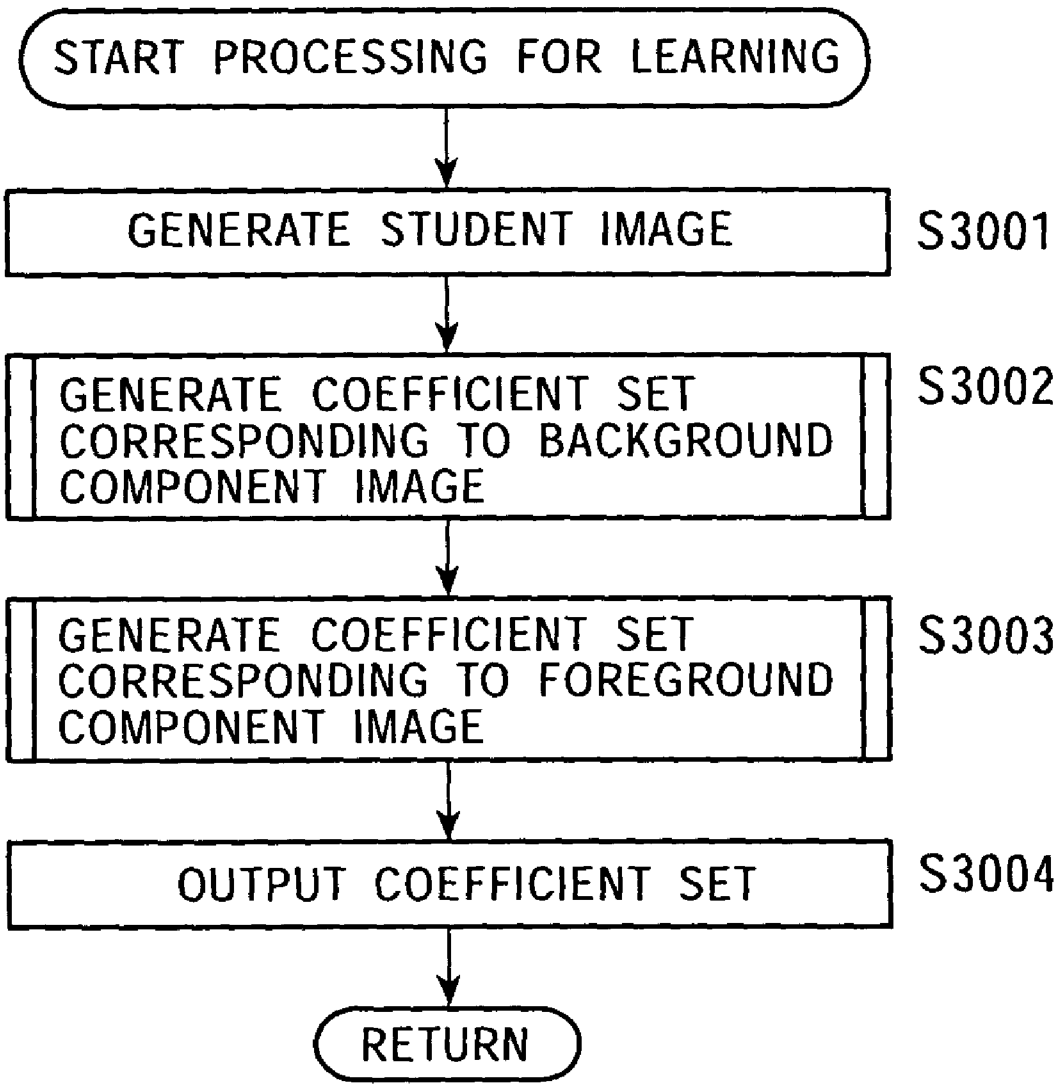

FIG. 143 is a flowchart explaining the learning processing for generating coefficient sets by the movement-blurring-removed-image processing unit 2004.

Figure 144:
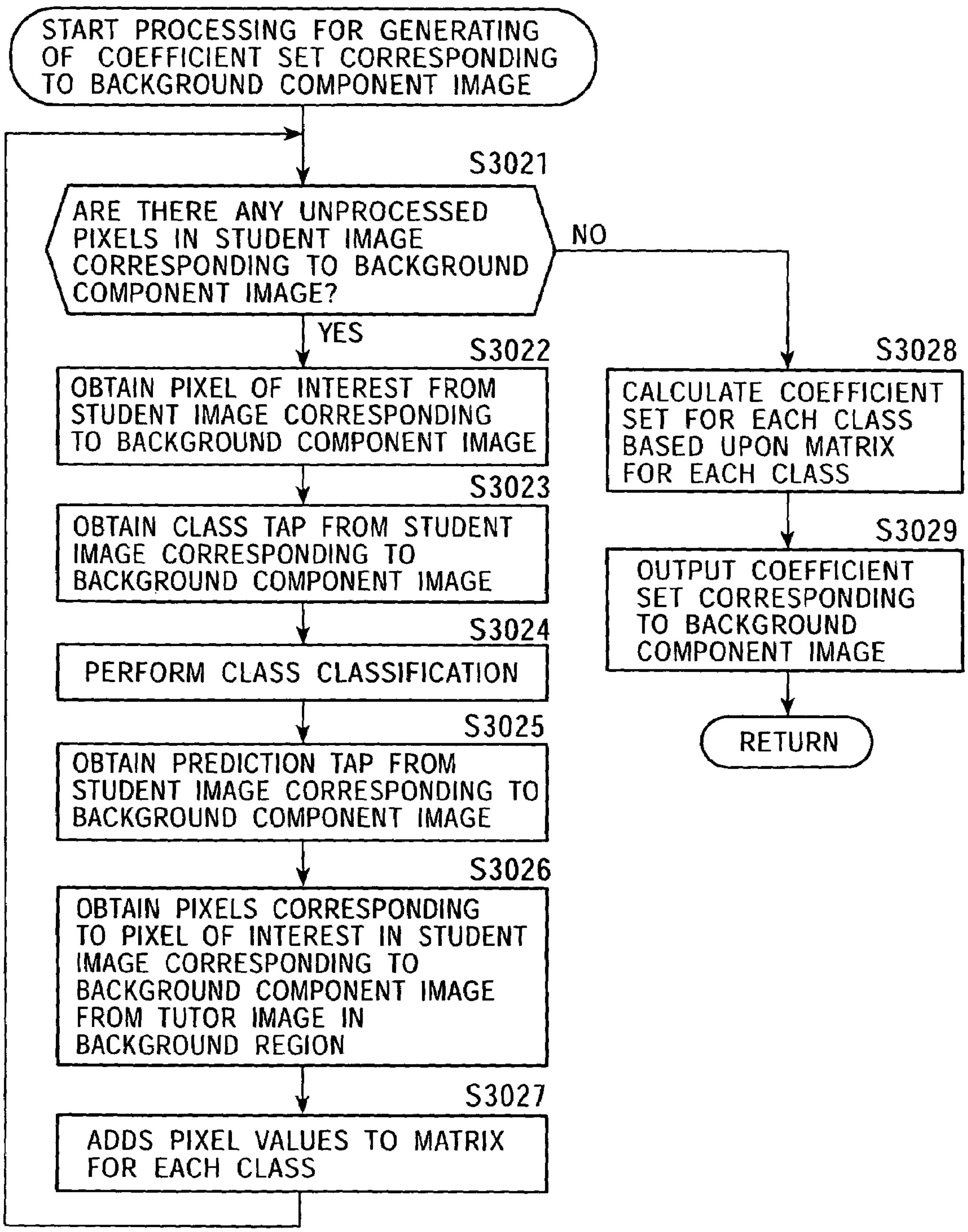

FIG. 144 is a flowchart for explaining the processing for generating coefficient sets corresponding to the background component image.

Figure 145:
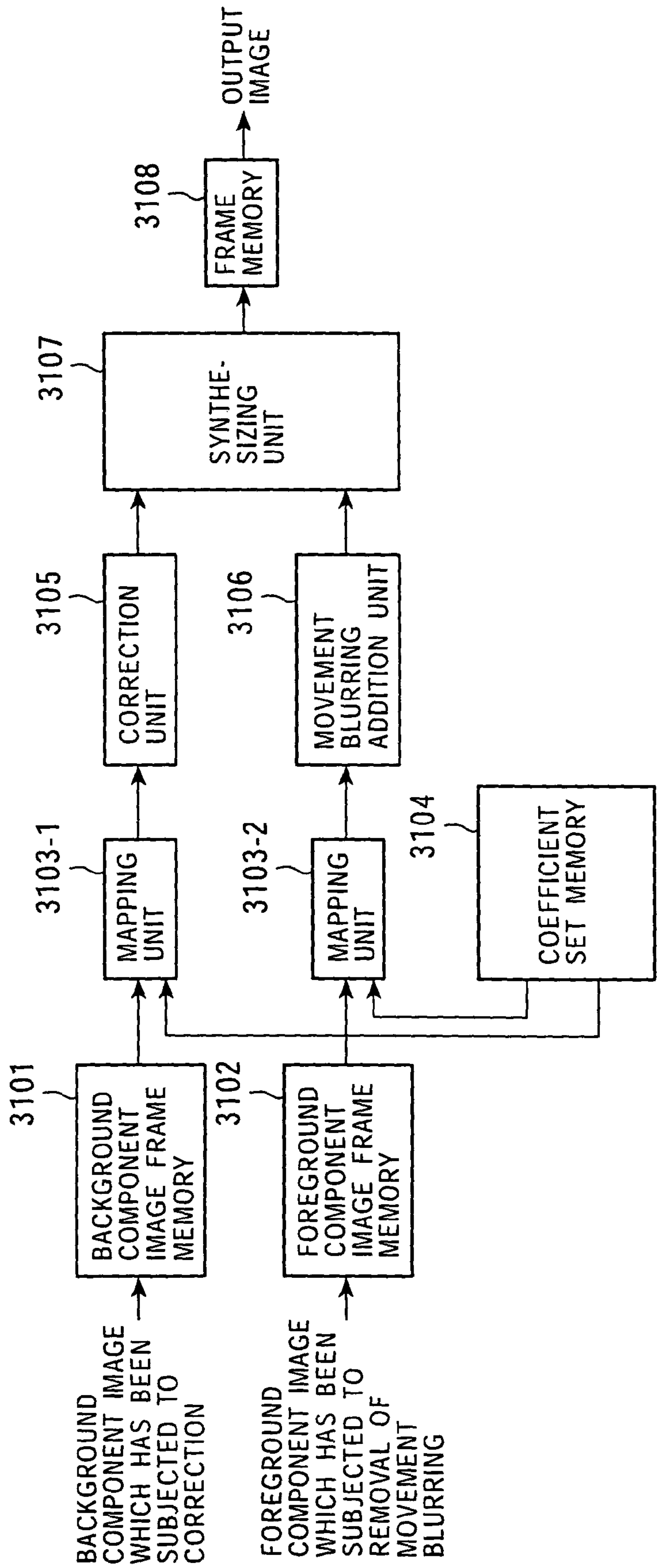

FIG. 145 is a block diagram illustrating the configuration of the movement-blurring-removed-image processing unit 2004 which executes class classification adaptation processing and generates a higher resolution image in the spatial direction.

Figure 146:
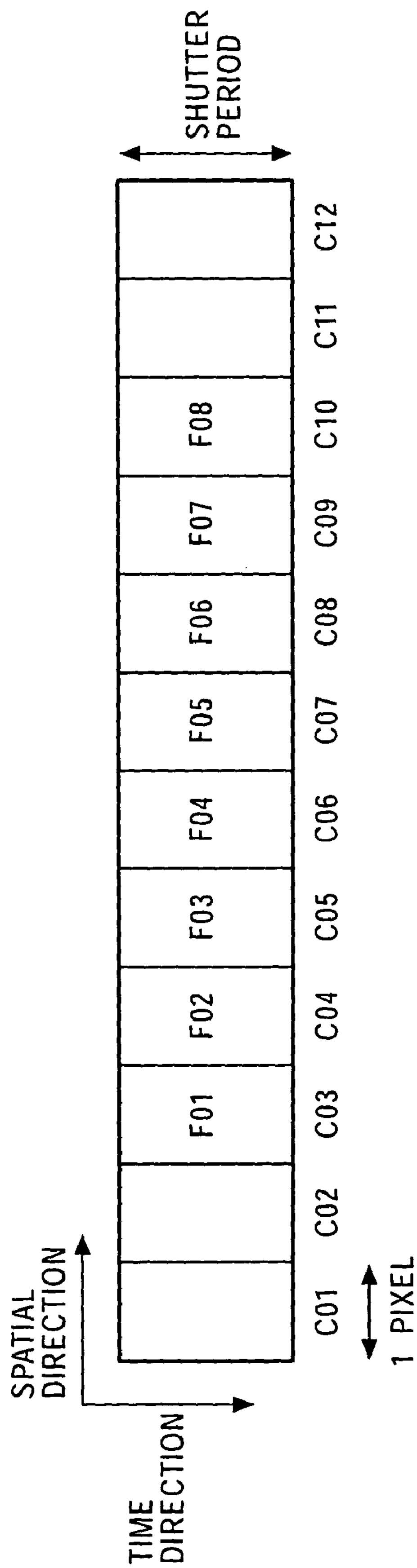

FIG. 146 is a diagram illustrating a model of a foreground component image wherein movement blurring has been removed.

Figure 147:
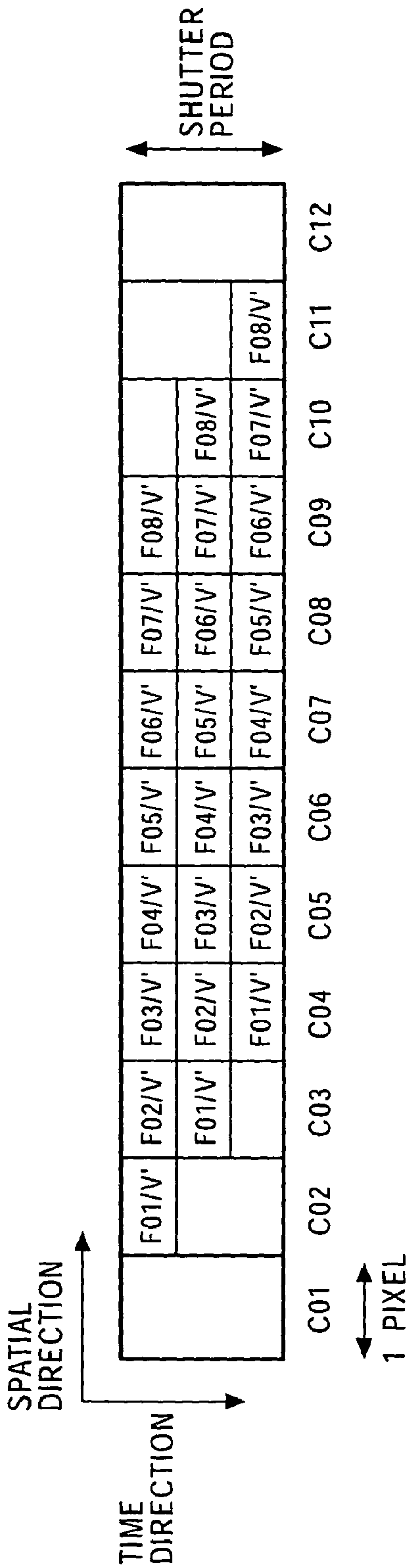

FIG. 147 is a diagram illustrating a model of a foreground component image wherein movement blurring has been added.

Figure 148:
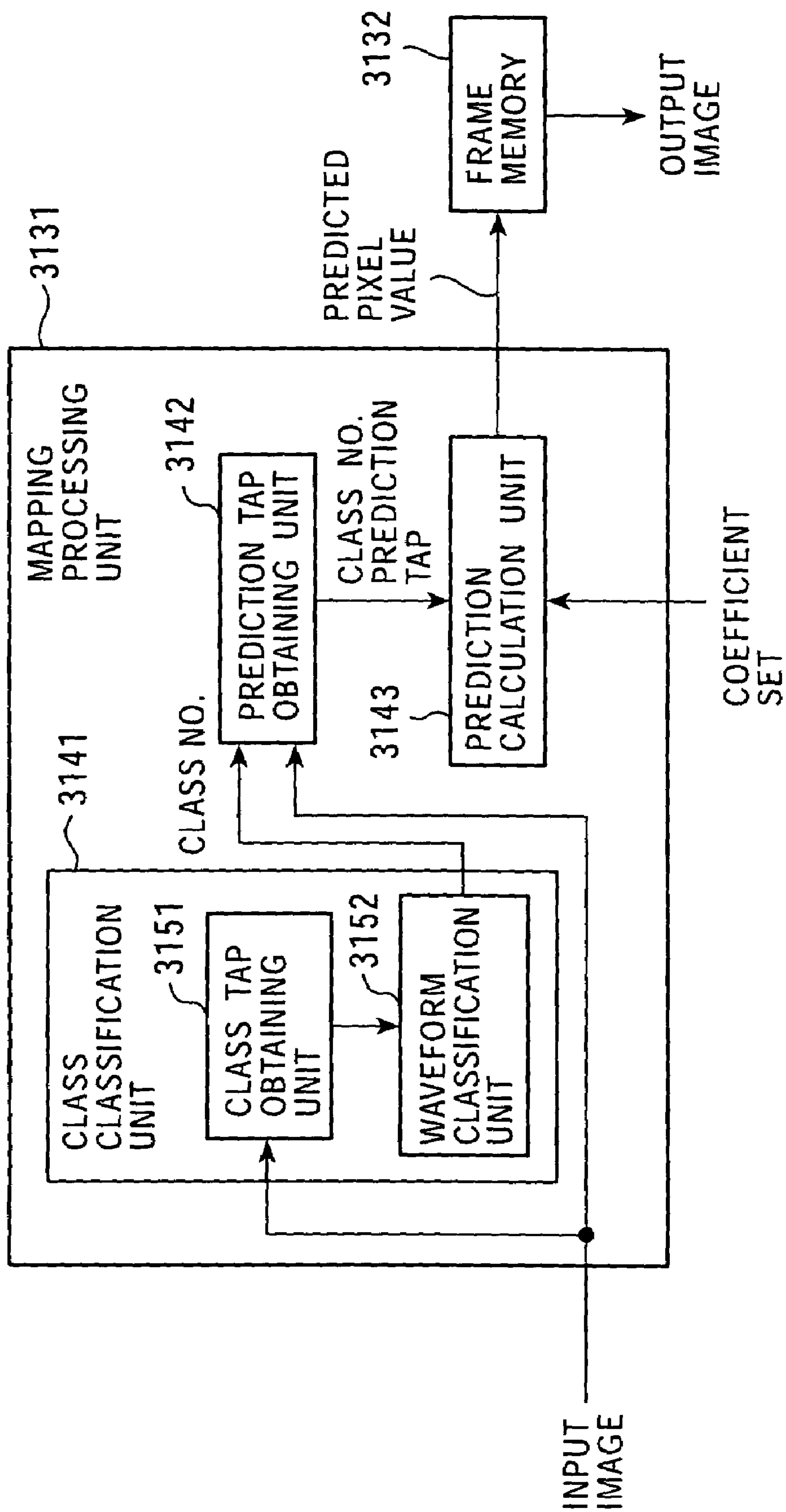

FIG. 148 is a block diagram illustrating the configuration of a mapping unit 3103.

Figure 149:
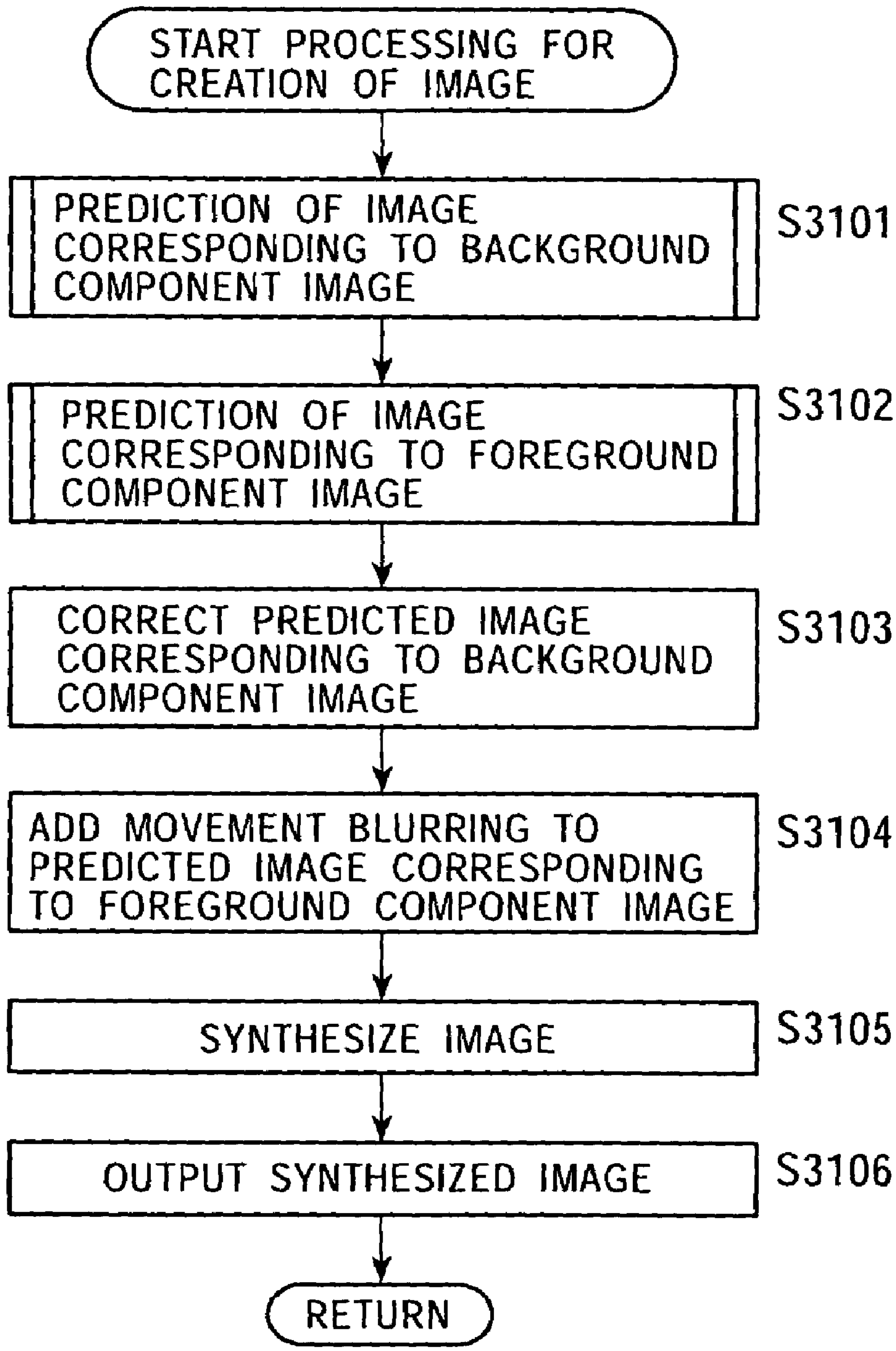

FIG. 149 is a flowchart explaining the processing for creating an image with regard to the movement-blurring-removed-image processing unit 2004.

Figure 150:
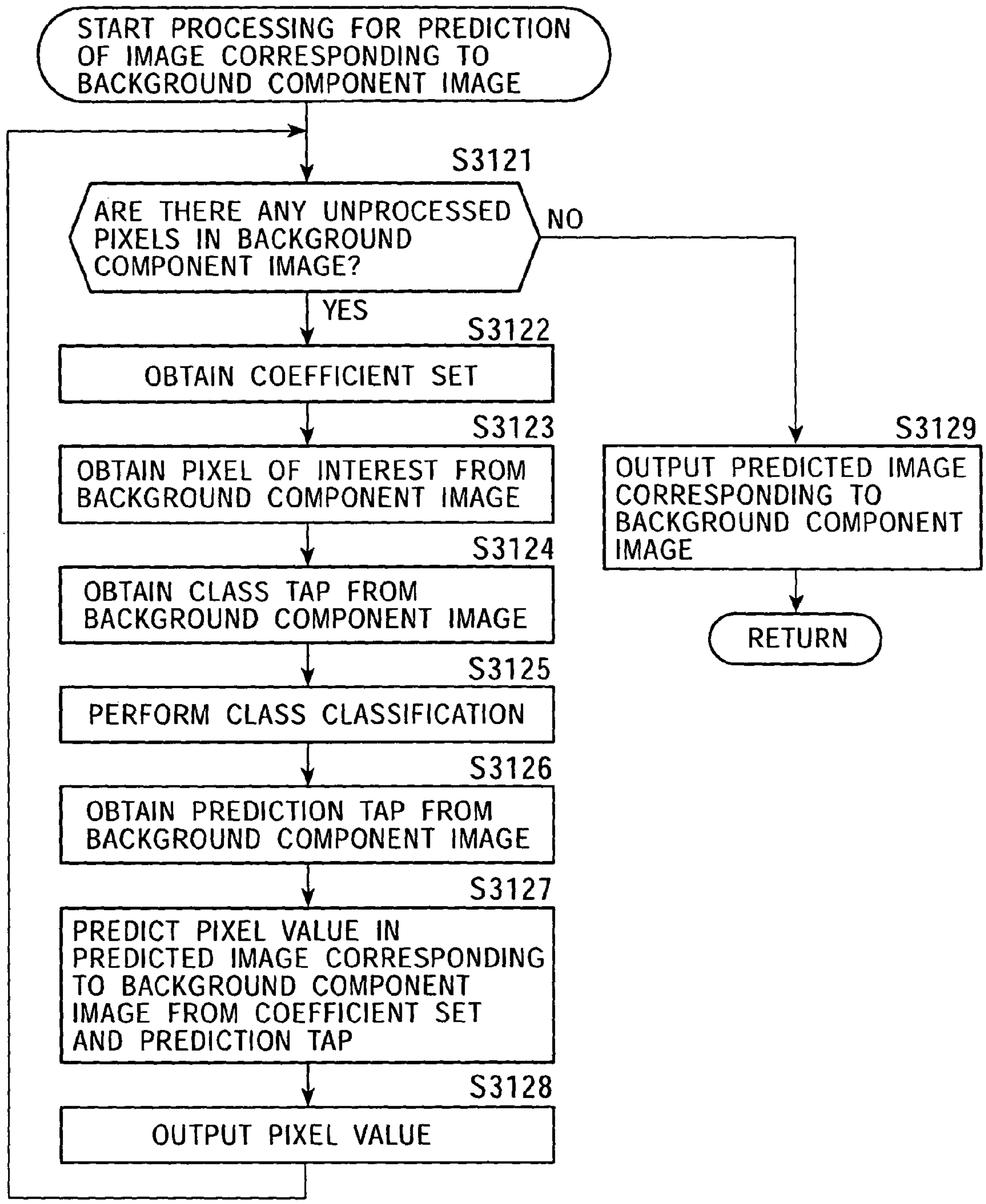

FIG. 150 is a flowchart describing processing for predicting images corresponding to the background component image.

Figure 151:
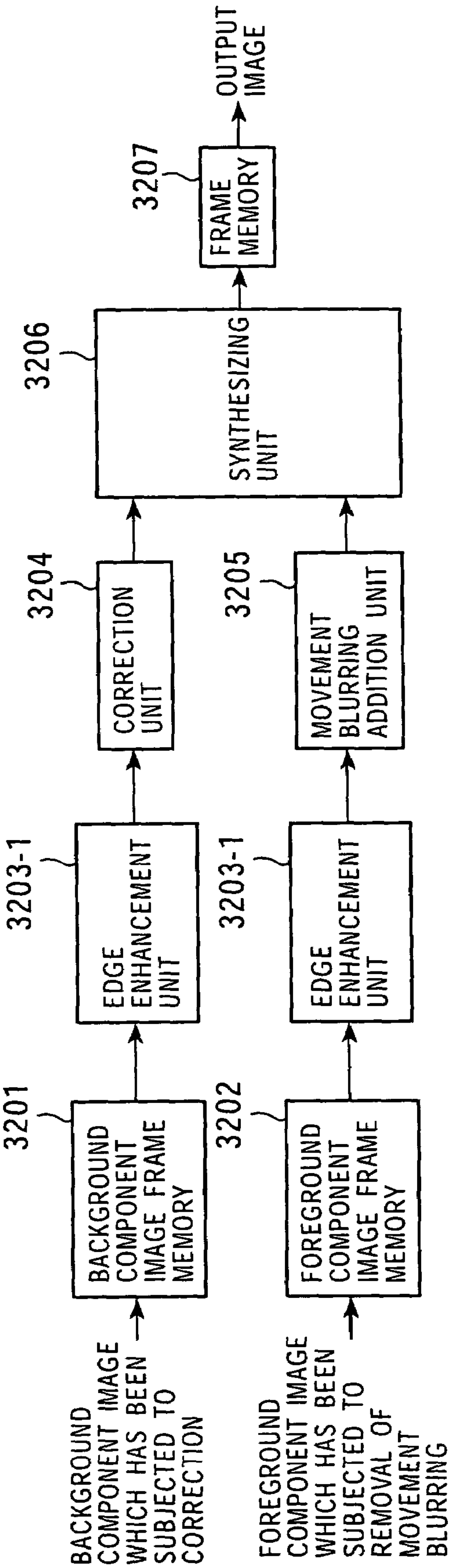

FIG. 151 is a block diagram illustrating the configuration of the movement-blurring-removed-image processing unit 2004 wherein edge enhancing processing with difference effects is applied for each image.

Figure 152:
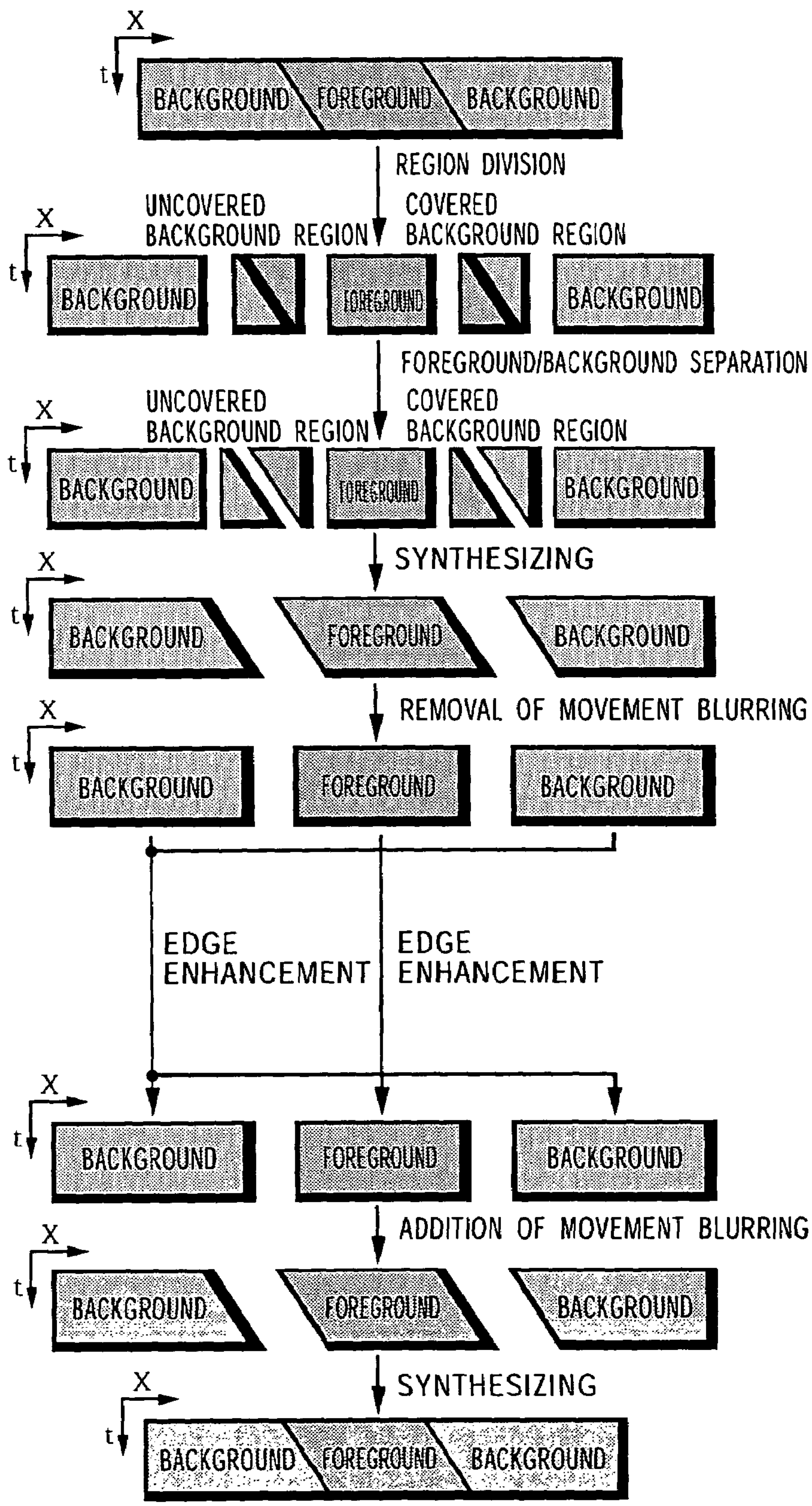

FIG. 152 is a diagram explaining the processing of the movement-blurring-removed-image processing unit 2004.

Figure 153:
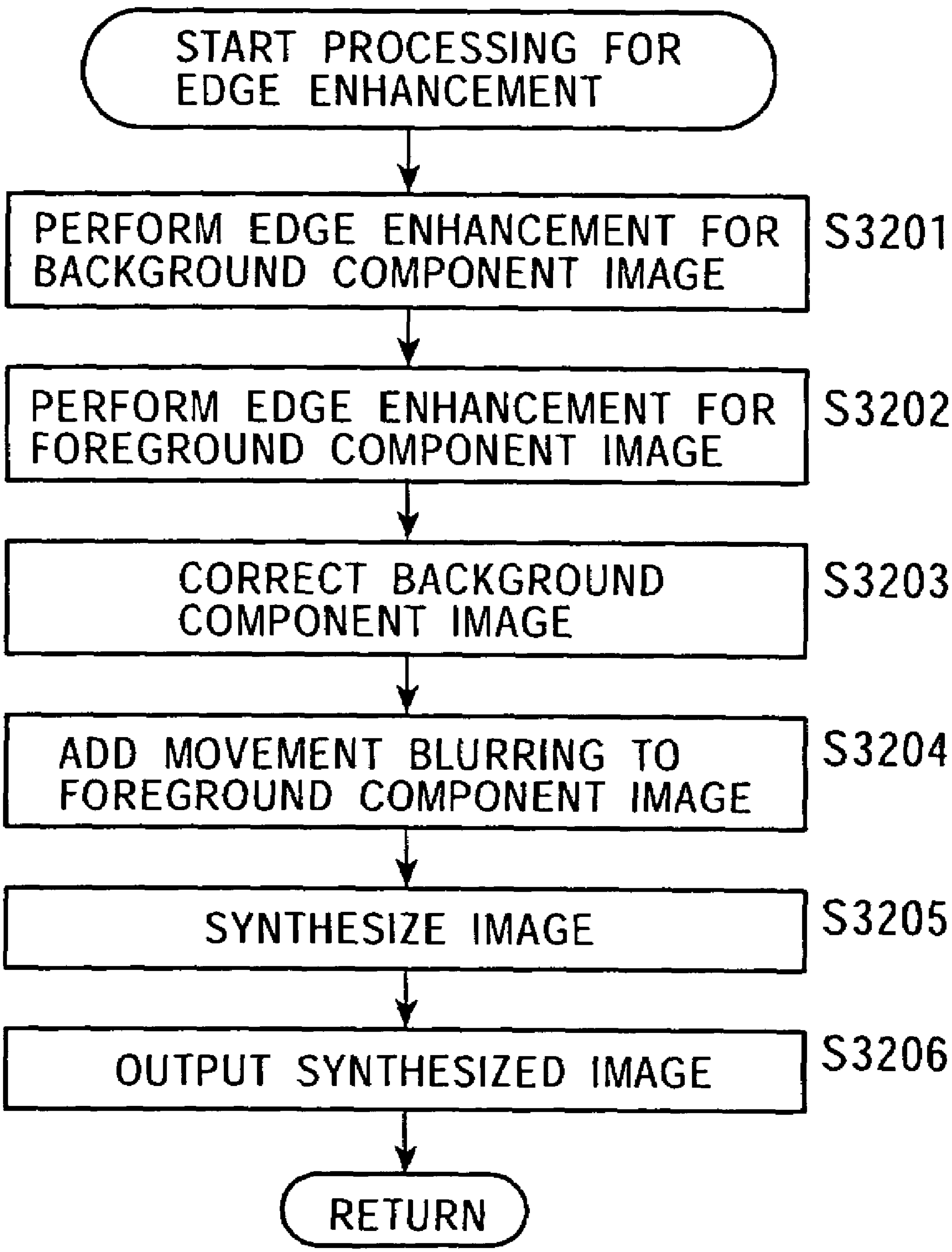

FIG. 153 is a flowchart explaining the processing of edge enhancement processing with the movement-blurring-removed-image processing unit 2004.

Figure 154:
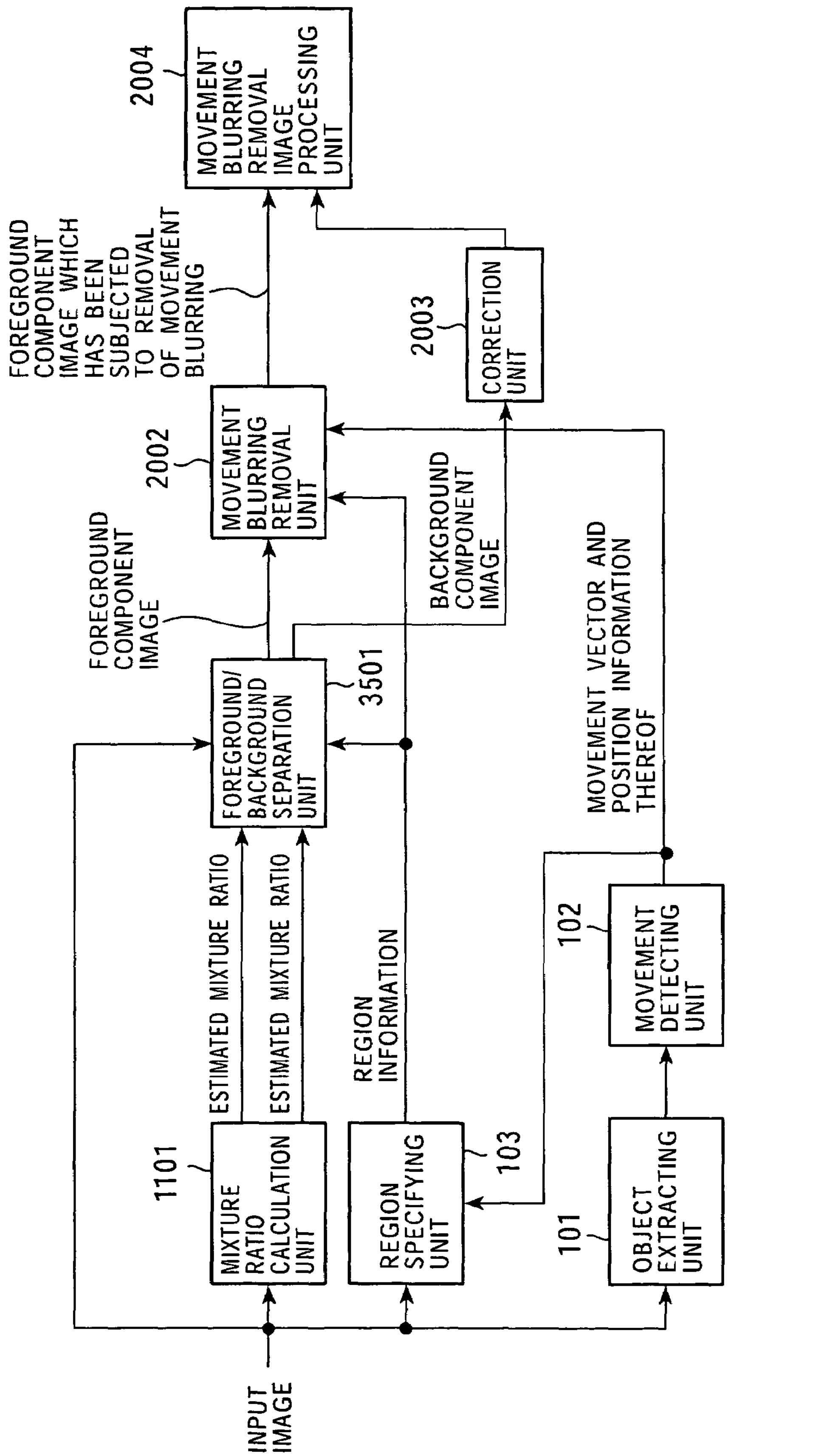

FIG. 154 is a block diagram illustrating another configuration of the functions of the image processing device.

Figure 155:
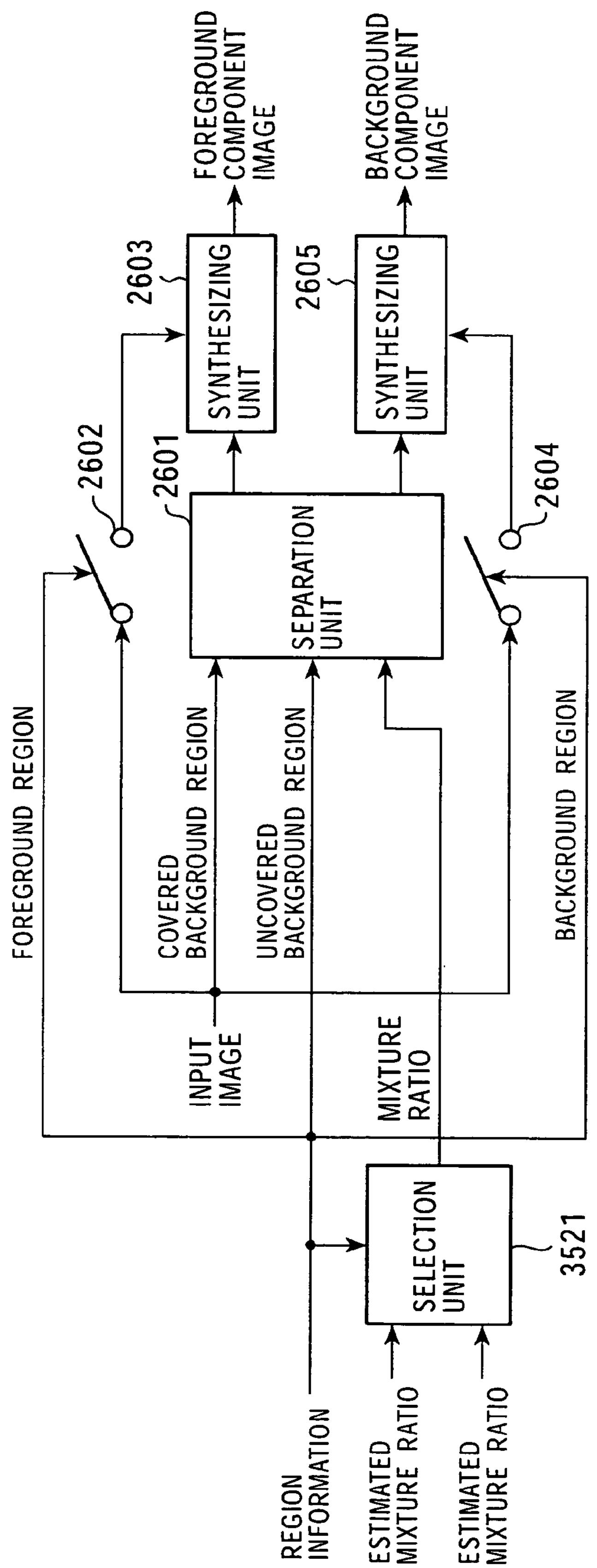

FIG. 155 is a block diagram illustrating an example of the configuration of a foreground/background separation unit 501.

BEST MODE FOR CARRYING OUT THE INVENTION

Figure 1:
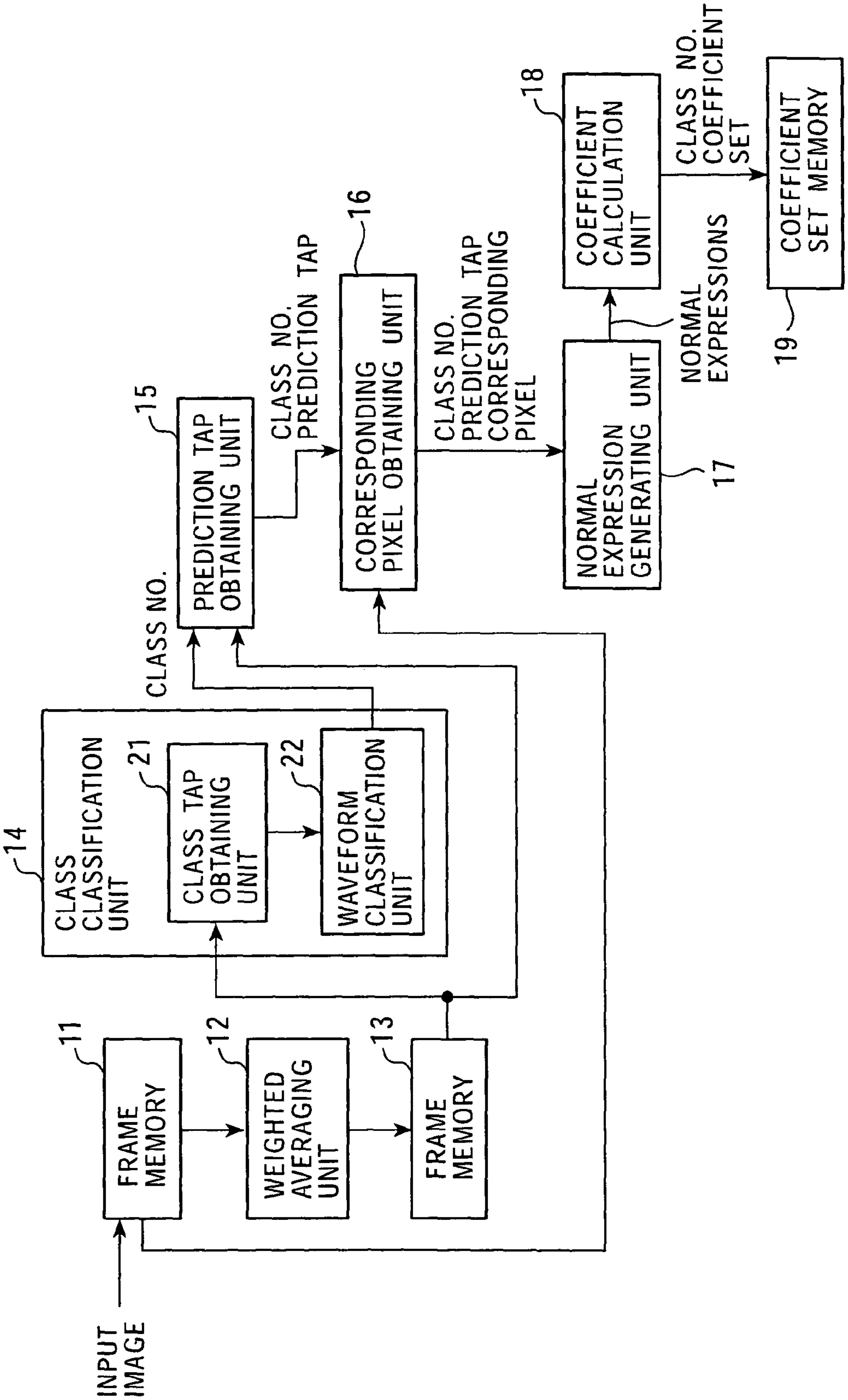
FIG. 1 is a block diagram illustrating the configuration of a conventional image processing device.
Figure 2:
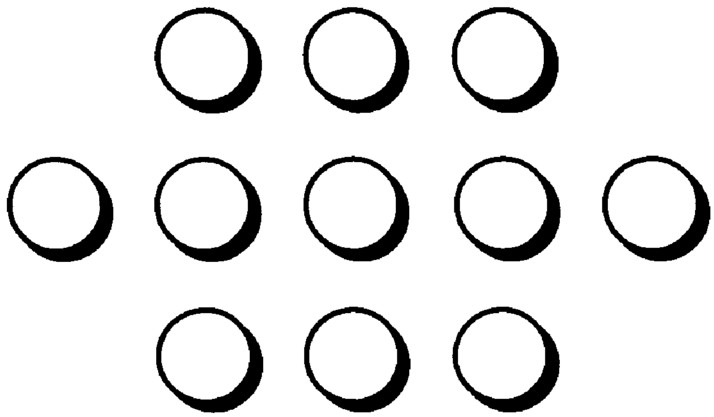
FIG. 2 is a diagram explaining class taps.
Figure 3:
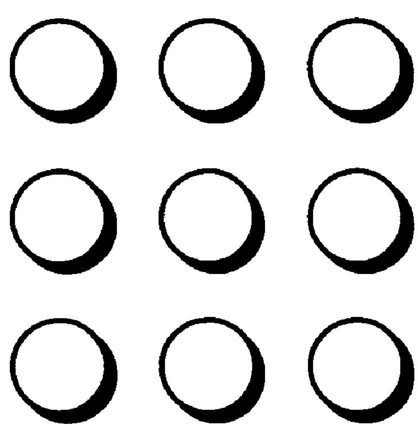
FIG. 3 is a diagram explaining prediction taps.
Figure 4:
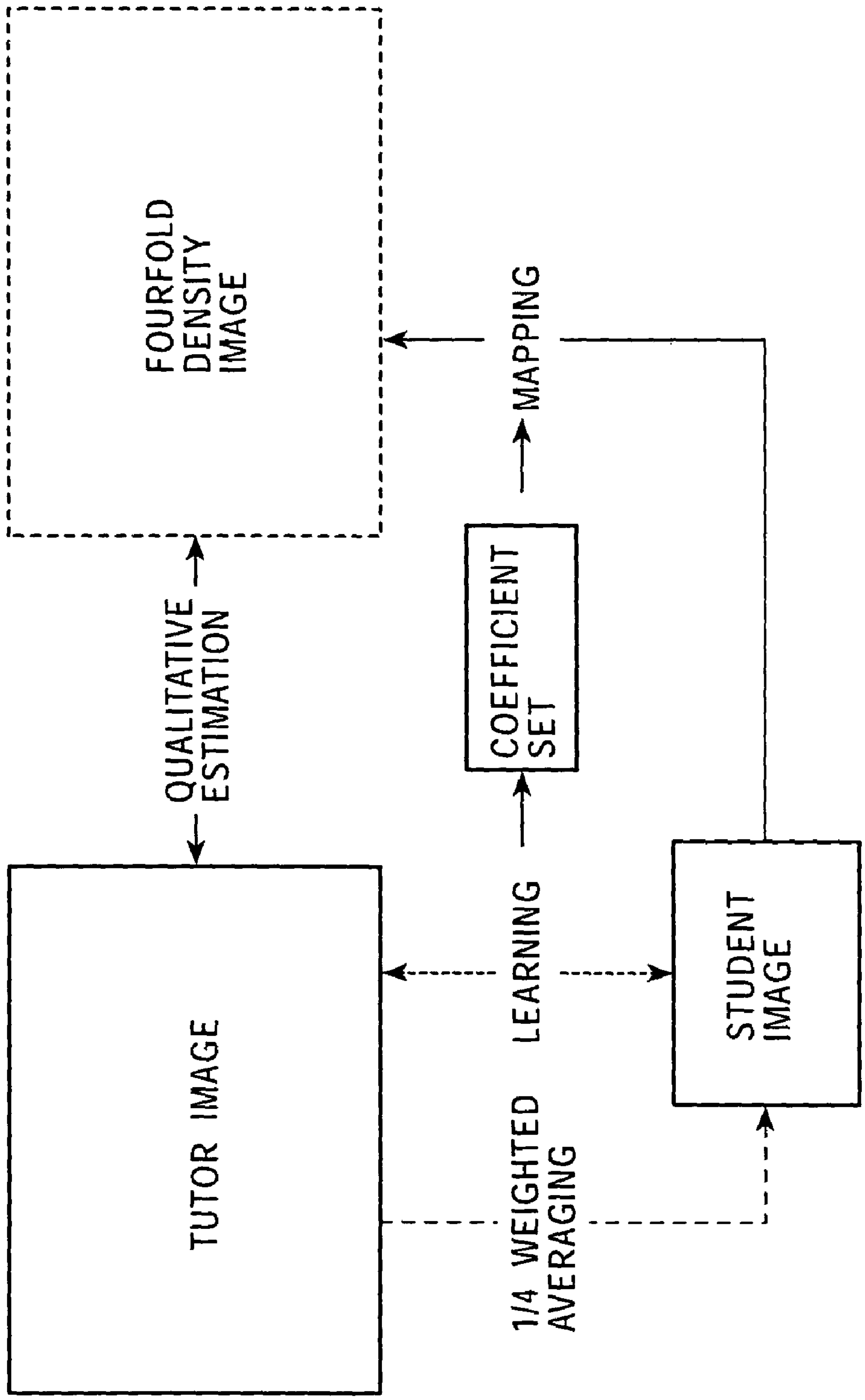
FIG. 4 is a diagram describing the overview of class classification adaptation processing.
Figure 5:
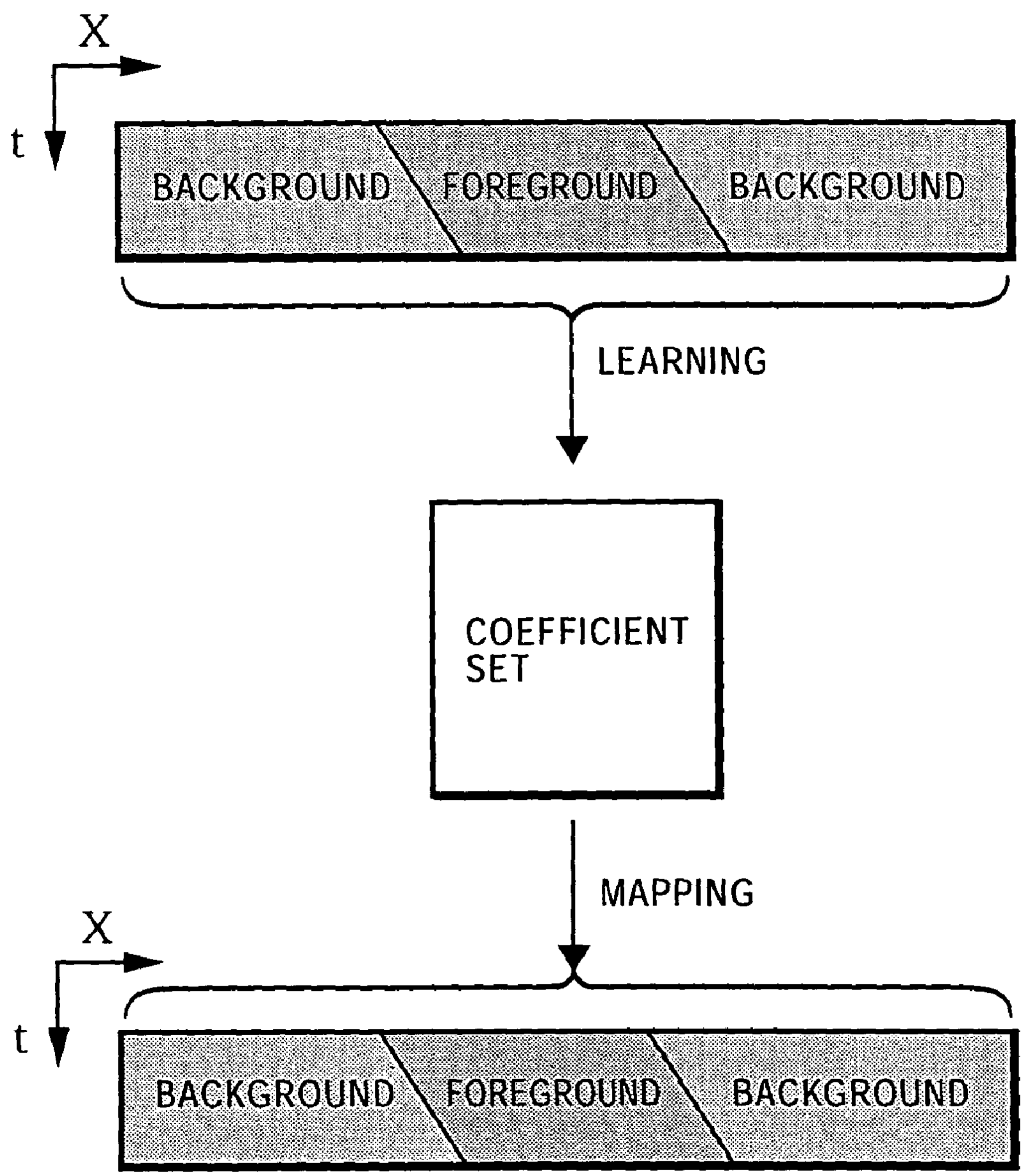
FIG. 5 is a diagram explaining conventional coefficient sets.
Figure 6:
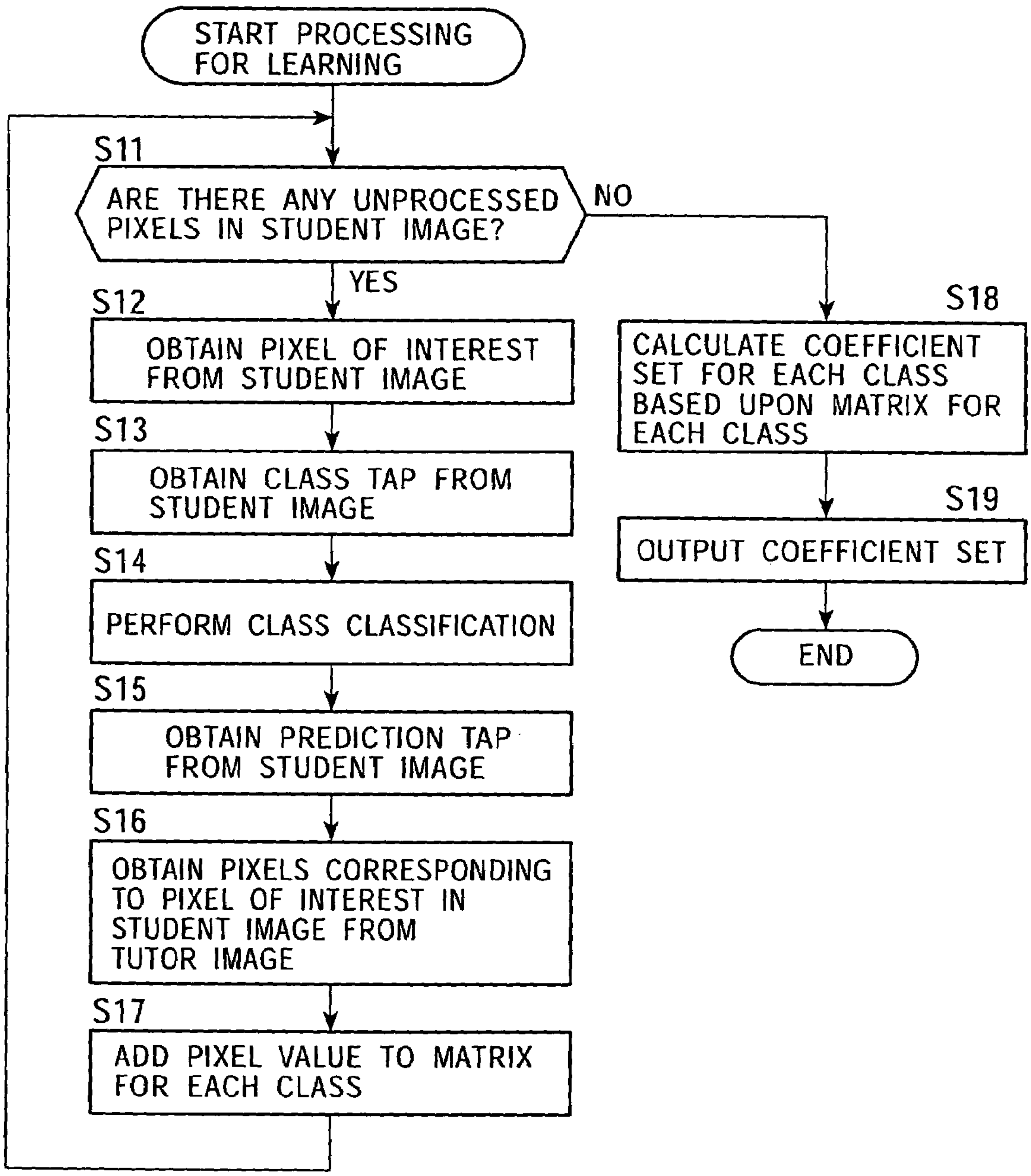
FIG. 6 is a flowchart explaining conventional learning processing.
Figure 7:
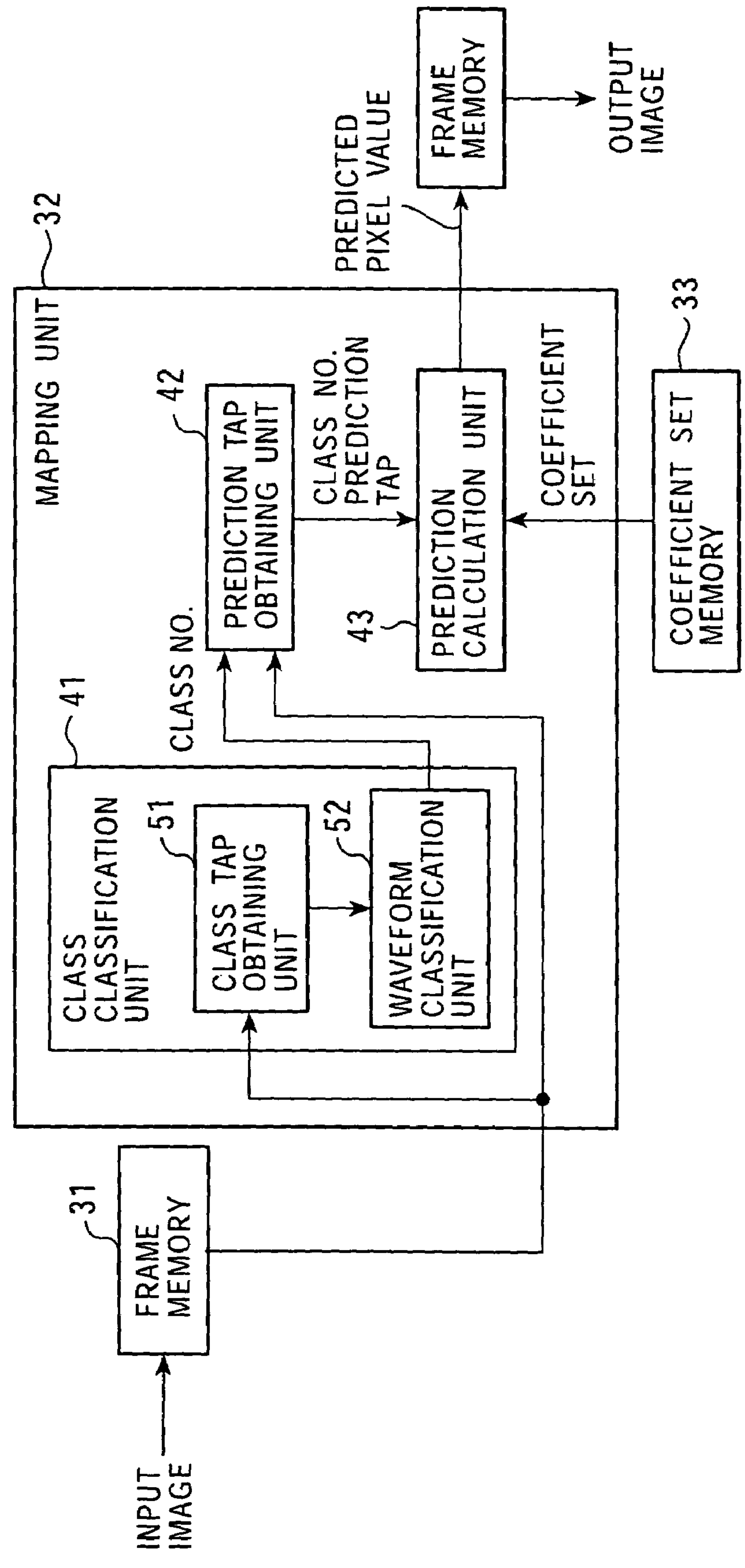
FIG. 7 is a block diagram illustrating the configuration of a conventional image processing device.
Figure 8:
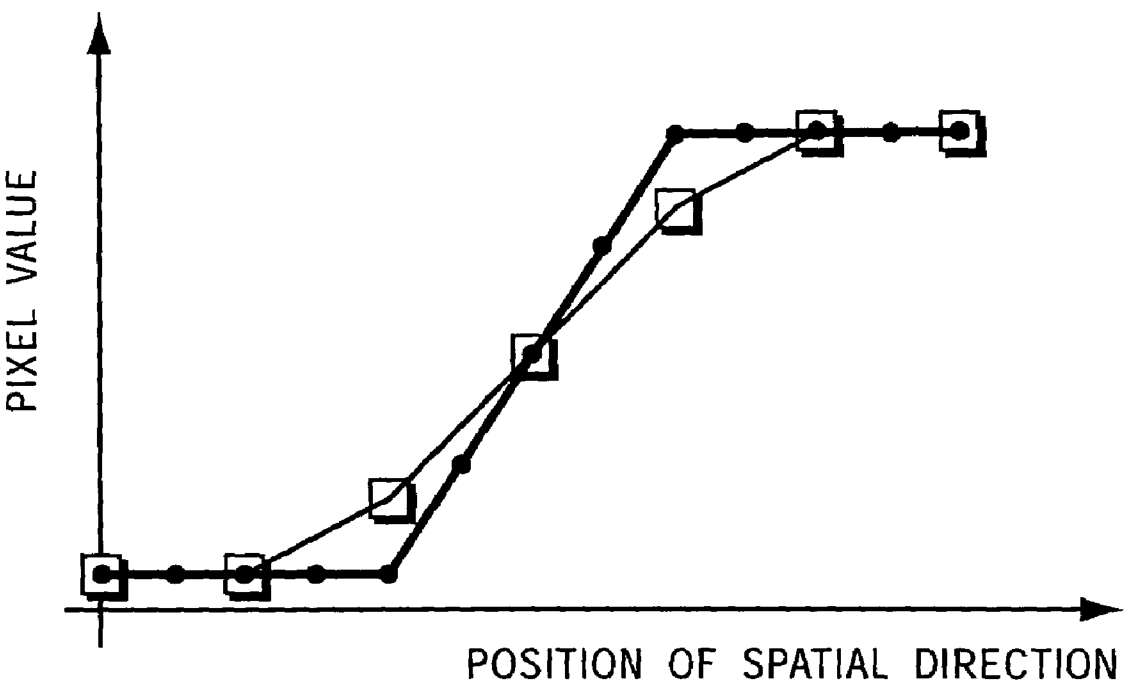
FIG. 8 is a diagram illustrating pixel values of an output image generated by pixel values of an input image, and class classification adaptation processing.
Figure 9:
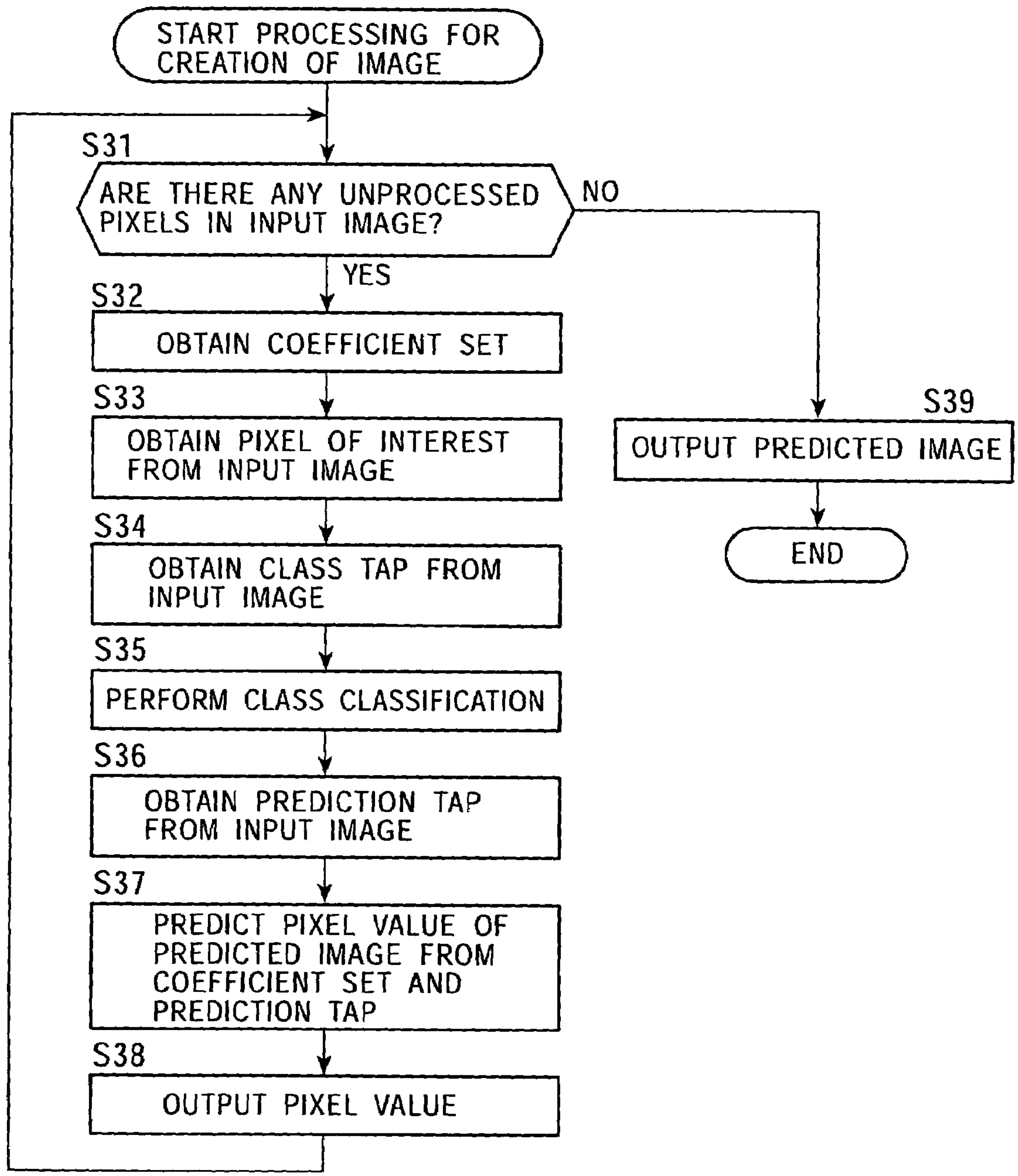
FIG. 9 is a flowchart explaining conventional processing for creating images.
Figure 10:
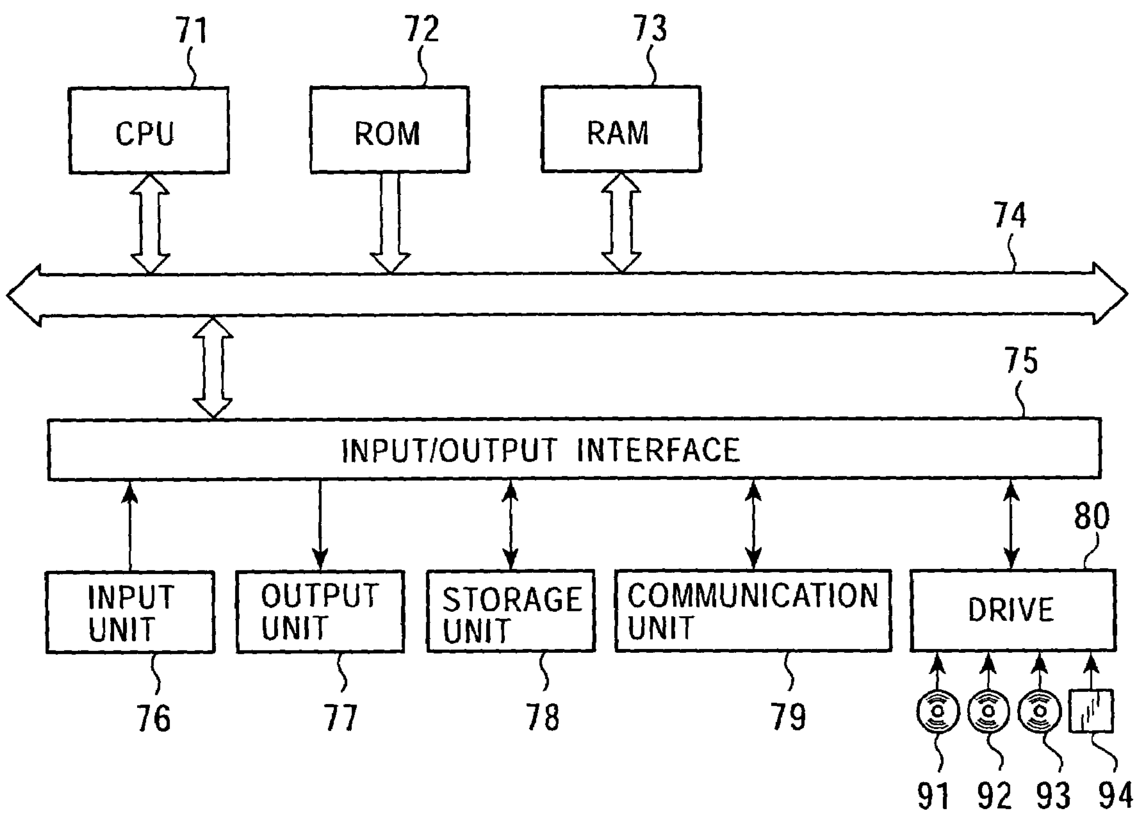
FIG. 10 is a block diagram illustrating the configuration of an embodiment of an image processing device according to the present invention.

FIG. 10 is a block diagram which illustrates the configuration of an embodiment of the image processing device according to the present invention. A CPU (Central Processing Unit) 71 performs various types of processing following programs stored in ROM (Read Only Memory) 72, or a storage unit 78. RAM (Random Access Memory) 73 suitably stores programs for the CPU 71 to execute, data, and so forth. These CPU 71, ROM 72, and RAM 73 are mutually connected via a bus 74.

The CPU 71 is also connected to an input/output interface 75 via the bus 74. The input/output interface 75 is connected to an input unit 76 such as a keyboard, mouse, microphone, or the like, and is connected to an output unit 77 such as a display, speaker, or the like. The CPU 71 performs various types of processing corresponding to instructions input from the input unit 76. The CPU 71 then outputs images, audio, or the like, which are obtained as a result of processing, to the output unit 77.

The storage unit 78 connected to the input/output interface 75 comprises a hard disk, for example, and stores programs for the CPU 71 to execute and various types of data. A communication unit 79 communicates with external devices via the Internet or other networks. In this case of the example, the communication unit 79 serves as an obtaining unit which obtains output from a sensor.

Also, an arrangement may be made wherein programs are obtained via the communication unit 79, and are stored in the storage unit 78.

A drive 80 connected to the input/output interface 75 drives a magnetic disk 91, optical disk 92, magneto-optical disk 93, semiconductor memory 94, or the like, in the event that those are mounted thereon, and obtains programs and data stored therein. The obtained programs and data are transmitted to the storage unit 78 and stored therein, as necessary.

Figure 11:
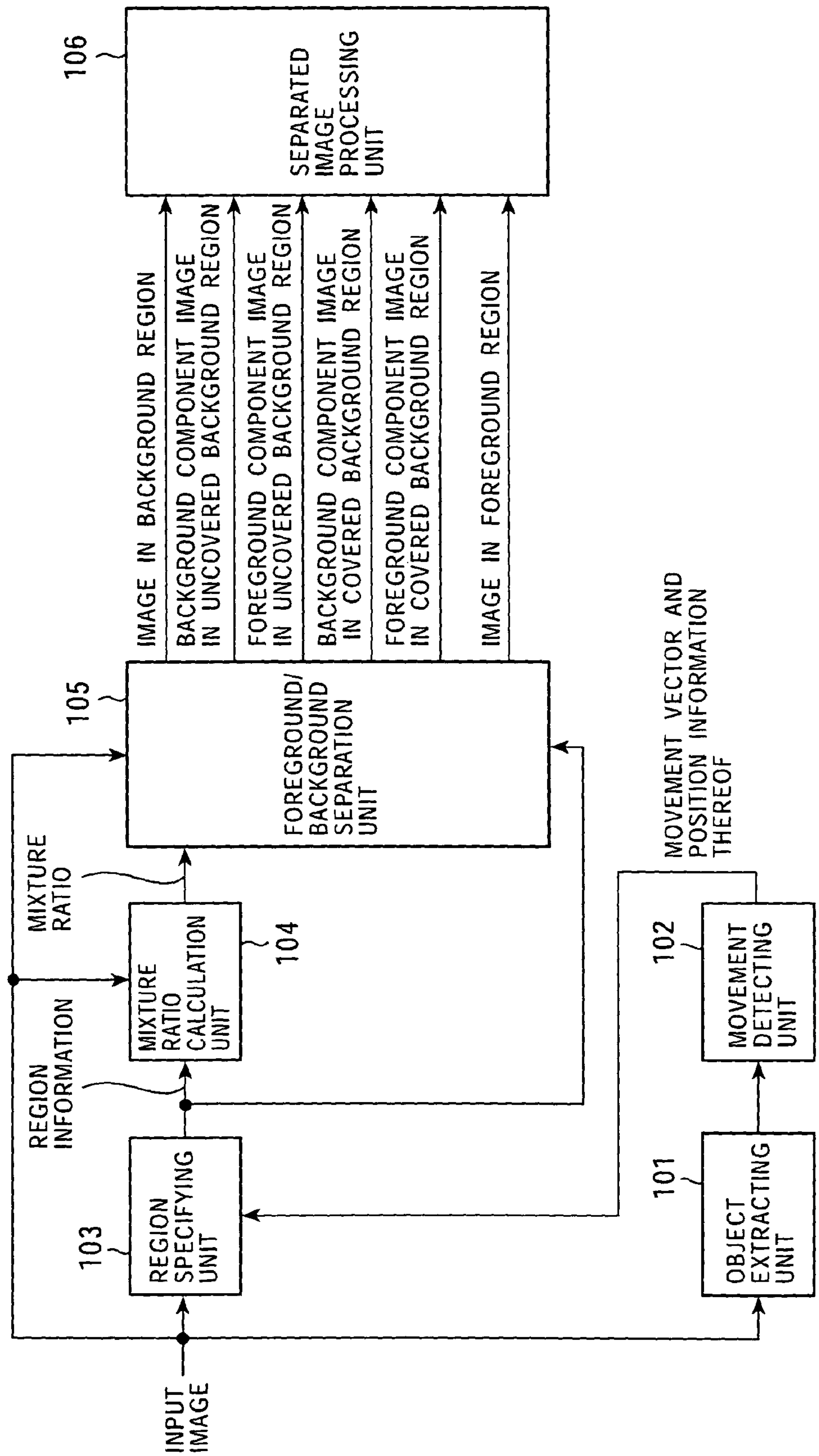
FIG. 11 is a block diagram illustrating a configuration of an image processing device.

FIG. 11 is a block diagram which illustrates the configuration of the functions of the image processing device according to the present invention.

Note that whether each function of the image processing device is realized by hardware or software does not matter. That is to say, each block diagram in the present Specification may be regarded as not only a hardware block diagram but also as a software function block diagram.

Here, the input image input in the image processing device contains movement blurring.

The movement blurring means distortion which is included in images corresponding to moving objects, which occurs due to movement of objects which are objects of image-taking in the real world and due to image-taking properties of the sensor.

In the present Specification, images corresponding to objects which are objects of image-taking in the real world are called image objects.

Input images provided to the image processing device are provided to an object extracting unit 101, a region specifying unit 103, a mixture ratio calculating unit 104, and a foreground/background separation unit 105.

The object extracting unit 101 roughly extracts the image objects corresponding to the foreground object contained in the input image, and supplies the extracted image object to the movement detecting unit 102. The object extracting unit 101 roughly extracts the image object corresponding to the foreground object, for example, by detecting the outlines of the image object corresponding to the foreground object contained in input image.

The object extracting unit 101 roughly extracts the image object corresponding to the background object contained in the input image, and supplies the extracted image object to the movement detecting unit 102. The object extracting unit 101 roughly extracts the image object corresponding to the background object, by the difference between the input image and the image object corresponding to the extracted foreground object, for example.

Also, for example, an arrangement may be made wherein the object extracting unit 101 roughly extracts the image objects corresponding to the foreground objects and the image objects corresponding to the background objects based upon the difference between the background images stored in background memory provided therein and the input images.

The movement detecting unit 102 calculates the movement vectors of the image object corresponding to the roughly extracted foreground objects by techniques such as block matching, gradation, phase correlation, pixel recursion, or the like, and supplies the calculated movement vectors and movement vector position information (information for specifying the pixel positions corresponding to the movement vectors) to the region specifying unit 103.

The movement vector output from the movement detecting unit 102 includes information corresponding to a movement amount v.

Also, for example, an arrangement may be made wherein the movement detecting unit 102 outputs the movement vector per image object to the movement blurring adjustment unit 106 along with the pixel position information for specifying a pixel of the image object.

The movement amount v is a value which represents the change of position of the image corresponding to the moving object in increments of pixel interval. For example, in the event that the object image corresponding to the foreground moves so as to be displayed at a position four pixels away in the following frame with a given frame as a reference, the movement amount v of the image of the object corresponding to the foreground is 4.

The region specifying unit 103 classifies each pixel of the input image into one of the foreground region, the background region, or the mixed region which consists of the uncovered background region and the covered background region, and supplies the information which indicates which of the foreground region, the background region, or the mixed region which consists of the uncovered background region or the covered background region, each pixel belongs to, (which will be referred to as region information hereafter), to the mixture ratio calculation unit 104 and the foreground/background separation unit 105. Note that details of the mixed region, uncovered background region, and the covered background region will be described later.

The mixture ratio calculating unit 104 calculates the mixture ratio corresponding to the pixels contained in the mixed region (which will be referred to as mixture ratio α hereafter) based upon the input image and the region information supplied from the region specifying unit 103, and supplies the calculated mixed ratio to the foreground/background separating unit 105.

The mixture ratio α is a value which represents the ratio of the image component corresponding to the background object (which will also be referred to as background component hereafter) with the pixel value as indicated in Expression (3) described below.

The foreground/background separation unit 105 separates the image components corresponding to the foreground object (which will be also referred to as the foreground component hereafter) and the background component image which consists of only the background components based upon the region information supplied from the region specifying unit 103 and the mixture ratio α supplied from the mixture ratio calculation unit 104, and supplies the image in the background region, the image which consists of only the background components in the uncovered background region (which will be referred to as the background component image in the uncovered background region), the image which consists of only the foreground components in the uncovered background region (which will be referred to as the foreground component image in the uncovered background region), the image which consists of only the background components in the covered background region (which will be referred to as the background component image in the covered background region), the image which consists of only the foreground components in the covered background region (which will be referred to as the foreground component image in the covered background region), and the image in the foreground region, to the separated image processing unit 106.

The separated image processing unit 106 performs processing for the image in the background region, the background component image in the uncovered background region, the foreground component image in the uncovered background region, the background component image in the covered background region, the foreground component image in the covered background region, and the image in the foreground region, supplied from the foreground/background separation unit 105, respectively.

For example, the separated image processing unit 106 generates coefficients which are used in the class classification adaptation processing for generating an even higher resolution image for each of the image in the background region, background component image in the uncovered background region, foreground component image in the uncovered background region, background component image in the covered background region, foreground component image in the covered background region, and image in the foreground region.

For example, the separated image processing unit 106 creates an even higher resolution image by applying the class classification adaptation processing for each of the image in the background region, background component image in the uncovered background region, foreground component image in the uncovered background region, background component image in the covered background region, foreground component image in the covered background region, and image in the foreground region.

Also, for example, the separated image processing unit 106 applies the processing for edge enhancement with differing degrees by using a different coefficient for each of the image in the background region, the background component image in the uncovered background region, the foreground component image in the uncovered background region, the background component image in the covered background region, the foreground component image in the covered background region, and the image in the foreground region.

The input images supplied to the image processing device will now be described, referring to FIG. 12 through FIG. 27.

Figure 12:
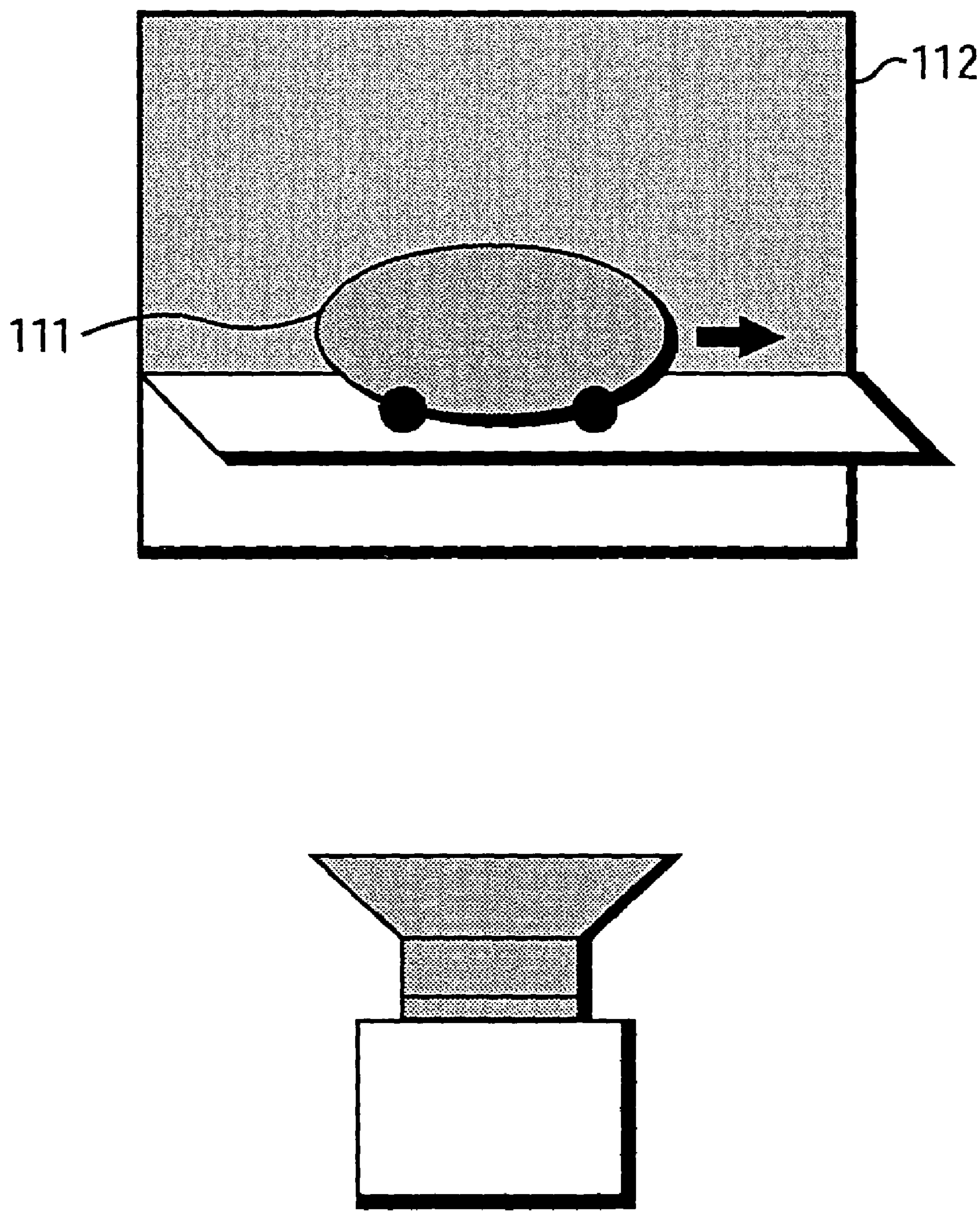
FIG. 12 is a diagram describing image-taking by a sensor.

FIG. 12 is a diagram which describes image-taking with a sensor. The sensor comprises a CCD video camera or the like, for example, including a CCD (Charge-Coupled Device) area sensor which is a solid-state image-taking device. An object 111 corresponding to the foreground in the real world moves between an object 112 corresponding to the background in the real world, and the sensor, for example, from the left side to the right side horizontally in the drawing.

The sensor takes images of the object 111 corresponding to the foreground with the object 112 corresponding to the background. The sensor outputs the taken images in increments of one frame. For example, the sensor outputs images of 30 frames per second. In this case, the exposure period of the sensor is 1/30 seconds. The exposure period represents a period from the sensor beginning conversion of input light into electric charges, up to the end of conversion of input light to electric charges. The exposure period will be also referred to as a shutter period hereafter.

Figure 13:
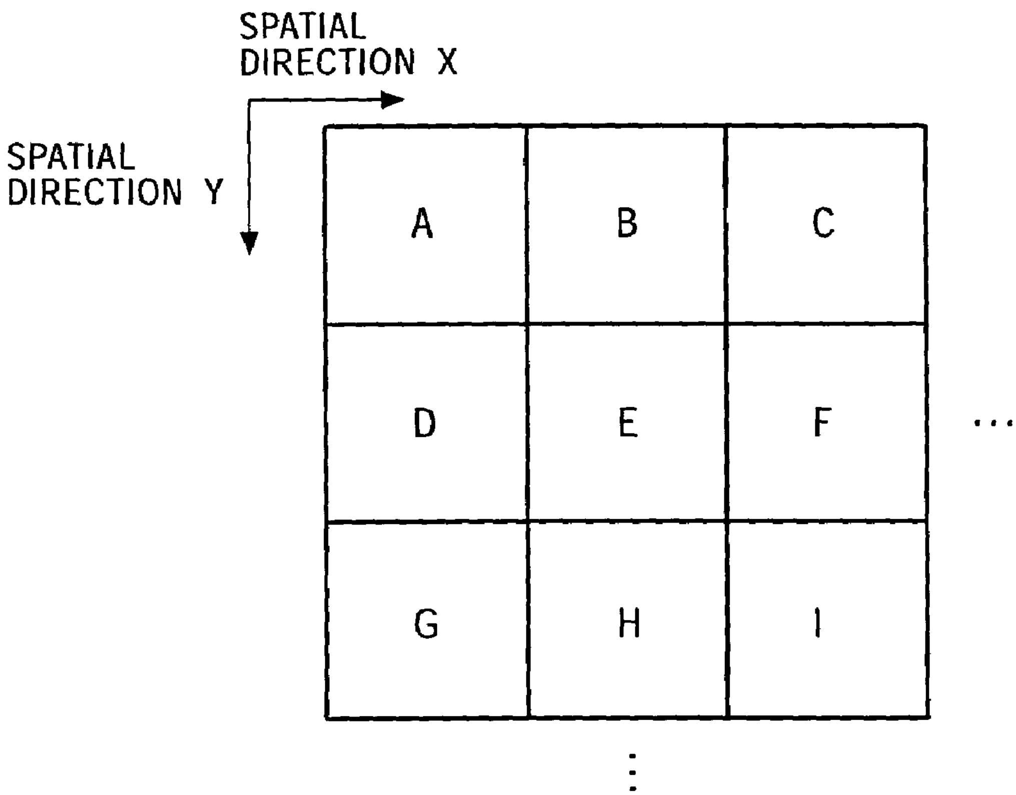
FIG. 13 is a diagram describing an arrangement of pixels.

FIG. 13 is a diagram which describes an arrangement of pixels. In FIG. 13, A through I denote individual pixels. These pixels are arranged on a plane corresponding to the image. One detecting element corresponding to one pixel is disposed on the sensor. Upon the sensor taking images, one detecting element outputs pixel values corresponding to one pixel which makes up the image. For example, a position in the X direction of the detecting elements corresponds to a position in the horizontal direction on the image, and a position in the Y direction of the detecting elements corresponds to a position in the vertical direction on the image.

Figure 14:
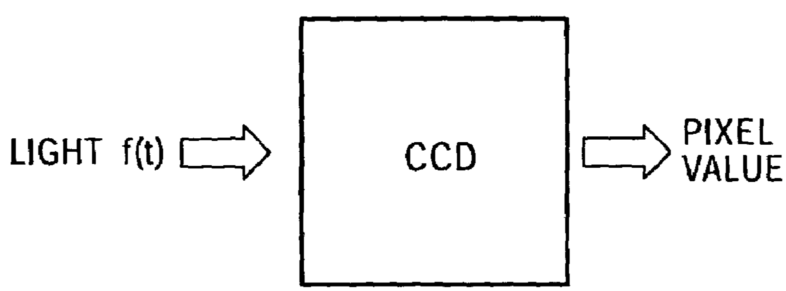
FIG. 14 is a diagram describing operation of a detecting device.

As shown in FIG. 14, for example, the detecting element of the CCD converts the input light into charges for a period corresponding to the shutter period, and accumulates the converted charges. The quantity of charges is approximately proportional to the strength of the input light and the period during which the light is input. The detecting element adds the charges converted from the input light to the accumulated charges in the period corresponding to the shutter period. That is to say, the detecting element integrates the input light during the period corresponding to the shutter period, and accumulates the amount of charges corresponding to the integrated light. It can also be said that the detecting element has integrating effects with regard to time.

The charges accumulated in the detecting element are converted into a voltage value by a circuit not shown in the drawings, which is further converted to pixel values such as digital data or the like, and is output. Accordingly, individual pixel values output from a sensor have values projected in one-dimensional space, which is from a result wherein a given portion having a spatial extension of the object corresponding to the foreground or the background, is integrated for the shutter period.

The image processing device extracts valid information buried in output signals due to such accumulation operations of the sensor, such as the mixture ratio $\alpha$, for example.

Figure 15A:
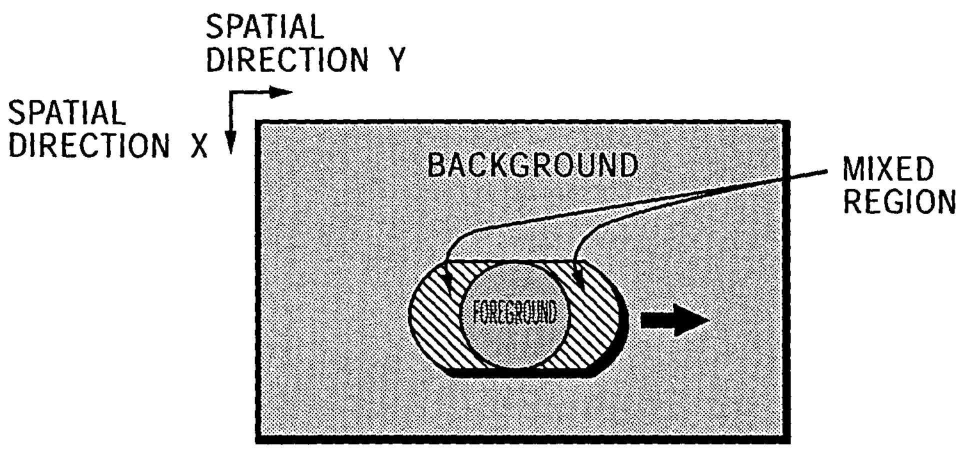
FIG. 15A is a diagram describing an image obtained by taking an image of an object corresponding to a moving foreground, and an object corresponding to a still background.
Figure 15B:
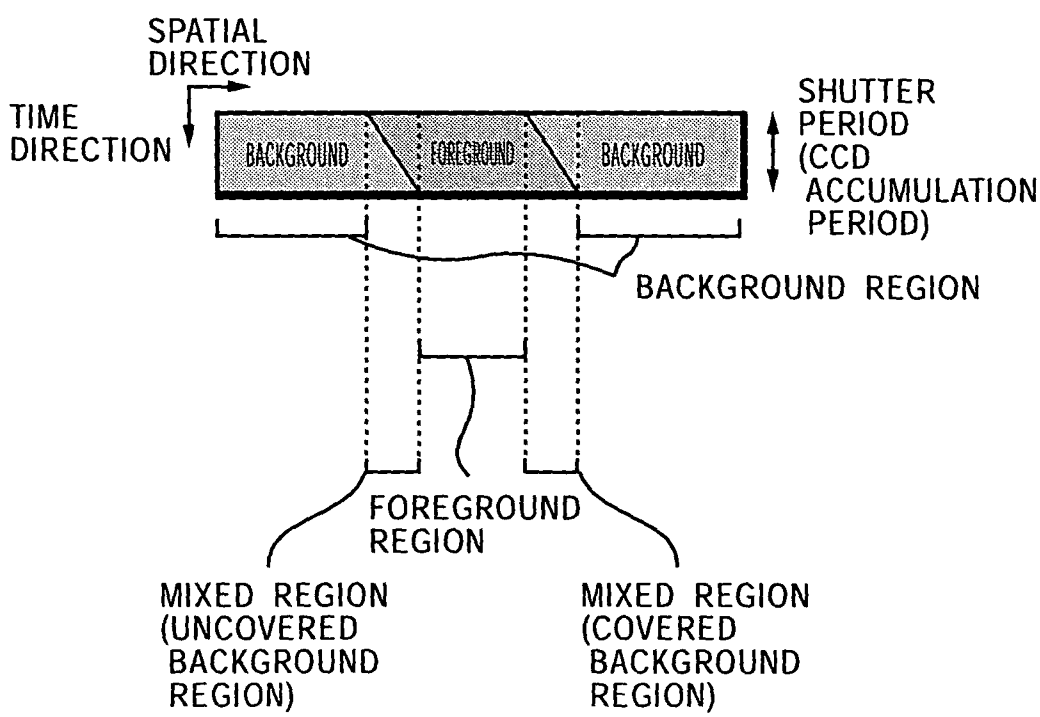
FIG. 15B is a diagram describing a model corresponding to an image obtained by taking an image of an object corresponding to a moving foreground, and an object corresponding to a still background.

FIG. 15A and FIG. 15B are diagrams which describe the image which is obtained by taking image of the object corresponding to the moving foreground and the object corresponding to the still background. FIG. 15A illustrates the image which is obtained by taking image of the object corresponding to the foreground with movement and the object corresponding to the still background. With the example shown in FIG. 15A, the object corresponding to the foreground moves from the left to the right horizontally in the drawing.

FIG. 15B is a model diagram wherein pixel values corresponding to one line of the image shown in FIG. 15A develop over the time direction. The horizontal direction in FIG. 15B corresponds to the spatial direction X in FIG. 15A.

The pixel values of pixels in the background regions are made up of only the background components, i.e., the image components corresponding to the background objects. The pixel values of pixels in the foreground regions are made up of only the foreground components, i.e., the image components corresponding to the foreground objects.

The pixel values of pixels in mixed regions are made up of the background components and the foreground components. Since the pixel values in the mixed region consists of the background components and the foreground components, the mixed region can also be said to be a distortion region. The mixed regions are further classified into covered background regions and uncovered background regions.

The covered background region is a mixed region at a position corresponding to a leading portion in the progress direction of the foreground object with regard to the foreground region, and accordingly is a region wherein the background components are covered by the foreground corresponding to elapsing of time.

Conversely, the uncovered background region is a mixed region at a position corresponding to a trailing portion in the progress direction of the foreground object with regard to the foreground region, and accordingly is a region wherein the background components emerge corresponding to elapsing of time.

As described above, images including the foreground region, background region, covered background region, or uncovered background region, are input as input images to the region specifying unit 103, the mixture ratio calculating unit 104, and the foreground/background separation unit 105.

Figures 16, 17:
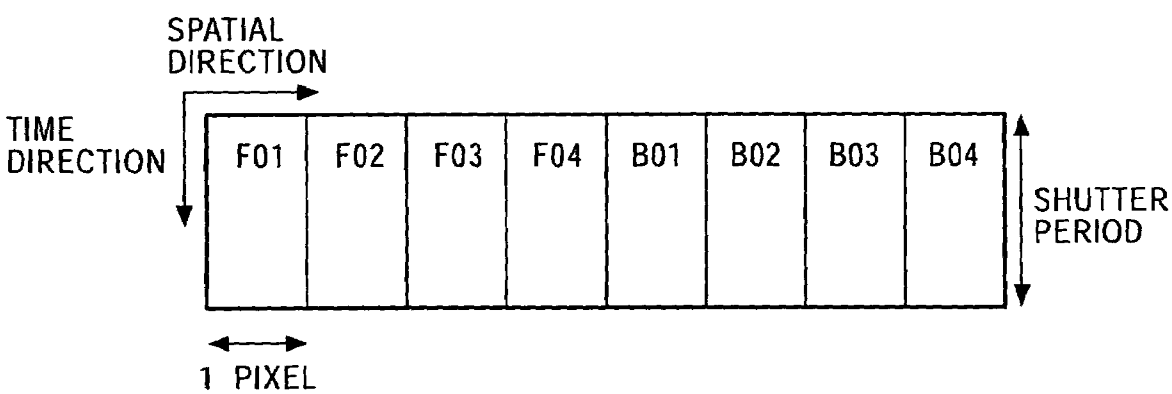
FIG. 16 is a diagram describing background region, foreground region, mixed region, covered background region, and uncovered background region.
FIG. 17 is a model diagram which develops, over the time direction, the pixel values of pixels adjacently arrayed in one row, in an image wherein an object corresponding to a still foreground and an object corresponding to a still background are subjected to image-taking.

FIG. 16 is a diagram which describes the background region, foreground region, mixed region, covered background region, and uncovered background region, as described above. In the event of corresponding to the images shown in FIG. 15A, the background region is the still portion, the foreground region is the moving portion, the covered background region of the mixed region is the portion which changes from the background to the foreground, and the uncovered background region of the mixed region is the portion which changes from the foreground to the background.

FIG. 17 is a model diagram wherein pixel values of the pixels arrayed adjacently in one line in the image that has been taken of the objects corresponding to the still foregrounds and the objects corresponding to the still backgrounds, develop over the time direction. For example, pixels arrayed in one line in a screen may be selected, as pixels adjacently arrayed in one line.

The pixel values F01 through F04 shown in FIG. 17 are pixel values of pixels corresponding to the still foreground object. The pixel values B01 through B04 shown in FIG. 17 are pixel values of pixels corresponding to the still background object.

The vertical direction in FIG. 17 represents elapsing of time from the top to the bottom in the drawing. The position of the upper side of the rectangle in FIG. 17 corresponds to the time at which the sensor begins conversion of the input light into charges, and the position of the lower side of the rectangle in FIG. 17 corresponds to the time at which the sensor ends the conversion of the input light into charges. That is to say, the distance from the upper side to the lower side of the rectangle in FIG. 17 corresponds to the shutter period.

An arrangement wherein the shutter period equals the frame interval will now be described below, by way of an example.

The horizontal direction in FIG. 17 corresponds to the spatial direction X as described in FIG. 15A. More particularly, shown by way of an example in FIG. 17, the distance from the left side of the rectangle denoted by "F01" to the right side of the rectangle denoted by "B04" in FIG. 17, is eight times long as the pixel pitch, that is to say, corresponds to the interval of eight continuous pixels.

In the event that the foreground objects and the background objects keep still, the light input to the sensor is not altered during the period corresponding to the shutter period.

Now, the period corresponding to the shutter period is divided into two or more periods of equal length. For example, in the event that the virtual dividing number is 4, the model diagram shown in FIG. 17 can be represented by the model shown in FIG. 18. The virtual dividing number is set corresponding to the movement amount v or the like of the object corresponding to the foreground within the shutter period. For example, corresponding to the movement amount v of 4, the virtual dividing number is 4, and the period corresponding to the shutter period is divided into 4 periods.

The uppermost row in the drawing corresponds to the first of the divided periods from the shutter being opened. The second row from the top in the drawing corresponds to the second of the divided periods from the shutter being opened. The third row from the top in the drawing corresponds to the third of the divided periods from the shutter being opened. The fourth row from the top in the drawing corresponds to the fourth of the divided periods from the shutter being opened.

The divided shutter period corresponding to the movement amount v is also referred to as a shutter period/v hereafter.

In the event that the object corresponding to the foreground keeps still, the foreground component F01/v equals the value in which the pixel value F01 is divided by the virtual dividing number, since the light input to the sensor is not altered. Similarly, in the event that the object corresponding to the foreground keeps still, the foreground component F02/v equals the value of the pixel value F02 being divided by the virtual dividing number, the foreground component F03/v equals the value of the pixel value F03 being divided by the virtual dividing number, and the foreground component F04/v equals the value of the pixel value F04 being divided by the virtual dividing number.

In the event that the object corresponding to the background keeps still, the background component B01/v equals the value of the pixel value B01 being divided by the virtual dividing number, since the light input to the sensor is not altered. Similarly, in the event that the object corresponding to the background keeps still, the background component B02/v equals the value of the pixel value B02 being divided by the virtual dividing number, B03/v equals the value of the pixel value B03 being divided by the virtual dividing number, and B04/v equals the value of the pixel value B04 being divided by the virtual dividing number.

That is to say, in the event that the object corresponding to the foreground keeps still, the foreground component F01/v corresponding to the first shutter period/v from the shutter opening, the foreground component F01/v corresponding to the second shutter period/v from the shutter opening, the foreground component F01/v corresponding to the third shutter period/v from the shutter opening, and the foreground component F01/v corresponding to the fourth shutter period/v from the shutter opening, are the same value, since the light corresponding to the foreground object which is input to the sensor is not altered during the period corresponding to the shutter period. F02/v through F04/v have the same relationship as F01/v.

In the event that the object corresponding to the background keeps still, the background component B01/v corresponding to the first shutter period/v from the shutter opening, the background components B01/v corresponding to the second shutter period/v from the shutter opening, the background components B01/v corresponding to the third shutter period/v from the shutter opening, and the background components B01/v corresponding to the fourth shutter period/v from the shutter opening, are the same value, since the light corresponding to the background object which is input to the sensor is not altered during the period corresponding to the shutter period. B02/v through B04/v have the same relationship.

A case will now be described wherein the object corresponding to the foreground moves while the object corresponding to the background keeps still.

Figure 19:
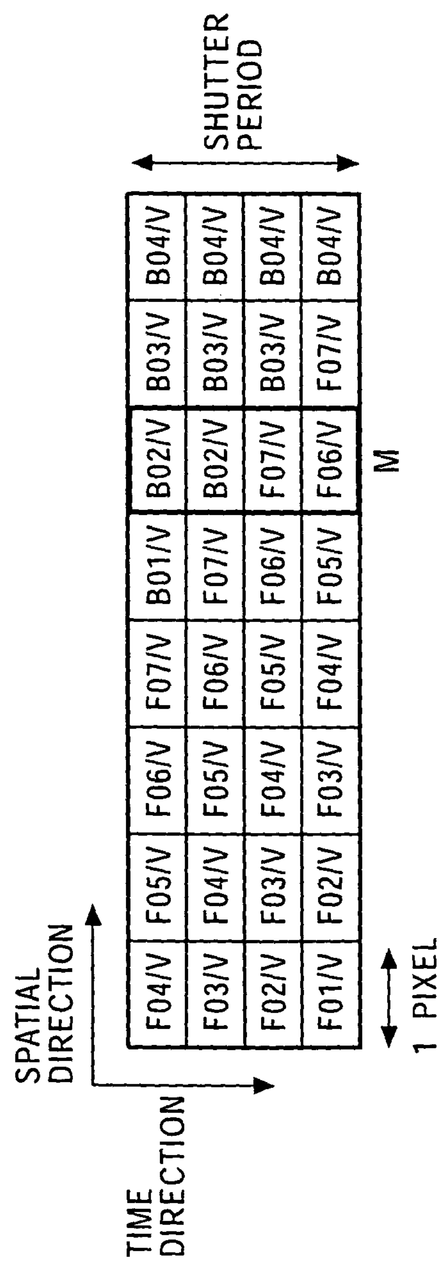
FIG. 19 is a model diagram wherein the pixel values are developed over the time direction, and periods corresponding to shutter time are divided.

FIG. 19 is a model diagram wherein pixel values of the pixels on one line including the covered background region develop over the time direction in the event that the object corresponding to the foreground moves towards the right side in the drawing. In FIG. 19, the movement amount v of the foreground is 4. Since one frame is a short period, an assumption may be made that the object corresponding to the foreground is a rigid body, and moves at a constant velocity.

In FIG. 19, the object image corresponding to the foreground moves so as to be displayed at a position four pixels to the right in the following frame, with a given frame as a reference.

In FIG. 19, the left-most pixel through the fourth pixel from the left, belong to the foreground region. In FIG. 19, the fifth through the seventh pixels from the left belong to the covered background region of the mixed region. In FIG. 19, the right-most pixel belongs to the background region.

Since the object corresponding to the foreground moves so as to hide the object corresponding to the background with elapsing of time, the components contained in the pixel values of the pixels which belong to the covered background region change from the background components to the foreground components at a certain point of the period corresponding to the shutter period.

For example, the pixel value M shown with a heavy frame in FIG. 19, is represented by Expression (1).

$$M=B02/v+B02/v+F07/v+F06/v \tag{1}$$

For example, since the fifth pixel from the left includes a background component corresponding to one shutter period/v and foreground components corresponding to the three shutter period/vs, the mixture ratio α of the fifth pixel from the left is ¼. Since the sixth pixel from the left contains background components corresponding to the two shutter period/vs and foreground components corresponding to the two shutter period/vs, the mixture ratio α of the sixth pixel from the left is ½. Since the seventh pixel from the left includes background components corresponding to the three shutter period/vs and a foreground component corresponding to the one shutter period/v, the mixture ratio α of the seventh pixel from the left is ¾.

Since an assumption may be made that the object corresponding to the foreground is a rigid body and the foreground image moves at a constant velocity so as to be displayed at a position four pixels to the right in the following frame, the foreground component F07/v of the first shutter period/v from the shutter opening of the fourth pixel from the left in FIG. 19, for example, equals the foreground component corresponding to the second shutter period/v from the shutter opening of the fifth pixel from the left in FIG. 19. Similarly, the foreground component F07/v equals the foreground component corresponding to the third shutter period/v from the shutter opening of the sixth pixel from the left in FIG. 19, and the foreground component corresponding to the fourth shutter period/v from the shutter opening of the seventh pixel from the left in FIG. 19, respectively.

Since an assumption may be made that the object corresponding to the foreground is a rigid body and that the foreground image moves at a constant velocity so as to be displayed at a point four pixels to the right in the following frame, the foreground component F06/v of the first shutter period/v from the shutter opening of the third pixel from the left in FIG. 19, for example, equals the foreground component corresponding to the second shutter period/v from the shutter opening of the fourth pixel from the left in FIG. 19. Similarly, the foreground component F06/v equals the foreground component corresponding to the third shutter period/v from the shutter opening of the fifth pixel from the left in FIG. 19, and the foreground component corresponding to the fourth shutter period/v from the shutter opening of the sixth pixel from the left in FIG. 19, respectively.

Since an assumption may be made that the object corresponding to the foreground is a rigid body and the foreground image moves at a constant velocity so as to be displayed at a position four pixels to the right in the following frame, the foreground component F05/v of the first shutter period/v from the shutter opening of the second pixel from the left in FIG. 19, for example, equals the foreground component corresponding to the second shutter period/v from the shutter opening of the third pixel from the left in FIG. 19. Similarly, the foreground component F05/v equals the foreground component corresponding to the third shutter period/v from the shutter opening of the fourth pixel from the left in FIG. 19, and the foreground component corresponding to the fourth shutter period/v from the shutter opening of the fifth pixel from the left in FIG. 19, respectively.

Since an assumption may be made that the object corresponding to the foreground is a rigid body and the foreground image moves at a constant velocity so as to be displayed at a position four pixels to the right in the following frame, the foreground component F04/v of the first shutter period/v from the shutter opening of the left-most pixel in FIG. 19, for example, equals the foreground component corresponding to the second shutter period/v from the shutter opening of the second pixel from the left in FIG. 19. Similarly, the foreground component F04/v equals the foreground component corresponding to the third shutter period/v from the shutter opening of the third pixel from the left in FIG. 19, and the foreground component corresponding to the fourth shutter period/v from the shutter opening of the fourth pixel from the left in FIG. 19, respectively.

As described above, the foreground region corresponding to the moving object includes movement blurring, so this can be said to be a distorted region.

Figure 20:
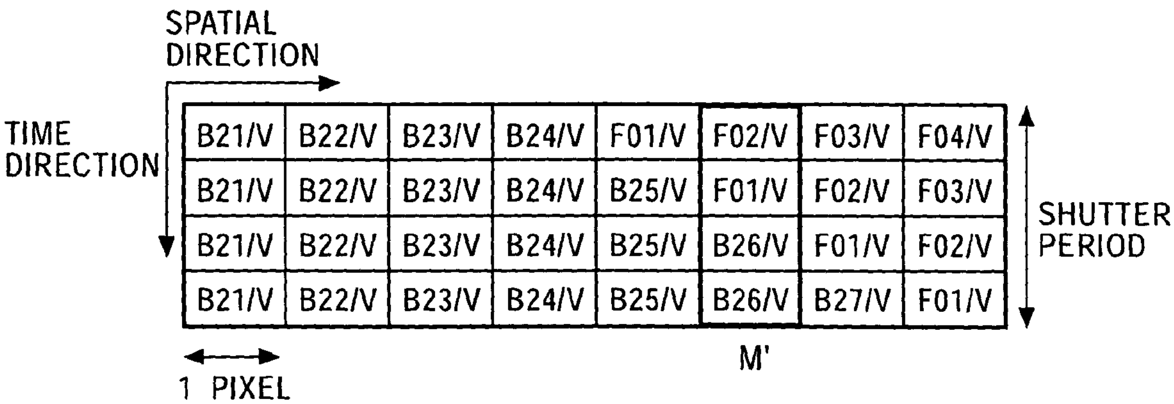
FIG. 20 is a model diagram wherein the pixel values are developed over the time direction, and periods corresponding to shutter time are divided.

FIG. 20 is a model diagram wherein the pixel values of the pixels on one line including the uncovered background region develop over the time direction in the event that the foreground moves toward the right side in the drawing. In FIG. 20, the movement amount v of the foreground is 4. Since one frame is a short time, an assumption may be made that the object corresponding to the foreground is a rigid body, and moves at a constant velocity. In FIG. 20, the object image corresponding to the foreground moves to the right side by four pixels in the following frame with a given frame as a reference.

In FIG. 20, the left-most pixel through the fourth pixel from the left, belong to the background region. In FIG. 20, the fifth through the seventh pixels from the left belong to the mixed region of the uncovered background. In FIG. 20, the right-most pixel belongs to the foreground region.

Since the object corresponding to the foreground which has hidden the object corresponding to the background moves so as to be removed from the front of the object corresponding to the background with elapsing of time, the components included in the pixel values of the pixels which belong to the uncovered background region change from the foreground components to the background components at a certain point in the period corresponding to the shutter period.

For example, the pixel value M' indicated with a heavy frame in FIG. 20, is represented by Expression (2).

$$M'=F02/v+F01/v+B26/v+B26/v \qquad (2)$$

For example, since the fifth pixel from the left includes the background components corresponding to the three shutter period/vs, and the foreground component corresponding to the one shutter period/v, the mixture ratio α of the fifth pixel from the left is ¾. Since the sixth pixel from the left includes the background components corresponding to the two shutter period/vs and the foreground components corresponding to the two shutter period/vs, the mixture ratio α of the sixth pixel from the left is ½. Since the seventh pixel from the left includes the background component corresponding to the one shutter period/v and the foreground components corresponding to the three shutter period/vs, the mixture ratio α of the seventh pixel from the left is ¼.

Further generalizing Expression (1) and Expression (2), the pixel value M is represented by Expression (3).

$$M = \alpha \cdot B + \sum_i F_i / v \qquad (3)$$

Here, α denotes the mixture ratio. B denotes the pixel value of the background, and Fi/v denotes the foreground component.

Since an assumption may be made that the object corresponding to the foreground is a rigid body and moves at a constant velocity, and the movement amount v is 4, for example, the foreground component F01/v of the first shutter period/v from the shutter opening of the fifth pixel from the left in FIG. 20 equals the foreground component corresponding to the second shutter period/v from the shutter opening of the sixth pixel from the left in FIG. 20. Similarly, F01/v equals the foreground component corresponding to the third shutter period/v from the shutter opening of the seventh pixel from the left in FIG. 20, and the foreground component corresponding to the fourth shutter period/v from the shutter opening of the eighth pixel from the left in FIG. 20, respectively.

Since an assumption may be made that the object corresponding to the foreground is a rigid body and moves at a constant velocity, and the virtual dividing number is 4, the foreground component F02/v of the first shutter period/v from the shutter opening of the sixth pixel from the left in FIG. 20, for example, equals the foreground component corresponding to the second shutter period/v from the shutter opening of the seventh pixel from the left in FIG. 20. Similarly, the foreground component F02/v equals the foreground component corresponding to the third shutter period/v from the shutter opening of the eighth pixel from the left in FIG. 20.

Since an assumption may be made that the object corresponding to the foreground is an rigid body and moves at a constant velocity, and movement amount v is 4, the foreground component F03/v of the first shutter period/v from the shutter opening of the seventh pixel from the left in FIG. 20, for example, equals the foreground component corresponding to the second shutter period/v from the shutter opening of the eighth pixel from the left in FIG. 20.

Figure 18:
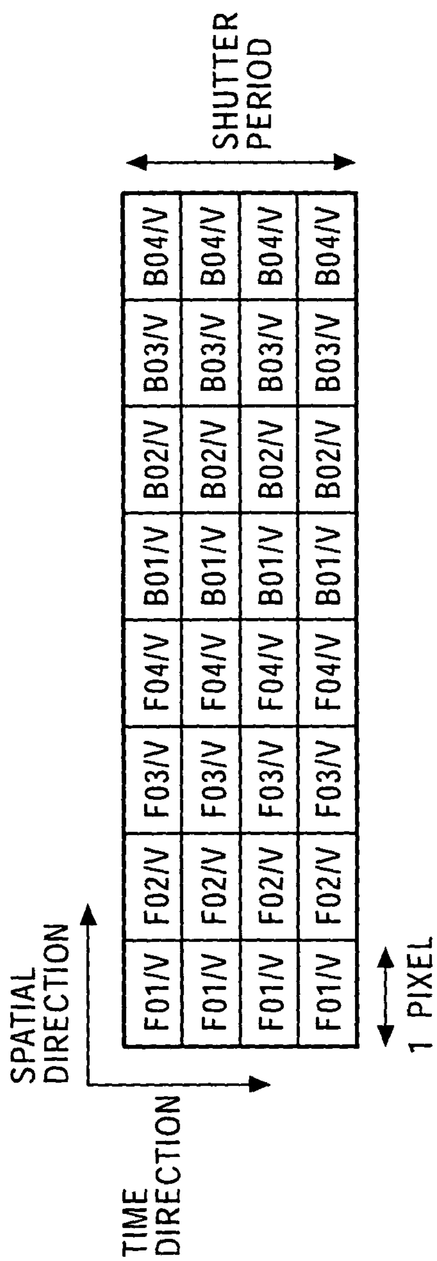
FIG. 18 is a model diagram wherein the pixel values are developed over the time direction, and periods corresponding to shutter time are divided.

While a description has been made in the description of FIG. 18 through FIG. 20 wherein the virtual dividing number is 4, the virtual dividing number corresponds to the movement amount v. The movement amount v generally corresponds to the movement velocity of the object corresponding to the foreground. For example, in the event that the object corresponding to the foreground moves so as to be displayed at a position-four pixels to the right in the following frame with a given frame as a reference, the movement amount v is 4. The virtual dividing number is 4 corresponding to the movement amount v. Similarly, for example, in the event that the object corresponding to the foreground moves so as to be displayed at a position six pixels to the left in the following frame with a given frame as a reference, the movement amount v is 6, and the virtual dividing number is 6.

Figure 21:
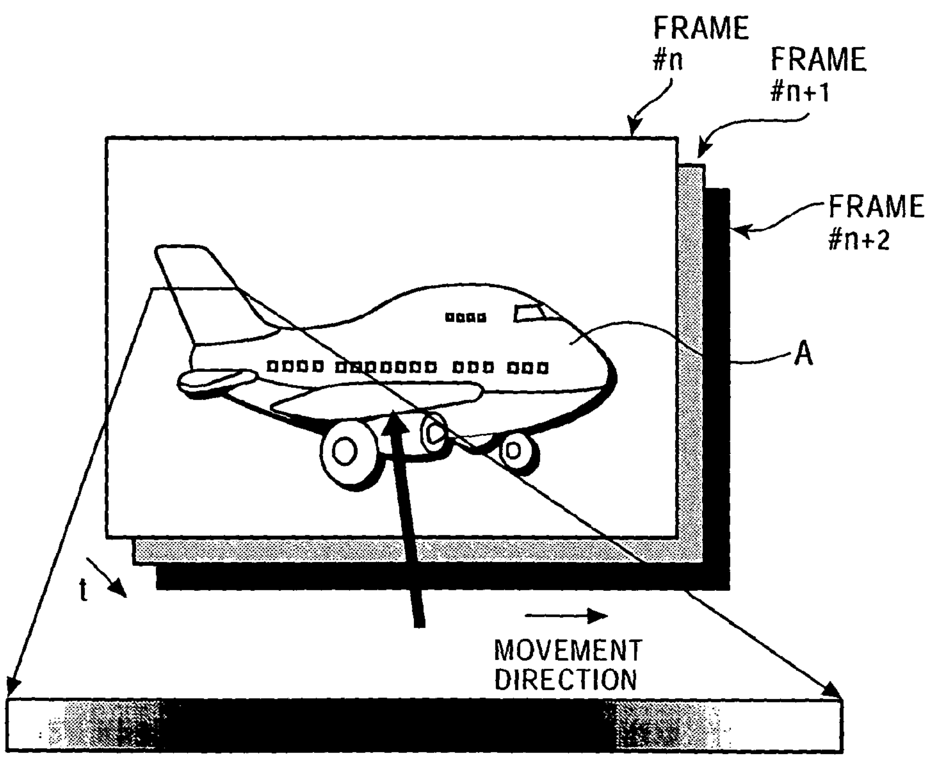
FIG. 21 is a diagram illustrating an example of extracting pixels of the foreground region, background region, and mixed region.
Figure 22:
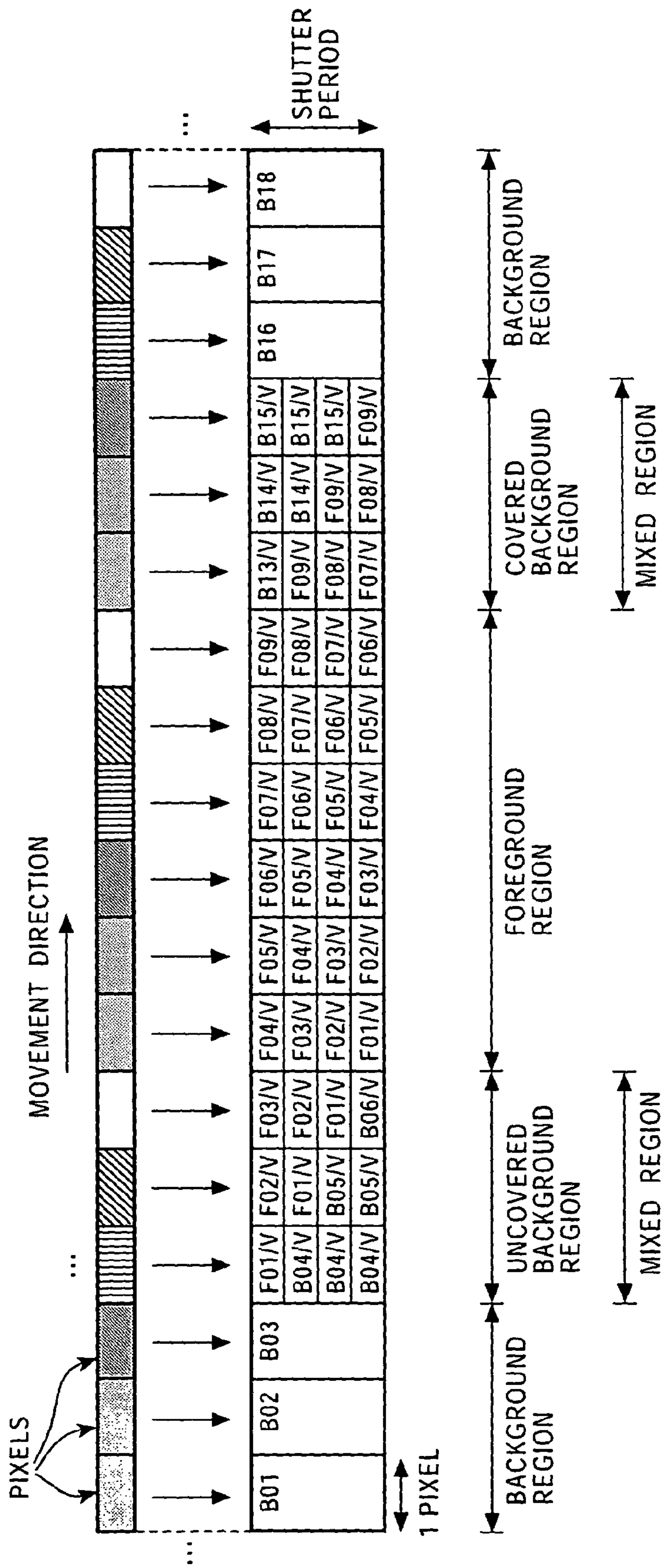
FIG. 22 is a diagram illustrating how pixels correspond to a model wherein pixel values are developed over the time direction.

FIG. 21 and FIG. 22 illustrate the relationship between the foreground region, the background region, and the mixed region which consists of the covered background region or the uncovered background region, and the foreground components and the background components, corresponding to the divided shutter period.

FIG. 21 illustrates an example wherein the pixels of the foreground region, the background region, and the mixed region, are extracted from the image including the foreground corresponding to the object which moves in front of the still background. The reference character A shown in FIG. 21 denotes an object which moves in front of the still background. In the example shown in FIG. 21, the object corresponding to the foreground denoted by the reference character A moves horizontally with regard to the screen.

The frame #n+1 is the frame following the frame #n, and the frame #n+2 is the frame following the frame #n+1.

FIG. 22 illustrates a model wherein the pixels of the foreground region, the background region, and the mixed region are extracted from one of frame #n through frame #n+2, and the pixel values of the extracted pixels are developed over the time direction, with the movement amount v at 4.

Since the object corresponding to the foreground moves, the pixel values of the foreground region consist of four different foreground components corresponding to the period of shutter period/v. For example, the left-most pixel of the pixels of the foreground region shown in FIG. 22 consists of F01/v, F02/v, F03/v, and F04/v. That is to say, the pixels of the foreground region include movement blurring.

Since the object corresponding to the background keeps still, the light corresponding to the background input to the sensor is not altered during the period corresponding to the shutter period. In this case, the pixel values of the background region do not contain movement blurring.

The pixel value of the pixel which belongs to the mixed region made up of the covered background region or the uncovered background region consists of the foreground components and the background components.

Next, a model will be described wherein, in the event that the image corresponding to the object moves, the pixel values of the pixels which are arrayed adjacently in a single line on multiple frames, and at the same position in the frames, develop over the time direction. For example, in the event that the image corresponding to the object moves horizontally on the screen, the pixels arrayed in a single line can be selected as pixels arrayed adjacently in a single line.

Figure 23:
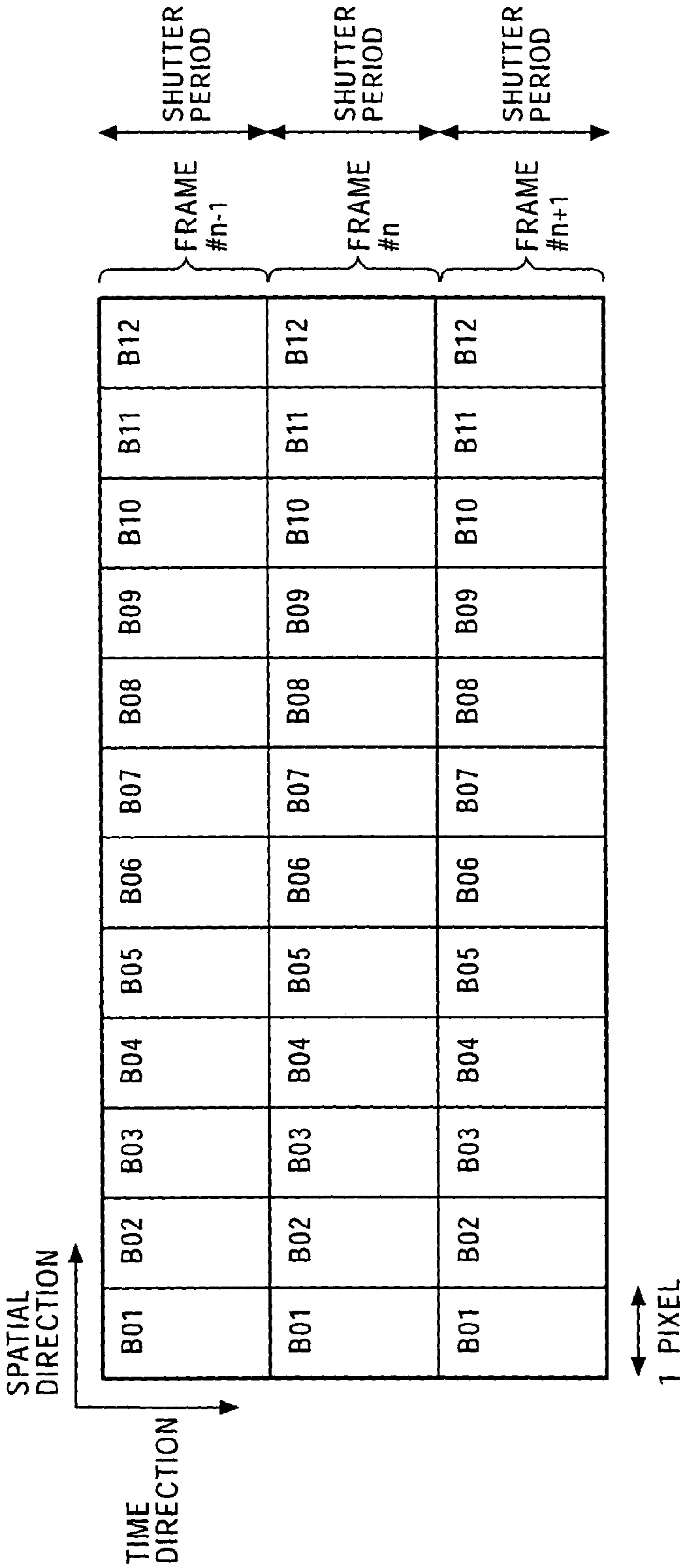
FIG. 23 is a model diagram wherein the pixel values are developed over the time direction, and periods corresponding to shutter time are divided.

FIG. 23 is a model diagram wherein the pixel values of pixels arrayed adjacently in a single line on three frames of images which are taken of the object corresponding to the still background, and are at the same position in the frames, develop over the time direction. The frame #n is the frame following the frame #n−1, and the frame #n+1 is the frame following the frame #n. Other frames are denoted in the same way.

The pixel values of the B01 through B12 shown in FIG. 23 are the pixel values of the pixels corresponding to the object of the still background. Since the object corresponding to the background keeps still, the pixel values of the corresponding pixels do not change in the frame #n−1 through the frame #n+1. For example, the pixels in the frame #n and the pixels in the frame #n+1 at the position corresponding to the pixel having a pixel value B05 in the frame #n−1, have a pixel value B05, respectively.

Figure 24:
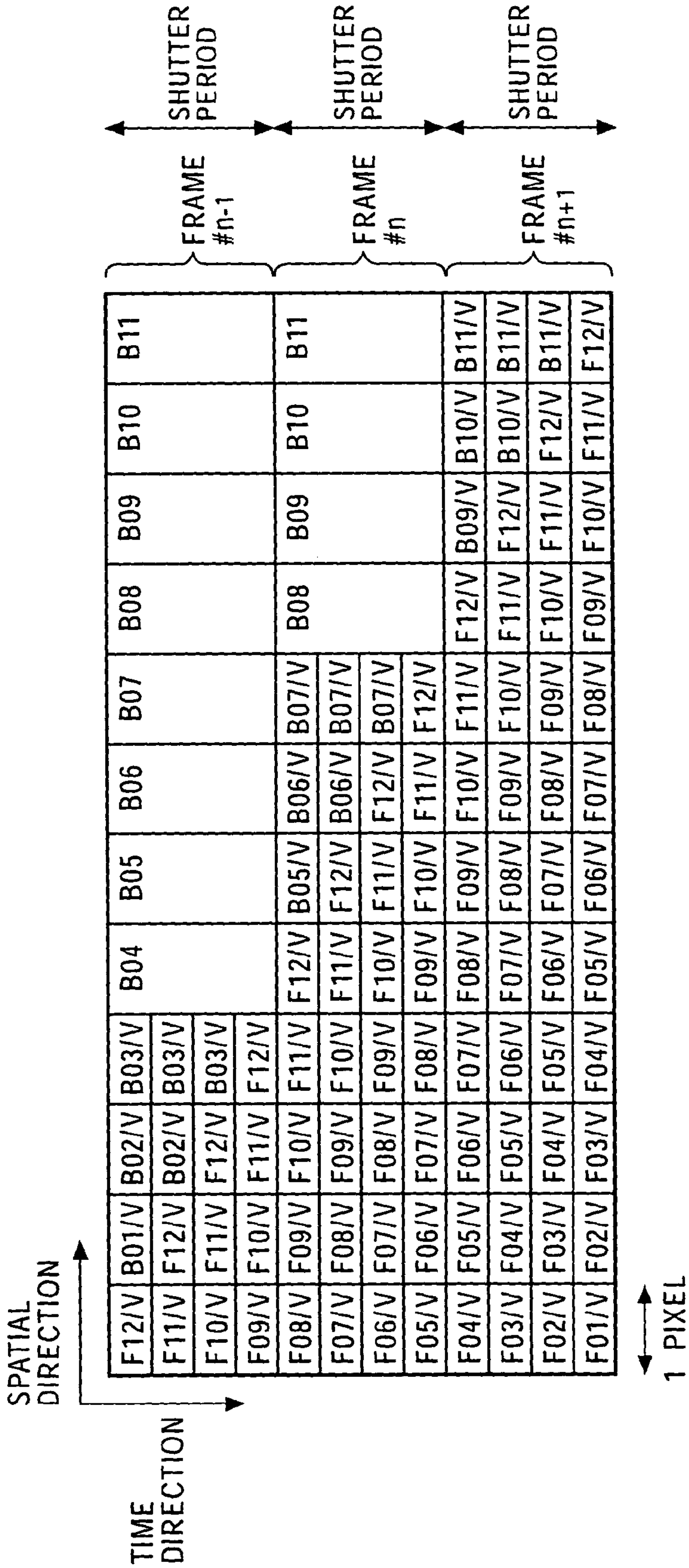
FIG. 24 is a model diagram wherein the pixel values are developed over the time direction, and periods corresponding to shutter time are divided.

FIG. 24 is a model diagram wherein the pixel values of pixels arrayed adjacently in a single line on three frames of images taken of the object corresponding to the foreground which moves to the right side in the drawing with the object corresponding to the still background, and at the same position in the frames, develop over the time direction. The models shown in FIG. 24 includes the covered background region.

Since an assumption may be made in FIG. 24 that the object corresponding to the foreground is a rigid body and moves at a constant velocity, and the foreground image moves so as to be displayed at a position four pixels to the right side in the following frame, the foreground movement amount v is 4, and the virtual dividing number is 4.

For example, the foreground component of the first shutter period/v from the shutter opening of the left-most pixel of the frame #n−1 in FIG. 24 is F12/v, the foreground component of the second shutter period/v from the shutter opening of the second pixel from the left in FIG. 24 is also F12/v. The foreground component of the third shutter period/v from the shutter opening of the third pixel from the left in FIG. 24, and the foreground component of the fourth shutter period/v from the shutter opening of the fourth pixel from the left in FIG. 24, are F12/v.

The foreground component of the second shutter period/v from the shutter opening of the left-most pixel in the frame #n−1 in FIG. 24 is F11/v, and the foreground component of the third shutter period/v from the shutter opening of the second pixel from the left in FIG. 24 is also F11/v. The foreground component of the fourth shutter period/v from the shutter opening of the third pixel from the left in FIG. 24 is F11/v.

The foreground component of the third shutter period/v from the shutter opening of the left-most pixel in the frame #n−1 in FIG. 24 is F10/v, and the foreground component of the fourth shutter period/v from the shutter opening of the second pixel from the left in FIG. 24 is also F10/v. The foreground component of the fourth shutter period/v from the shutter opening of the left-most pixel in the frame #n−1 in FIG. 24 is F09/v.

Since the object corresponding to the background keeps still, the background component of the first shutter period/v from the shutter opening of the second pixel from the left in the frame #n−1 in FIG. 24 is B01/v. The background components of the first and second shutter period/vs from the shutter opening of the third pixel from the left in the frame #n−1 in FIG. 24 are B02/v. The background components of the first through third shutter period/vs from the shutter opening of the fourth pixel from the left in the frame #n−1 in FIG. 24 are B03/v.

In the frame #n−1 in FIG. 24, the left-most pixel belongs to the foreground region, and the second through fourth pixels from the left belong to the mixed region of the covered background region.

The fifth through twelfth pixels from the left in the frame #n−1 in FIG. 24 belong to the background region, and the pixel values thereof are B04 through B11, respectively.

The first through fifth pixels from the left in the frame #n in FIG. 24 belong to the foreground region. The foreground component of the shutter period/v in the foreground region in the frame #n, is one of F05/v through F12/v.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the fifth pixel from the left in the frame #n in FIG. 24 is F12/v, the foreground component of the second shutter period/v from the shutter opening of the sixth pixel from the left in FIG. 24 is also F12/v. The foreground component of the third shutter period/v from the shutter opening of the seventh pixel from the left in FIG. 24, and the foreground component of the fourth shutter period/v from the shutter opening of the eighth pixel from the left in FIG. 24, are F12/v.

The foreground component of the second shutter period/v from the shutter opening of the fifth pixel from the left in the frame #n in FIG. 24 is F11/v, and the foreground component of the third shutter period/v from the shutter opening of the sixth pixel from the left in FIG. 24 is also F11/v. The foreground component of the fourth shutter period/v from the shutter opening of the seventh pixel from the left in FIG. 24 is F11/v.

The foreground component of the third shutter period/v from the shutter opening of the fifth pixel from the left in the frame #n in FIG. 24 is F10/v, and the foreground component of the fourth shutter period/v from the shutter opening of the sixth pixel from the left in FIG. 24 is also F10/v. The foreground component of the fourth shutter period/v from the shutter opening of the fifth pixel from the left in the frame #n in FIG. 24 is F09/v.

Since the object corresponding to the background keeps still, the background component of the first shutter period/v from the shutter opening of the sixth pixel from the left in the frame #n in FIG. 24 is B05/v. The background components of the first and second shutter period/vs from the shutter opening of the seventh pixel from the left in the frame #n in FIG. 24 are B06/v. The background components of the first through third shutter period/vs from the shutter opening of the eighth pixel from the left in the frame #n in FIG. 24 are B07/v.

In the frame #n in FIG. 24, the sixth through eighth pixels from the left belong to the mixed region of the covered background region.

The ninth through twelfth pixels from the left in the frame #n in FIG. 24 belong to the background region, and the pixel values are B08 through B11, respectively.

The first through ninth pixels from the left in the frame #n+1 in FIG. 24 belong to the foreground region. The foreground component of the shutter period/v in the foreground region in the frame #n+1 is one of F01/v through F12/v.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the ninth pixel from the left in the frame #n+1 in FIG. 24 is F12/v, and the foreground component of the second shutter period/v from the shutter opening of the tenth pixel from the left in FIG. 24 is also F12/v. The foreground component of the third shutter period/v from the shutter opening of the eleventh pixel from the left in FIG. 24, and the foreground component of the fourth shutter period/v from the shutter opening of the twelfth pixel from the left in FIG. 24, are F12/v.

The foreground component of the second shutter period/v from the shutter opening of the ninth pixel from the left in the frame #n+1 in FIG. 24 is F11/v, and the foreground component of the third shutter period/v from the shutter opening of the tenth pixel from the left in FIG. 24 is also F11/v. The foreground component of the fourth shutter period/v from the shutter opening of the eleventh pixel from the left in FIG. 24 is F11/v.

The foreground component of the third shutter period/v from the shutter opening of the ninth pixel from the left in the frame #n+1 in FIG. 24 is F10/v, and the foreground component of the fourth shutter period/v from the shutter opening of the tenth pixel from the left in FIG. 24 is also F10/v. The foreground component of the fourth shutter period/v from the shutter opening of the ninth pixel from the left in the frame #n+1 in FIG. 24 is F09/v.

Since the object corresponding to the background keeps still, the background component of the first shutter period/v from the shutter opening of the tenth pixel from the left in the frame #n+1 in FIG. 24 is B09/v. The background components of the first and second shutter period/vs from the shutter opening of the eleventh pixel from the left in the frame #n+1 in FIG. 24 are B10/v. The background components of the first through third shutter period/vs from the shutter opening of the twelfth pixel from the left in the frame #n+1 in FIG. 24 are B11/v.

In the frame #n+1 in FIG. 24, the tenth through twelfth pixels from the left side correspond to the mixed region which is the covered background region.

Figure 25:
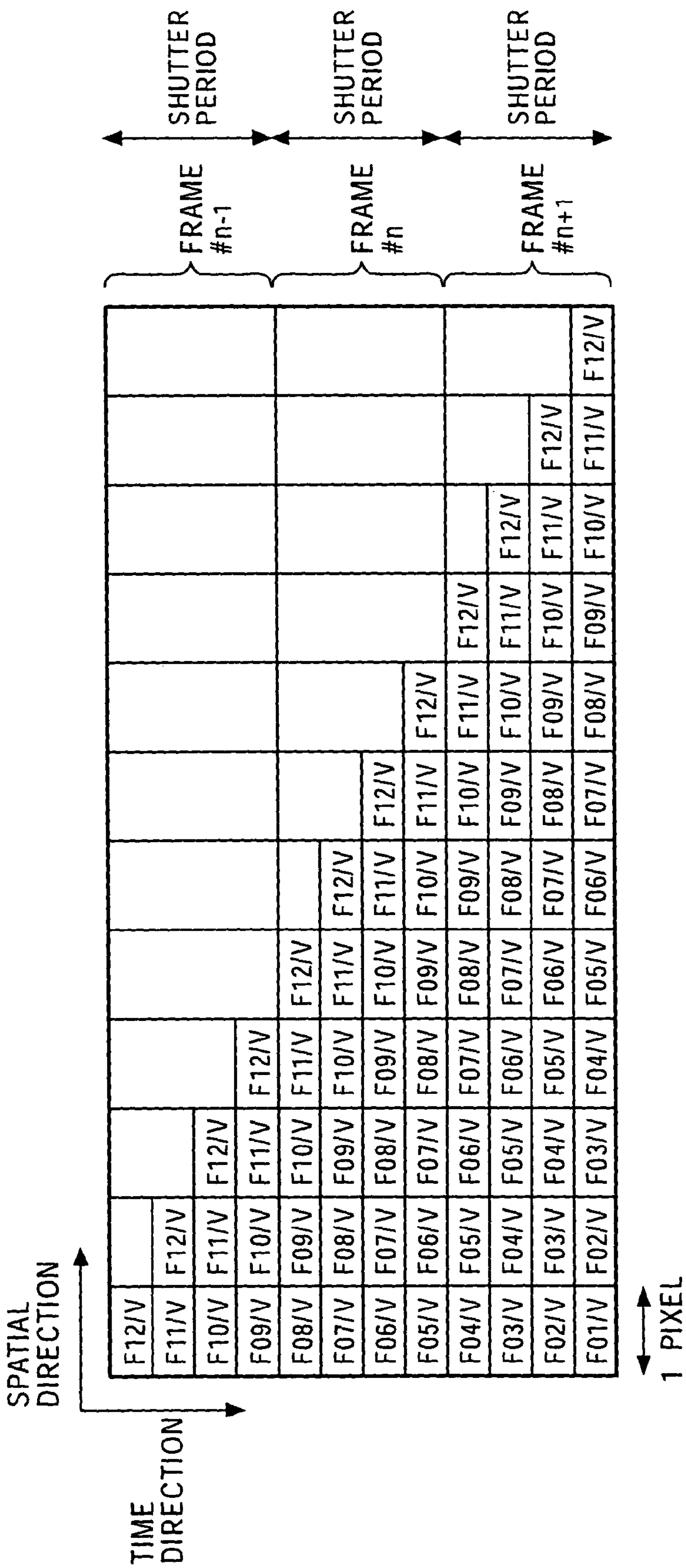
FIG. 25 is a model diagram wherein the pixel values are developed over the time direction, and periods corresponding to shutter time are divided.

FIG. 25 is a model diagram wherein the foreground components are extracted from the pixel values illustrated in FIG. 24.

Figure 26:
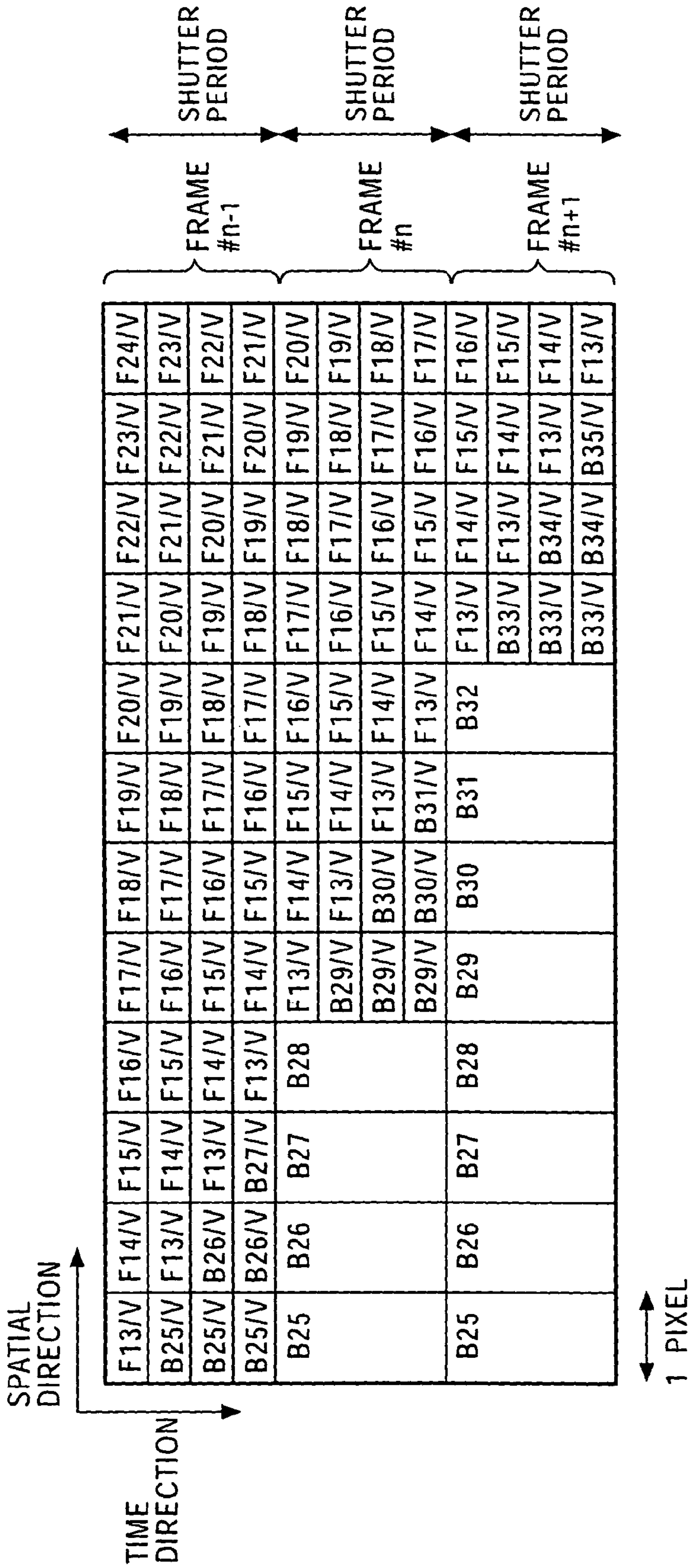
FIG. 26 is a model diagram wherein the pixel values are developed over the time direction, and periods corresponding to shutter time are divided.

FIG. 26 is a model diagram wherein the pixel values of the pixels adjacently arrayed in a row in three frames of the images which are taken of the foreground corresponding to the object which moves to the right side in the drawing with the still background, and are at the same position in the frames, develop over the time direction. In FIG. 26, the model diagram includes the uncovered background region.

In FIG. 26, an assumption may be made that the object corresponding to the foreground is a rigid body, and moves at a constant velocity. Since the object corresponding to the foreground moves so as to be displayed at a position four pixels to the right side in the following frame, the movement amount v is 4.

For example, the foreground component of the first shutter period/v from the shutter opening of the left-most pixel in the frame #n−1 in FIG. 26 is F13/v, and the foreground component of the second shutter period/v from the shutter opening of the second pixel from the left in FIG. 26 is also F13/v. The foreground component of the third shutter period/v from the shutter opening of the third pixel from the left in FIG. 26, and the foreground component of the fourth shutter period/v from the shutter opening of the fourth pixel from the left in FIG. 26, are F13/v.

The foreground component of the first shutter period/v from the shutter opening of the second pixel from the left in the frame #n−1 in FIG. 26 is F14/v, and the foreground component of the second shutter period/v from the shutter opening of the third pixel from the left in FIG. 26 is also F14/v. The foreground component of the first shutter period/v from the shutter opening of the third pixel from the left in FIG. 26 is F15/v.

Since the object corresponding to the background keeps still, the background component of the second through fourth shutter period/vs from the shutter opening of the left-most pixel in the frame #n−1 in FIG. 26 is B25/v. The background components of the third and fourth shutter period/vs from the shutter opening of the second pixel from the left in the frame #n−1 in FIG. 26 are B26/v. The background component of the fourth shutter period/v from the shutter opening of the third pixel from the left in the frame #n−1 in FIG. 26 is B27/v.

In the frame #n−1 in FIG. 26, the left-most pixel through the third pixel belong to a mixed region of the uncovered background region.

The fourth through twelfth pixels from the left in the frame #n−1 in FIG. 26 belong to the foreground region. The foreground component in the frame is one of F13/v through F24/v.

The left-most pixel through the fourth pixel from the left in the frame #n in FIG. 26 belong to the background region, and the pixel values are B25 through B28, respectively.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the fifth pixel from the left in the frame #n in FIG. 26 is F13/v, and the foreground component of the second shutter period/v from the shutter opening of the sixth pixel from the left in FIG. 26 is also F13/v. The foreground component of the third shutter period/v from the shutter opening of the seventh pixel from the left in FIG. 26, and the foreground component of the fourth shutter period/v from the shutter opening of the eighth pixel from the left in FIG. 26, are F13/v.

The foreground component of the first shutter period/v from the shutter opening of the sixth pixel from the left in the frame #n in FIG. 26 is F14/v, and the foreground component of the second shutter period/v from the shutter opening of the seventh pixel from the left in FIG. 26 is also F14/v. The foreground component of the first shutter period/v from the shutter opening of the eighth pixel from the left in FIG. 26 is F15/v.

Since the object corresponding to the background keeps still, the background components of the second through fourth shutter period/vs from the shutter opening of the fifth pixel from the left in the frame #n in FIG. 26 are B29/v. The background components of the third and fourth shutter period/vs from the shutter opening of the sixth pixel from the left in the frame #n in FIG. 26 are B30/v. The background component of the fourth shutter period/v from the shutter opening of the seventh pixel from the left in the frame #n in FIG. 26 is B31/v.

In the frame #n in FIG. 26, the fifth through seventh pixels from the left belong to the mixed region of the uncovered background region.

The eighth through twelfth pixels from the left in the frame #n in FIG. 26 belong to the foreground region. The value corresponding to the period of the shutter period/v in the foreground region in the frame #n is one of F13/v through F20/v.

The left-most pixel through the eighth pixel from the left in the frame #n+1 in FIG. 26, belong to the background region, and the pixel values thereof are B25 through B32, respectively.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the ninth pixel from the left in the frame #n+1 in FIG. 26 is F13/v, and the foreground component of the second shutter period/v from the shutter opening of the tenth pixel from the left in FIG. 26 is also F13/v. The foreground component of the third shutter period/v from the shutter opening of the eleventh pixel from the left in FIG. 26, and the foreground component of the fourth shutter period/v from the shutter opening of the twelfth pixel from the left in FIG. 26, are F13/v.

The foreground component of the first shutter period/v from the shutter opening of the tenth pixel from the left in the frame #n+1 in FIG. 26 is F14/v, and the foreground component of the second shutter period/v from the shutter opening of the eleventh pixel from the left in FIG. 26 is also F14/v. The foreground component of the first shutter period/v from the shutter opening of the twelfth pixel from the left in FIG. 26 is F15/v.

Since the object corresponding to the background keeps still, the background components of the second through fourth shutter period/vs from the shutter opening of the ninth pixel from the left in the frame #n+1 in FIG. 26 are B33/v. The background components of the third and fourth shutter period/vs from the shutter opening of the tenth pixel from the left in the frame #n+1 in FIG. 26 are B34/v. The background component of the fourth shutter period/v from the shutter opening of the eleventh pixel from the left in the frame #n+1 in FIG. 26 is B35/v.

In the frame #n+1 in FIG. 26, the ninth through eleventh pixels from the left belong to the mixed region of the uncovered background region.

The twelfth pixel from the left in the frame #n+1 in FIG. 26 belongs to the foreground region. The foreground component of the shutter period/v in the foreground region in the frame #n+1 is one of F13/v through F16/v.

Figure 27:
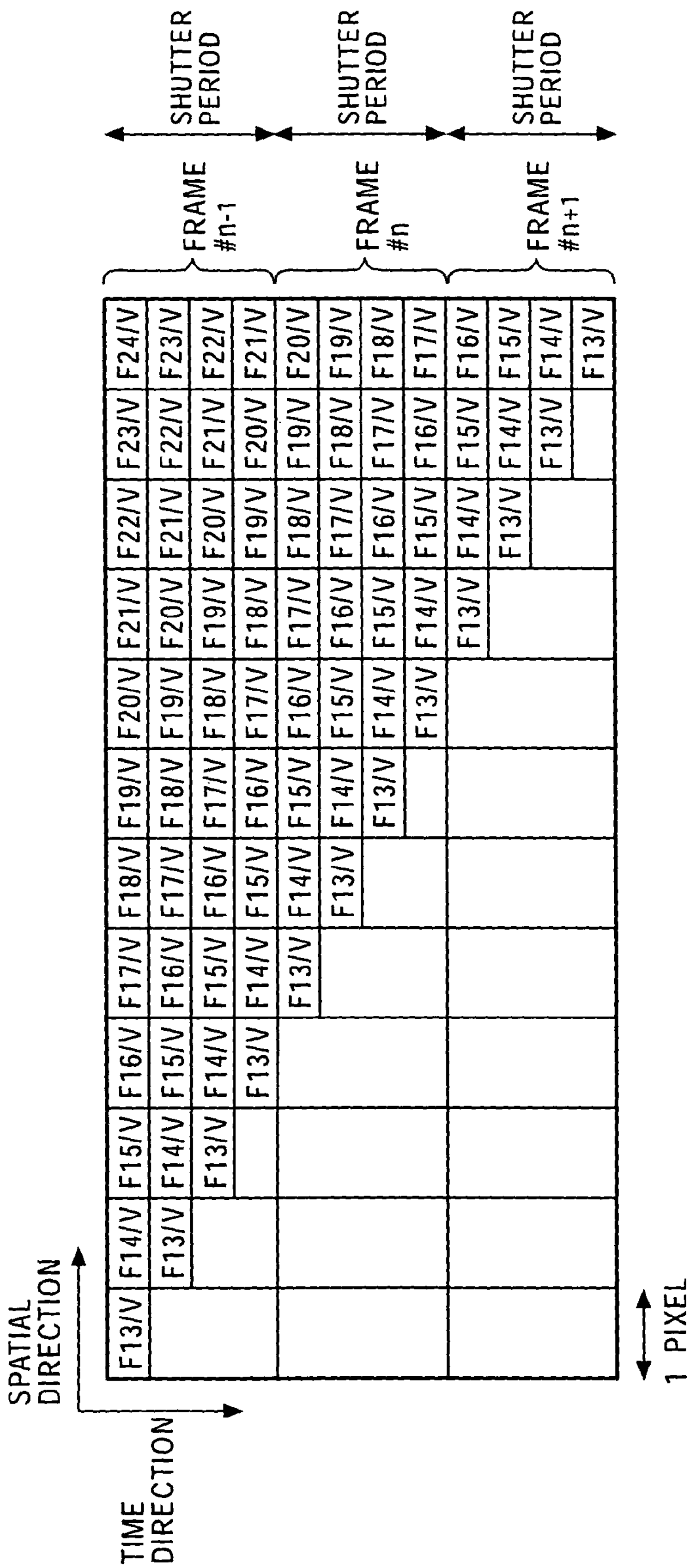
FIG. 27 is a model diagram wherein the pixel values are developed over the time direction, and periods corresponding to shutter time are divided.

FIG. 27 is a model diagram of the image wherein the foreground components are extracted from the pixel values shown in FIG. 26.

Figure 28:
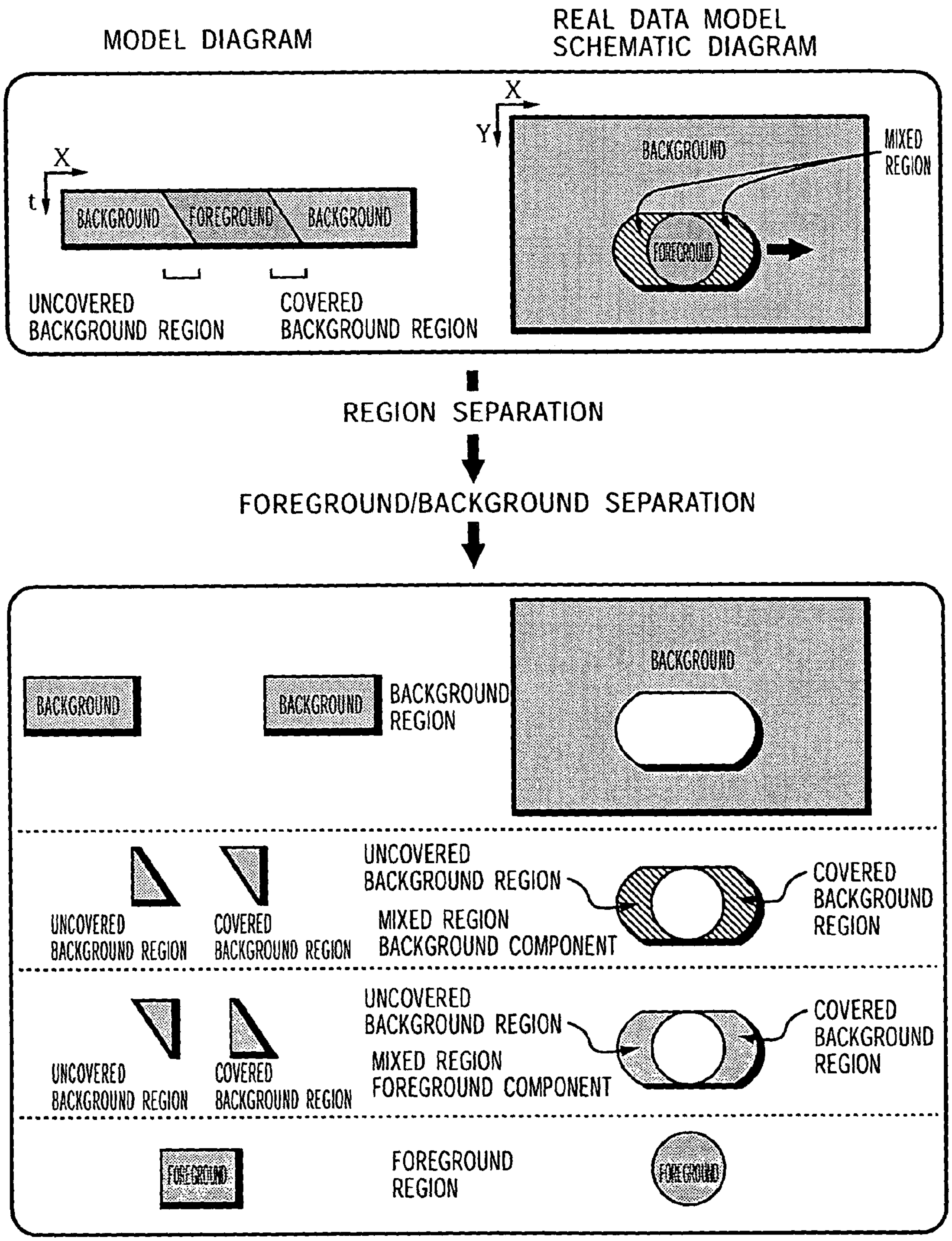
FIG. 28 is a diagram illustrating the correlation between a divided image, and a model diagram wherein the pixel values of pixels are developed over the time direction.

FIG. 28 is a diagram which illustrates how the input image divided into the image in the foreground region, the image in the background region, the foreground component image in the covered background region, the background component image in the covered background region, the foreground component image in the uncovered background region, and the background component image in the uncovered background region, correspond to a model diagram wherein the pixel values of pixels develop over the time direction.

As shown in FIG. 28, the input image is classified into the foreground region, background region, covered background region, and uncovered background region, by the region specifying unit 103. The input image is separated into the image in the foreground region, the image in the background region, the foreground component image in the covered background region, the background component image in the covered background region, the foreground component image in the uncovered background region, the background component image in the uncovered background region, by the foreground/background separation unit 105 based upon the specified regions, i.e., the foreground region, background region, covered background region, and uncovered background region, and the mixture ratio α detected by the mixture ratio calculation unit 104.

The separated images, i.e., the image in the foreground region, the image in the background region, the foreground component image in the covered background region, the background component image in the covered background region, the foreground component image in the uncovered background region, the background component image in the uncovered background region, are processed, respectively.

Figure 29:
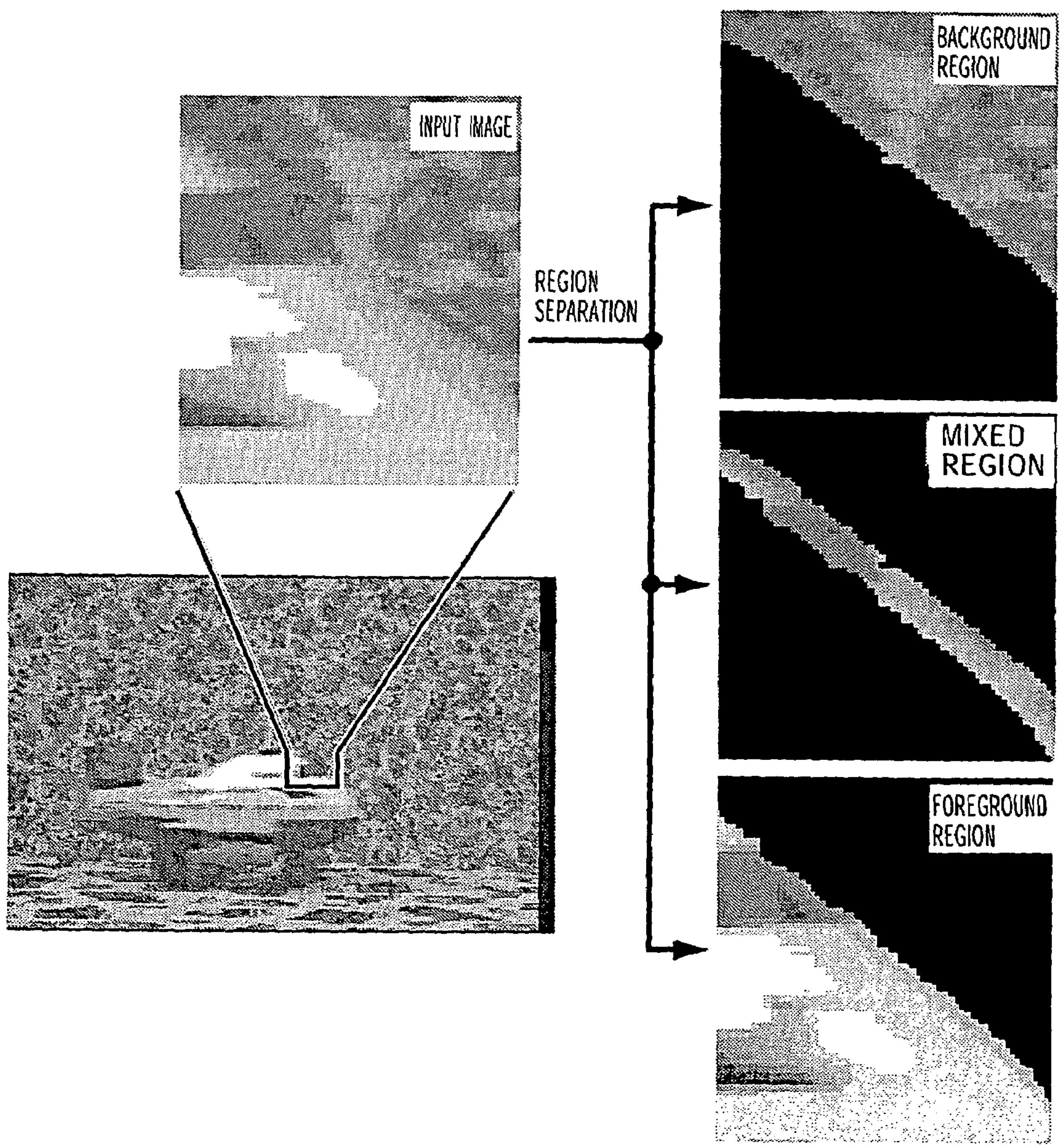
FIG. 29 is a diagram illustrating an example of a divided image.

FIG. 29 is a diagram which illustrates an example of the image divided into the foreground region, the background region, and the mixed region. The region specifying unit 103 specifies the foreground region, background region, and mixed region, of the input image. The image processing device can divide the input image into the image of the foreground region, image of the background region, and image of the mixed region, based upon the region information indicating the foreground region, background region, and mixed region.

Figure 30:
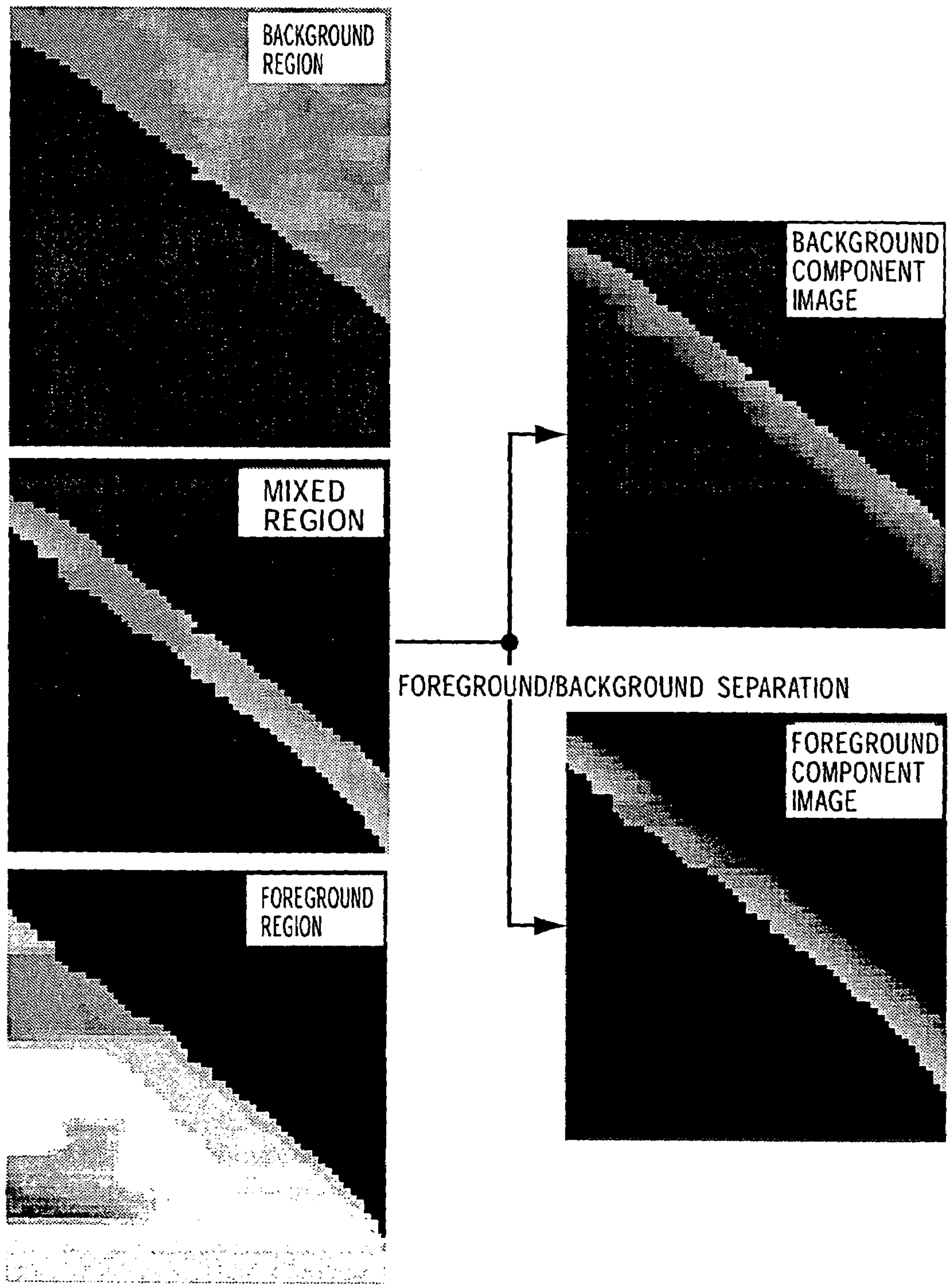
FIG. 30 is a diagram illustrating an example of a divided image.

As shown in FIG. 30, the foreground/background separation unit 105 separates the image of the mixed region into the foreground component image and the background component image based upon the region information supplied from the region specifying unit 103 and the mixture ratio α supplied from the mixture ratio calculating unit 104.

Figure 31:
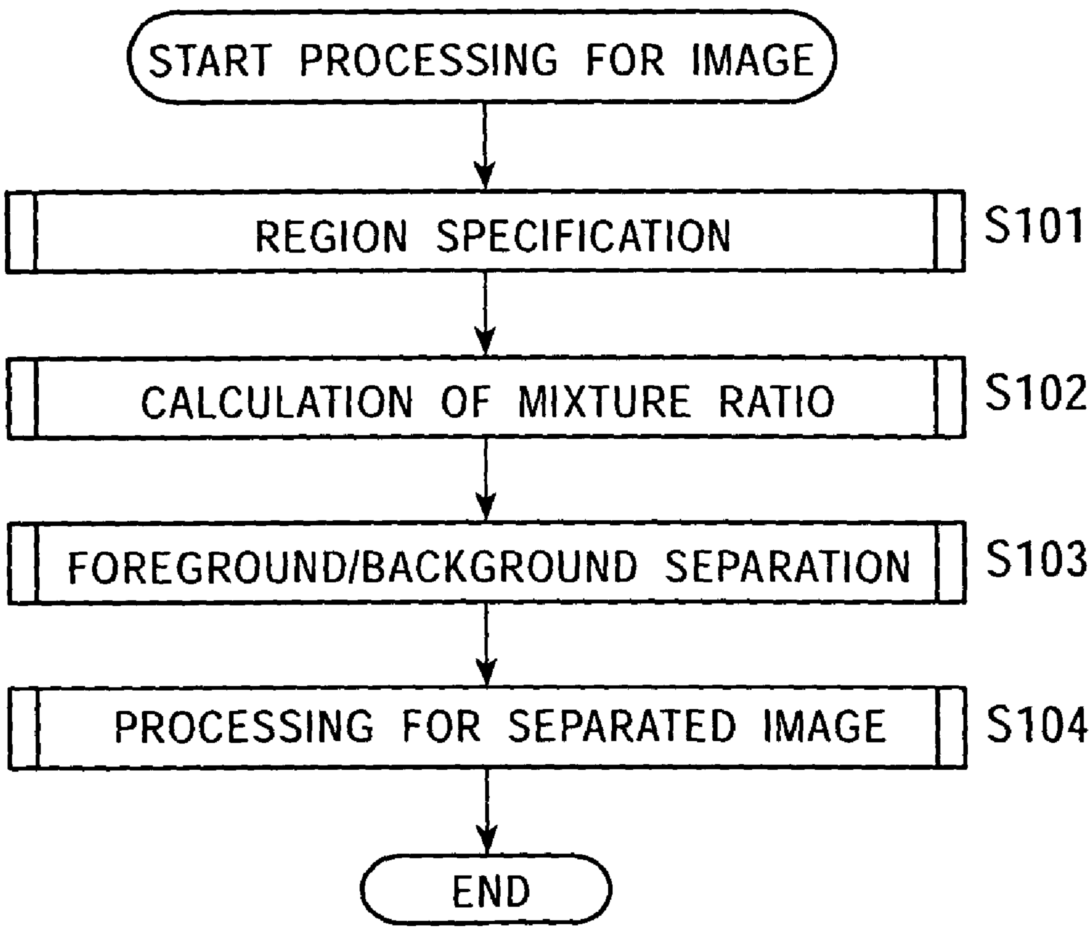
FIG. 31 is a flowchart explaining the processing of images with the image processing device according to the present invention.

FIG. 31 illustrates the flowchart which describes the processing for an image with the image processing device according to the present invention.

In Step S101, the region specifying unit 103 specifies the foreground region, background region, covered background region, and uncovered background region of the input image, based upon the movement vector and the position information thereof supplied from the movement detecting unit 102 and the input image. Details of the processing for region specifying will be described later.

In Step S102, the mixture ratio calculating unit 104 calculates the mixture ratio α based upon the region information supplied from the region specifying unit 103 and the input image. Details of the processing of the mixture ratio calculating unit 104 calculating the mixture ratio α will be described later.

In Step S103, the foreground/background separation unit 105 separates the input image into the image in the foreground region, the image in the background region, the foreground component image in the covered background region, the background component image in the covered background region, the foreground component image in the uncovered background, and the background component image in the uncovered background region, based upon the region information supplied from the region specifying unit 103 and the mixture ratio α supplied from the mixture ratio calculation unit 104. Details of the processing for separation of an image by the foreground/background separation unit 105 will be described later.

In Step S104, the separated image processing unit 106 performs image processing for each of the separated images, i.e., the image in the foreground region, the image in the background region, the foreground component image in the covered background region, the background component image in the covered background region, the foreground component image in the uncovered background region, and the background component image in the uncovered background region, and the processing ends. Details of the image processing performed by the separated image processing unit 106 will be described later.

As described above, the image processing device according to the present invention separates the input image into the image in the foreground region, the image in the background region, the foreground component image in the covered background region, the background component image in the covered background region, the foreground component image in the uncovered background region, and the background component image in the uncovered background region, and performs the image processing for each of the separated images, i.e., the image in the foreground region, the image in the background region, the foreground component image in the covered background region, the background component image in the covered background region, the foreground component image in the uncovered background region, and the background component image in the uncovered background region, which are separated.

Figure 32:
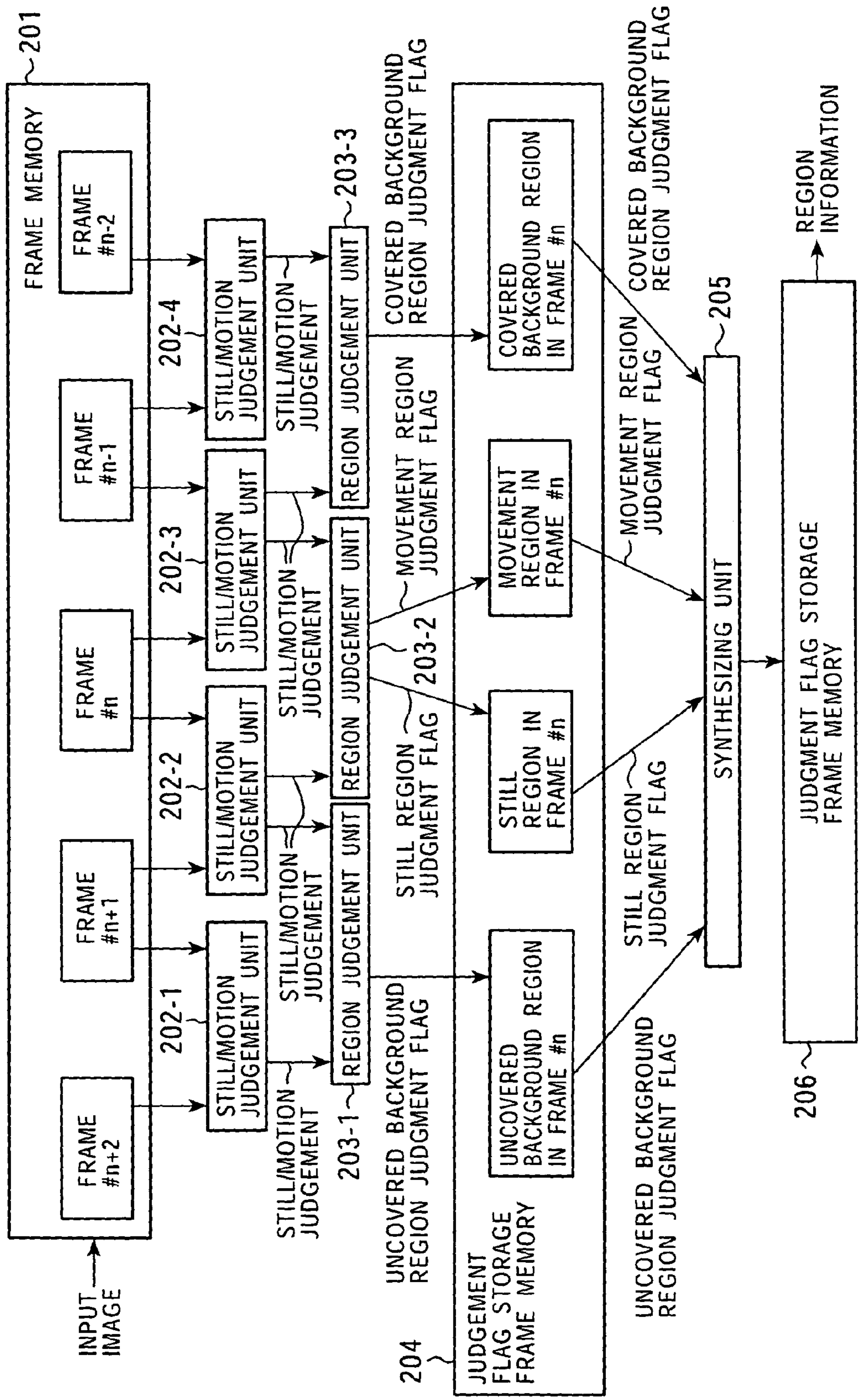
FIG. 32 is a block diagram illustrating an example of the configuration of the region specifying unit 103.

FIG. 32 is a block diagram which illustrates an example of the configuration of the region specifying unit 103. The region specifying unit 103, of which configuration is shown in FIG. 32, does not use the movement vectors. Frame memory 201 stores the input images in increments of one frame. In the event that the object of the processing is the frame #n, the frame memory 201 stores the frame #n−2 which is two frames previous from the frame #n, the frame #n−1 which is one frame previous from the frame #n, the frame #n, the frame #n+1 which is one frame following the frame #n, and the frame #n+2 which is two frames following the frame #n.

A still/motion judgment unit 202-1 reads out the pixel value of the pixel in the frame #n+2, which is at the same position as the position of the pixel on the image, which is the object of specifying the region in the frame #n, and the pixel value of the pixel in the frame #n+1, which is at the same position as the position of the pixel on the image, which is the object of specifying the region of the frame #n, from the frame memory 201, and calculates the absolute value of the difference between the read out pixel values. The still/motion judgment unit 202-1 judges whether or not the absolute value of the difference between the pixel value in the frame #n+2 and the pixel value in the frame #n+1 is greater than the predetermined threshold value Th, and in the event that judgment is made that the absolute value of the difference is greater than the threshold value Th, the still/motion judgment unit 202-1 supplies the still/motion judgment, indicating motion, to a region judgment unit 203-1. In the event that judgment is made that the absolute value of the difference between the pixel value of the pixel in the frame #n+2 and the pixel value of the pixel in the frame #n+1 is equal to or less than the threshold value Th, the still/motion judgment unit 202-1 supplies the still/motion judgment, indicating "still", to the region judgment unit 203-1.

A still/motion judgment unit 202-2 reads out the pixel value of the pixel in the frame #n+1, which is at the same position as the position of the pixel on the image, which is the object of specifying the region in the frame #n, and the pixel value of pixel which is the object in the frame #n from the frame memory 201, and calculates the absolute value of the difference between the pixel values. The still/motion judgment unit 202-2 judges whether or not the absolute value of the difference between the pixel value in the frame #n+1 and the pixel value in the frame #n is greater than the predetermined threshold value Th, and in the event that judgment is made that the absolute value of the difference between the pixel values is greater than the threshold value Th, the still/motion judgment indicating motion is supplied to the region judgment unit 203-1 and the region judgment unit 203-2. In the event that judgment is made that the absolute value of the difference between the pixel value of the pixel in the frame

#n+1 and the pixel value of the pixel in the frame #n is equal to or smaller than the threshold value Th, the still/motion judgment unit 202-2 supplies the still/motion judgment, indicating "still", to the region judgment unit 203-1 and the region judgment unit 203-2.

The still/motion judgment unit 202-3 reads out the pixel value of the pixel, which is the object of specifying the region in the frame #n, and the pixel value of the pixel in the frame #n−1, which is at the same position as the position on the image of the pixel, which is the object of specifying the region in the frame #n, from the frame memory 201, and calculates the absolute value of the difference between the pixel values. The still/motion judgment unit 202-3 judges whether or not the absolute value of the difference between the pixel value in the frame #n and the pixel value in the frame #n−1 is greater than the predetermined value Th, and in the event that judgment is made that the absolute value of the difference between the pixel values is greater than the threshold value Th, the still/motion judgment indicating motion is supplied to the region judgment unit 203-2 and the region judgment unit 203-3. In the event that judgment is made that the absolute value of the difference between the pixel value of the pixel in the frame #n and the pixel value of the pixel in the frame #n−1 is equal to or smaller than the threshold value Th, the still/motion judgment unit 202-3 supplies the still/motion judgment indicating "still" to the region judgment unit 203-2 and the region judgment unit 203-3.

The still/motion judgment unit 202-4 reads out the pixel value of the pixel in the frame #n−1 at the same position as the position of the pixel on the image, which is the object of specifying the region in the frame #n, and the pixel value of the pixel in the frame #n−2 at the same position as the position of the pixel on the image, which is the object of specifying the region in the frame #n, from the frame memory 201, and calculates the absolute value of the difference between the pixel values. The still/motion judgment unit 202-4 judges whether or not the absolute value of the difference between the pixel value in the frame #n−1 and the pixel value in the frame #n−2 is greater than the predetermined threshold value Th, and in the event that judgment is made that the absolute value of the difference between the pixel values is greater than the threshold value Th, the still/motion judgment indicating motion is supplied to the region judgment unit 203-3. In the event that judgment is made that the absolute value of the difference between the pixel value of the pixel in the frame #n−1 and the pixel value of the pixel in the frame #n−2 is equal to or smaller than the threshold value Th, the still/motion judgment unit 202-4 supplies the still/motion judgment indicating "still" to the region judgment unit 203-3.

In the event that the still/motion judgment supplied from the still/motion judgment unit 202-1 indicates "still", and the still/motion judgment supplied from the still/motion judgment unit 202-2 indicates motion, the region judgment unit 203-1 judges that the pixel which is the object of specifying the region in the frame #n belongs to the uncovered background region, and sets the uncovered background region judgment flag corresponding to the judged pixel in the region, to "1", which indicates that the pixel belongs to the uncovered background region.

In the event that the still/motion judgment supplied from the still/motion judgment unit 202-1 indicates motion, or the still/motion judgment supplied from the still/motion judgment unit 202-2 indicates still, the region judgment unit 203-1 judges that the pixel which is the object of specifying the region in the frame #n does not belong to the uncovered background region, and sets the uncovered background region judgment flag corresponding to the judged pixel in the region to "0", which indicates that the pixel does not belong to the uncovered background region.

The region judgment unit 203-1 supplies the uncovered background region judgment flag which has been set to "1" or "0", as described above, to the judgment flag storing memory 204.

In the event that the still/motion judgment supplied from the still/motion judgment unit 202-2 indicates "still", and the still/motion judgment supplied from the still/motion judgment unit 202-3 indicates "still", the region judgment unit 203-2 judges that the pixel which is the object of specifying the region in the frame #n belongs to the still region, and sets the still region judgment flag corresponding to the pixel judged in the region, to "1", which indicates that the pixel belongs to the still region.

In the event that the still/motion judgment supplied from the still/motion judgment unit 202-2 indicates motion, or the still/motion judgment supplied from the still/motion judgment unit 202-3 indicates motion, the region judgment unit 203-2 judges that the pixel which is the object of specifying the region in the frame #n does not belong to the still region, and sets the still region judgment flag corresponding to the judged pixel in the region, to "0", which indicates that the pixel does not belong to the still region.

The region judgment unit 203-2 supplies the still region judgment flag which has been set to "1" or "0" as described above, to judgment flag storing frame memory 204.

In the event that the still/motion judgment supplied from the still/motion judgment unit 202-2 indicates motion, and the still/motion judgment supplied from the still/motion judgment unit 202-3 indicates motion, the region judgment unit 203-2 judges the pixel which is the object of specifying the region in the frame #n belongs to the moving region, and sets the moving region judgment flag corresponding to the judged pixel in the region, to "1", which indicates that the pixel belongs to the moving region.

In the event that the still/motion judgment supplied from the still/motion judgment unit 202-2 indicates "still", or the still/motion judgment supplied from the still/motion judgment unit 202-3 indicates "still", the region judgment unit 203-2 judges that the pixel which is the object of specifying the region in the frame #n does not belong to the moving region, and sets the moving region judgment flag corresponding to the judged pixel in the region, to "0", which indicates that the pixel does not belong to the moving region.

The region judgment unit 203-2 supplies the moving region judgment flag which has been set to "1" or "0", to the judgment flag storing frame memory 204.

In the event that the still/motion judgment supplied from the still/motion judgment unit 202-3 indicates motion, and the still/motion judgment supplied from the still/motion judgment unit 202-4 indicates "still", the region judgment unit 203-3 judges that the pixel which is the object of specifying the region in the frame #n belongs to the covered background region, and sets the covered background region judgment flag corresponding to the judged pixel in the region to "1", which indicates that the pixel belongs to the covered background region.

In the event that the still/motion judgment supplied from the still/motion judgment unit 202-3 indicates "still", or the still/motion judgment supplied from the still/motion judgment unit 202-4 indicates motion, the region judgment unit 203-3 judges that the pixel which is the object of specifying the region in the frame #n does not belong to the covered background region, and sets the covered background region judgment flag corresponding to the judged pixel in the region to "0", which indicates that the pixel does not belong to the covered background region.

The region judgment unit 203-3 supplies the covered background region judgment flag which has been set to "1" or "0" as described above, to the judgment flag storing frame memory 204.

The judgment flag storing frame memory 204 stores the uncovered background region judgment flag supplied from the region judgment unit 203-1, the still region judgment flag supplied from the region judgment unit 203-2, the moving region judgment flag supplied from the region judgment unit 203-2, and the covered background region judgment flag supplied from the region judgment unit 203-3.

The judgment flag storing frame memory 204 supplies the uncovered background region judgment flag, the still region judgment flag, the moving region judgment flag, and the covered background region judgment flag, which are stored therein, to a synthesizing unit 205. The synthesizing unit 205 generates the region information which indicates which of the uncovered background region, the still region, the moving region, or the covered background region, each pixel belongs to, and supplies the information to judgment flag storing frame memory 206, based upon the uncovered background region judgment flag, the still region judgment flag, the moving region judgment flag, and the covered background region judgment flag, which are supplied from the judgment flag storing frame memory 204.

The judgment flag storing frame memory 206 stores the region information supplied from the synthesizing unit 205, and also outputs the stored region information.

An example for processing performed by the region specifying unit 103 will now be described with reference to FIG. 33 through FIG. 37.

Figure 33:
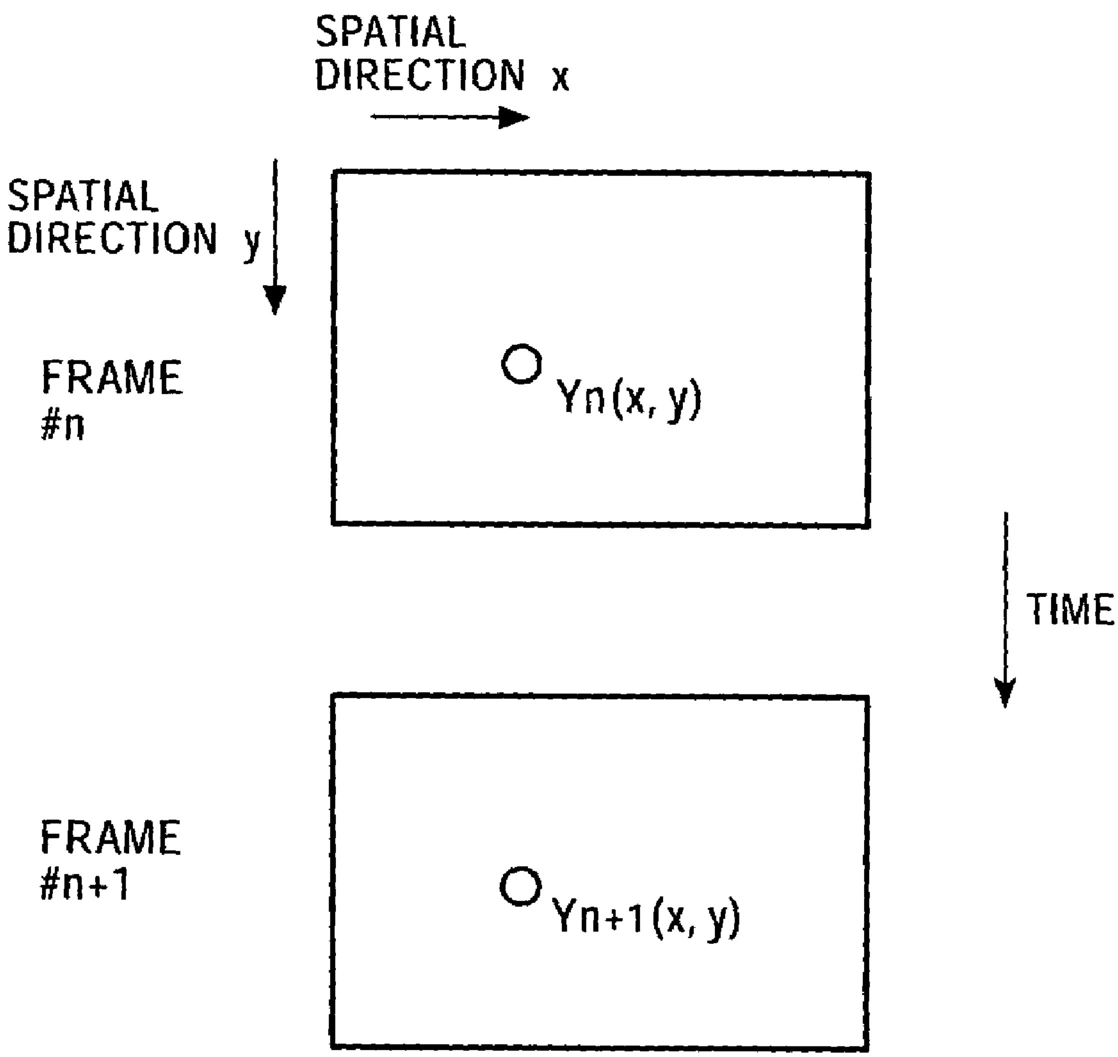
FIG. 33 is a diagram describing an image wherein an object corresponding to the foreground is moving.

In the event that the object corresponding to the foreground moves, the position of the image corresponding to the object on the screen changes with each frame. As shown in FIG. 33, in the frame #n, the image corresponding to the object which is at the position indicated by Yn(x,y) is at the position Yn+1 (x,y) in the following frame #n+1.

Figure 34:
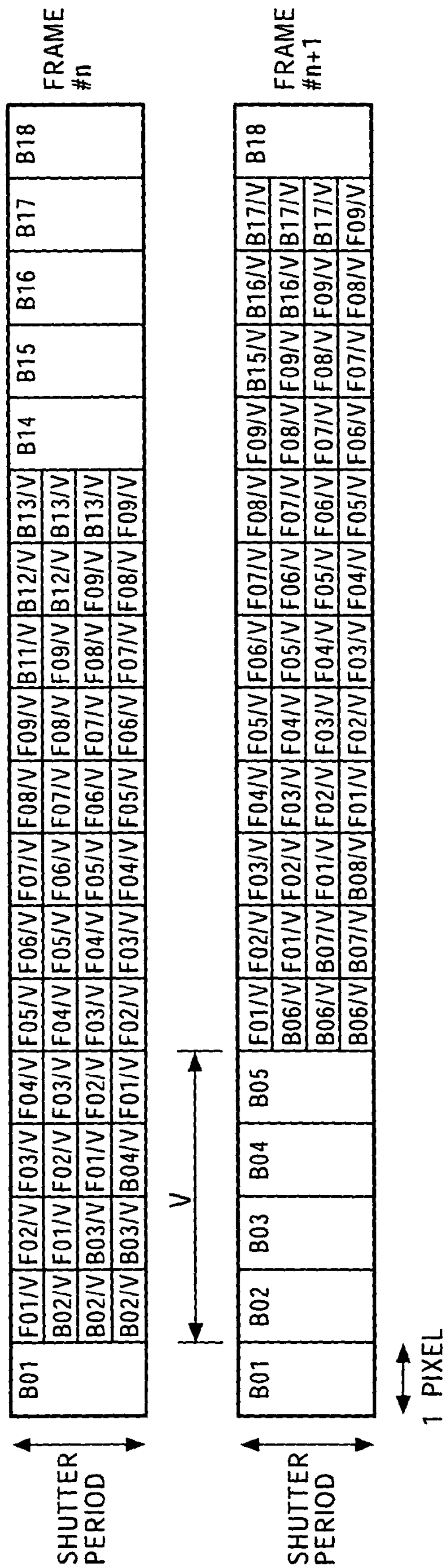
FIG. 34 is a model diagram wherein the pixel values are developed over the time direction, and periods corresponding to shutter time are divided.

FIG. 34 is a model diagram wherein the pixel values of pixels of the image corresponding to the foreground object, which are adjacently arrayed in sequence in a image movement direction, develop over the time direction. For example, in the event that the image moving direction corresponding to the foreground object is horizontal to the screen, the model diagram in FIG. 34 indicates the model wherein the pixel values of adjacent pixels in one line develop over the time direction.

In FIG. 34, the line in the frame #n is the same as the line in the frame #n+1.

The foreground components corresponding to the object, which are included in the second pixel through thirteenth pixel from the left in the frame #n, are included in the sixth through seventeenth pixels from the left in the frame #n+1.

In the frame #n, the pixels belonging to the covered background region are the eleventh through thirteenth pixels from the left, and the pixels belonging to the uncovered background region are the second through fourth pixels from the left. In the frame #n+1, the pixels belonging to the covered background region are the fifteenth through seventeenth pixels from the left, and the pixels belonging to the uncovered background region are sixth through eighth pixels from the left.

With the example shown in FIG. 34, the movement amount v is 4, since the foreground components included in the frame #n move by four pixels in the frame #n+1. The virtual dividing number is 4, corresponding to the movement value v.

Next, a description will be made regarding the change of the pixel values of the pixels belonging to the mixed region in the frames previous to and following the frame of interest.

Figure 35:
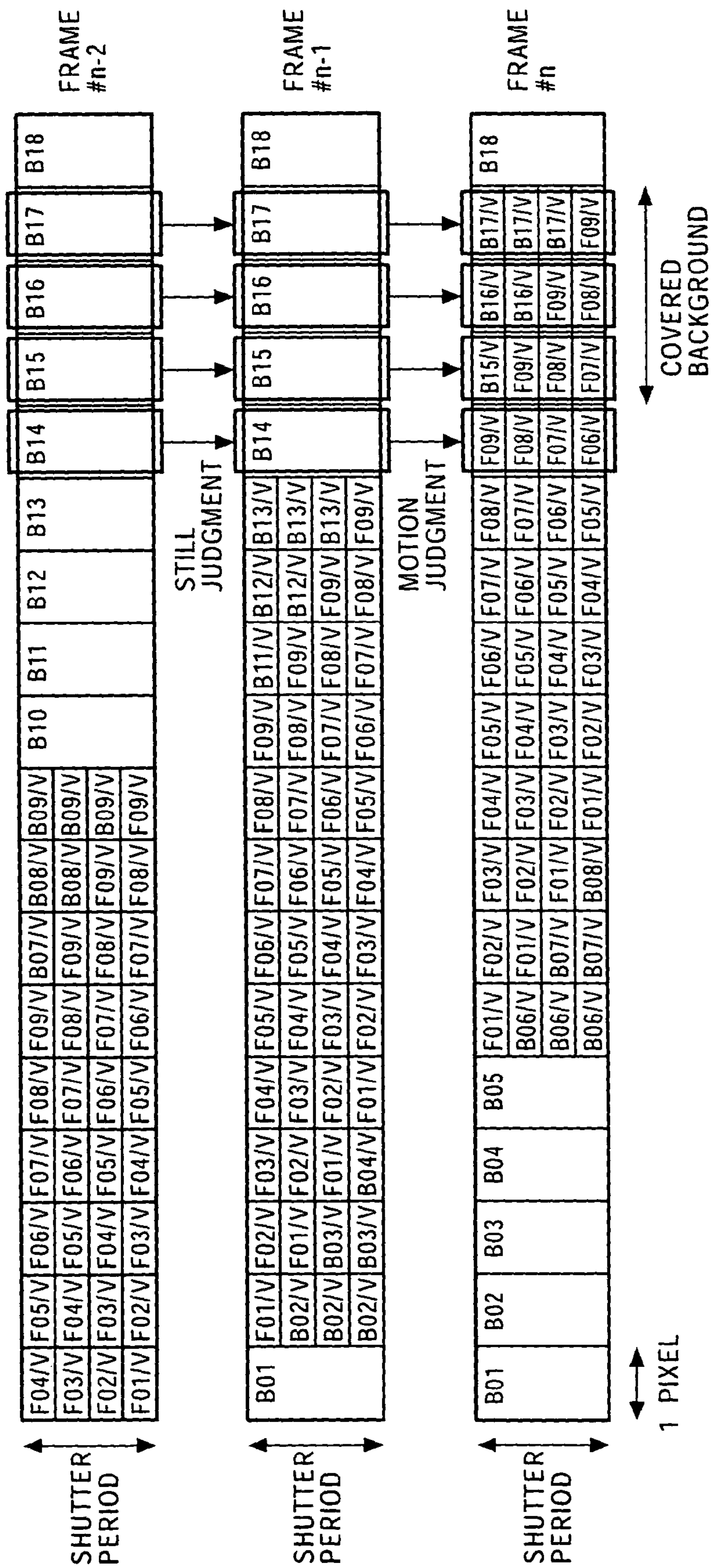
FIG. 35 is a model diagram wherein the pixel values are developed over the time direction, and periods corresponding to shutter time are divided.

In the frame #n wherein the background keeps still and the movement amount v of the foreground is 4, shown in FIG. 35, the pixels belonging to the covered background region are the fifteenth through seventeenth pixels from the left. Since the movement amount v is 4, in the previous frame #n−1, the fifteenth through seventeenth pixels from the left include only the background components, and belong to the background region. Also, in the frame # n−2 which is one further before, the fifteenth through seventeenth pixels from the left contain only the background components, and belong to the background region.

Note that since the object corresponding to the background keeps still, the pixel value of the fifteenth pixel from the left in the frame #n−1 do not change from the pixel value of the fifteenth pixel from the left in the frame #n−2. Similarly, the pixel value of the sixteenth pixel from the left in the frame #n−1 do not change from the pixel value of the sixteenth pixel from the left in the frame #n−2, and the pixel values of the seventeenth pixel from the left in the frame #n−1 do not change from the pixel value of the seventeenth pixel from the left in the frame #n−2.

That is to say, the pixels of the frame #n−1 and frame #n−2 corresponding to the pixels belonging to the covered background region in the frame #n consists of only the background components, and the pixel values do not change, and accordingly the absolute value of the difference therebetween is approximately zero. Accordingly, judgment is made that the still/motion judgment for the pixels of the frame #n−1 and the frame #n−2 corresponding to the pixels belonging to the mixed region in the frame #n is still by the still/motion judgment unit 202-4.

Since the pixels belonging to the covered background region in the frame #n contain the foreground components, the pixel values are different from the case wherein the pixel values in the frame #n−1 consist of only the background components. Accordingly, judgment is made that the still/motion judgment for the pixels belonging to the mixed region in the frame #n and the pixels in the frame #n−1 corresponding thereto is motion by the still/motion judgment unit 202-3.

As described above, the region judgment unit 203-3 judges that the corresponding pixels belong to the covered background region in the event that the still/motion judgment unit 202-3 supplies the results of the still/motion judgment which indicates motion, and the still/motion judgment unit 202-4 supplies the results of the still/motion judgment which indicates "still".

Figure 36:
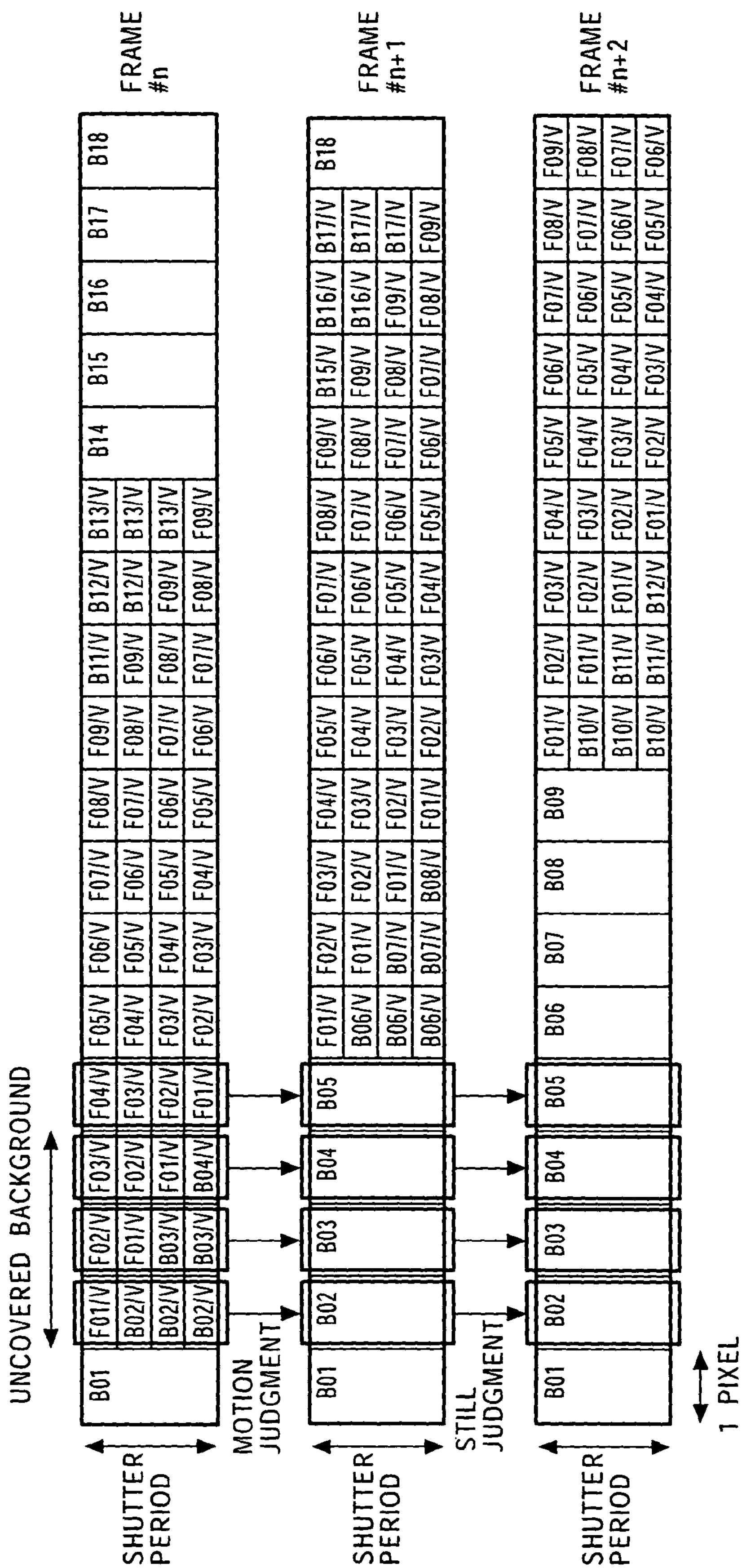
FIG. 36 is a model diagram wherein the pixel values are developed over the time direction, and periods corresponding to shutter time are divided.

In the frame #n wherein the background keeps still and the foreground movement amount v is 4 as shown in FIG. 36, the pixels included in the uncovered background region are the second through fourth pixels from the left. Since the movement amount v is 4, in the frame #n+1 following the frame #n, the second through fourth pixels from the left include only the background components, and belong to the background region. Also, in the frame #n+2 further one frame following the frame #n+1, the second through fourth pixels from the left contain only the background components, and belong to the background region.

Note that since the object corresponding to the background keeps still, the pixel values of the second pixel from the left in the frame #n+2 does not change from the pixel value of the second pixel from the left in the frame #n+1. Similarly, the pixel value of the third pixel from the left in the frame #n+2 does not change from the pixel value of the third pixel from the left in the frame #n+1, and the pixel value of the fourth pixel from the left in the frame #n+2 does not change from the pixel value of the fourth pixel from the left in the frame #n+1.

That is to say, the pixels of the frame #n+1 and the frame #n+2, corresponding to the pixels belonging to the uncovered background region in the frame #n, consist of only the background components, so the pixel values thereof do not change, and accordingly the absolute value of the difference thereof is approximately zero. Accordingly, judgment is made that the still/motion judgment for the pixels of the frame #n+1 and the frame #n+2 corresponding to the pixels belonging to the mixed region in the frame #n is "still" by the still/motion judgment unit 202-1.

Since the pixels belonging to the uncovered background region in the frame #n contain the foreground components, the pixel values are different from the case wherein the pixels consists of only the background components in the frame #n+1. Accordingly, judgment is made that the still/motion judgment for the pixels belonging to the mixed region in the frame #n and the pixels corresponding thereto in the frame #n+1 is motion by the still/motion judgment unit 202-2.

As described above, the region judgment unit 203-1 judges that the corresponding pixels belong to the uncovered background region in the event that the still/motion judgment unit 202-2 supplies the results of the still/motion judgment which indicates motion, and the still/motion judgment unit 202-1 supplies the still/motion judgment which indicates "still".

FIG. 37 is a diagram which illustrates judgment conditions of the region specifying unit 103 in the frame #n. In the event that judgment is made that the pixel in the frame #n−2 at the same position as the position of the pixel which is the object of judgment on the image in the frame #n, and the pixel in the frame #n−1 at the same position as the position of the pixel which is the object of judgment on the image in the frame #n, are "still", and judgment is made that the pixel in the frame #n−1 at the same position as the position of the pixel which is the object of judgment on the image in the frame #n, and the pixel in the frame #n are motion, the region specifying unit 103 judges that the pixel which is the object of judgment of the frame #n belongs to the covered background region.

In the event that judgment is made that the pixel in the frame #n−1 at the same position as the position of the pixel which is the object of judgment on the image in the frame #n, and the pixel in the frame #n, are judged to be "still", and judgment is made that the pixel in the frame #n and the pixel in the frame #n+1 at the same position as the position of the pixel which is the object of judgment on the image in the frame #n, are judged to be "still", the region specifying unit 103 judges that the pixel which is the object of judgment of the frame #n belongs to the still region.

In the event that judgment is made that the pixel in the frame #n−1 at the same position as the position of the pixel which is the object of judgment on the image in the frame #n, and the pixel in the frame #n, are judged to be motion, and judgment is made that the pixel of the frame #n and the pixel in the frame #n+1 at the same position as the position of the pixel which is the object of judgment on the image in the frame #n, are judged to be motion, the region specifying unit 103 judges that the pixel which is the object of judgment of the frame #n belongs to the movement region.

In the event that judgment is made that the pixel of the frame #n and the pixel in the frame #n+1 at the same position as the position of the pixel which is the object of judgment on the image in the frame #n, are motion, and judgment is made that the pixel in the frame #n+1 at the same position as the position of the pixel which is the object of judgment on the image in the frame #n, and the pixel in the frame #n+2 at the same position as the position of the pixel which is the object of judgment on the image in the frame #n, are judged to be "still", the region specifying unit 103 judges that the pixel which is the object of judgment of the frame #n belongs to the uncovered background region.

Figure 38A:
FIG. 38A is a diagram illustrating an example of the results of region specification made by the region specifying unit 103.
Figure 38B:
FIG. 38B is a diagram illustrating an example of the results of region specification made by the region specifying unit 103.

FIG. 38A through FIG. 38D are diagrams which illustrate examples of results of the region specifying unit 103 specifying the region. In FIG. 38A, the pixels which have been judged to belong to the covered background region are displayed in white. In FIG. 38B, the pixels which have been judged to belong to the uncovered background region are displayed in white.

Figure 38C:
FIG. 38C is a diagram illustrating an example of the results of region specification made by the region specifying unit 103.
Figure 38D:
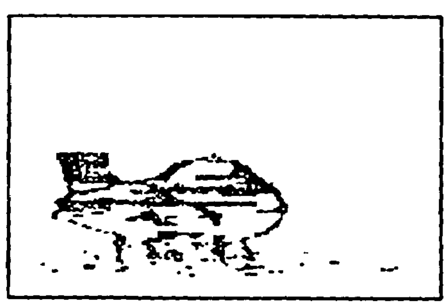
FIG. 38D is a diagram illustrating an example of the results of region specification made by the region specifying unit 103.

In FIG. 38C, the pixels which have been judged to belong to the movement region are displayed in white. In FIG. 38D, the pixels which have been judged to belong to the still region are displayed in white.

Figure 39:
FIG. 39 is a diagram illustrating an example of the results of region specification made by the region specifying unit 103.

FIG. 39 is a diagram which illustrates the region information as an image, indicating the mixed region of the region information which the judgment flag storing frame memory 206 outputs. In FIG. 39, the pixels which have been judged to belong to the covered background region or the uncovered background region, i.e., the pixels judged to belong to the mixed region, are displayed in white. The region information indicating the mixed region, which the judgment flag storing frame memory 206 outputs, indicates the mixed region and the portions which have texture within the foreground region and are surrounded by portions which have no texture.

Figure 40:
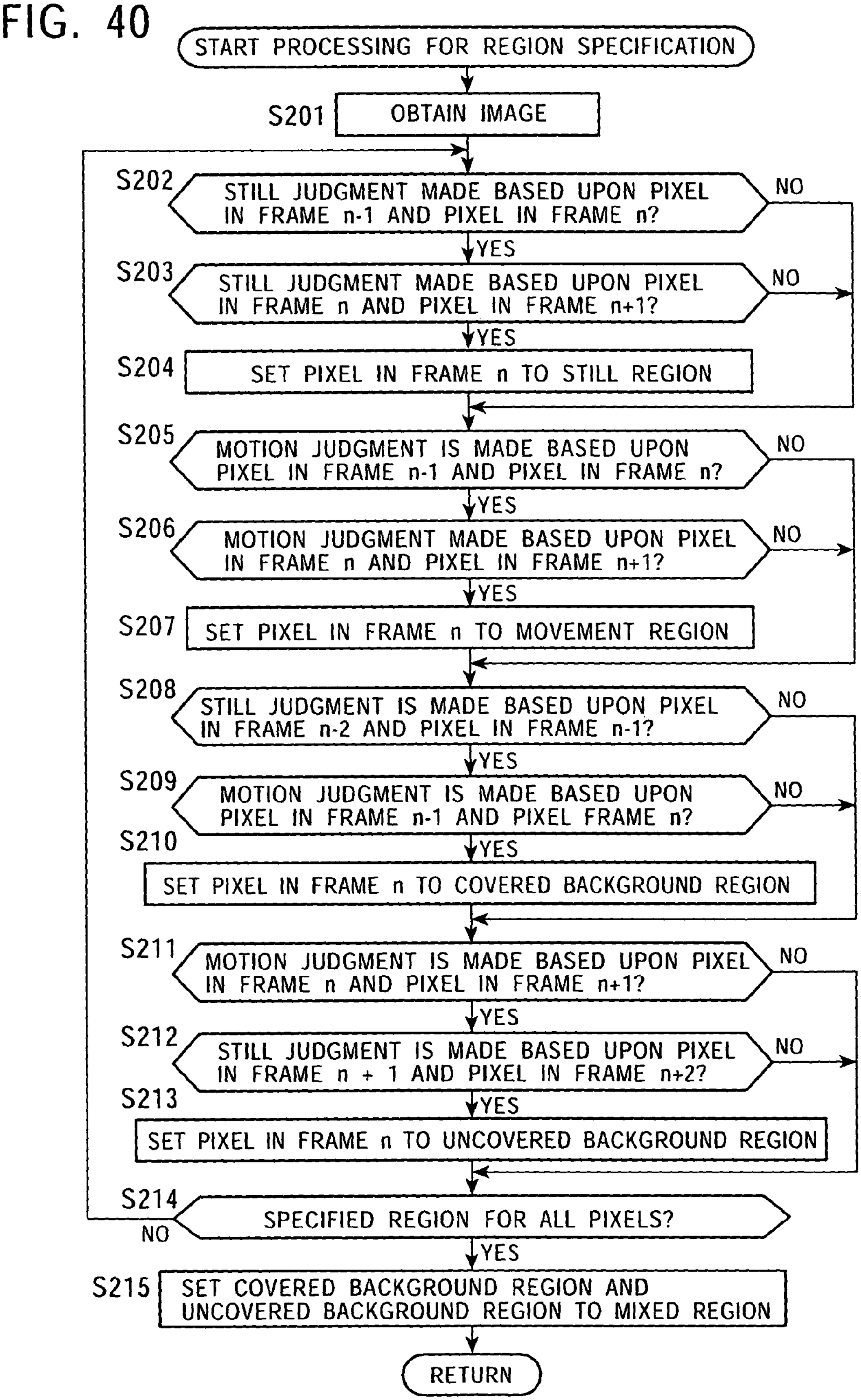
FIG. 40 is a flowchart explaining processing for region specifying.

Next, referring to the flowchart in FIG. 40, the processing for region specifying by the region specifying unit 103 will be described. In Step S201, the frame memory 201 obtains the images of the frame #n−2 through the frame #n+2, including the frame #n which is the object of judgment.

In Step S202, the still/motion judgment unit 202-3 judges whether or not the pixel of the frame #n−1 and the pixel of the frame #n at the same position keep still, and in the event of judgment of "still", the flow proceeds to Step S203, and the still/motion judgment unit 202-2 judges whether or not the pixel of the frame #n and the pixel of the frame #n+1 at the same position keep still.

In Step S203, in the event that judgment is made that the pixel of the frame #n and the pixel of the frame #n+1 at the same position are "still", the flow proceeds to Step S204, and the region judgment unit 203-2 sets the still region judgment flag corresponding to the judged pixel in the region to "1" which indicates the pixel belongs to the still region. The region judgment unit 203-2 supplies the still region judgment flag to the judgment flag storing frame memory 204, and the procedure proceeds to Step S205.

In Step S202, in the event that judgment is made that the pixel of the frame #n−1 and the pixel of the frame #n at the same position are motion, or in Step S203, judgment is made that the pixel of the frame #n and the pixel of the frame #n+1 at the same position are motion, the pixel of the frame #n does not belong to the still region, and accordingly the processing in Step S204 is skipped, and the procedure proceeds to Step S205.

In Step S205, the still/motion judgment unit 202-3 judges whether or not the pixel of the frame #n−1 and the pixel of the frame #n at the same position are in motion, and in the event of judgment of motion, the flow proceeds to Step S206, and the still/motion judgment unit 202-2 judges whether or not the pixel of the frame #n and the pixel of the frame #n+1 at the same position are in motion.

In Step S206, in the event that judgment is made that the pixel of the frame #n and the pixel of the frame #n+1 at the same position are in motion, the flow proceeds to Step S207, the region judgment unit 203-2 set the movement region judgment flag corresponding to the judged pixel in the region to "1" which indicates that the pixel belongs to the movement region. The region judgment unit 203-2 supplies the movement region judgment flag to the judgment flag storing frame memory 204, and the procedure proceeds to Step S208.

In Step S205, in the event that judgment is made that the pixel of the frame #n−1 and the pixel of the frame #n at the same position are "still", or in Step S206, in the event that judgment is made that the pixel of the frame #n and the pixel of the frame #n+1 at the same position are "still", since the pixel of the frame #n does not belong to the movement region, the processing in Step S207 is skipped, and the procedure proceeds to Step S208.

In Step S208, the still/motion judgment unit 202-4 judges whether or not the pixel of the frame #n−2 and the pixel of the frame #n−1 at the same position keeps still, and in the event of judgment of "still", the flow proceeds to Step S209, and the still/motion judgment unit 202-3 judges whether or not the pixel of the frame #n−1 and the pixel of the frame #n at the same position are in motion.

In Step S209, in the event that judgment is made that the pixel of the frame #n−1 and the pixel of the frame #n at the same position are in motion, the flow proceeds to Step S210, and the region judgment unit 203-3 sets the covered background region judgment flag corresponding to the judged pixel in the region to "1" which indicates that the pixel belongs to the covered background region. The region judgment unit 203-3 supplies the covered background region judgment flag to the judgment flag storing frame memory 204, and the procedure proceeds to Step S211.

In Step S208, in the event that judgment is made that the pixel of the frame #n−2 and the pixel of the frame #n−1 at the same position are in motion, or in Step S209, in the event that judgment is made that the pixel of the frame #n−1 and the pixel of the frame #n at the same position are "still", the pixel of the frame #n does not belong to the covered background region, so the processing in Step S210 is skipped, and the procedure proceeds to Step S211.

In Step S211, the still/motion judgment unit 202-2 judges whether or not the pixel of the frame #n and the pixel of the frame #n+1 at the same position are in motion, and in the event of judgment of motion, the flow proceeds to Step S212, and the still/motion judgment unit 202-1 judges whether or not the pixel of the frame #n+1 and the pixel of the frame #n+2 at the same position keep still.

In Step S212, in the event that judgment is made that the pixel of the frame #n+1 and the pixel of the frame #n+2 at the same position are "still", the flow proceeds to Step S213, and the region judgment unit 203-1 sets the uncovered background region judgment flag corresponding to the judged pixel in the region to "1" which indicates that the pixel belongs to the uncovered background region. The region judgment unit 203-1 supplies the uncovered background region judgment flag to the judgment flag storing frame memory 204, and the procedure proceeds to Step S214.

In Step S211, in the event that judgment is made that the pixel of the frame #n and the pixel of the frame #n+1 at the same position are "still", or in Step 212, in the event that judgment is made that the pixel of the frame #n+1 and the pixel of the frame #n+2 at the same position are in motion, since the pixel of the frame #n does not belong to the uncovered background region, the processing in Step S213 is skipped, and the procedure proceeds to Step S214.

In Step S214, the region specifying unit 103 judges whether or not all the pixels in the frame #n are region-specified, and in the event that judgment is made that not all pixels are region-specified, the procedure returns to Step S202, and repeats the processing of specifying the region for other pixels.

In Step S214, in the event that judgment is made that all the pixels in the frame #n are region-specified, the flow proceeds to Step S215, and the synthesizing unit 205 generates the region information which indicates the mixed region based upon the uncovered background region judgment flag and the covered background region judgment flag, which are stored in the judgment flag storing frame memory 204, and furthermore generates the region information which indicates which of the uncovered background region, the still region, the movement region, or the covered background region, each pixel belongs to, sets the generated region information for the judgment flag storing frame memory 206, and the processing ends.

As described above, the region specifying unit 103 can generate region information which indicates which of the movement region, the still region, the uncovered background region, or the covered background region, each pixel contained in the frame belongs to.

Note that an arrangement may be made wherein the region specifying unit 103 generates the region information corresponding to the mixed region and the region information made up of flags which indicates which of the movement region, the still region, or the mixed region, each of pixels contained in the frame belongs to, by applying the logical sum to the region information corresponding to the uncovered background region and the covered background region.

In the event that the object corresponding to the foreground has texture, the region specifying unit 103 can specify the movement region more accurately.

The region specifying unit 103 can output the region information indicating the movement region as the region information indicating the foreground region, or output the region information indicating the still region as the region information indicating the background region.

While description has been made wherein the object corresponding to the background keeps still, the processing of specifying the region described above can be applied even if the image corresponding to the background region contains motion. For example, in the event that the image corresponding to the background region moves in a constant manner, the region specifying unit 103 shifts the entire image corresponding to the movement, and performs processing in the same manner as with the case wherein the object corresponding to the background keeps still. Also, in the event that the image corresponding to the background region contains a different motion at each local position, the region specifying unit 103 selects the pixel corresponding to the motion, and performs the above-described processing.

Figure 41:
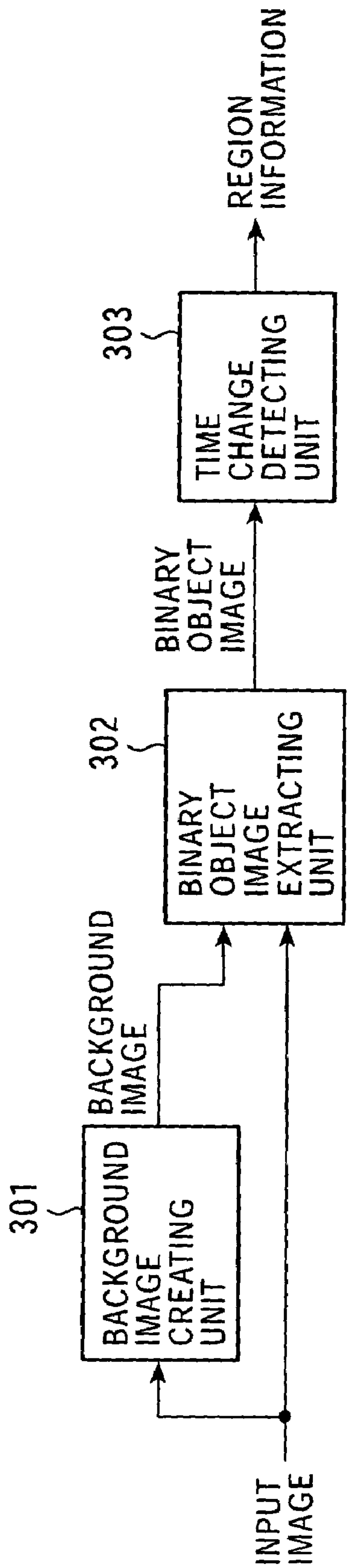
FIG. 41 is a block diagram illustrating another example of the configuration of the region specifying unit 103.

FIG. 41 is a block diagram which illustrates another example of the structure of the region specifying unit 103. The region specifying unit 103 shown in FIG. 41 does not use movement vectors. A background image generating unit 301 generates the background image corresponding to the input image, and supplies the generated background image to a binary object image extracting unit 302. The background image generating unit 301 extracts, for example, the image object corresponding to the background object contained in the input image, and generates the background image.

Figure 42:
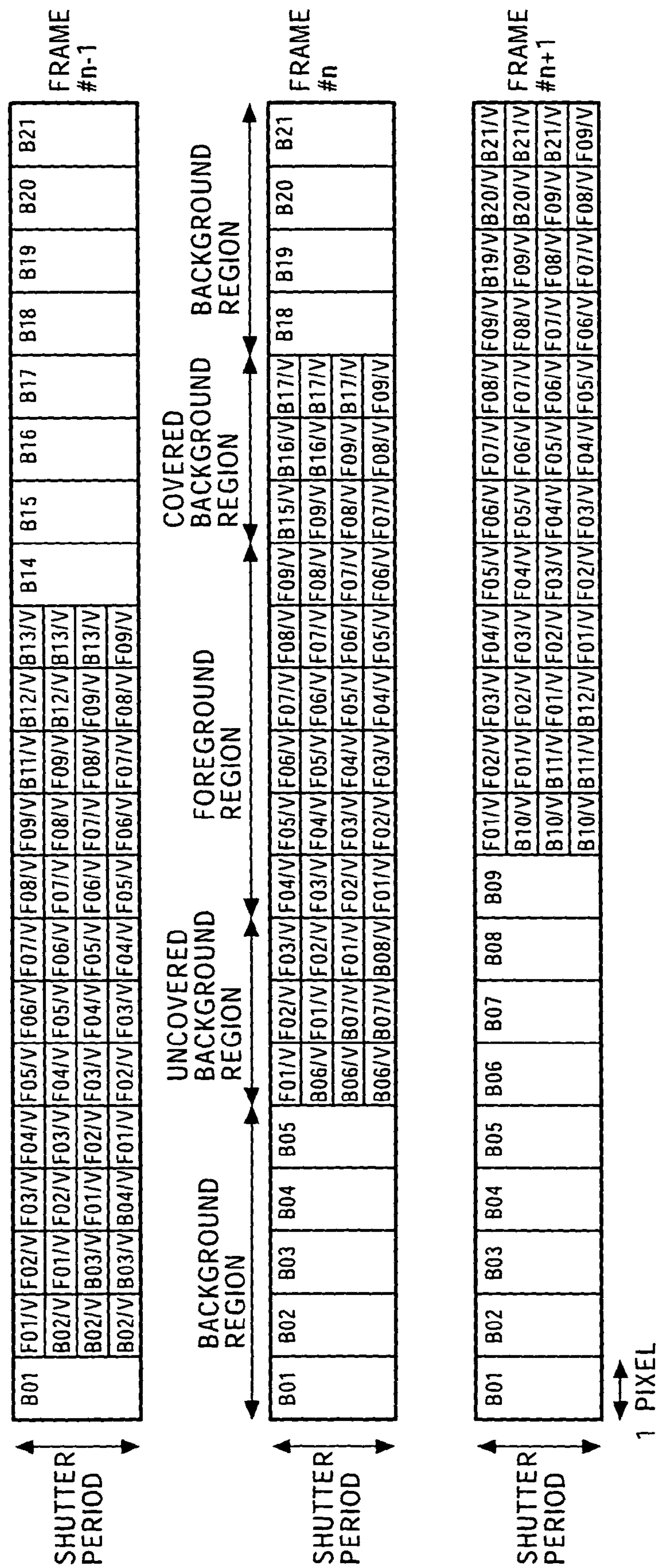
FIG. 42 is a model diagram wherein the pixel values are developed over the time direction, and periods corresponding to shutter time are divided.

An example of a model diagram is illustrated in FIG. 42 wherein the pixel values of the pixels arrayed in sequence adjacently in a movement direction of the image corresponding to the foreground object develop over the time direction. For example, the model diagram in FIG. 42 illustrates a model wherein, in the event that the movement direction of the image corresponding to the foreground object is horizontal to the screen, the pixel values of the adjacent pixels in one line develop over the time direction.

In FIG. 42, the line in the frame #n is the same as the line in the frame #n−1 and the line in the frame #n+1.

In the frame #n, the foreground components corresponding to the object, which are contained in the sixth pixel through seventeenth pixel from the left, are contained in the second through thirteenth pixels from the left in the frame #n−1, and are contained in the tenth through twenty first pixels from the left in the frame #n+1.

In the frame #n−1, the pixels belonging to the covered background region are the eleventh through thirteenth pixels from the left, and the pixels belonging to the uncovered background region are the second through fourth pixels from the left. In the frame #n, the pixels belonging to the covered background region are the fifteenth through the seventeenth pixels from the left, and the pixels belonging to the uncovered background region are the sixth through eighth pixels from the left. In the frame #n+1, the pixels belonging to the covered background region are the nineteenth through twenty first pixels from the left, and the pixels belonging to the uncovered background region are the tenth through twelfth pixels from the left.

In the frame #n−1, the pixels belonging to the background region are the first from the left, and the fourteenth through twenty first pixels from the left. In the frame #n, the pixels belonging to the background region are the first through fifth pixels from the left, and the eighteenth through twenty first pixels from the left. In the frame #n+1, the pixels belonging to the background region are the first through ninth pixels from the left.

Figure 43:
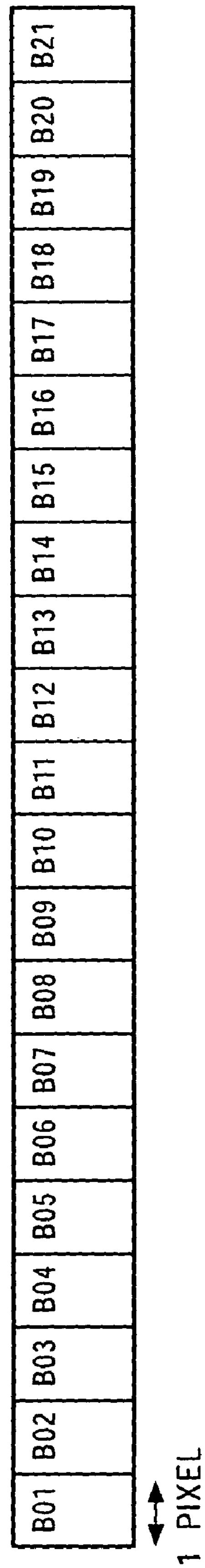
FIG. 43 is a diagram illustrating an example of a background region image.

An example of the background image corresponding to the example shown in FIG. 42, which is generated by the background image generating unit 301, is illustrated in FIG. 43. The background image is made up of the pixels corresponding to the background object, and does not contain image components corresponding to the foreground object.

The binary object image extracting unit 302 generates a binary object image based upon the correlation between the background image and the input image, and supplies the generated binary object image to a time change detecting unit 303.

Figure 44:
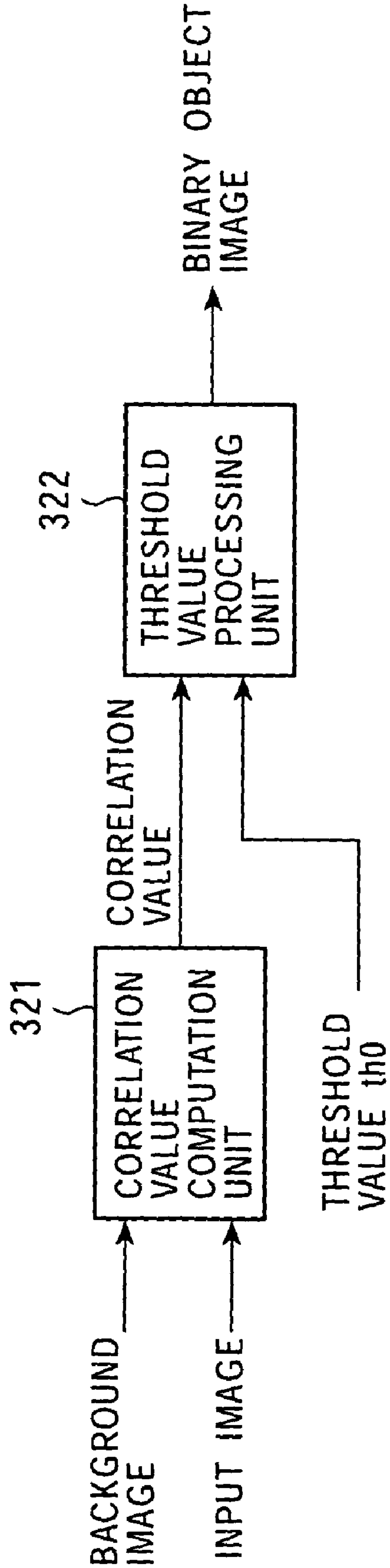
FIG. 44 is a block diagram illustrating the configuration of a binary object image extracting unit 302.

FIG. 44 is a block diagram which illustrates the configuration of the binary object image extracting unit 302. A correlation value computing unit 321 computes the correlation between the background image supplied from the background image generating unit 301 and the input image, generates a correlation value, and supplies the generated correlation value to a threshold value processing unit 322.

The correlation value computing unit 321 applies Expression (4) to a block 3×3 wherein $X_4$ is centered in the background image as shown in FIG. 45A, and a block 3×3 wherein $Y_4$ corresponding to the block in the background image is centered in the input image as shown in FIG. 45B, and calculates a correlation value corresponding to the $Y_4$, for example.

$$\text{Correlation Value} = \frac{\sum_{i=0}^{8}(X_i-\overline{X})\sum_{i=0}^{8}(Y_i-\overline{Y})}{\sqrt{\sum_{i=0}^{8}(X_i-\overline{X})^2\cdot\sum_{i=0}^{8}(Y_i-\overline{Y})^2}} \tag{4}$$

-continued $$\overline{X} = \frac{\sum_{i=0}^{8} X_i}{9} \tag{5}$$

$$\overline{Y} = \frac{\sum_{i=0}^{8} Y_i}{9} \tag{6}$$

The correlation value computing unit 321 supplies the correlation value calculated corresponding to each pixel as described above to the threshold value processing unit 322.

Also, an arrangement may be made wherein the correlation value computing unit 321, for example, applies Expression (7) to the block 3×3 in the background image wherein $X_4$ is centered as shown in FIG. 46A, and the block 3×3 in the input image wherein $Y_4$ is centered corresponding to the block in the background image as shown in FIG. 46B, and calculates the sum of absolute value of difference corresponding to $Y_4$.

$$\text{Sum of Absolute Value of Difference} = \sum_{i=0}^{8}|(X_i-Y_i)| \tag{7}$$

The correlation value computing unit 321 supplies the difference absolute value calculated as described above as the correlation value to the threshold value processing unit 322.

The threshold value processing unit 322 compares the pixel value of the correlation image with the threshold value th0, and in the event that the correlation value is equal to or less than the threshold value th0, the threshold value processing unit 322 sets the pixel value of the binary object image to 1, and in the event that the correlation value is greater than the threshold value th0, the threshold value processing unit 322 sets the pixel value of the binary object image to 0, and outputs the binary object image of which each pixel value has been set to 0 or 1. The threshold value processing unit 322 may store the threshold value th0 beforehand, and may use the threshold value th0 which is input externally.

Figure 47:
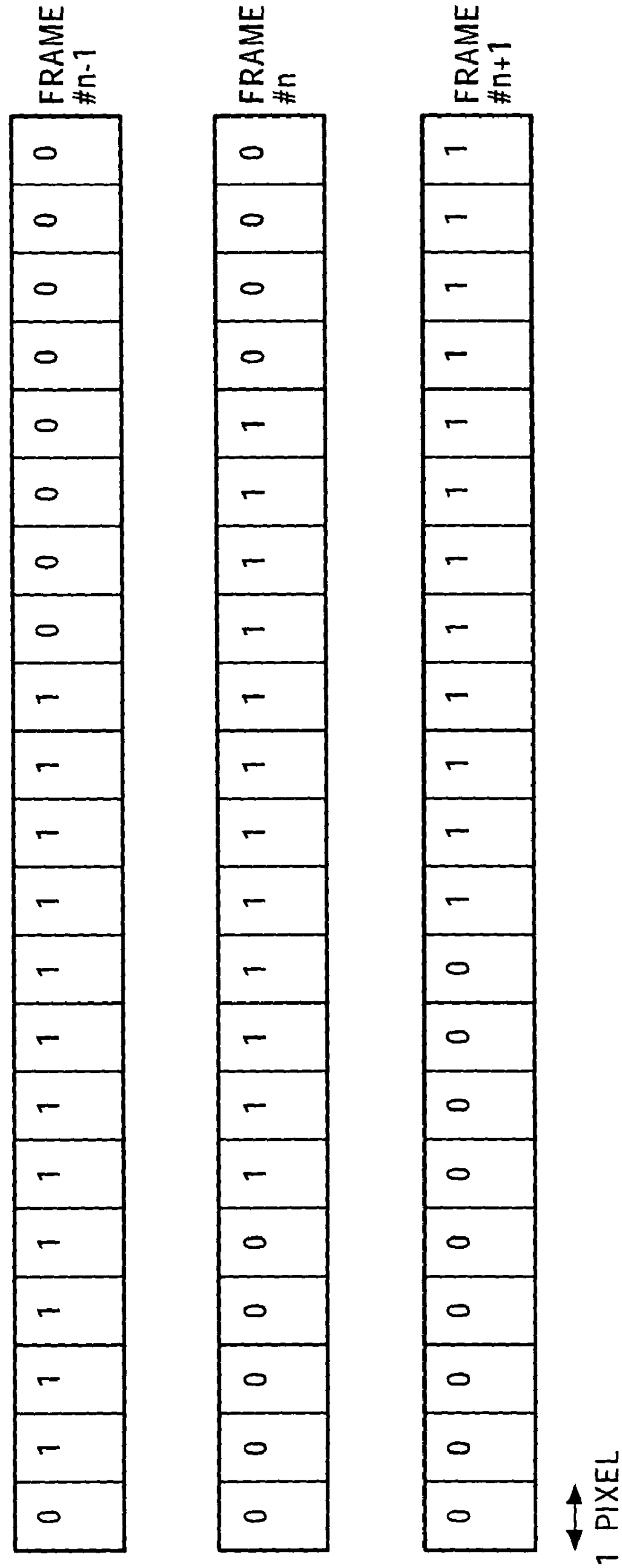
FIG. 47 is a diagram illustrating an example of a binary object image.

FIG. 47 is a diagram which illustrates an example of the binary object image corresponding to the model of the input image shown in FIG. 42. In the binary object image, a pixel value of a pixel having a high correlation with the background image is set to 0.

Figure 48:
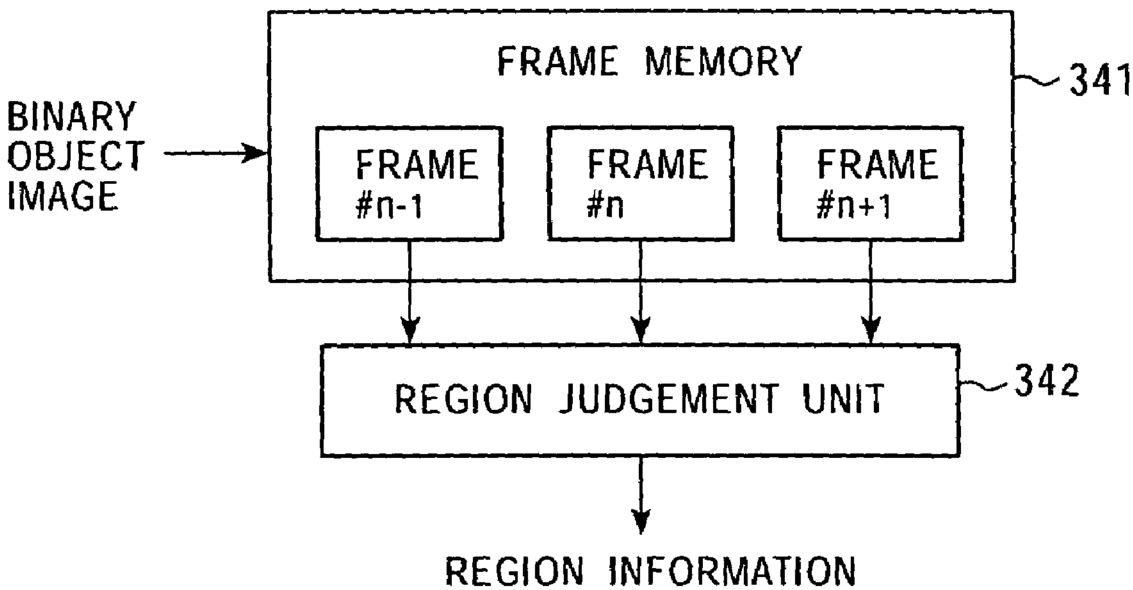
FIG. 48 is a block diagram illustrating the configuration of a time change detecting unit 303.

FIG. 48 is a block diagram which illustrates the configuration of the time change detecting unit 303. Frame memory 341 stores the binary object images of the frame #n−1, frame #n, and frame #n+1, supplied from the binary object image extracting unit 302 at the point of judgment of the region for the pixel of the frame #n.

A region judgment unit 342 judges the region for each pixel of the frame #n based upon the binary object images of the frame #n−1, frame #n, and frame #n+1, which are stored in the frame memory 341, generates the region information, and outputs the generated region information.

FIG. 49 is a diagram which describes the judgment made by the region judgment unit 342. In the event that the pixel of interest of the binary object image of the frame #n is 0, the region judgment unit 342 judges the pixel of interest of the frame #n to belong to the background region.

In the event that the pixel of interest of the binary object image of the frame #n is 1, the corresponding pixel of the binary object image of the frame #n−1 is 1, and the corresponding pixel of the binary object image of the frame #n+1 is 1, the region judgment unit 342 judges the pixel of interest of the frame #n to belong to the foreground region.

In the event that the pixel of interest of the binary object image of the frame #n is 1, and the corresponding pixel of the binary object image of the frame #n−1 is 0, the region judgment unit 342 judges the pixel of interest of the frame #n to belong to the covered background region.

In the event that the pixel of interest of the binary object image of the frame #n is 1, and the corresponding pixel of the binary object image of the frame #n+1 is 0, the region judgment unit 342 judges the pixel of interest of the frame #n to belong to the uncovered background region.

Figure 50:
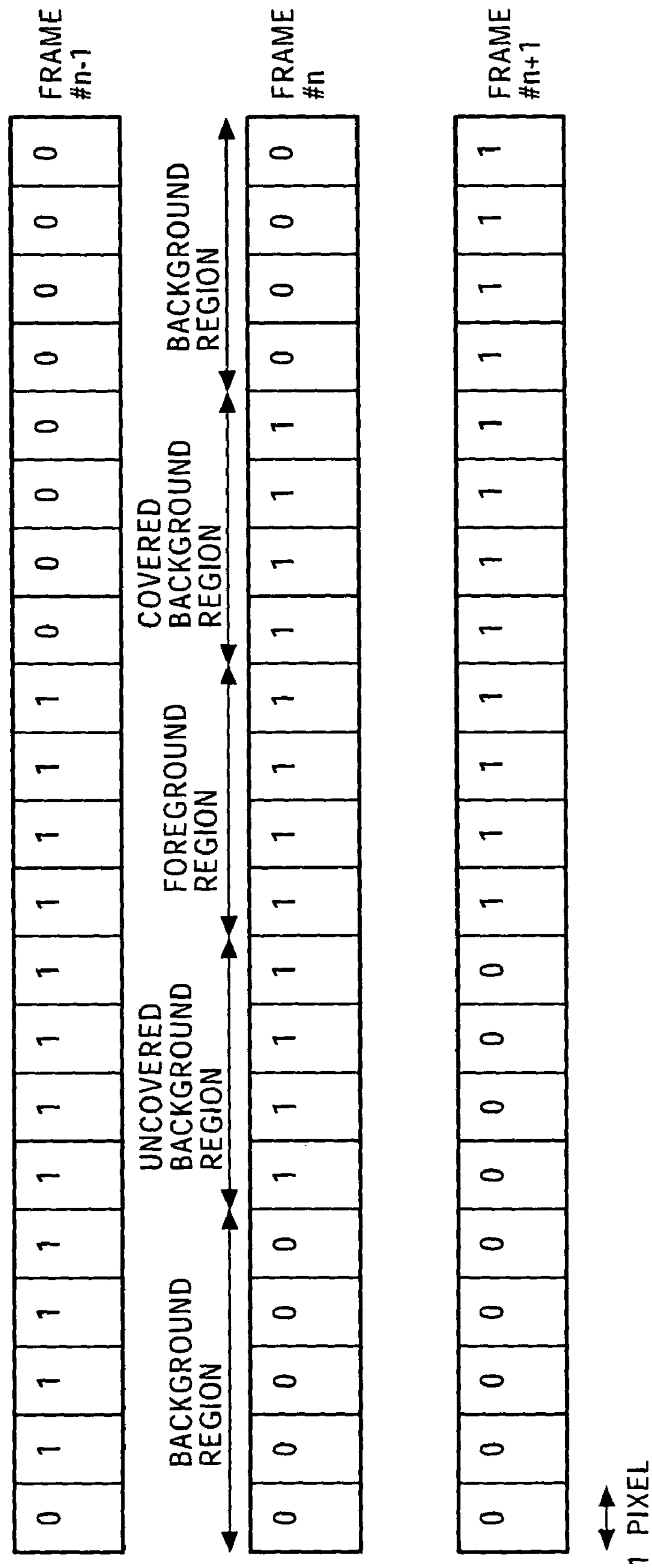
FIG. 50 is a diagram illustrating an example of judgment made by the time change detecting unit 303.

FIG. 50 is a diagram which illustrates an example wherein the time change detecting unit 303 judges the binary object image corresponding to the model of the input image shown in FIG. 42. The time change detecting unit 303 judges the first through fifth pixels from the left of the frame #n to belong to the background region since the corresponding pixels of the binary object image of the frame #n are 0.

The time change detecting unit 303 judges the sixth through ninth pixels from the left to belong to the uncovered background region since the pixels of the binary object image of the frame #n are 1, and the corresponding pixels of the frame #n+1 are 0.

The time change detecting unit 303 judges the tenth through thirteenth pixels from the left to belong to the foreground region since the pixels of the binary object image of the frame #n are 1, the corresponding pixels of the frame #n−1 are 1, and the corresponding pixels of the frame #n+1 are 1.

The time change detecting unit 303 judges the fourteenth through seventeenth pixels from the left to belong to the covered background region since the pixels of the binary object image of the frame #n are 1, and the corresponding pixels of the frame #n−1 are 0.

The time change detecting unit 303 judges the eighteenth through twenty first pixels from the left to belong to the background region since the corresponding pixels of the binary object image of the frame #n are 0.

Figure 51:
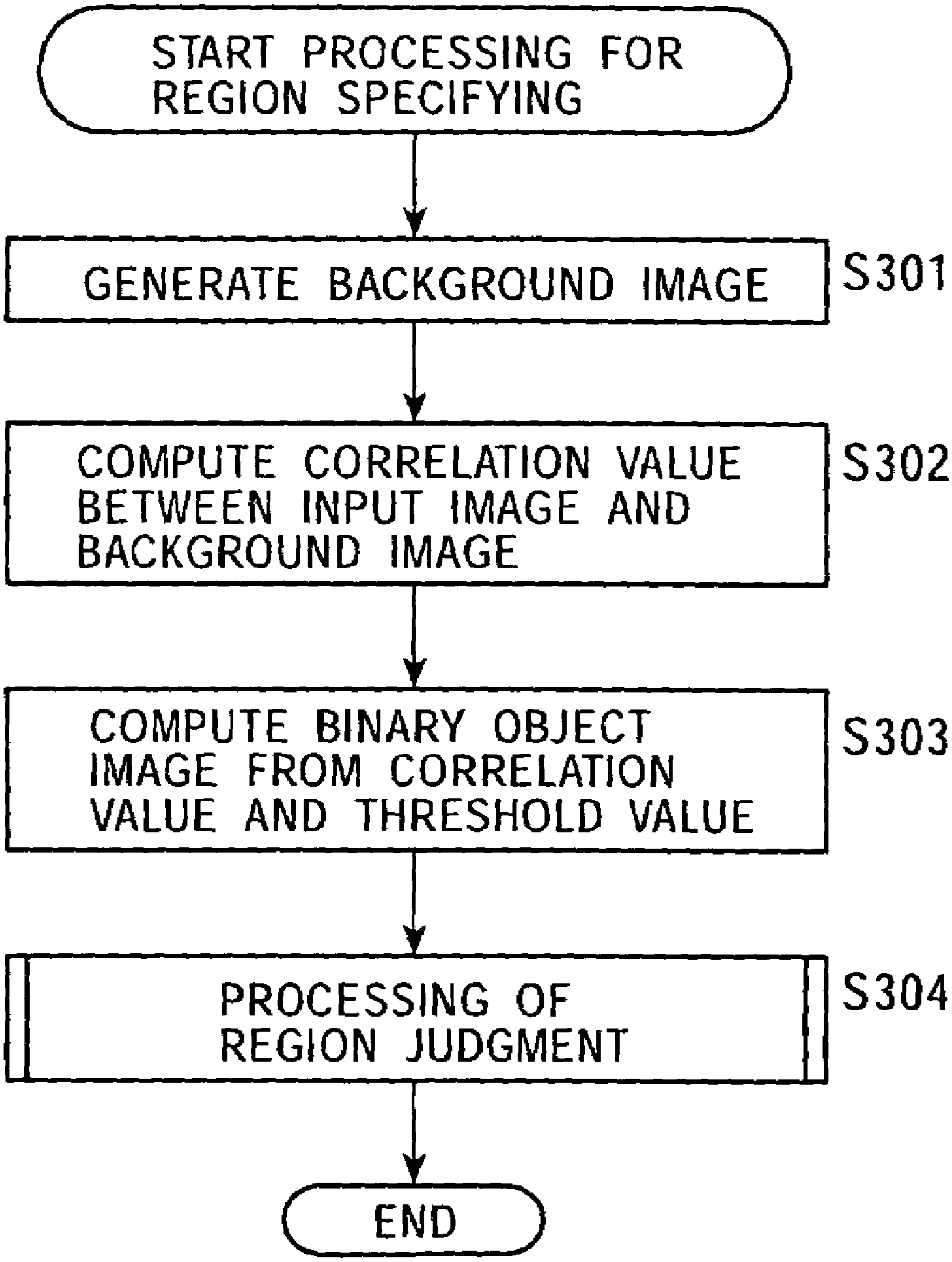
FIG. 51 is a flowchart describing processing for region specification by the region judgment unit 103.

The processing of specifying the region by the region judgment unit 103 will be now described, referring to the flowchart shown in FIG. 51. In Step S301, the background image generating unit 301 of the region judgment unit 103, for example, generates the background image by extracting the image object corresponding to the background object contained in the input image based upon the input image, and supplies the generated background image to the binary object image extracting unit 302.

In Step S302, the binary object image extracting unit 302 computes the correlation value between the input image and the background image supplied from the background image generating unit 301 by the computation described referring to FIG. 45, for example. In Step S303, the binary object image extracting unit 302 computes the binary object image from the correlation value and the threshold value th0 by comparing the correlation value with the threshold value th0, for example.

In Step S304, the time change detecting unit 303 performs processing of region judgment, and the processing ends.

Figure 52:
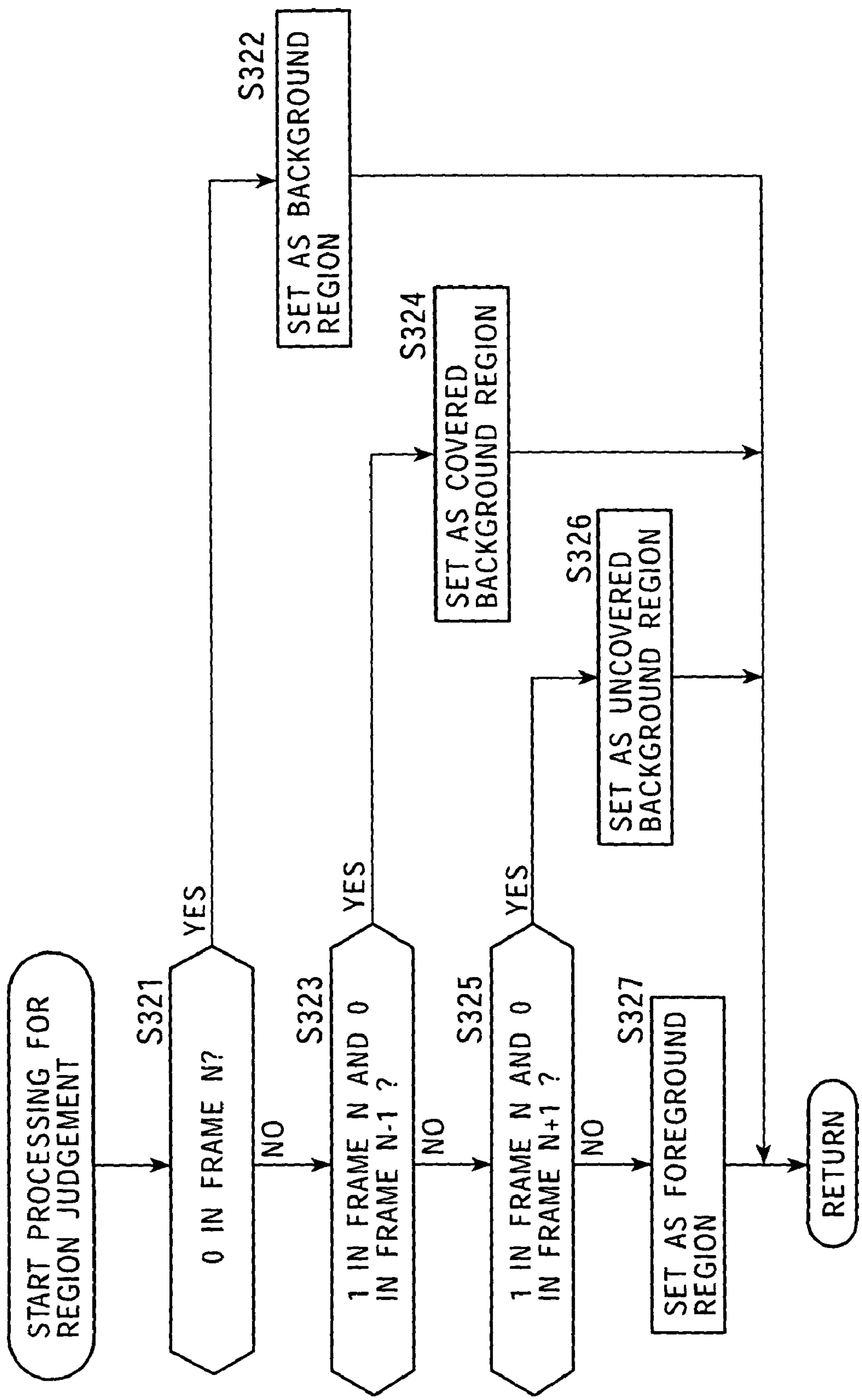
FIG. 52 is a flowchart for describing the processing for region specification in detail.

The processing of the region judgment corresponding to Step S304 will be described in detail, referring to the flowchart shown in FIG. 52. In Step S321, the region judgment unit 342 of the time change detecting unit 303 judges whether or not the pixel of interest in the frame #n stored in the frame memory 341 is 0, and in the event that the judgment is made that the pixel of the interest in the frame #n is 0, the flow proceeds to Step S322, makes settings to the effect that the pixel of interest in the frame #n belongs to the background region, and the processing ends.

In Step S321, in the event that judgment is made that the pixel of interest in the frame #n is 1, the flow proceeds to Step S323, and the region judgment unit 342 of the time change detecting unit 303 judges whether or not the pixel of interest in the frame #n stored in the frame memory 341 is 1, and the corresponding pixel in the frame #n−1 is 0, and in the event that judgment is made that the pixel of interest in the frame #n is 1, and the corresponding pixel in the frame #n−1 is 0, the flow proceeds to Step S324, makes settings to the effect that the pixel of interest in the frame #n belongs to the covered background region, and the processing ends.

In Step S323, in the event that judgment is made that the pixel of interest in the frame #n is 0, or the corresponding pixel in the frame #n−1 is 1, the flow proceeds to Step S325, and the region judgment unit 342 of the time change detecting unit 303 judges whether or not the pixel of interest in the frame #n stored in the frame memory 341 is 1, and the corresponding pixel in the frame #n+1 is 0, and in the event that judgment is made that the pixel of interest in the frame #n is 1, and the corresponding pixel in the frame #n+1 is 0, the flow proceeds to Step S326, makes settings to the effect that the pixel of interest in the frame #n belongs to the uncovered background region, and the processing ends.

In Step S325, in the event that judgment is made that the pixel of interest in the frame #n is 0, or the corresponding pixel in the frame #n+1 is 1, the flow proceeds to Step S327, and the region judgment unit 342 of the time change detecting unit 303 sets the pixel of interest in the frame #n for the foreground region, and the processing ends.

As described above, the region specifying unit 103 can specify which of the foreground region, the background region, the covered background region, or the uncovered background region, the pixel of the input image belongs to, and can generate region information corresponding to the specified results.

Figure 53:
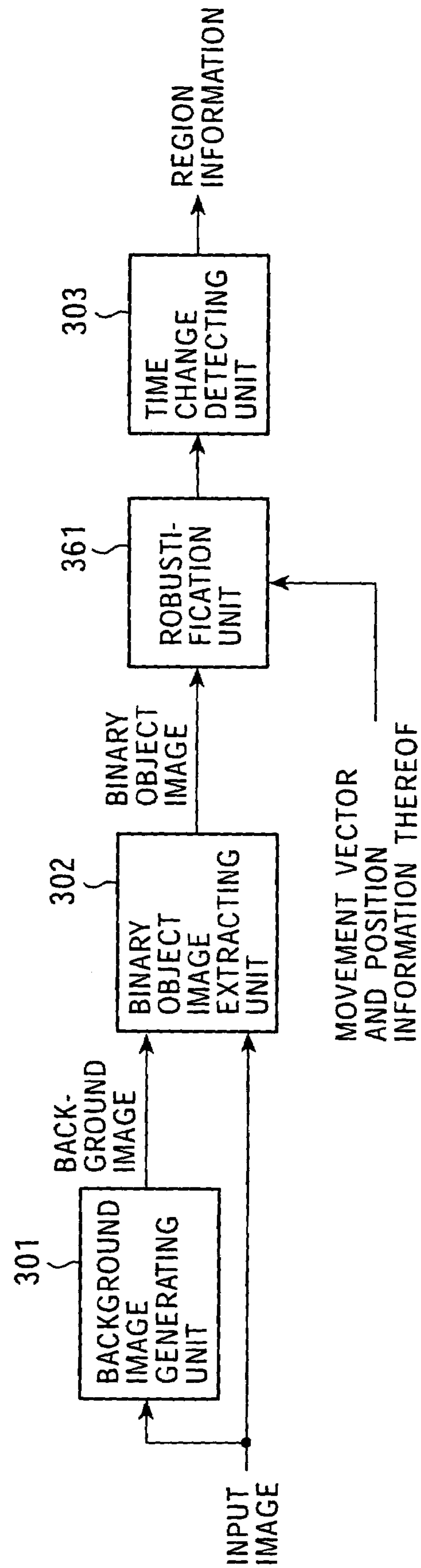
FIG. 53 is a block diagram illustrating yet another configuration of the region specifying unit 103.

FIG. 53 is a block diagram which illustrates another configuration of the region specifying unit 103. The region specifying unit 103 shown in FIG. 53 uses the movement vector and the position information thereof, which are supplied from the movement detecting unit 102. Portions the same as those shown in FIG. 41 are denoted by the same reference numerals, and description thereof will be omitted.

A robustification unit 361 generates a robustified binary object image based upon N frames of the binary object image supplied from the binary object image extracting unit 302, and outputs to the time change detecting unit 303.

Figure 54:
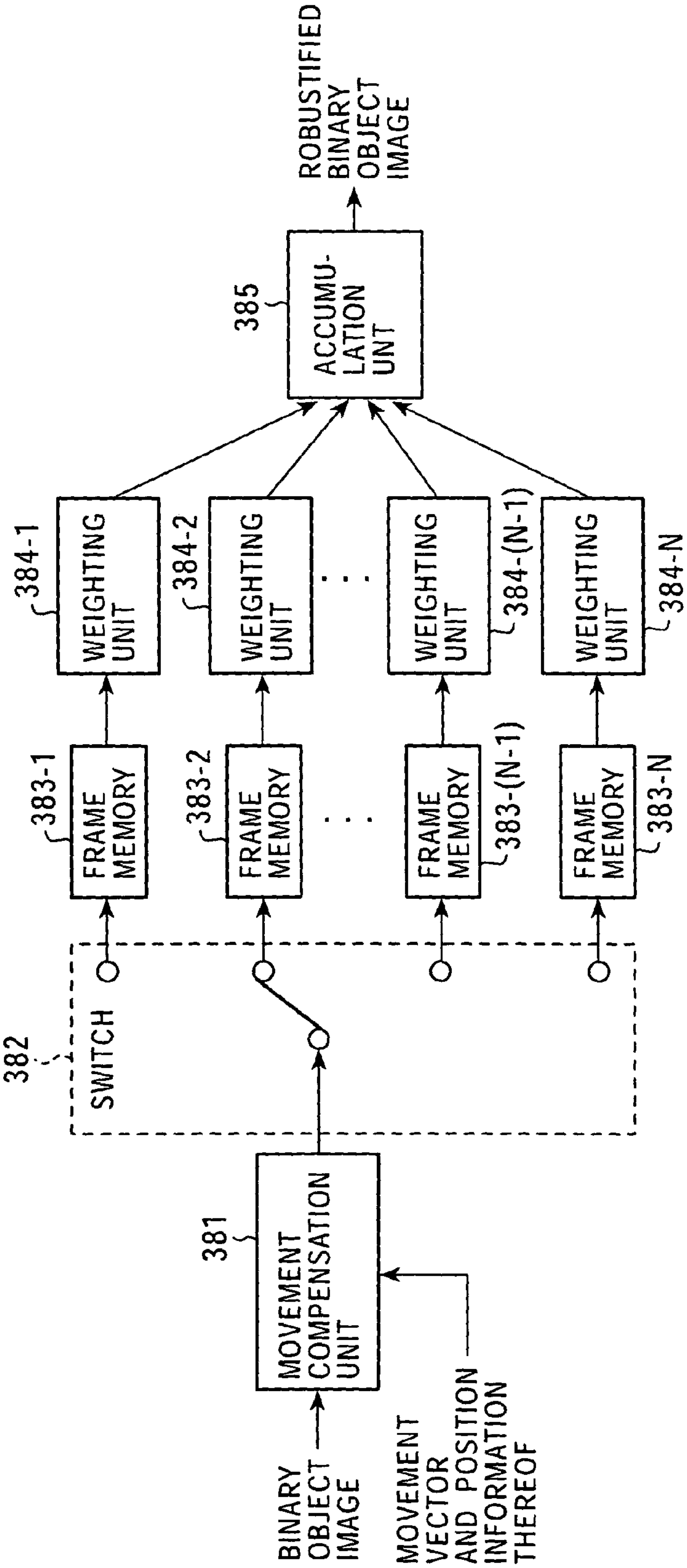
FIG. 54 is a block diagram describing the configuration of a robustification unit 361.

FIG. 54 is a block diagram which describes the configuration of the robustification unit 361. A movement compensation unit 381 compensates for the movement of the binary object image of N frames based upon the movement vector and the position information thereof supplied from the movement detecting unit 102, and outputs the binary object image which has been subjected to compensation of movement to a switch 382.

Figure 55:
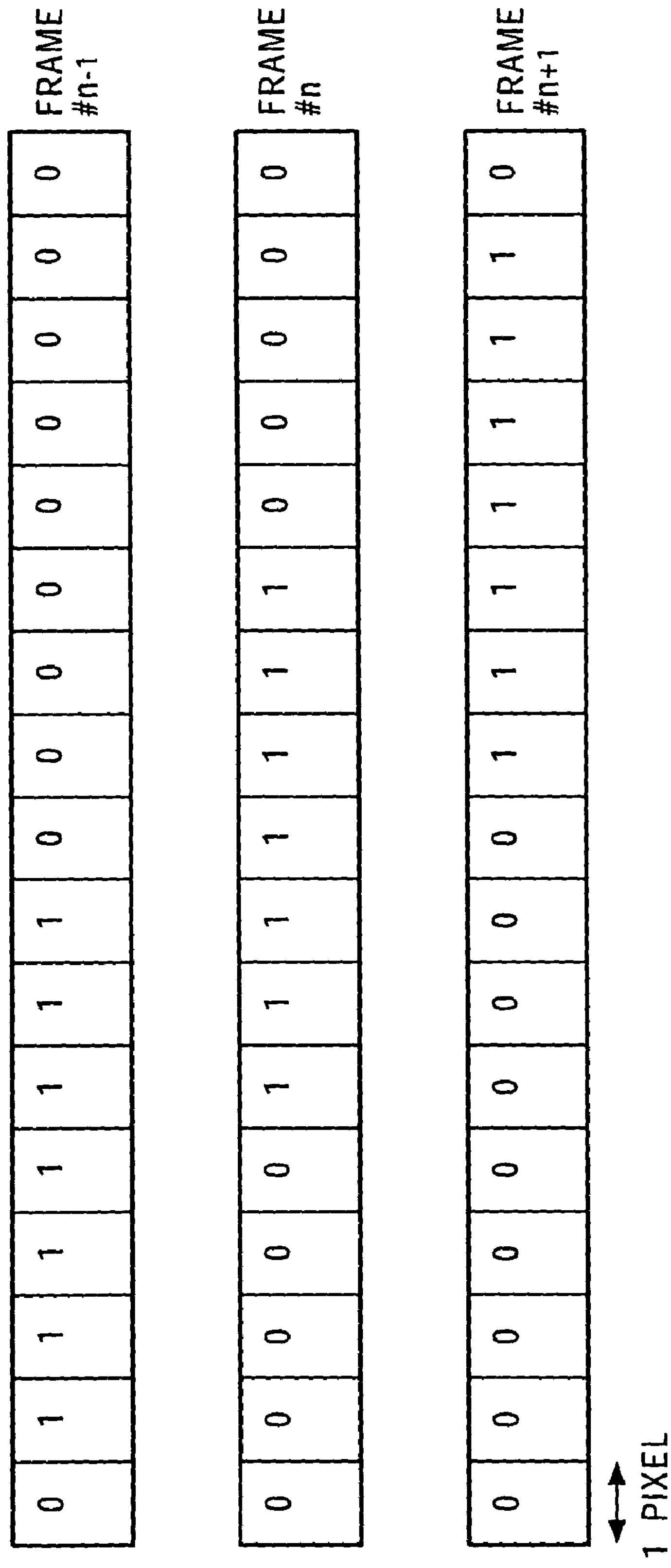
FIG. 55 is a diagram describing movement compensation of a movement compensation unit 381.
Figure 56:
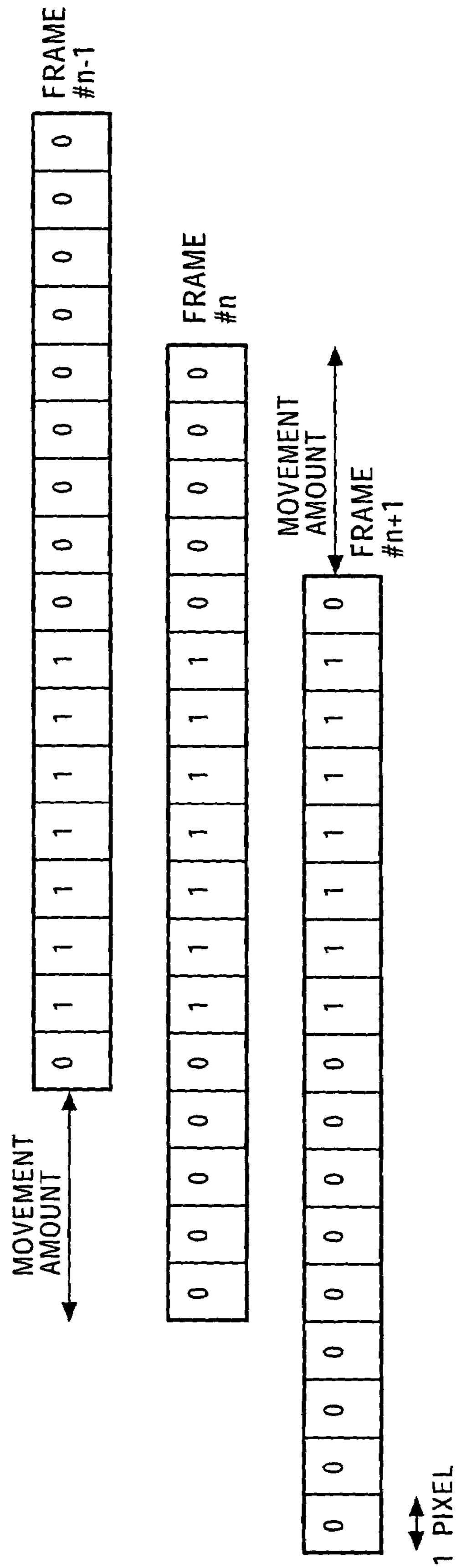
FIG. 56 is a diagram describing movement compensation of a movement compensation unit 381.

The movement compensation of the movement compensation unit 381 will be described with reference to examples shown in FIG. 55 and FIG. 56. For example, when judging the region in the frame #n, in the event that there is input of the binary object images of the frame #n−1, the frame #n, and the frame #n+1, shown by way of the example in FIG. 55, the movement compensation unit 381 compensates for movement of the binary object image of the frame #n−1 and the binary object image of the frame #n+1, based upon the movement vector supplied from the movement detecting unit 102, and supplies the binary object image which has been subjected to compensation of movement to the switch 382, as indicated in the example shown in FIG. 56.

The switch 382 outputs the binary object image which has been subjected to movement compensation of the first frame, to the frame memory 383-1, and outputs the binary object image which has been subjected to movement compensation of the second frame to the frame memory 383-2. Similarly, the switch 382 outputs each of the binary object images of which the third through N−1'th frames have been subjected to compensation for the movement to each of frame memory 383-3 through frame memory 383-(N−1), respectively, and outputs the binary object image of which the N'th frame has been subjected to movement compensation to frame memory 383-N.

The frame memory 383-1 stores the binary object image of which the first frame has been subjected to movement compensation, and outputs the stored binary object image to a weighting addition unit 384-1. The frame memory 383-2 stores the binary object image of which the second frame has been subjected to movement compensation, and outputs the stored binary object image to a weighting addition unit 384-2.

Similarly, each of the frame memory 383-3 through the frame memory 383-(N−1) stores each of the binary object images of which one of the third frame through N−1'th frame has been subjected to compensation for the movement, and outputs the stored binary object image to each of the weighing addition unit 384-3 through the weighing addition unit 384-(N−1). The frame memory 383-N stores the binary object image of which N'th frame has been subjected to compensation for the movement, and outputs the stored binary object image to a weighing addition unit 384-N.

The weighing addition unit 384-1 multiplies the pixel value of the binary object image of which the first frame has been subjected to compensation for the movement supplied from the frame memory 383-1 by the predetermined weight w1, and supplies to an accumulation unit 385. The weighing addition unit 384-2 multiplies the pixel value of the binary object image of the second frame which has been subjected to movement compensation supplied from the frame memory 383-2 by the predetermined weight w2, and supplies to an accumulation unit 385.

Similarly, each of the weighting addition unit 384-3 through the weighing addition unit 384-(N−1) multiplies the pixel value of the binary object image of one of the third through N−1'th frames, which has been subjected to movement compensation supplied from one of the frame memory 383-3 through the frame memory 383-(N−1) by one of the predetermined weights w3 through w(N−1), and supplies to the accumulation unit 385. A weighing addition unit 384-N multiplies the pixel value of the binary object image of the N'th frame supplied from the frame memory 383-N which has been subjected to movement compensation by the predetermined weight wN, and supplies to the accumulation unit 385.

The accumulation unit 385 accumulates the pixel value corresponding to the binary object image, wherein each of the first through N'th frames which has been subjected to movement compensation is multiplied by one of the predetermined weights w1 through wN, and generates the binary object image by comparing the accumulated pixel value with the predetermined threshold value th0.

As described above, the robustification unit 361 generates the robustified binary object image from the N frames of binary object images, and supplies to the time change detecting unit 303, so the region specifying unit 103 of which the configuration is shown in FIG. 53 can specify the region more accurately as compared with the case shown in FIG. 41, even if the input image contains noise.

Figure 57:
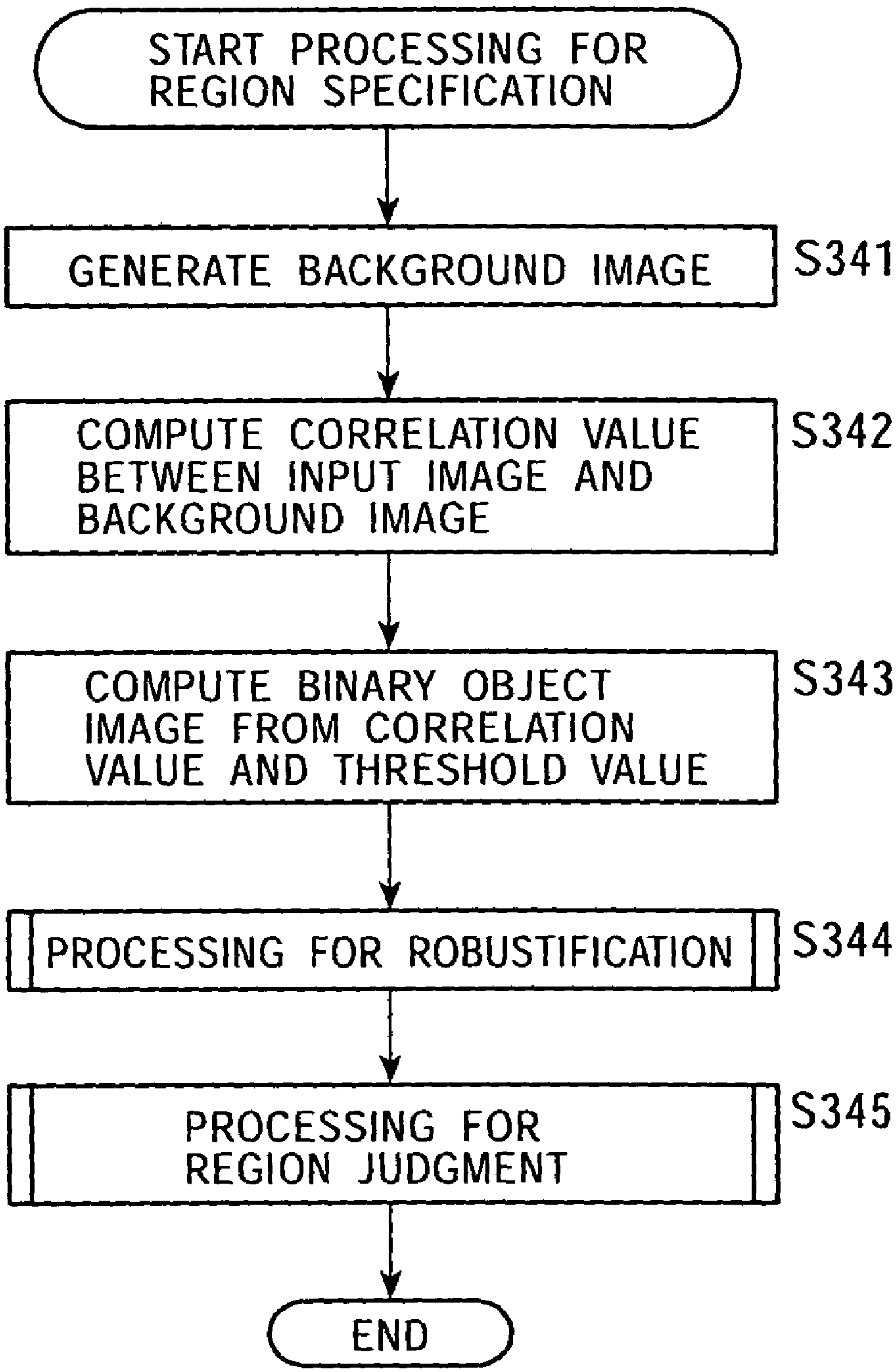
FIG. 57 is a flowchart describing the processing for region specification.

The processing for specifying the region of the region specifying unit 103 of which the configuration is shown in FIG. 53 will now be described, referring to the flowchart shown in FIG. 57. The processing in Step S341 through Step S343 is the same as Step S301 through Step S303 described in the flowchart shown in FIG. 51, respectively, and accordingly, description thereof will be omitted.

In Step S344, the robustification unit 361 performs processing for robustification.

In Step S345, the time change detecting unit 303 performs processing for specifying the region, and the processing ends. Details of the processing in Step S345 are the same as the processing described with reference to the flowchart shown in FIG. 52, so description thereof will be omitted.

Figure 58:
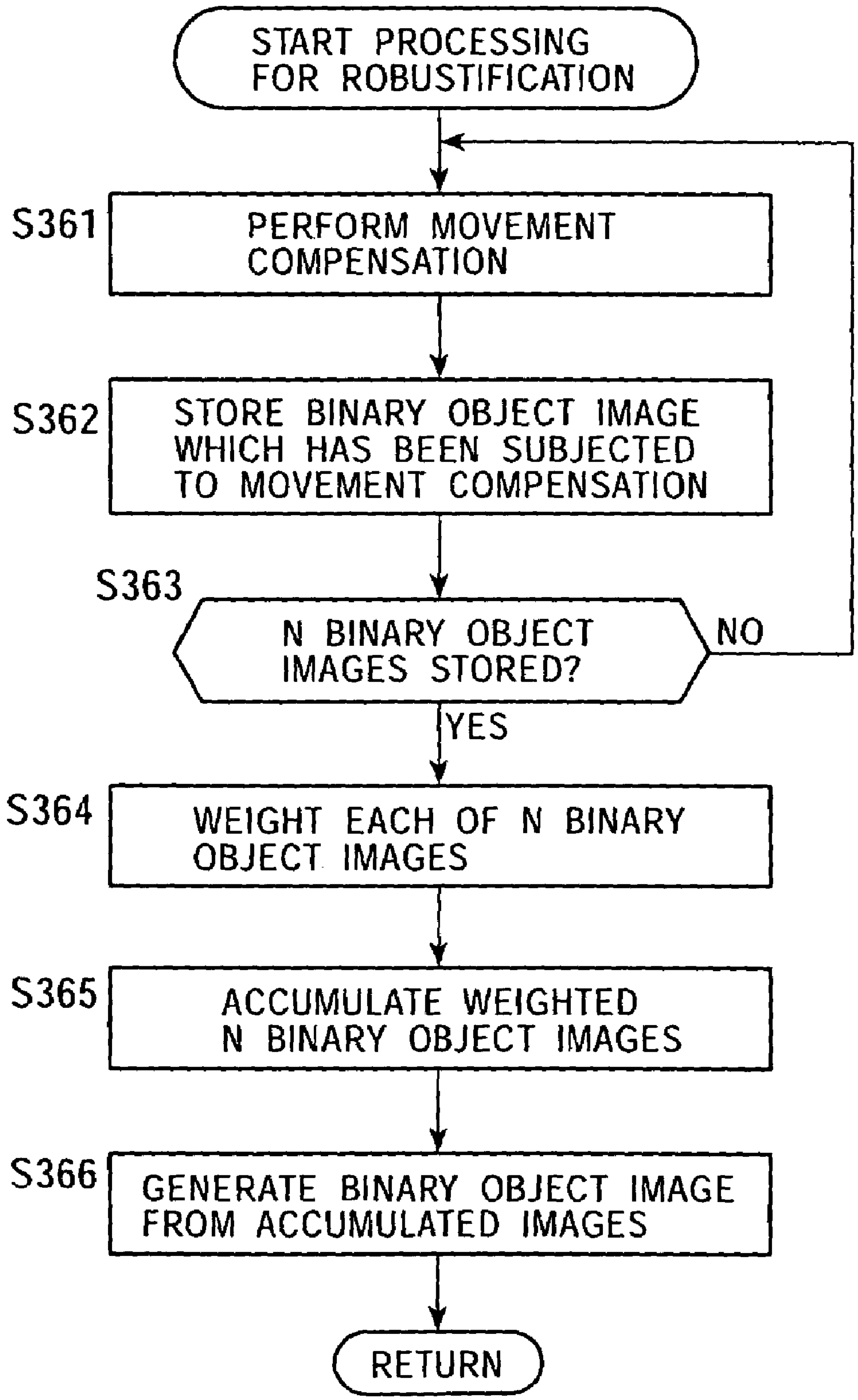
FIG. 58 is a flowchart describing details of processing for robustification.

Referring to the flowchart shown in FIG. 58, processing of robustification corresponding to the processing in Step S344 shown in FIG. 57 will now be described in detail. In Step S361, the movement compensation unit 381 performs movement compensation processing of the input binary object image based upon the movement vector and the position information thereof supplied from the movement detecting unit 102. In Step S362, one of the frame memory 383-1 through the frame memory 383-N stores the binary object image, which has been subjected to movement compensation, supplied via the switch 382.

In Step S363, the robustification unit 361 judges whether or not N binary object images are stored, and in the event that judgment is made that N binary object images have not been stored, the flow returns to Step S361, and the robustification unit 363 repeats processing of compensation for movement of the binary object image, and processing of storing the binary object image.

In Step S363, in the event that judgment is made that N binary object images stored, the flow proceeds to Step S364, and each of the weighting addition units 384-1 through 384-N multiplies each of N binary object images, by one of the weights w1 through wN for weighting.

In Step S365, the accumulation unit 385 accumulates the N weighted binary object images.

In Step S366, the accumulation unit 385 generates the binary object image from the accumulated image, by comparing with the predetermined threshold value th1, for example, and the processing ends.

As described above, the region specifying unit 103, of which the configuration is shown in FIG. 53, can generate region information based upon the robustified binary object image.

As described above, the region specifying unit 103 can generate the region information which indicates which of the movement region, the still region, the uncovered background region, or the covered background region, each of the pixels contained in the frame belongs to.

Figure 59:
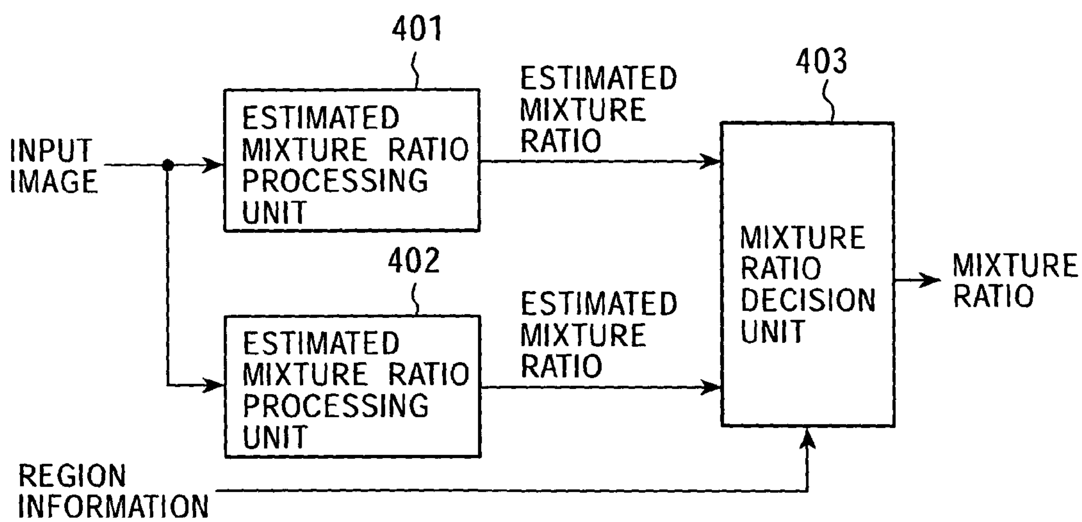
FIG. 59 is a block diagram illustrating an example of the configuration of a mixture ratio calculating unit 104.

FIG. 59 is a block diagram which illustrates an example of the configuration of the mixture ratio calculating unit 104. An estimated mixture ratio processing unit 401 calculates estimated mixture ratio for each pixel by computation corresponding to a model of a covered background region based upon the input image, and supplies the calculated estimated mixture ratio to a mixture ratio determination unit 403.

An estimated mixture ratio processing unit 402 calculates estimated mixture ratio for each pixel by computation corresponding to a model of the uncovered background region based upon the input image, and supplies the calculated estimated mixture ratio to the mixture ratio determination unit 403.

Since an assumption may be made that the object corresponding to the foreground moves at a constant velocity within a shutter period, the mixture ratio α of a pixel belonging to the mixed region has a nature such as described below. That is to say, the mixture ratio α changes linearly corresponding to the change of the position of the pixel. Taking the change of the pixel position to be one-dimensional, the change of the mixture ratio α may be represented by a straight line, and taking the change of the pixel position to be two-dimensional, the change of the mixture ratio α may be represented by a plane.

Note that the period of one frame is short, an assumption may be made that the object corresponding to the foreground is a rigid body, and moves at a constant velocity.

In this case, the inclination of the mixture ratio α is inversely proportionate to the movement amount v of the foreground within the shutter period.

Figure 60:
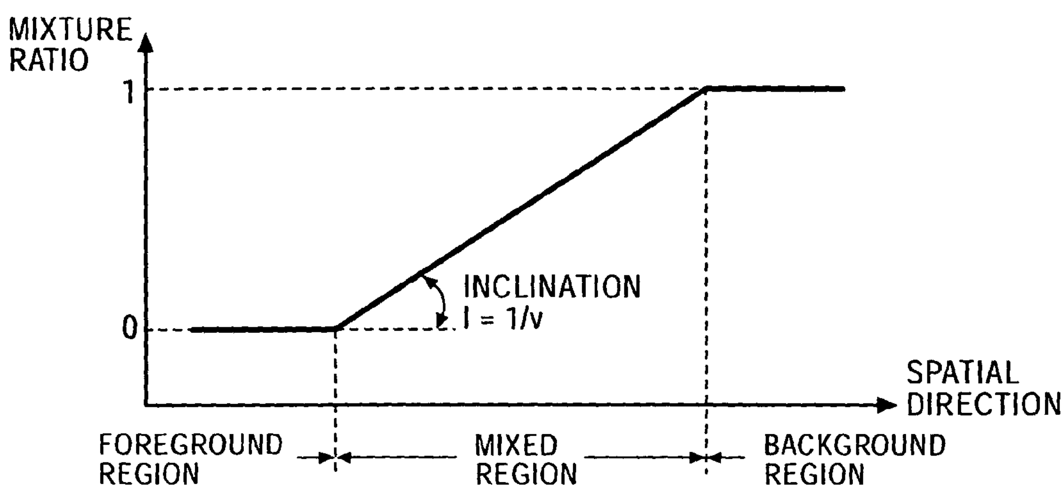
FIG. 60 is a diagram illustrating an example of an ideal mixture ratio α.

An example of an ideal mixture ratio α is shown in FIG. 60. The inclination 1 of an ideal mixture ratio α in the mixed region may be represented by the reciprocal of the movement amount v.

As shown in FIG. 60, an ideal mixture ratio α has a value of 1 in the background region, and has a value of 0 in the foreground region, and has a value which exceeds 0 and is less than 1 in the mixed region.

Figure 61:
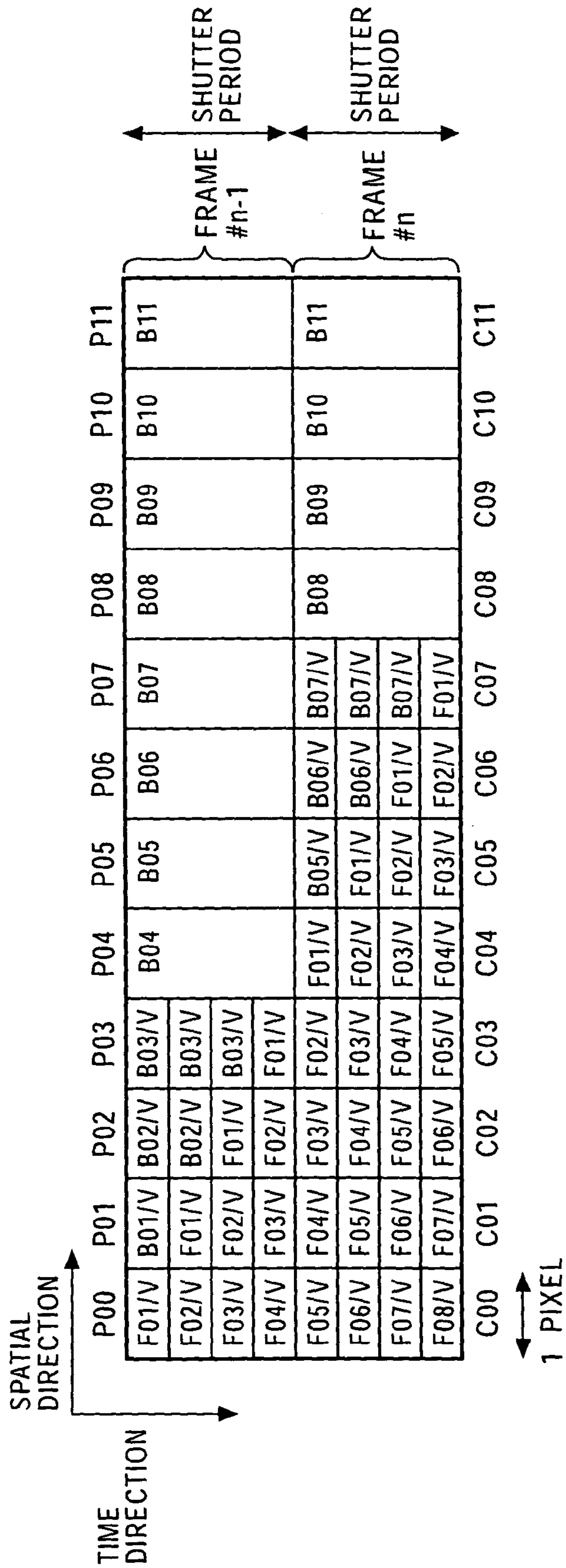
FIG. 61 is a model diagram wherein the pixel values are developed over the time direction, and periods corresponding to shutter time are divided.

With the example shown in FIG. 61, the pixel value C06 of the seventh pixel from the left in the frame #n may be represented in Expression (8), using the pixel value P06 of the seventh pixel from the left in the frame #n−1.

$$\begin{aligned} C06 &= B06/v + B06/v + F01/v + F02/v \\ &= P06/v + P06/v + F01/v + F02/v \\ &= 2/v \cdot P06 + \sum_{i=1}^{2} F_i/v \end{aligned} \tag{8}$$

In Expression (8), the pixel value C06 is represented as the pixel value M of the pixel in the mixed region, and the pixel value P06 is represented as the pixel value B of the pixel in the background region. That is to say, the pixel value M of the pixel in the mixed region and the pixel value B of the pixel in the background region may be represented as in Expression (9) and Expression (10), respectively.

$$M=C06 \tag{9}$$

$$B=P06 \tag{10}$$

In Expression (8), 2/v corresponds to the mixture ratio α. Since the movement amount v is 4, the mixture ratio α of the seventh pixel from the left in the frame #n is 0.5.

As described above, Expression (3) indicating the mixture ratio α may be rewritten as with Expression (11) by reckoning the pixel value C in the frame #n of interest to be a pixel value in the mixed region, and reckoning the pixel value P in the frame #n−1 previous to the frame #n to be a pixel value of the background region.

$$C=\alpha \cdot P+f \tag{11}$$

In Expression (11), f is the sum of the foreground components contained in the pixel of interest, $\Sigma_i$Fi/v. The variables included in Expression (11) are two, i.e., the mixture ratio α and the sum of the foreground components f.

Figure 62:
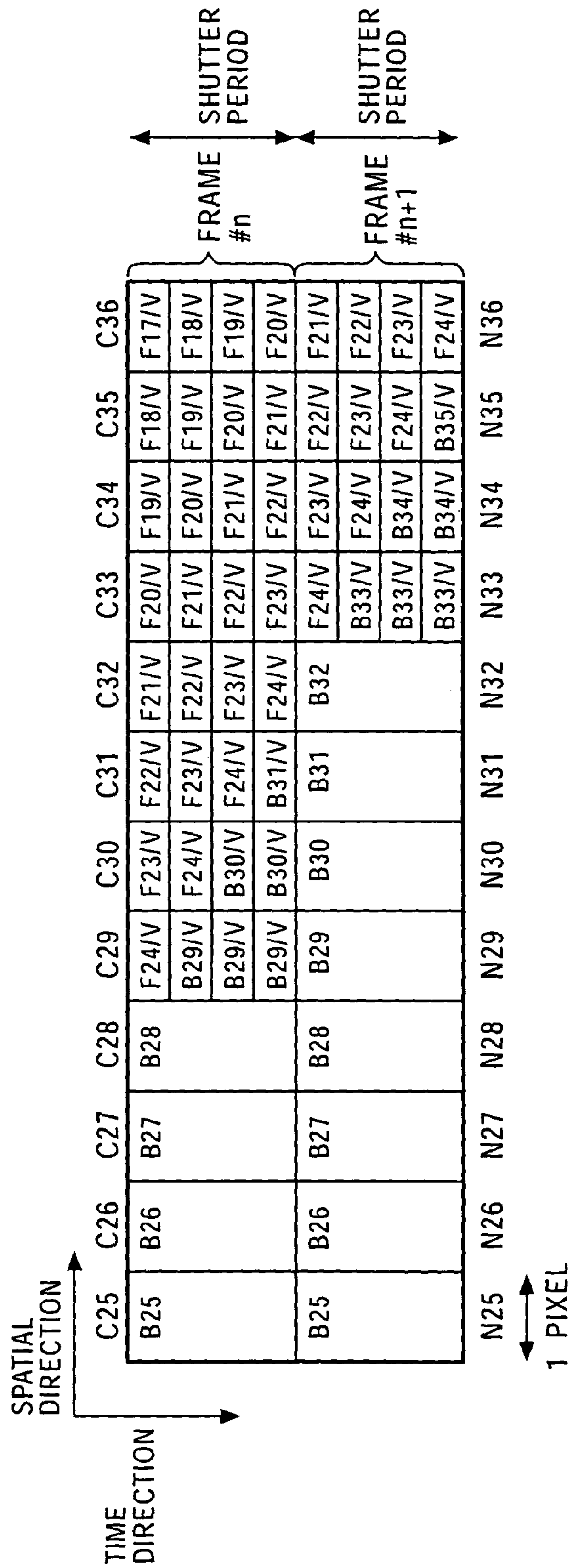
FIG. 62 is a model diagram wherein the pixel values are developed over the time direction, and periods corresponding to shutter time are divided.

In the same way, FIG. 62 illustrates a model wherein the pixel values wherein the movement amount v is 4, and virtual dividing number is 4 in the uncovered background region, develop over the time direction.

Expression (3) indicating the mixture ratio α may be represented as in Expression (12) with the pixel value C in the frame #n of interest as a pixel value in the mixed region, and with the pixel value N in the frame #n+1 following the frame #n as a pixel value in the background region, in the same manner as the representation in the covered background region described above, in the uncovered background region.

$$C=\alpha \cdot N+f \tag{12}$$

Note that while description has been made with an assumption that the background object keeps still, Expression (8) through Expression (12) may be applied by using the pixel values of the pixels at the positions corresponding to the background movement amount v, even if the background object moves. For example, in FIG. 61, in the event that the movement amount v of the object corresponding to the background is 2, the virtual dividing number is 2, and the object corresponding to the background moves to the right side in the drawing, the pixel value B of the pixel in the background region in Expression (10) is the pixel value P04.

Expression (11) and Expression (12) include two variables, respectively, and accordingly the mixture ratio α can not be obtained in this state. Here, images generally have great correlation spatially, the adjacent pixels have approximately the same value.

Thus, since the foreground components have great correlation spatially, the mixture ratio is obtained by transforming the expression so as to obtain the sum of the foreground components from the previous or following frame.

Figure 63:
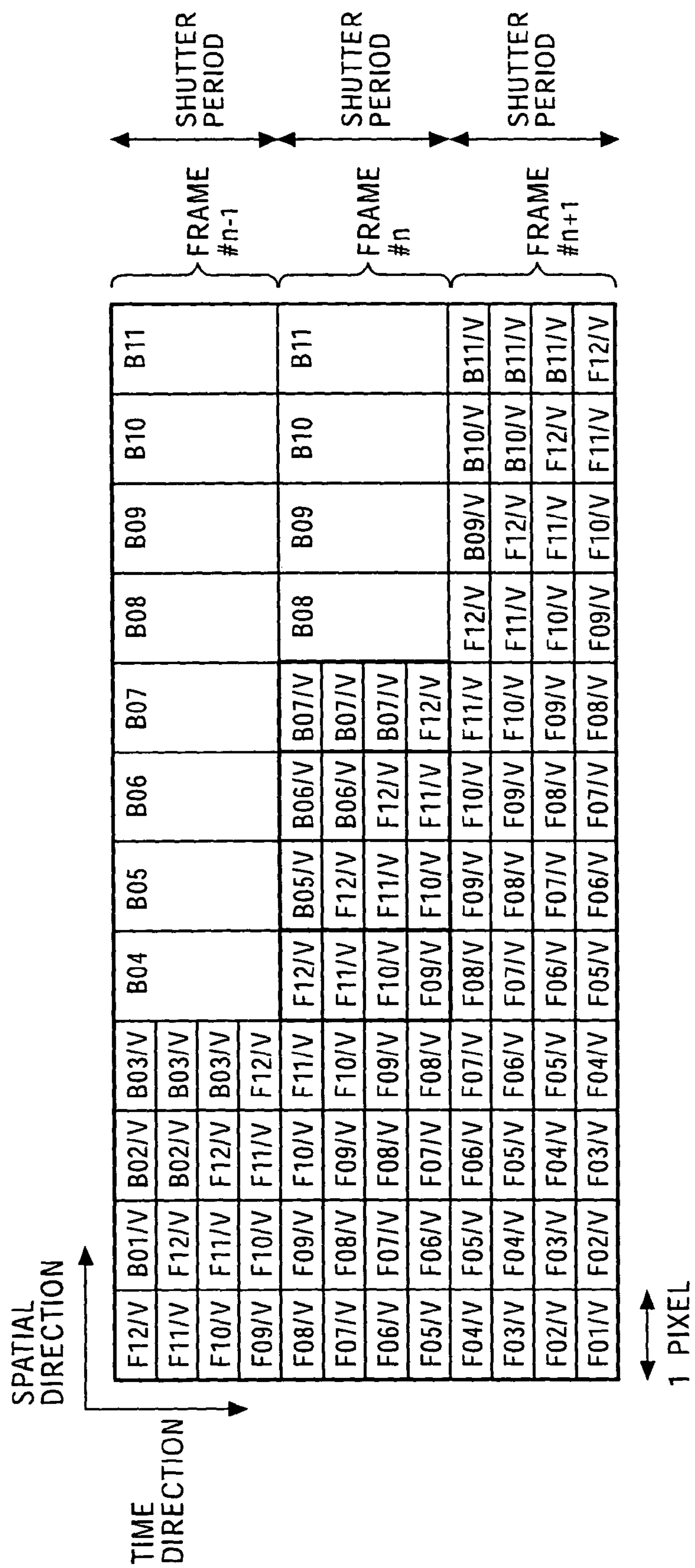
FIG. 63 is a diagram describing approximation using correlation of foreground components.

The pixel value Mc of the seventh pixel from the left in the frame #n in FIG. 63 may be represented in Expression (13).

$$Mc = \frac{2}{v} \cdot B06 + \sum_{i=11}^{12} F_i/v \tag{13}$$

The first argument 2/v of the right side in Expression (13) corresponds to the mixture ratio α. The second argument of the right side in Expression (13) is represented as in Expression (14) using the pixel values in the following frame #n+1.

$$\sum_{i=11}^{12} F_i/v = \beta \cdot \sum_{i=7}^{10} F_i/v \tag{14}$$

Here, an assumption may be made that Expression (15) holds, using the spatial correlation of the foreground components.

$$F=F05=F06=F07=F08=F09=F10=F11=F12 \tag{15}$$

Expression (14) may be rewritten as Expression (16) using Expression (15).

$$\begin{aligned} \sum_{i=11}^{12} F_i/v &= \frac{2}{v} \cdot F \\ &= \beta \cdot \frac{4}{v} \cdot F \end{aligned} \tag{16}$$

As a result, β may be represented in Expression (17).

$$\beta=2/4 \tag{17}$$

In general, in the event that an assumption is made wherein the foreground components correlated to the mixed region are the same as shown in Expression (15), Expression (18) is formed by the relationship of the internal dividing ratio for all the pixel in the mixed region.

$$\beta=1-\alpha \tag{18}$$

In the event that Expression (18) holds, Expression (11) may develop as indicated in Expression (19).

$$\begin{aligned} C &= \alpha\cdot P+f \\ &= \alpha\cdot P+(1-\alpha)\cdot\sum_{i=\gamma}^{\gamma+V-1}F_i/v \\ &= \alpha\cdot P+(1-\alpha)\cdot N \end{aligned} \tag{19}$$

Similarly, in the event that Expression (18) holds, Expression (12) may develop as indicated in Expression (20).

$$\begin{aligned} C &= \alpha\cdot N+f \\ &= \alpha\cdot N+(1-\alpha)\cdot\sum_{i=\gamma}^{\gamma+V-1}F_i/v \\ &= \alpha\cdot N+(1-\alpha)\cdot P \end{aligned} \tag{20}$$

Figure 64:
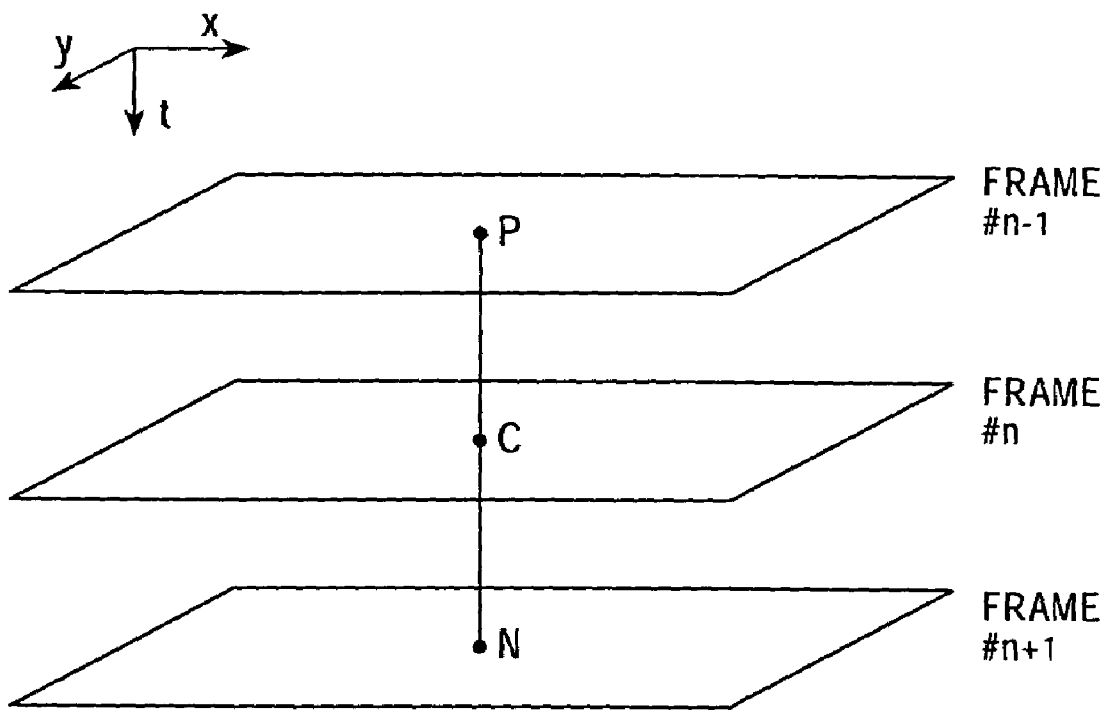
FIG. 64 is a diagram describing the relation between C, N, and P.

In Expression (19) and Expression (20), since C, N, and P are known pixel values, the variable included in Expression (19) and Expression (20) is only the mixture ratio α. The relationship between C, N, and P in Expression (19) and Expression (20) is illustrated in FIG. 64. C is the pixel value of the pixel of interest in the frame #n for calculating the mixture ratio α. N is the pixel value of the pixel in the frame #n+1, of which the position in the spatial direction corresponds to that of the pixel of interest. P is the pixel value of the pixel in the frame #n−1, of which the position in the spatial direction corresponds to that of the pixel of interest.

Accordingly, since Expression (19) and Expression (20) include one variable each, the mixture ratio α can be calculated using the pixel values in three frames. The conditions for calculating an accurate mixture ratio α by solving Expression (19) and Expression (20) are that; the foreground components with regard to the mixed region are the same, that is to say, in the foreground image object which has been taken in the state of the foreground object being still, the pixel values of pixels of a number double the movement amount v, which are arrayed sequentially at the boundary of the image object, corresponding to the movement direction of the foreground object, are constant.

As described above, the mixture ratio α of the pixel belonging to the covered background region is calculated by Expression (21), and the mixture ratio α belonging to the uncovered background region is calculated by Expression (22).

$$\alpha=(C-N)/(P-N) \tag{21}$$

$$\alpha=(C-P)/(N-P) \tag{22}$$

Figure 65:
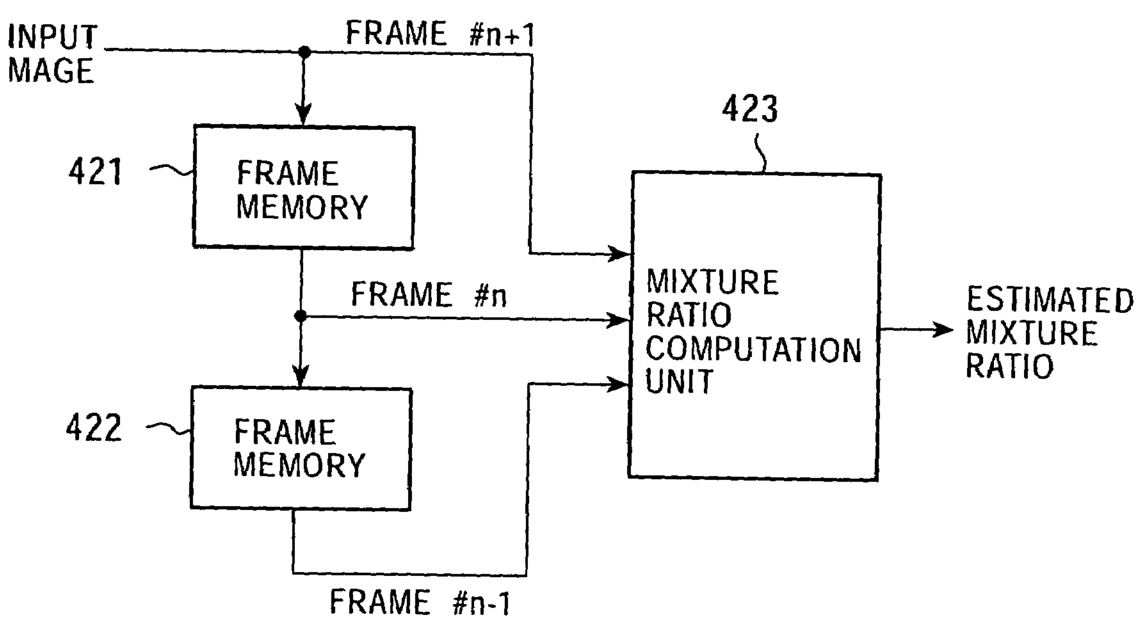
FIG. 65 is a block diagram illustrating another configuration of the estimated mixture ratio processing unit 401.

FIG. 65 is a block diagram which illustrates the configuration of the estimated mixture ratio processing unit 401. Frame memory 421 stores the input image in increments of frames, and supplies the frame following the frame which is input as an input image, to frame memory 422 and a mixture ratio computation unit 423.

The frame memory 422 stores the input image in increments of frames, and supplies the frame following the frame supplied from the frame memory 421, to the mixture ratio computation unit 423.

Accordingly, in the event that the frame #n+1 is input as an input image to the mixture ratio computation unit 423, the frame memory 421 supplies the frame #n to the mixture ratio computation unit 423, and the frame memory 422 supplies the frame #n−1 to the mixture ratio computation unit 423.

The mixture ratio computation unit 423 calculates the estimated mixture ratio of the pixel of interest by the computation represented in Expression (21) based upon the pixel value C of the pixel of interest in the frame #n, the pixel value N of the pixel in the frame #n+1 wherein the spatial position thereof corresponds to that of the pixel of interest, and the pixel value P of the pixel in the frame #n−1 wherein the spatial position thereof corresponds to that of the pixel of interest, and outputs the calculated estimated mixture ratio. For example, in the event that the background keeps still, the mixture ratio computation unit 423 calculates the estimated mixture ratio of the pixel of interest based upon the pixel value C of the pixel of interest in the frame #n, the pixel value N of the pixel in the frame #n+1 at the same position in the frame as the pixel of interest, and the pixel value P of the pixel in the frame #n−1 at the same position in the frame as the pixel of interest, and outputs the calculated estimated mixture ratio.

As described above, the estimated mixture ratio processing unit 401 can calculate the estimated mixture ratio based upon the input image, and supply to the mixture ratio decision unit 403.

Note that the processing of the estimated mixture ratio processing unit 402 is the same as that of the estimated mixture ratio processing unit 401 except for the processing wherein, while the estimated mixture ratio processing unit 401 calculates the estimated mixture ratio of the pixel of interest by the computation represented in Expression (21), the estimated mixture ratio processing unit 402 calculates the estimated mixture ratio of the pixel of interest by the computation represented in Expression (22), and accordingly, description thereof will be omitted.

Figure 66:
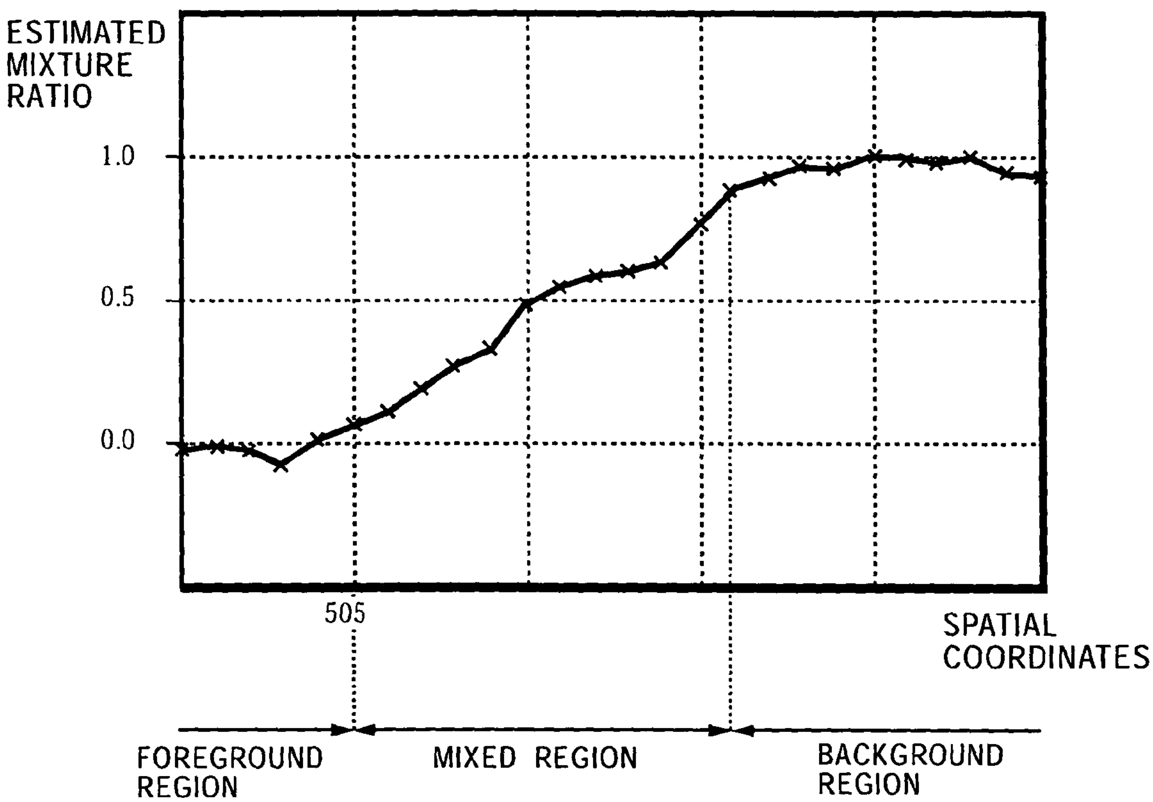
FIG. 66 is a diagram illustrating an example of an estimated mixture ratio.

FIG. 66 is a diagram which illustrates an example of the estimated mixture ratio calculated by the estimated mixture ratio processing unit 401. The estimated mixture ratio shown in FIG. 66 indicates the results in a case wherein the foreground movement amount v corresponding to the object which moves at a constant velocity is 11, for one line.

It can be understood that the estimated mixture ratio changes generally linearly in the mixed region, as shown in FIG. 60.

Returning to FIG. 59, the mixture ratio decision unit 403 sets the mixture ratio α based upon the region information indicating which of the foreground region, the background region, the covered background region, or the uncovered background region, the pixel which is the object of calculation of the mixture ratio α belongs to, supplied from the region specifying unit 103.

In the event that the pixel which is the object belongs to the foreground region, the mixture ratio decision unit 403 sets the mixture ratio α to 0, in the event that the pixel which is the object belongs to the background region, sets the mixture ratio α to 1, in the event that the pixel which is the object belongs to the covered background region, sets the mixture ratio α to the estimated mixture ratio supplied from the estimated mixture ratio processing unit 401, and in the event that the pixel which is the object belongs to the uncovered background region, sets the mixture ratio α to the estimated mixture ratio supplied from the estimated mixture ratio processing unit 402. The mixture ratio decision unit 403 outputs the mixture ratio α which has been set based upon the region information.

Figure 67:
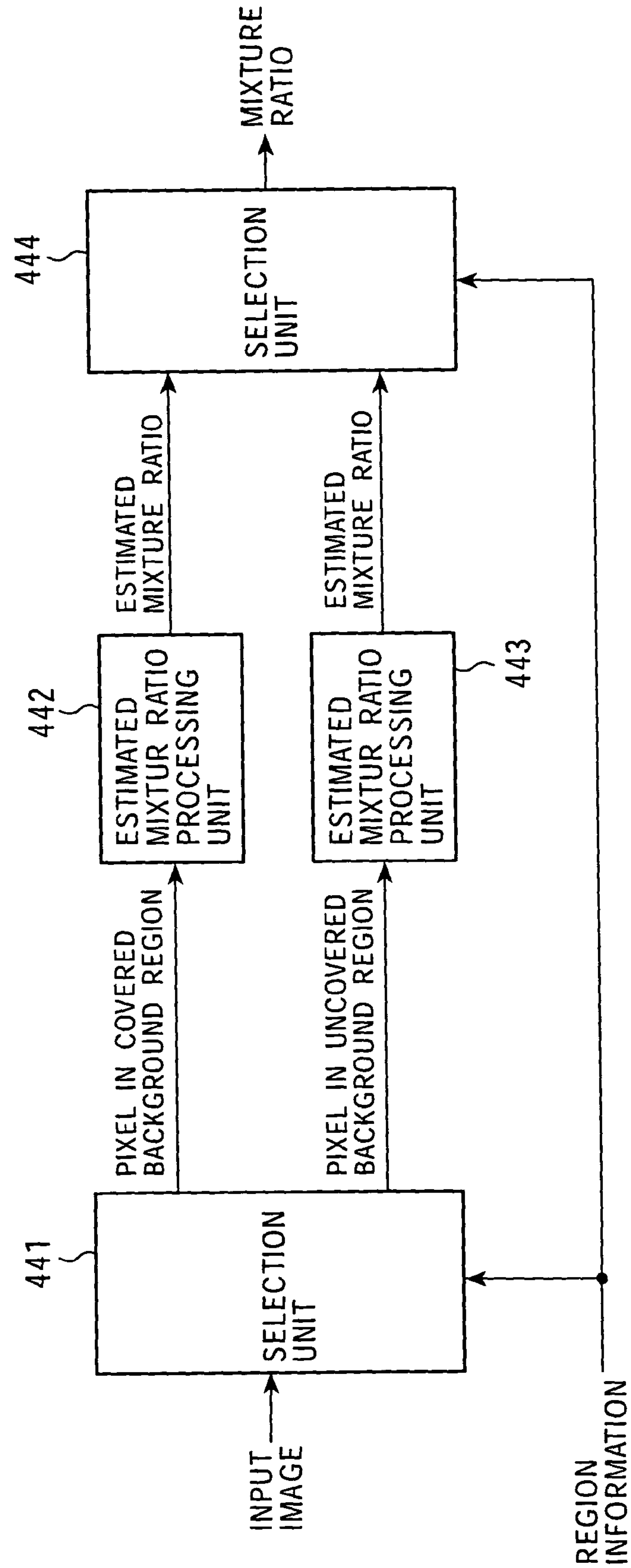
FIG. 67 is a block diagram illustrating another configuration of a mixture ratio calculation unit 104.

FIG. 67 is a block diagram which illustrates another configuration of the mixture ratio calculating unit 104. A selection unit 441 supplies the pixels belonging to the covered background region and the corresponding pixels in the following and previous frames, to an estimated mixture ratio processing unit 442, based upon the region information supplied from the region specifying unit 103. The selection unit 441 supplies the pixels belonging to the uncovered background region and the corresponding pixels in the previous and following frames, to an estimated mixture ratio processing unit 443, based upon the region information supplied from the region specifying unit 103.

The estimated mixture ratio processing unit 442 calculates the estimated mixture ratio of the pixel of interest belonging to the covered background region by the computation represented in Expression (21) based upon the pixel values input from the selection unit 441, and supplies the calculated estimated mixture ratio to a selection unit 444.

The estimated mixture ratio processing unit 443 calculates the estimated mixture ratio of the pixel of interest belonging to the uncovered background region by the computation represented in Expression (22) based upon the pixel values input from the selection unit 441, and supplies the calculated estimated mixture ratio to the selection unit 444.

In the event that the pixel which is the object belongs to the foreground region, the selection unit 444 selects the estimated mixture ratio of 0, and sets for the mixture ratio α, and in the event that the pixel which is the object belongs to the background region, the selection unit 444 selects the estimated mixture ratio of 1, and sets for the mixture ratio α, based upon the region information supplied from the region specifying unit 103. In the event that the pixel which is the object belongs to the covered background region, the selection unit 444 selects the estimated mixture ratio supplied from the estimated mixture ratio processing unit 442, and sets for the mixture ratio α, and in the event that the pixel which is the object belongs to the uncovered background region, the selection unit 444 selects the estimated mixture ratio supplied from the estimated mixture ratio processing unit 443, and sets this for the mixture ratio α. The selection unit 444 outputs the mixture ratio α which has been selected and set based upon the region information.

As described above, the mixture ratio calculating unit 104 having another configuration shown in FIG. 67 can calculate the mixture ratio α for each pixel contained in the image, and output the calculated mixture ratio α.

Referring to the flowchart shown in FIG. 68, the processing for calculation of the mixture ratio α by the mixture ratio calculating unit 104 of which configuration is shown in FIG. 59 will be described. In Step S401, the mixture ratio calculating unit 104 obtains the region information supplied from the region specifying unit 103. In Step S402, the estimated mixture ratio processing unit 401 performs processing of computation of the estimated mixture ratio by a model corresponding to the covered background region, and supplies the calculated estimated mixture ratio to the mixture ratio decision unit 403. Details of the processing for computation of the estimated mixture ratio will be described later with reference to the flowchart shown in FIG. 69.

In Step S403, the estimated mixture ratio processing unit 402 performs the processing of the computation of the estimated mixture ratio by a model corresponding to the uncovered background region, and supplies the calculated mixture ratio to the mixture ratio decision unit 403.

In Step S404, the mixture ratio calculating unit 104 judges whether or not the mixture ratio α has been estimated for the entire frame, and in the event that judgment is made that the mixture ratio α has not been estimated for the entire frame, the flow returns to Step S402, and performs the processing of estimation of the mixture ratio α for the following pixel.

In the event that judgment is made in Step S404 that the mixture ratio α has been estimated for the entire frame, the flow proceeds to Step S405, and the mixture ratio decision unit 403 sets the mixture ratio α based upon the region information which indicates which of the foreground region, the background region, the covered background region, or the uncovered background region, the pixel belongs to, supplied from the region specifying unit 103. In the event that the pixel which is the object belongs to the foreground region, the mixture ratio decision unit 403 sets the mixture ratio α to 0, in the event that the pixel which is the object belongs to the background region, sets the mixture ratio α to 1, in the event that the pixel which is the object belongs to the covered background region, sets the mixture ratio α to the estimated mixture ratio supplied from the estimated mixture ratio processing unit 401, and in the event that the pixel which is the object belongs to the uncovered background region, sets the mixture ratio α to the estimated mixture ratio supplied from the estimated mixture ratio processing unit 402, and the processing ends.

As described above, the mixture ratio calculating unit 104 can calculate the mixture ratio α which is the amount of features corresponding to each pixel based upon the region information supplied from the region specifying unit 103 and the input image.

Figure 68:
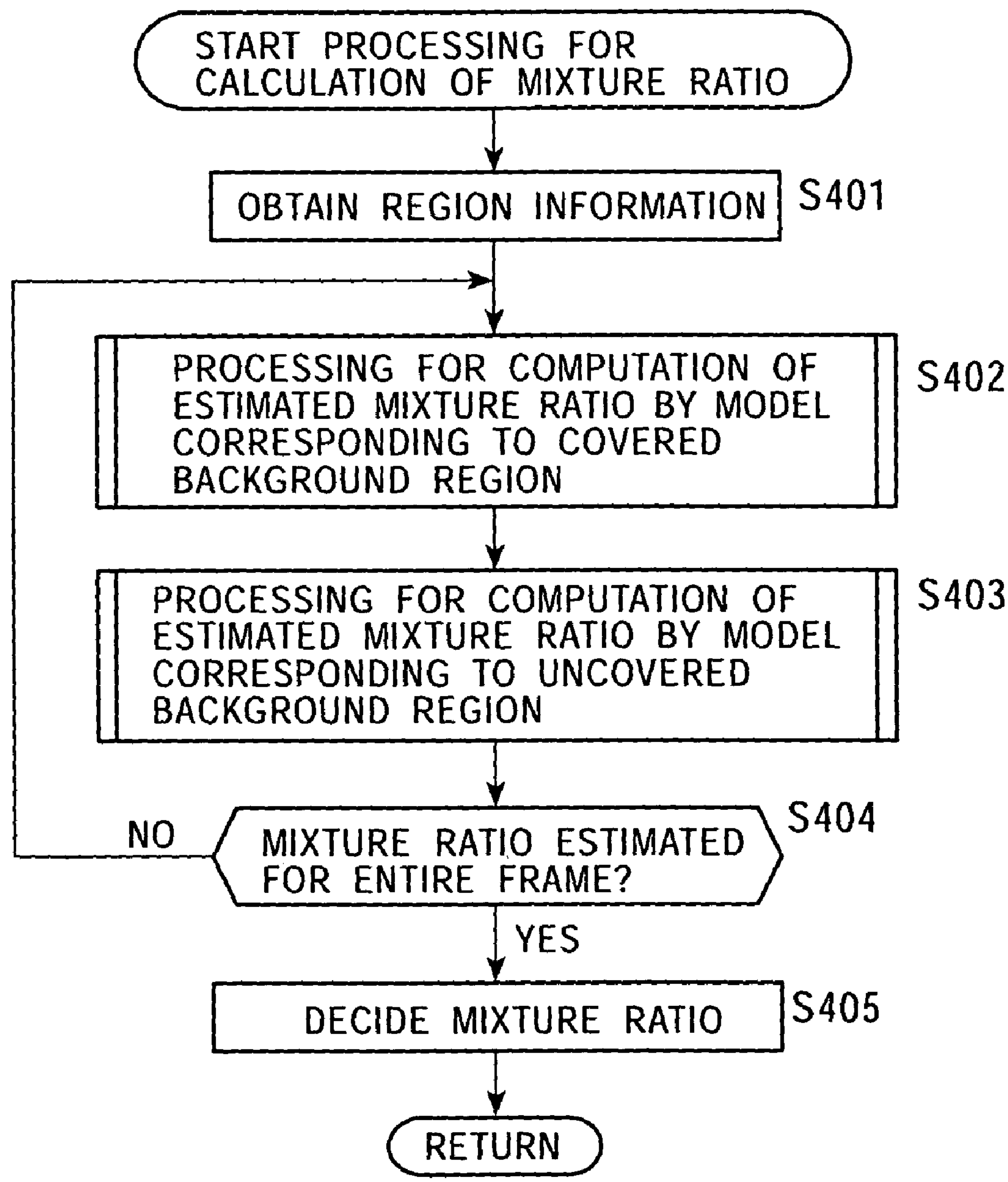
FIG. 68 is a flowchart explaining the processing for calculating mixture ratio.

The processing of calculation of the mixture ratio α by the mixture ratio calculation unit 104 of which configuration is shown in FIG. 67 is the same as the processing described in the flowchart shown in FIG. 68, so description thereof will be omitted.

The processing for mixture ratio estimation by a model corresponding to the covered background region, which corresponds to Step S402 in FIG. 68, will now be described with reference to the flowchart shown in FIG. 69.

In Step S421, the mixture ratio computation unit 423 obtains the pixel value C of the pixel of interest in the frame #n from the frame memory 421.

In Step S422, the mixture ratio computation unit 423 obtains the pixel value P of the pixel in the frame #n−1, which corresponds to the pixel of interest, from the frame memory 422.

In Step S423, the mixture ratio computation unit 423 obtains the pixel value N of the pixel in the frame #n+1, which corresponds to the pixel of interest contained in the input image.

In Step S424, the mixture ratio computation unit 423 computes the estimated mixture ratio based upon the pixel value C of the pixel of interest in the frame #n, the pixel value P of the pixel in the frame #n−1, and the pixel value N of the pixel in the frame #n+1.

In Step S425, the mixture ratio computation unit 423 judges whether or not the processing for computation of the estimated mixture ratio has been ended for the entire frame, and in the event that judgment is made that the processing for computation of the estimated mixture ratio has not been ended for the entire frame, the flow returns to Step S421, and the processing for calculating of the estimated mixture ratio is repeated for the following pixel.

In Step S425, in the event that judgment is made that the processing for computation of the estimated mixture ratio has been ended for the entire frame, the processing ends.

As described above, the estimated mixture ratio processing unit 401 can compute the estimated mixture ratio based upon the input image.

Figure 69:
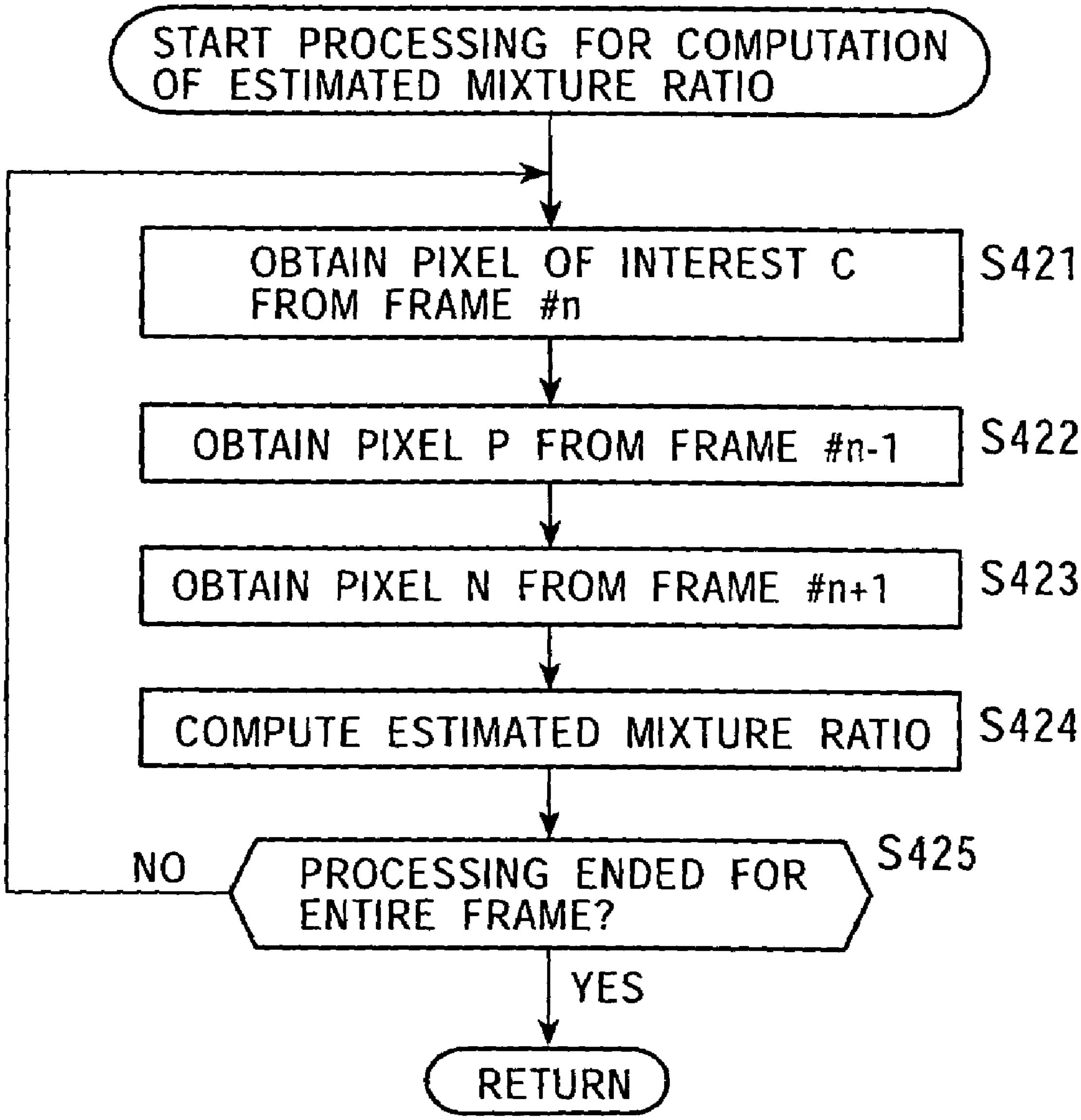
FIG. 69 is a flowchart describing processing for computing an estimated mixture ratio.

The processing of mixture ratio estimation by a model corresponding to the uncovered background region shown in Step S403 in FIG. 68 is the same as the processing indicated in the flowchart shown in FIG. 69, wherein expressions corresponding to a model of the uncovered background region are used, and accordingly description thereof will be omitted.

Note that the estimated mixture ratio processing unit 442 and the estimated mixture ratio processing unit 443 shown in FIG. 67 compute the estimated mixture ratio by performing the processing the same as the processing indicated in the flowchart shown in FIG. 69, and accordingly description thereof will be omitted.

Also, while description has been made with an assumption that the object corresponding to the background keeps still, the processing for obtaining the mixture ratio α described above may be applied even if the image corresponding to the background region contains movement. For example, in the event that the image corresponding to the background moves uniformly, the estimated mixture ratio processing unit 401 shifts the entire image corresponding to the background movement, and performs processing in the same manner as in the case wherein the object corresponding to the background keeps still. Also, in the event that the image corresponding to the background region contains the background movement which is different at each local position, the estimated mixture ratio processing unit 401 selects the pixels corresponding to the background movement as the pixels corresponding to the pixels belonging to the mixed region, and performs the processing described above.

Also, an arrangement may be made wherein the mixture ratio calculating unit 104 performs only the processing of the mixture ratio estimation by a model corresponding to the covered background region for all pixels, and outputs the calculated estimated mixture ratio as the mixture ratio α. In this case, the mixture ratio α indicates the ratio of the background components with regard to the pixels belonging to the covered background region, and indicates the ratio of the foreground components with regard to the pixels belonging to the uncovered background region. The image processing device can obtain the mixture ratio α indicating the ratio of the background components with regard to the pixels belonging to the uncovered background region, by calculating the absolute value of the difference between the mixture ratio α calculated as described above and 1, and setting the calculated absolute value for the mixture ratio α, with regard to the pixels belonging to the uncovered background region.

Note that similarly, an arrangement may be made wherein the mixture ratio calculating unit 104 performs only the processing for the mixture ratio estimation by a model corresponding to the uncovered background region for all pixels, and outputs the calculated estimated mixture ratio as the mixture ratio α.

Another processing of the mixture ratio calculation unit 104 will now be described.

An expression wherein the mixture ratio α and the sum of the foreground components f are approximated spatially can be formed, using the nature wherein the mixture ratio α changes linearly corresponding to the change of the pixel position due to the object corresponding to the foreground moving at a constant velocity within a shutter period. The mixture ratio α is calculated by solving the expression wherein the mixture ratio α and the sum of the foreground components f are approximated, using multiple sets of the pixel value of the pixel belonging to the mixed region and the pixel value of the pixel belonging to the background region.

In the event that the change of the mixture ratio α is generally linearly, the mixture ratio α is represented in Expression (23).

$$\alpha = il + p \tag{23}$$

In Expression (23), i denotes the index in the spatial direction wherein the position of the pixel of interest is 0. l is the inclination of the straight line of the mixture ratio α. p is the intercept of the straight line of the mixture ratio α, as well as the mixture ratio α of the pixel of interest. In Expression (23), while the index i is known, the inclination l and the intercept p are unknown.

Figure 70:
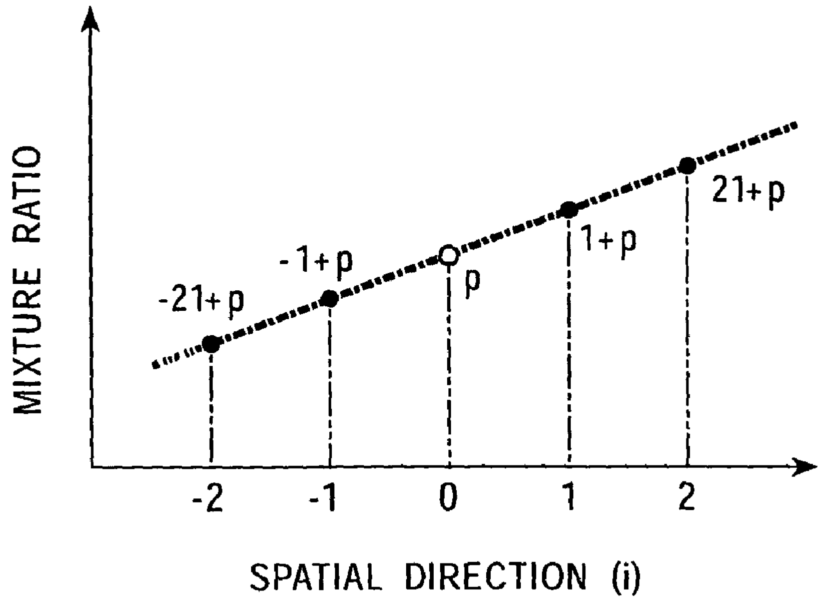
FIG. 70 is a diagram describing a straight line approximating a mixture ratio α.

The correlation between the index i, the inclination l, and the intercept p, is shown in FIG. 70.

Figure 71:
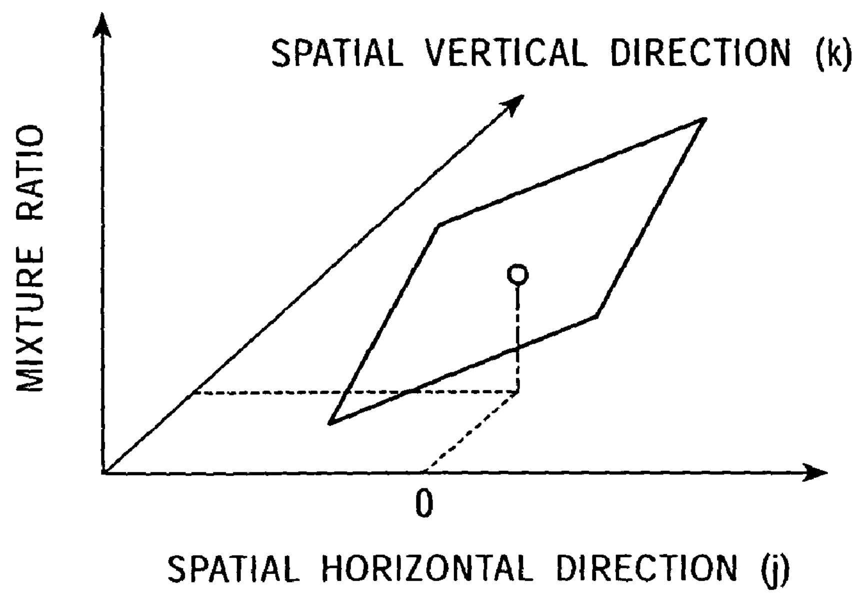
FIG. 71 is a diagram describing a plane approximating a mixture ratio α.

In FIG. 70 and FIG. 71, white circles indicate the pixel of interest. In FIG. 70, solid circles indicate pixels near the pixel of interest.

Multiple different mixture ratio α for multiple pixels are represented by two variables by approximating the mixture ratio α as in Expression (23). In the example shown in FIG. 70, five mixture ratios for five pixels are represented by two variables, i.e., the inclination l and the intercept p.

In the event of approximating the mixture ratio α in a planner manner shown in FIG. 71, taking the movement v corresponding to the two directions of the horizontal direction and the vertical direction of the image into consideration, the mixture ratio α is represented in Expression (24) by expanding Expression (23) onto a plane.

$$\alpha = jm + kq + p \tag{24}$$

In Expression (24), j is the index in the horizontal direction wherein the position of the pixel of interest is 0, and k is the index in the vertical direction. m is the inclination of the mixture ratio α in the horizontal direction, and q is the inclination of the plane of the mixture ratio α in the vertical direction. p is the intercept of the plane of the mixture ratio α.

For example, in the frame #n shown in FIG. 61, Expression (25) through Expression (27) hold with regard to C05 through C07, respectively.

$$C05 = \alpha 05 \cdot B05/v + f05 \tag{25}$$

$$C06 = \alpha 06 \cdot B06/v + f06 \tag{26}$$

$$C07 = \alpha 07 \cdot B07/v + f07 \tag{27}$$

Making an assumption that the foreground components generally agree, i.e., that F01 through F03 are the same, and that F01 through F03 are written as Fc, Expression (28) holds.

$$f(x) = (1 - \alpha(x)) \cdot Fc \tag{28}$$

In Expression (28), x denotes the position in the spatial direction.

Rewriting α(x) as Expression (24), Expression (28) may be represented as Expression (29).

$$\begin{aligned} f(x) &= (1 - (jm + kq + p)) \cdot Fc \\ &= j \cdot (-m \cdot Fc) + k \cdot (-q \cdot Fc) + ((1 - p) \cdot Fc) \\ &= js + kt + u \end{aligned} \tag{29}$$

In Expression (29), (−m·Fc), (−q·Fc), and (1−p)·Fc are rewritten as Expression (30) through Expression (32).

$$s = -m \cdot Fc \tag{30}$$

$$t = -q \cdot Fc \tag{31}$$

$$u = (1 - p) \cdot Fc \tag{32}$$

In Expression (29), j is the index in the horizontal direction wherein the position of pixel of interest is 0, and k is the index in the vertical direction.

As described above, since an assumption is made that the object corresponding to the foreground moves at a constant velocity within a shutter period, and the components corresponding to the foreground generally agree, the sum of the foreground components is approximated in Expression (29).

Note that in the event of approximating the mixture ratio α linearly, the sum of the foreground components may be represented in Expression (33).

$$f(x)=is+u \tag{33}$$

Rewriting the mixture ratio α and the sum of the foreground components in Expression (13) using Expression (24) and Expression (29), the pixel value M is represented in Expression (34).

$$\begin{aligned} M &= (jm+kq+p)\cdot B+js+kt+u \\ &= jB\cdot m+kB\cdot q+B\cdot p+j\cdot s+k\cdot t+u \end{aligned} \tag{34}$$

In Expression (34), the unknown variables are the six values of the inclination of the plane of the mixture ratio α in the horizontal direction, m, the inclination of the plane of the mixture ratio α in the vertical direction, q, the intercepts of the plane of the mixture ratio α, p, s, t, and u.

Setting the pixel value M and pixel value B for the normal equation represented in Expression (34) corresponding to the pixels near the pixel of interest, the mixture ratio α is calculated by solving multiple normal equations wherein the pixel value M and the pixel value B have been set, by the least square method.

For example, with the index j of the pixel of interest in the horizontal direction as 0, with the index k of the pixel of interest in the vertical direction as 0, and setting the pixel value M or the pixel value B for the normal equation represented in Expression (34) with regard to 3×3 pixels near the pixel of interest, Expression (35) through Expression (43) are obtained.

$$M_{-1,-1}=(-1)\cdot B_{-1,-1}\cdot m+(-1)\cdot B_{-1,-1}\cdot q+B_{-1,-1}\cdot p+(-1)\cdot s+(-1)\cdot t+u \tag{35}$$

$$M_{0,-1}=(0)\cdot B_{0,-1}\cdot m+(-1)\cdot B_{0,-1}\cdot q+B_{0,-1}\cdot p+(0)\cdot s+(-1)\cdot t+u \tag{36}$$

$$M_{+1,-1}=(+1)\cdot B_{+1,-1}\cdot m+(-1)\cdot B_{+1,-1}\cdot q+B_{+1,-1}\cdot p+(+1)\cdot s+(-1)\cdot t+u \tag{37}$$

$$M_{-1,0}=(-1)\cdot B_{-1,0}\cdot m+(0)\cdot B_{-1,0}\cdot q+B_{-1,0}\cdot p+(-1)\cdot s+(0)\cdot t+u \tag{38}$$

$$M_{0,0}=(0)\cdot B_{0,0}\cdot m+(0)\cdot B_{0,0}\cdot q+B_{0,0}\cdot p+(0)\cdot s+(0)\cdot t+u \tag{39}$$

$$M_{+1,0}=(+1)\cdot B_{+1,0}\cdot m+(0)\cdot B_{+1,0}\cdot q+B_{+1,0}\cdot p+(+1)\cdot s+(0)\cdot t+u \tag{40}$$

$$M_{-1,+1}=(-1)\cdot B_{-1,+1}\cdot m+(+1)\cdot B_{-1,+1}\cdot q+B_{-1,+1}\cdot p+(-1)\cdot s+(+1)\cdot t+u \tag{41}$$

$$M_{0,+1}=(0)\cdot B_{0,+1}\cdot m+(+1)\cdot B_{0,+1}\cdot q+B_{0,+1}\cdot p+(0)\cdot s+(+1)\cdot t+u \tag{42}$$

$$M_{+1,+1}=(+1)\cdot B_{+1,+1}\cdot m+(+1)\cdot B_{+1,+1}\cdot q+B_{+1,+1}\cdot p+(+1)\cdot s+(+1)\cdot t+u \tag{43}$$

Since the index of the pixel of interest in the horizontal direction, j, is 0, and the index in the vertical direction, k, is 0, the mixture ratio α of the pixel of interest is equal to the value wherein j=0 and k=0, from Expression (24), i.e., the intercept p.

Accordingly, the intercept p can be output as the mixture ratio α by calculating the inclination in the horizontal direction, m, the inclination in the vertical direction, q, the intercept p, s, t, and u, by the least square method, based upon the nine expressions of Expression (35) through Expression (43).

More specific procedures for calculating the mixture ratio α by applying the least square method will now be described.

Representing the index i and the index k with one index x, the relationship between the index i, the index k, and the index x, is represented in Expression (44).

$$x=(j+1)\cdot 3+(k+1) \tag{44}$$

The inclination in the horizontal direction, m, the inclination in the vertical direction, q, the intercept p, s, t, and u, are represented by variables, w0, w1, w2, w3, w4, and w5, respectively, and jB, kB, B, j, k, and l are represented by a0, a1, a2, a3, a4, and a5, respectively. Taking the margin of error ex into consideration, Expression (35) through Expression (43) are rewritten as Expression (45).

$$M_x=\sum_{y=0}^{5} ay\cdot wy+ex \tag{45}$$

In Expression (45), x denotes one of the integers between 0 and 8.

Expression (46) may be derived from Expression (45).

$$e_x=M_x-\sum_{y=0}^{5} ay\cdot wy \tag{46}$$

To apply the least square method, the sum of squares of margin of error E is defined as represented in Expression (47).

$$E=\sum_{x=0}^{8} ex^2 \tag{47}$$

To minimize the margin of error, the partial derivative of the squared-sum of the margin of error E from the variable Wv should be 0. Here v is one of the integers between 0 through 5. Accordingly, wy is calculated so as to satisfy Expression (48).

$$\begin{aligned} \frac{\partial E}{\partial wv} &= 2\cdot\sum_{x=0}^{8} ex\cdot\frac{\partial ex}{\partial wv} \\ &= 2\cdot\sum_{x=0}^{8} ex\cdot av = 0 \end{aligned} \tag{48}$$

Substituting Expression (46) for Expression (48), Expression (49) is obtained.

$$\sum_{x=0}^{8}\left(av\cdot\sum_{y=0}^{5}ay\cdot wy\right)=\sum_{x=0}^{8}av\cdot M_x \tag{49}$$

Applying, for example, the sweeping method (Gauss-Jordan elimination) and so forth, to the six expressions each of which is obtained by substituting-one of the integers between 0 and 5 for v in Expression (49), wy is calculated. As described above, w0 denotes the inclination in the horizontal direction, m, w1 denotes the inclination in the vertical direction, q, w2 denotes the intercept p, w3 denotes s, w4 denotes t, and w5 denotes u.

As described above, the inclination in the horizontal direction, m, the inclination in the vertical direction, q, the intercept p, s, t, and u may be obtained by applying the least square method to an expression wherein the pixel value M and the pixel value B have been set.

In the description corresponding to Expression (35) through Expression (43), while description has been made with the pixel value of the pixel included in the mixed region as M, and the pixel value of the pixel included in the background region as B, the normal equation needs to be formed for each case of the pixel of interest being included in the covered background region, and being included in the uncovered background region.

For example, in a case of obtaining the mixture ratio α of the pixel included in the covered background region of the frame #n shown in FIG. 61, the pixels of the frame #n, C04 through C08, and the pixel values of the pixels of the frame #n−1, P04 through P08, are set for the normal equation.

In a case of obtaining the mixture ratio α of the pixel included in the uncovered background region of the frame #n shown in FIG. 62, the pixels of the frame #n, C28 through C32, and the pixel values of the pixels of the frame #n+1, N28 through N32, are set for the normal equation.

Also, for example, in the event of calculating the mixture ratio α of the pixel included in the covered background region shown in FIG. 72, Expression (50) through Expression (58) shown below may be formed. The pixel value of the pixel for calculation of the mixture ratio α is Mc5.

$$Mc1=(-1)\cdot Bc1\cdot m+(-1)\cdot Bc1\cdot q+Bc1\cdot p+(-1)\cdot s+(-1)\cdot t+u \tag{50}$$

$$Mc2=(0)\cdot Bc2\cdot m+(-1)\cdot Bc2\cdot q+Bc2\cdot p+(0)\cdot s+(-1)\cdot t+u \tag{51}$$

$$Mc3=(+1)\cdot Bc3\cdot m+(-1)\cdot Bc3\cdot q+Bc3\cdot p+(+1)\cdot s+(-1)\cdot t+u \tag{52}$$

$$Mc4=(-1)\cdot Bc4\cdot m+(0)\cdot Bc4\cdot q+Bc4\cdot p+(-1)\cdot s+(0)\cdot t+u \tag{53}$$

$$Mc5=(0)\cdot Bc5\cdot m+(0)\cdot Bc5\cdot q+Bc5\cdot p+(0)\cdot s+(0)\cdot t+u \tag{54}$$

$$Mc6=(+1)\cdot Bc6\cdot m+(0)\cdot Bc6\cdot q+Bc6\cdot p+(+1)\cdot s+(0)\cdot t+u \tag{55}$$

$$Mc7=(-1)\cdot Bc7\cdot m+(+1)\cdot Bc7\cdot q+Bc7\cdot p+(-1)\cdot s+(+1)\cdot t+u \tag{56}$$

$$Mc8=(0)\cdot Bc8\cdot m+(+1)\cdot Bc8\cdot q+Bc8\cdot p+(0)\cdot s+(1)\cdot t+u \tag{57}$$

$$Mc9=(+1)\cdot Bc9\cdot m+(+1)\cdot Bc9\cdot q+Bc9\cdot p+(+1)\cdot s+(+1)\cdot t+u \tag{58}$$

In the event of calculating the mixture ratio α of the pixel included in the covered background region in the frame #n, the pixel values Bc1 through Bc9 of the pixels in the background region in the frame #n−1 corresponding to the pixels in the frame #n, are used in Expression (50) through Expression (58).

Figure 72:
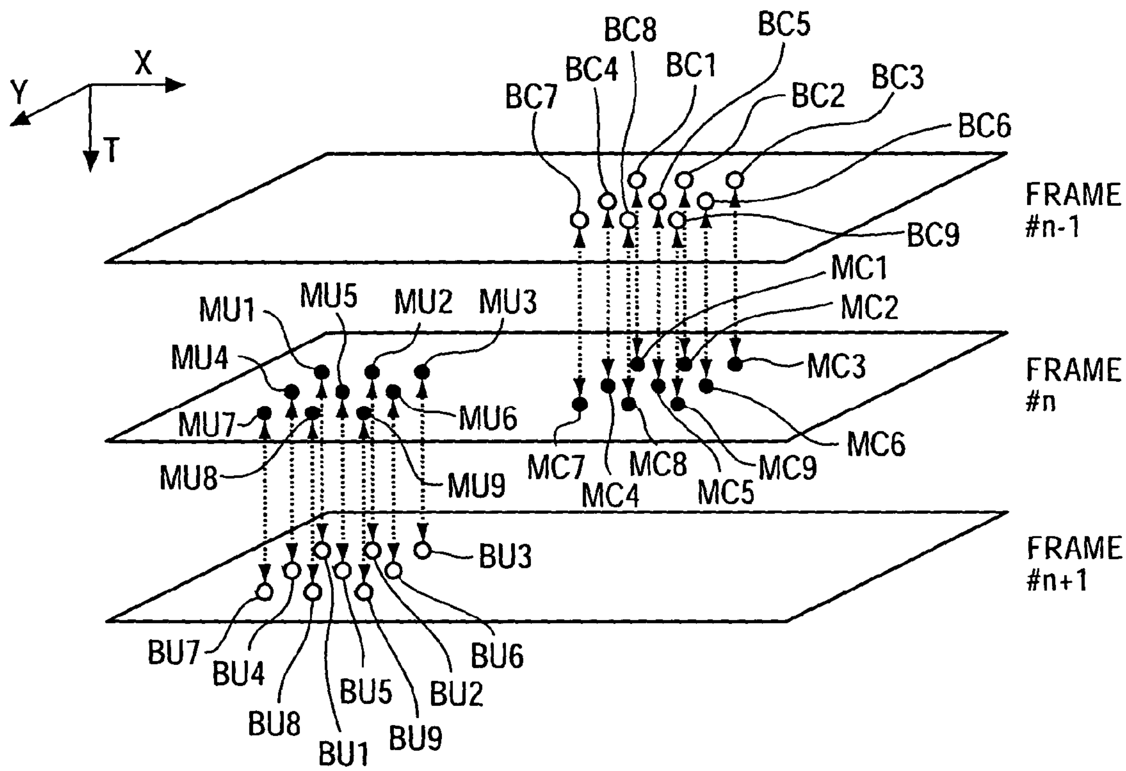
FIG. 72 is a diagram describing how pixels in multiple frames correspond at the time of calculating the mixture ratio α.

In FIG. 72, white circles indicate the pixels which are regarded as backgrounds, and solid circles indicate the pixels which are regarded as pixels in the mixed region.

In the event of calculating the mixture ratio α of the pixel included in the uncovered background region shown in FIG. 72, Expression (59) through Expression (67) described below may be formed. The pixel value of the pixel for calculation of the mixture ratio α is Mu5.

$$Mu1=(-1)\cdot Bu1\cdot m+(-1)\cdot Bu1\cdot q+Bu1\cdot p+(-1)\cdot s+(-1)\cdot t+u \tag{59}$$

$$Mu2=(0)\cdot Bu2\cdot m+(-1)\cdot Bu2\cdot q+Bu2\cdot p+(0)\cdot s+(-1)\cdot t+u \tag{60}$$

$$Mu3=(+1)\cdot Bu3\cdot m+(-1)\cdot Bu3\cdot q+Bu3\cdot p+(+1)\cdot s+(-1)\cdot t+u \tag{61}$$

$$Mu4=(-1)\cdot Bu4\cdot m+(0)\cdot Bu4\cdot q+Bu4\cdot p+(-1)\cdot s+(0)\cdot t+u \tag{62}$$

$$Mu5=(0)\cdot Bu5\cdot m+(0)\cdot Bu5\cdot q+Bu5\cdot p+(0)\cdot s+(0)\cdot t+u \tag{63}$$

$$Mu6=(+1)\cdot Bu6\cdot m+(0)\cdot Bu6\cdot q+Bu6\cdot p+(+1)\cdot s+(0)\cdot t+u \tag{64}$$

$$Mu7=(-1)\cdot Bu7\cdot m+(+1)\cdot Bu7\cdot q+Bu7\cdot p+(-1)\cdot s+(+1)\cdot t+u \tag{65}$$

$$Mu8=(0)\cdot Bu8\cdot m+(+1)\cdot Bu8\cdot q+Bu8\cdot p+(0)\cdot s+(1)\cdot t+u \tag{66}$$

$$Mu9=(+1)\cdot Bu9\cdot m+(+1)\cdot Bu9\cdot q+Bu9\cdot p+(+1)\cdot s+(+1)\cdot t+u \tag{67}$$

In the event of calculating the mixture ratio α of the pixel included in the uncovered background region in the frame #n, the pixel values Bu1 through Bu9 of the pixels in the background region in the frame #n+1 corresponding to the pixels in the frame #n, are used in Expression (59) through Expression (67).

Figure 73:
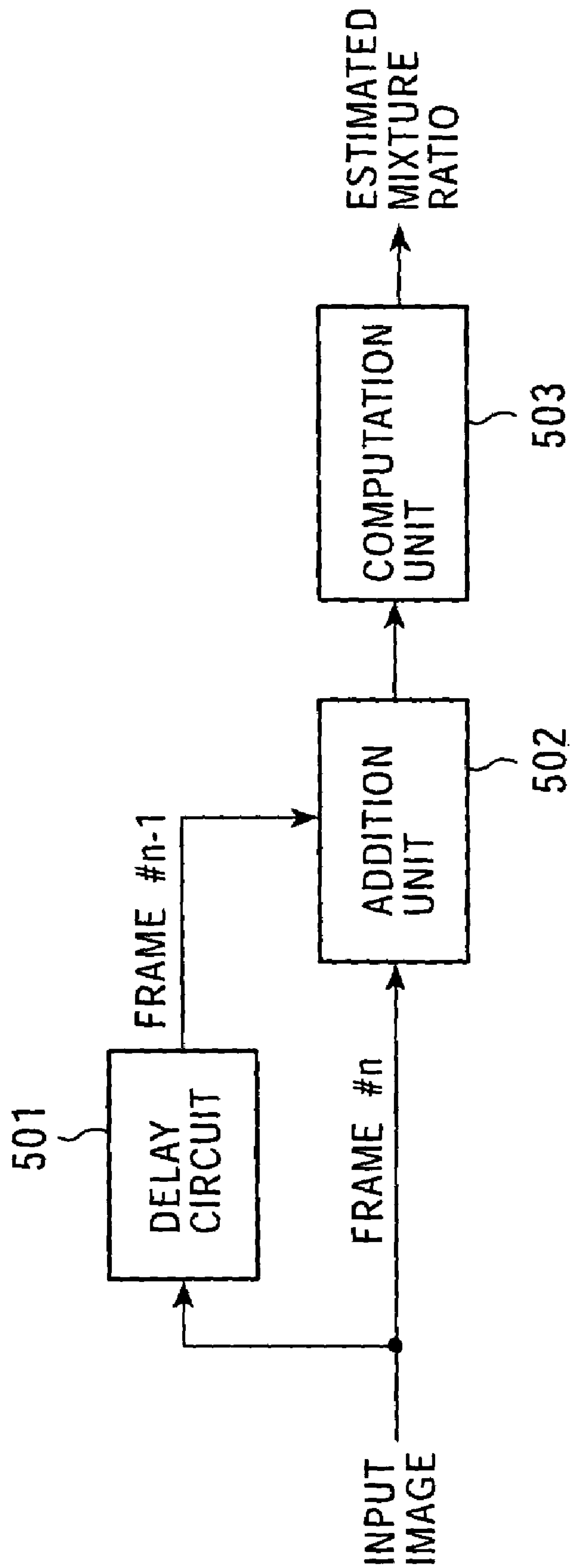
FIG. 73 is a block diagram illustrating another configuration of the mixture ratio estimation processing unit 401.

FIG. 73 is a block diagram which illustrates the configuration of the estimated mixture ratio processing unit 401. The image input to the estimated mixture ratio processing unit 401 is supplied to a delay circuit 501 and an addition unit 502.

The delay circuit 501 delays the input image by one frame, and supplies to the addition unit 502. At the point that the frame #n is input to the addition unit 502 as an input image, the delay circuit 501 supplies the frame #n−1 to the addition unit 502.

The addition unit 502 sets the pixel values of the pixels near the pixel for calculation of the mixture ratio α, and the pixel values of the frame #n−1, for the normal equation. For example, the addition unit 502 sets the pixel values Mc1 through Mc9, and the pixel values Bc1 through Bc9 for the normal equation based upon Expression (50) through Expression (58). The addition unit 502 supplies the normal equation for which the pixel values have been set, to a computation unit 503.

The computation unit 503 obtains the estimated mixture ratio by solving the normal equation supplied from the addition unit 502 by the sweeping method or the like, and outputs the obtained estimated mixture ratio.

As described above, the estimated mixture ratio processing unit 401 can calculate the estimated mixture ratio based upon the input image, and supply to the mixture ratio decision unit 403.

Note that the estimated mixture ratio processing unit 402 has the same configuration as the estimated mixture ratio processing unit 401, and accordingly description thereof will be omitted.

Figure 74:
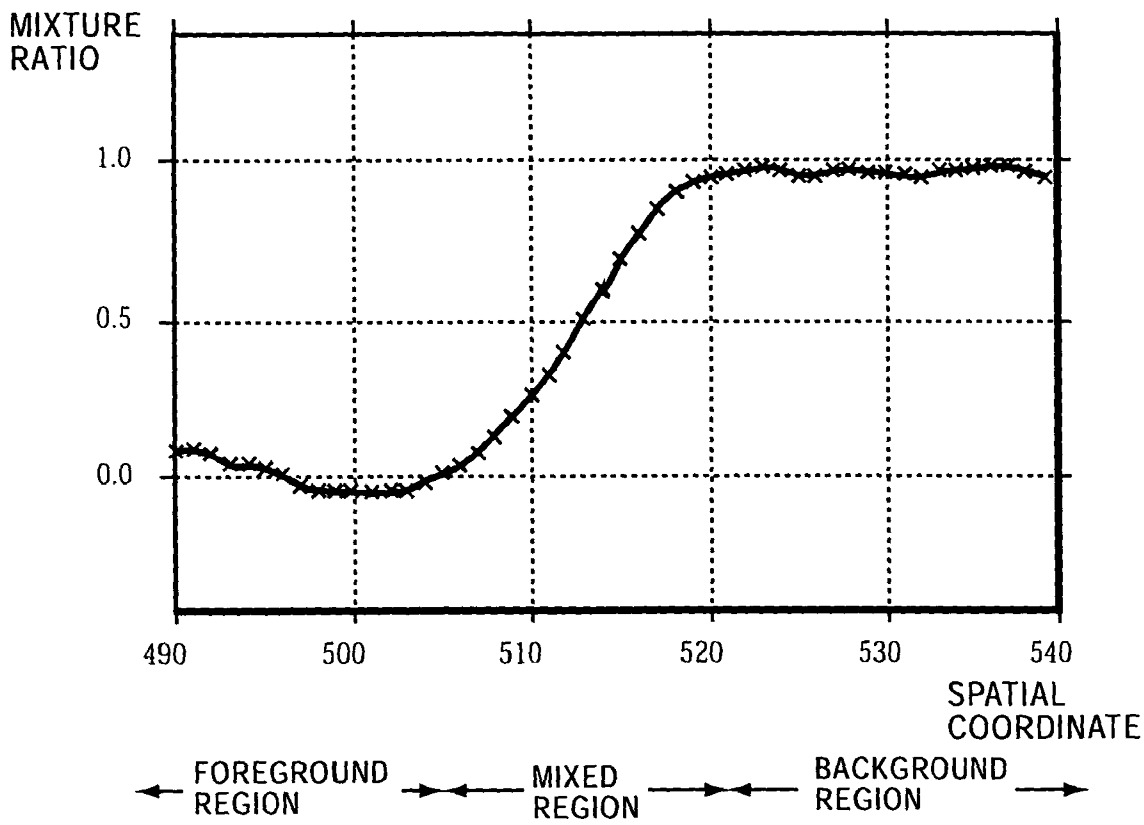
FIG. 74 is a diagram illustrating an example of an estimated mixture ratio.

FIG. 74 is a diagram which illustrates an example of the estimated mixture ratio calculated by the estimated mixture ratio processing unit 401. FIG. 74 illustrates the estimated mixture ratio with regard to one line, wherein the movement v of the foreground corresponding to the object which moves at a constant velocity is 11, and the results are calculated by the expression generated in increments of blocks 7×7 pixels.

It can be understood that the estimated mixture ratio changes generally linearly in the mixed region as shown in FIG. 60.

The mixture ratio decision unit 403 sets the mixture ratio based upon the region information indicating which of the foreground region, the background region, the covered background region, or the uncovered background region the pixel for calculation of the mixture ratio belongs to, supplied from the region specifying unit 101. In the event that the pixel which is the object belongs to the foreground region, the mixture ratio decision unit 403 sets the mixture ratio to 0, in the event that the pixel which is the object belongs to the background region, sets the mixture ratio to 1, in the event that the pixel which is the object belongs to the covered background region, sets the mixture ratio to the estimated mixture ratio supplied from the estimated mixture ratio processing unit 401, and in the event that the pixel which is the object belongs to the uncovered background region, sets the mixture ratio to the estimated mixture ratio supplied from the estimated mixture ratio processing unit 402. The mixture ratio decision unit 403 outputs the mixture ratio which is set based upon the region information.

Referring to the flowchart shown in FIG. 75, the processing for calculation of the mixture ratio by the mixture ratio calculating unit 102 in a case that the estimated mixture ratio processing unit 401 has a configuration shown in FIG. 73 will be described. In Step S501, the mixture ratio calculating unit 102 obtains the region information supplied from the region specifying unit 101. In Step S502, the estimated mixture ratio processing unit 401 performs the processing of mixture ratio estimation by a model corresponding to the covered background region, and supplies the estimated mixture ratio to the mixture ratio decision unit 403. Details of the processing for mixture ratio estimation will be described later with reference to the flowchart shown in FIG. 76.

In Step S503, the estimated mixture ratio processing unit 402 performs the processing of mixture ratio estimation by a model corresponding to the uncovered background region, and supplies the estimated mixture ratio to the mixture ratio decision unit 403.

In Step S504, the mixture ratio calculating unit 102 judges whether or not the mixture ratio has been estimated for the entire frame, and in the event that judgment is made that the mixture ratio has not been estimated for the entire frame, the flow returns to Step S502, and the processing of mixture ratio estimation for the following pixel is performed.

In Step S504, in the event that judgment is made that the mixture ratio has been estimated for the entire frame, the flow proceeds to Step S505, and the mixture ratio decision unit 403 sets the mixture ratio based upon the region information which indicates which of the foreground region, the background region, the covered background region, or the uncovered background region the pixel of calculation of the mixture ratio belongs to, supplied from the region specifying unit 101. In the event that the pixel which is the object belongs to the foreground region, the mixture ratio decision unit 403 sets the mixture ratio to 0, in the event that the pixel which is the object belongs to the background region, sets the mixture ratio to 1, in the event that the pixel which is the object belongs to the covered background region, sets the mixture ratio to the estimated mixture ratio supplied from the estimated mixture ratio processing unit 401, and in the event that the pixel which is the object belongs to the uncovered background region, sets the mixture ratio to the estimated mixture ratio supplied from the estimated mixture ratio processing unit 402, and processing ends.

As described above, the mixture ratio calculating unit 102 can calculate the mixture ratio α which is the amount of features corresponding to each pixel based upon the region information supplied from the region specifying unit 101 and the input image.

Using the mixture ratio α enables the separation of the foreground components and the background components contained in the pixel value while leaving the information of movement blurring contained in the image corresponding to the moving object.

Also, synthesizing an image based upon the mixture ratio α enables creation of an image containing accurate movement blurring corresponding to the speed of the object which moves as if image taking of the real world had been performed again.

The processing for the mixture ratio estimation by a model corresponding to the covered background region, which corresponds to Step S502 shown in FIG. 75, will now be described with reference to the flowchart shown in FIG. 76.

In Step S521, the addition unit 502 sets the pixel values contained in the input image and the pixels contained the image supplied from the delay circuit 501 for the normal equation corresponding to a model of the covered background region.

In Step S522, the estimated mixture ratio processing unit 401 judges whether or not setting of the pixel which is the object has ended, and in the event that judgment is made that the setting for the pixel which is the object has not ended, the flow returns to Step S521, and the processing of setting of the pixel value for the normal equation is repeated.

In Step S522, in the event that judgment is made that setting of pixel values with regard to the pixel which is the object has ended, the flow proceeds to Step S523, and the computation unit 503 computes the estimated mixture ratio based upon the normal equation which the pixel values have been set for, and outputs the obtained estimated mixture ratio.

As described above, the estimated mixture ratio processing unit 401 can computes the estimated mixture ratio based upon the input image.

Figure 75:
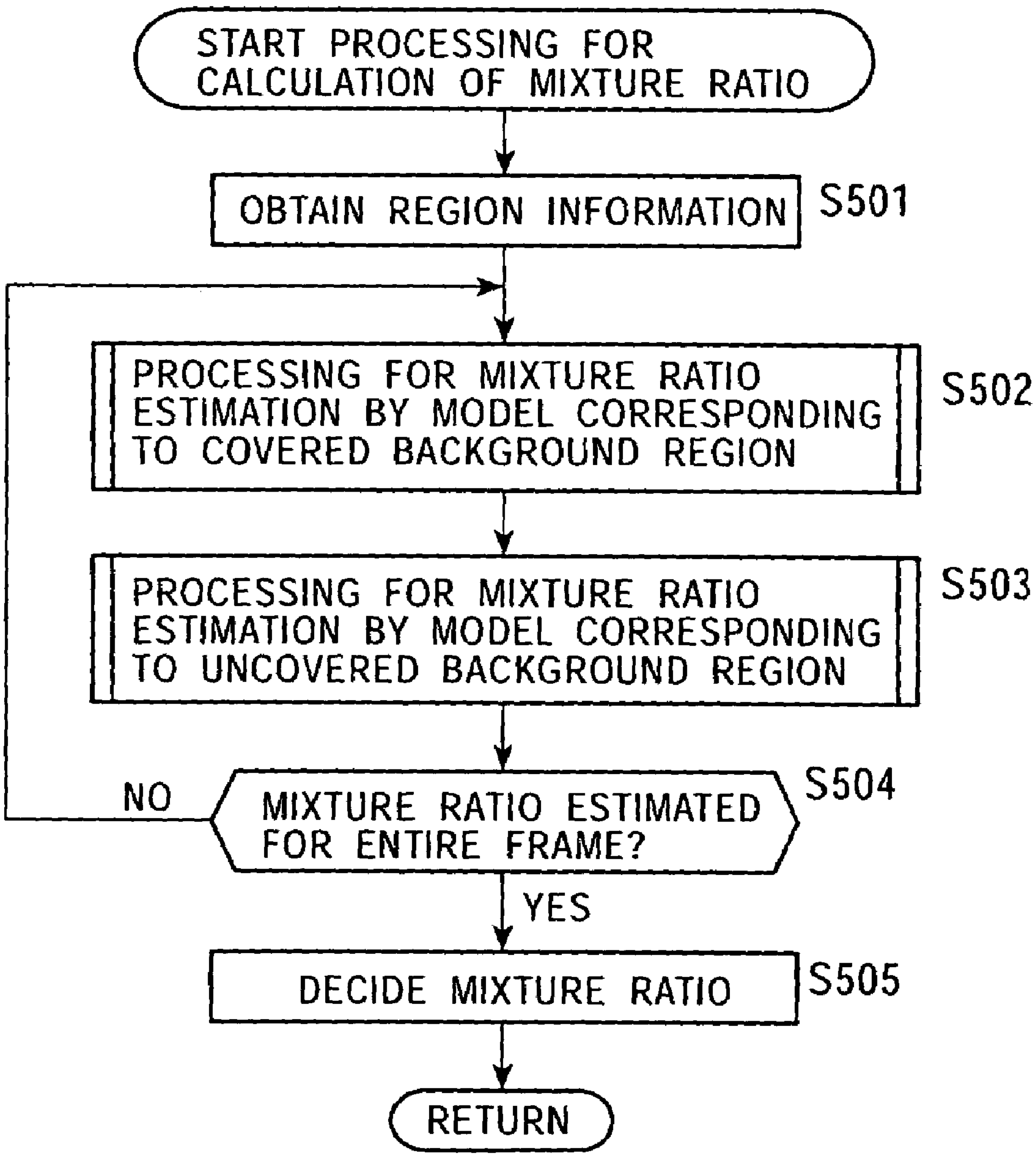
FIG. 75 is a flowchart explaining the processing for calculating mixture ratio.
Figure 76:
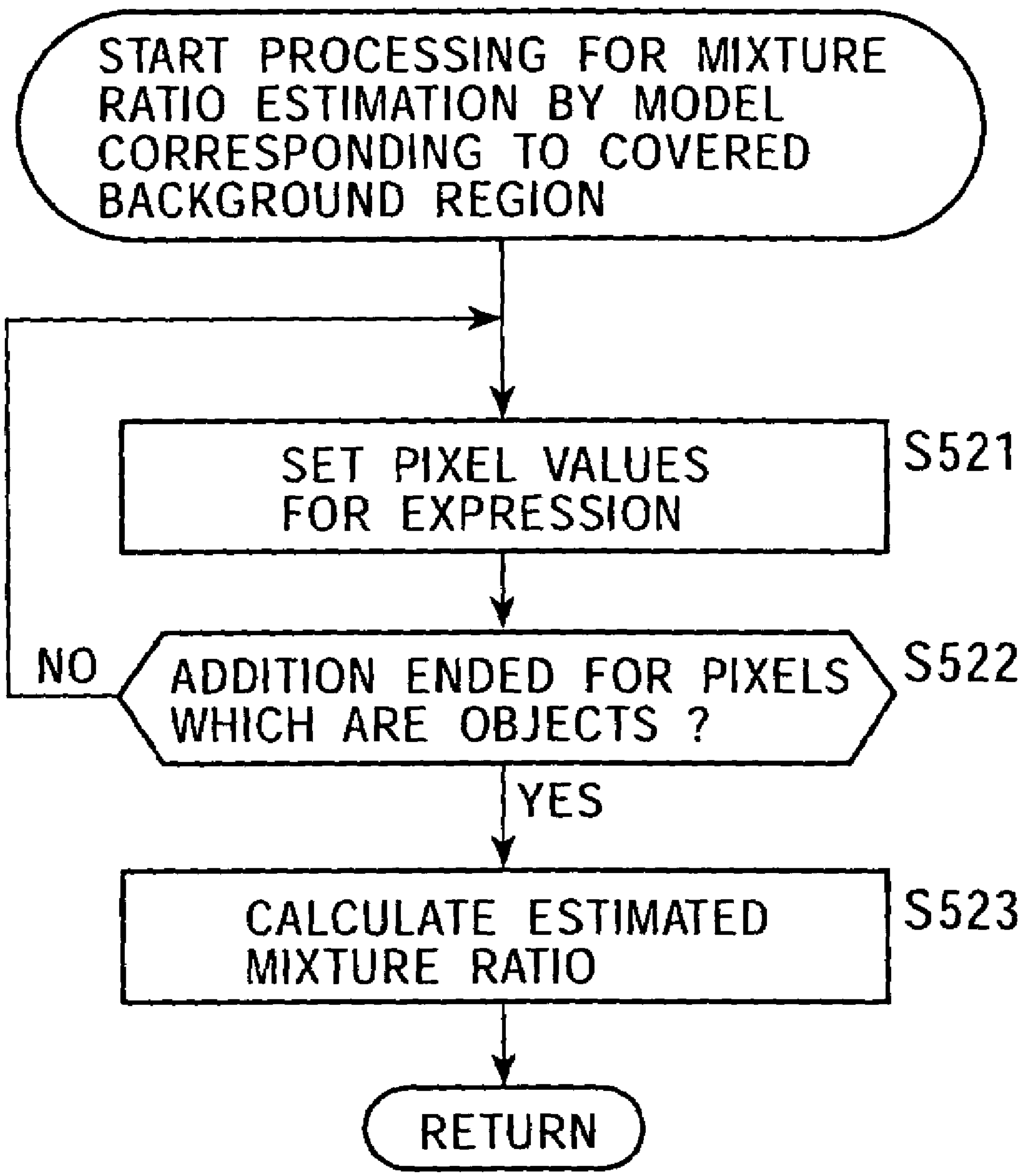
FIG. 76 is a flowchart describing the processing for mixture ratio estimation by way of a model corresponding to a covered background region.

The processing for mixture ratio estimation by a model corresponding to the uncovered background region in Step S153 shown in FIG. 75 is the same as the processing shown in the flowchart in FIG. 76 using the normal equation corresponding to a model of the uncovered background region, and accordingly, description thereof will be omitted.

Note that while description has been made with an assumption that the object corresponding to the background keeps still, the processing of obtaining the mixture ratio described above may be applied even if the image corresponding to the background contains movement. For example, in the event that the image corresponding to the background region moves uniformly, the estimated mixture ratio processing unit 401 shifts the entire image corresponding to the movement, and performs processing in the same manner as a case wherein the object corresponding to the background keeps still. Also, in the event that the image corresponding to the background contains different movement at each local position, the estimated mixture ratio processing unit 401 selects pixels corresponding to the movement as pixels corresponding to pixels belonging to the mixed region, and performs the above-described processing.

Figure 77:
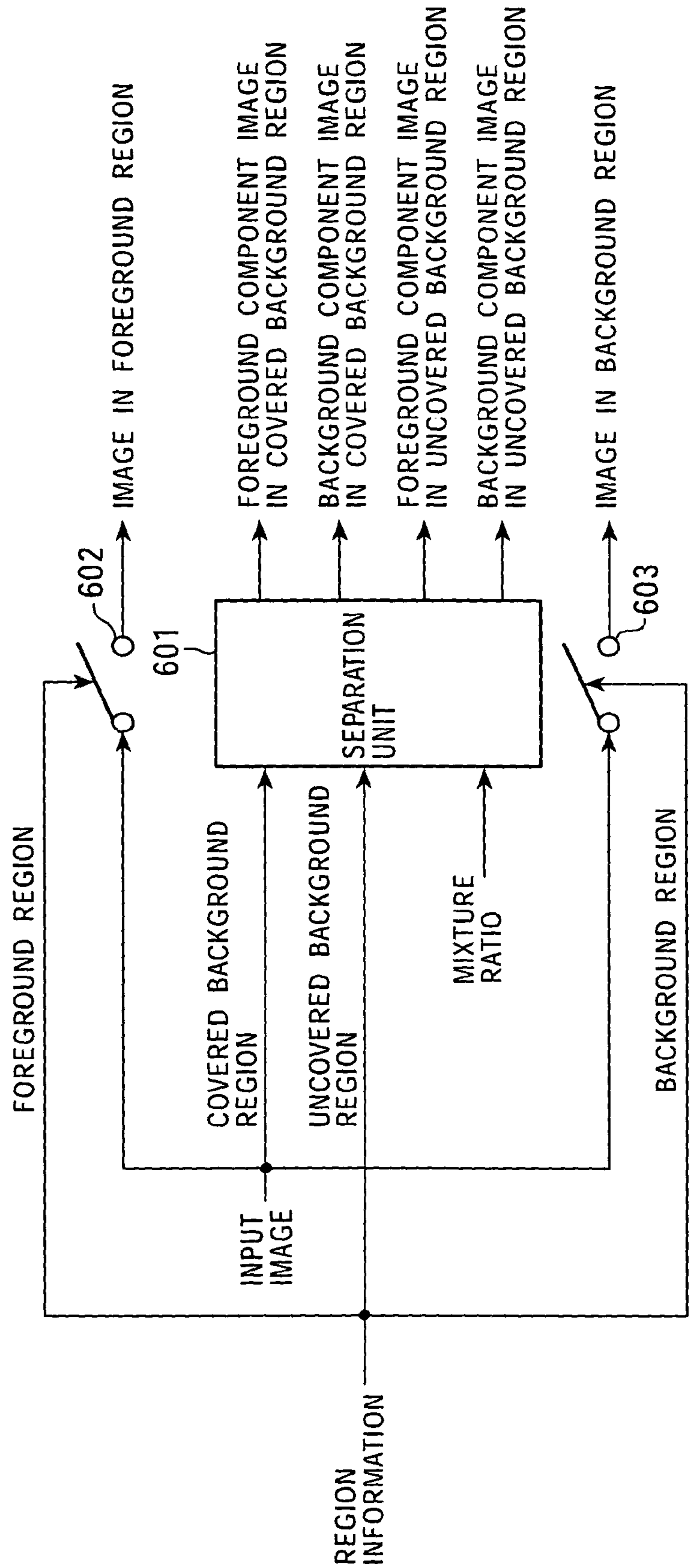
FIG. 77 is a block diagram illustrating an example of the configuration of a foreground/background separation unit 105.

The foreground/background separation unit 105 will now be described. FIG. 77 is a block diagram which illustrates an example of the configuration of the foreground/background separation unit 105. The input image supplied to the foreground/background separation unit 105 is supplied to a separation unit 601, a switch 602, and a switch 603. The region information indicating the covered background region and the uncovered background region, which is supplied from the region specifying unit 103, is supplied to the separation unit 601. The region information indicating the foreground region is supplied to the switch 602. The region information indicating the background region is supplied to the switch 603.

The mixture ratio α supplied from the mixture ratio calculation unit 104 is supplied to the separation unit 601.

The separation unit 601 separates the background components from the covered background region in the input image, as well as foreground components, based upon the region information which indicates the covered background region and the mixture ratio α, and outputs the foreground component image in the covered background region which consists of the separated foreground components, and the background component image in the covered background region which consists of the separated background components.

The separation unit 601 separates the background components from the uncovered background region in the input image, as well as foreground components, based upon the region information which indicates the uncovered background region and the mixture ratio α, and outputs the foreground component image in the uncovered background region which consists of the separated foreground components, and the background component image in the uncovered background region which consists of the separated background components.

In the event of inputting the pixel corresponding to the foreground region, the switch 602 is closed based upon the region information which indicates the foreground region, and outputs the image in the foreground region.

In the event of inputting the pixel corresponding to the background region, the switch 603 is closed based upon the region information which indicates the background region, and outputs the image in the background region.

Figure 78A:
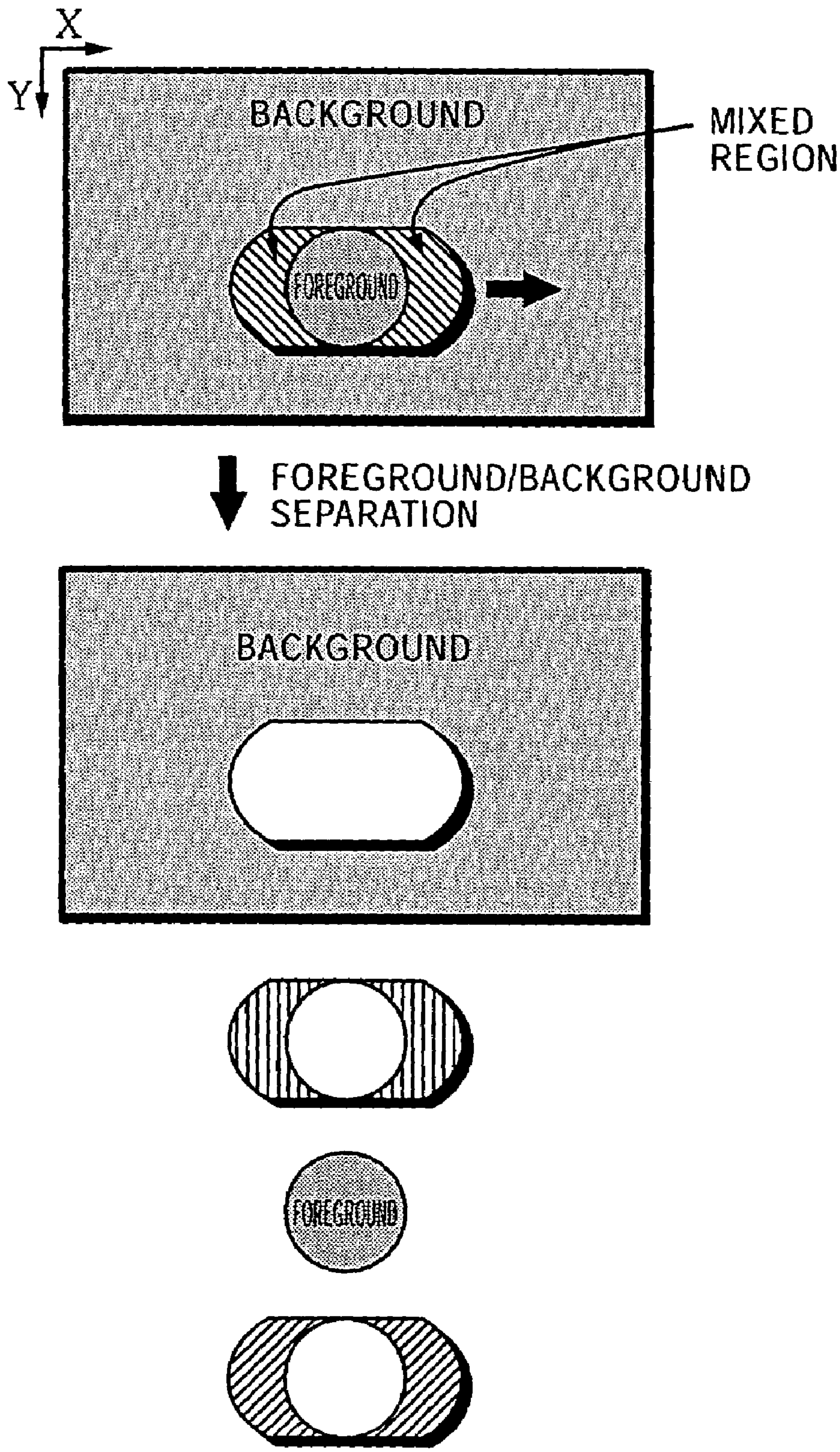
FIG. 78A is a diagram illustrating an input image, foreground region image, background region image, foreground component image, and background component image.
Figure 78B:
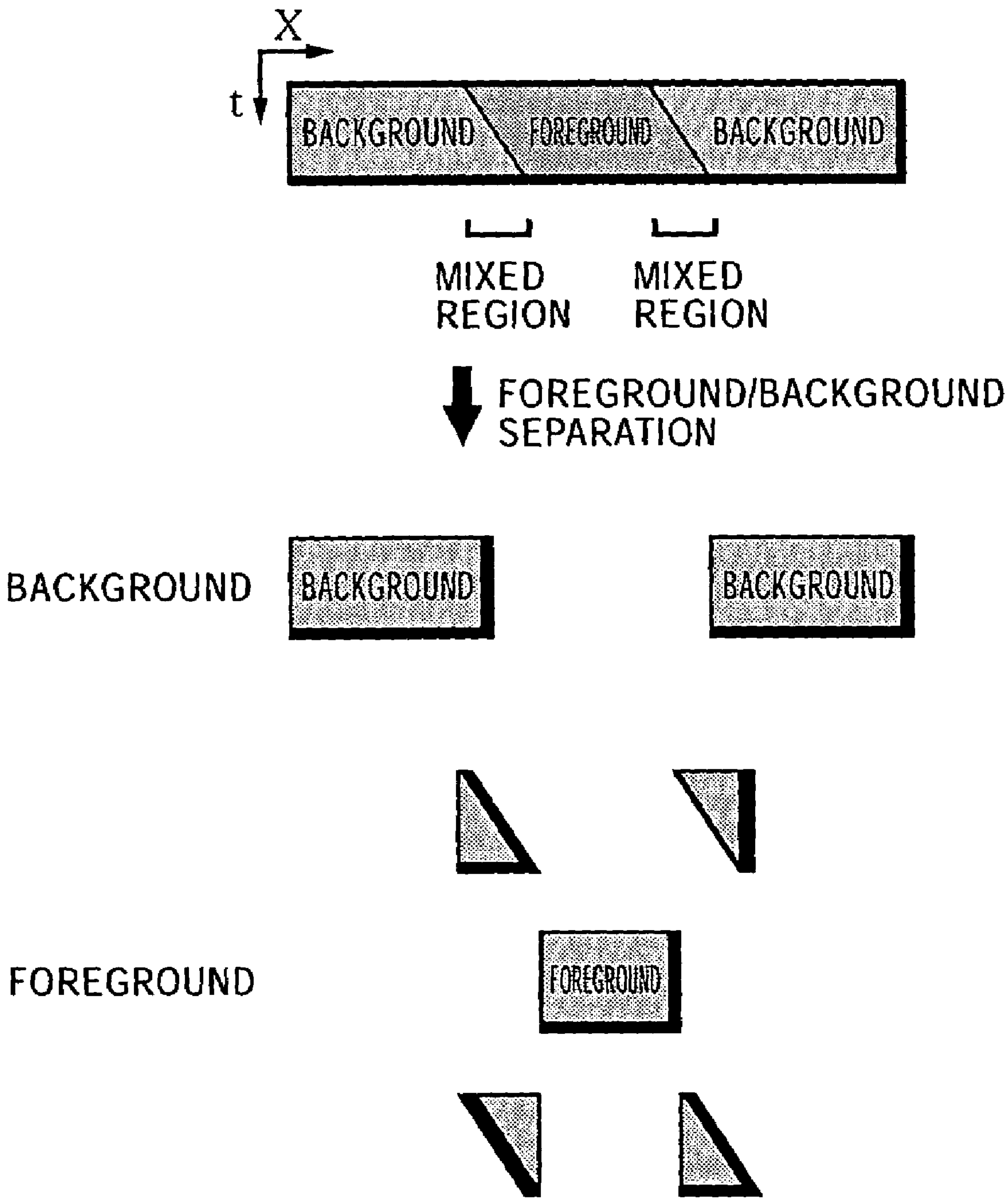
FIG. 78B is a model diagram corresponding to an input image, foreground region image, background region image, foreground component image, and background component image.

FIGS. 78A and FIG. 78B are diagrams which illustrate the input image input to the foreground/background separation unit 105, and the foreground component image and the background component image, output from the foreground/background separation unit 105.

FIG. 78A is a schematic diagram which illustrates the displayed image, and FIG. 78B is a model diagram wherein one line of pixels including pixels belonging to the foreground region, pixels belonging to the background region, and pixels belonging to the mixed region, corresponding to FIG. 78A, develop over the time direction.

As shown in FIGS. 78A and 78B, the image in the background region output from the foreground/background separation unit 105 is made up of pixels belonging to the background region.

As shown in FIGS. 78A and 78B, the image in the foreground region output from the foreground/background separation unit 105 is made up of pixels belonging to the foreground region.

The pixel value of the pixel in the uncovered background region is separated into the background components and the foreground components by the foreground/background separation unit 105. The separated background components make up the background component image in the uncovered background region, and the separated foreground components make up the foreground component image in the uncovered background region.

The pixel value of the pixel in the covered background region is separated into the background components and the foreground components by the foreground/background separation unit 105. The separated background components make up the background component image in the covered background region, and the separated foreground components make up the foreground component image in the covered background region.

A description will now be made regarding the separation processing for the foreground components and the background components from the pixel belonging to the mixed region performed by the separation unit 601.

Figure 79:
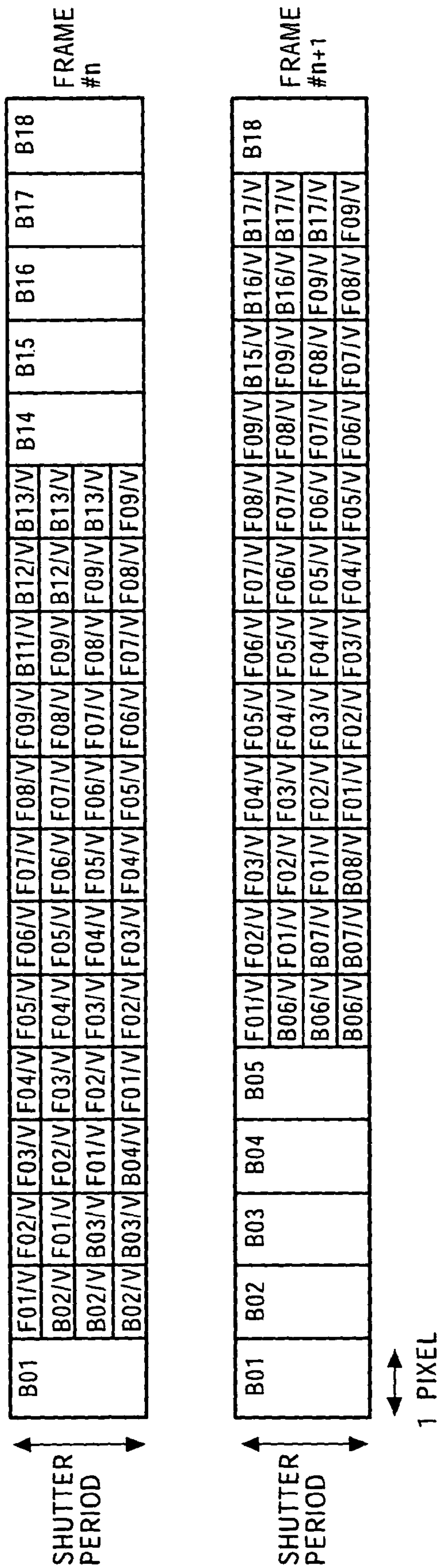
FIG. 79 is a model diagram wherein the pixel values are developed over the time direction, and periods corresponding to shutter time are divided.

FIG. 79 is a model of an image which indicates two frames of the foreground components and the background components, including the foreground corresponding to the object which moves from the left to the right in the drawing. In the model of the image shown in FIG. 79, the movement amount v of the foreground is 4, and the virtual dividing number is 4.

In the frame #n, the left-most pixel and the fourteenth through eighteenth pixels from the left are made up of only the background components, and belong to the background region. In the frame #n, the second through fourth pixels from the left are made up of the background components and the foreground components, and belong to the uncovered background region. In the frame #n, the eleventh through thirteenth pixels from the left are made up of the background components and the foreground components, and belong to the covered background region. In the frame #n, the fifth through tenth pixels from the left are made up of only the foreground components, and belong to the foreground region.

In the frame #n+1, the first through fifth pixels from the left and the eighteenth pixel from the left are made up of only the background components, and belong to the background region. In the frame #n+1, the sixth through eighth pixels from the left contain the background components and the foreground components, and belong to the uncovered background region. In the frame #n+1, the fifteenth through seventeenth pixels from the left contain the background components and the foreground components, and belong to the covered background region. In the frame #n+1, the ninth through fourteen pixels from the left are made up of only the foreground components, and belong to the foreground region.

Figure 80:
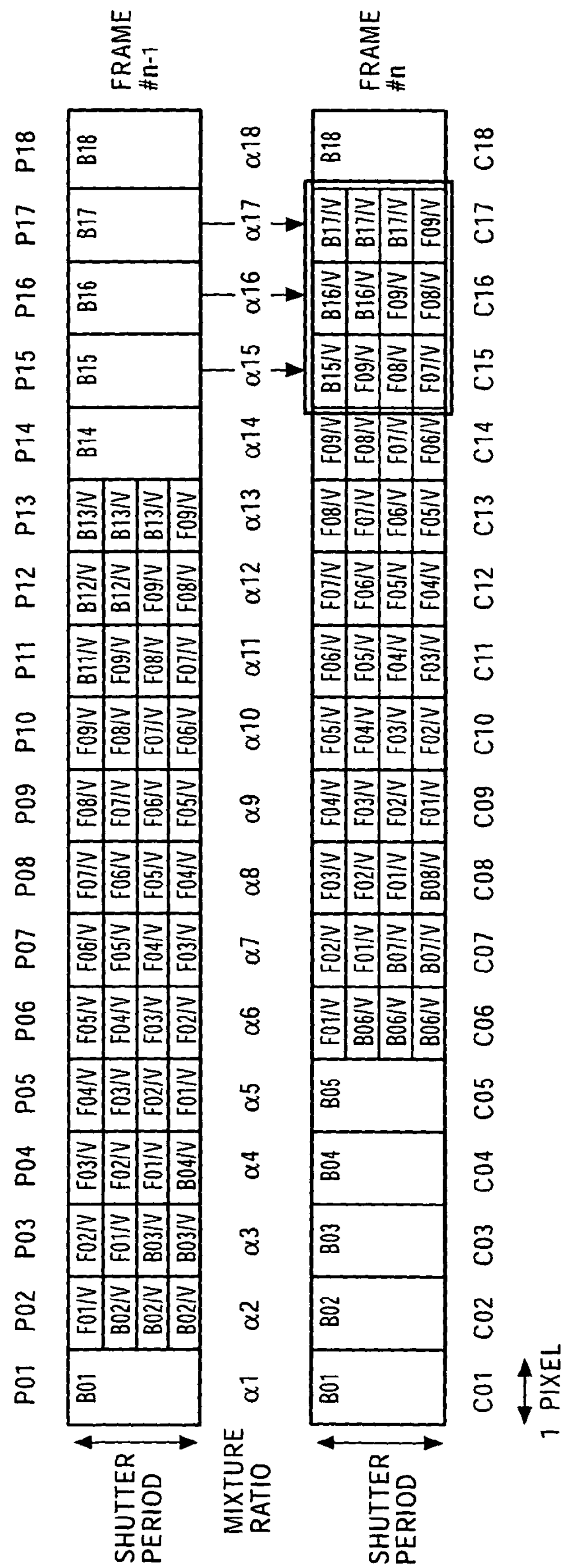
FIG. 80 is a model diagram wherein the pixel values are developed over the time direction, and periods corresponding to shutter time are divided.

FIG. 80 is a diagram which describes the processing for separation of the foreground components from the pixel belonging to the covered background region. In FIG. 80, α1 through α18 are the mixture ratios corresponding to the pixels in the frame #n, respectively. In FIG. 80, the fifteenth through seventeenth pixels from the left belong to the covered background region.

The pixel value C15 of the fifteenth pixel from the left in the frame #n is represented in Expression (68).

$$\begin{aligned} C15 &= B15/v + F09/v + F08/v + F07/v \\ &= \alpha 15 \cdot B15 + F09/v + F08/v + F07/v \\ &= \alpha 15 \cdot P15 + F09/v + F08/v + F07/v \end{aligned} \tag{68}$$

Here, α15 denotes the mixture ratio of the fifteenth pixel from the left in the frame #n. P15 denotes the pixel value of the fifteenth pixel from the left in the frame #n−1.

The sum f15 of the foreground components of the fifteenth pixel from the left in the frame #n is represented in Expression (69) based upon Expression (68).

$$\begin{aligned} f15 &= F09/v + F08/v + F07/v \\ &= C15 - \alpha 15 \cdot P15 \end{aligned} \tag{69}$$

Similarly, the sum f16 of the foreground components of the sixteenth pixel from the left in the frame #n is represented in Expression (70), and the sum f17 of the foreground components of the seventeenth pixel from the left in the frame #n is represented in Expression (71).

$$f16=C16-\alpha16\cdot P16 \tag{70}$$

$$f17=C17-\alpha17\cdot P17 \tag{71}$$

As described above, the foreground component fc contained in the pixel value C of the pixel belonging to the covered background region is calculated by Expression (72).

$$fc=C-\alpha\cdot P \tag{72}$$

P denotes the pixel value of the corresponding pixel in the previous frame.

Figure 81:
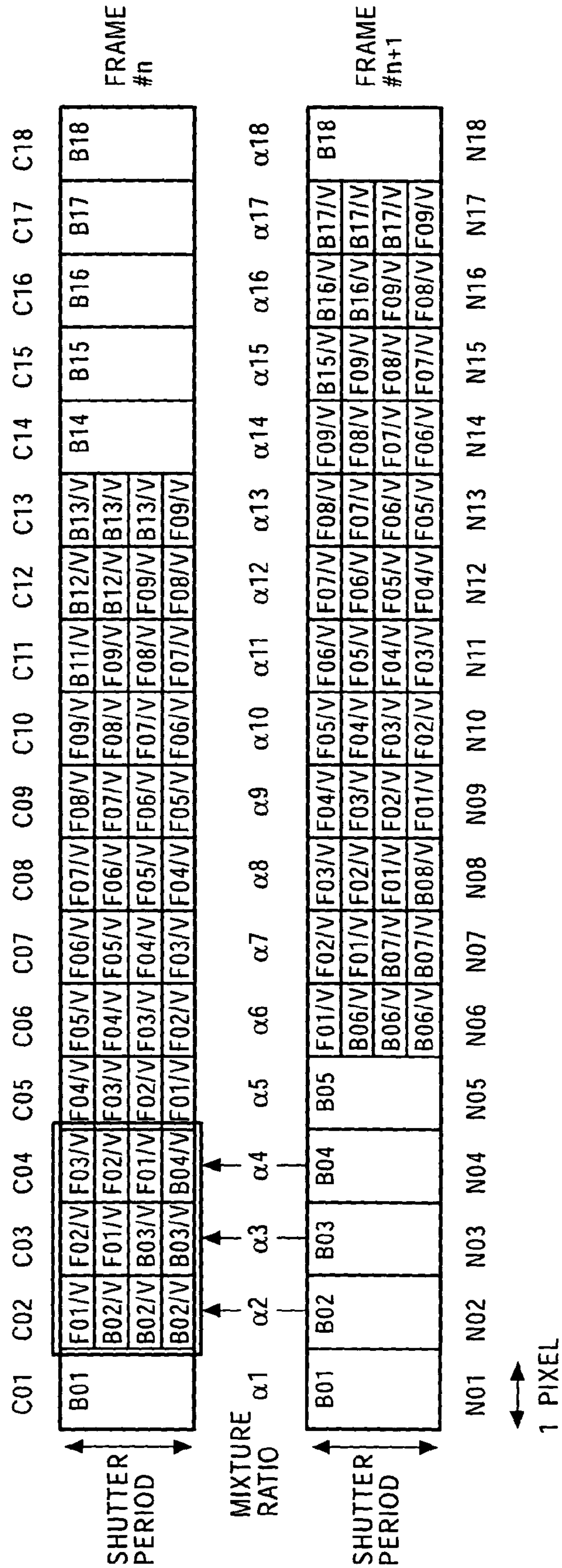
FIG. 81 is a model diagram wherein the pixel values are developed over the time direction, and periods corresponding to shutter time are divided.

FIG. 81 is a diagram which describes the processing for separating the foreground components from the pixel belonging to the uncovered background region. In FIG. 81, α1 through α18 denote the mixture ratio corresponding to the pixels in the frame #n, respectively. In FIG. 81, the second through fourth pixels from the left belong to the uncovered background region.

The pixel value C02 of the second pixel from the left in the frame #n is represented in Expression (73).

$$\begin{aligned} C02 &= B02/v + B02/v + B02/v + F01/v \\ &= \alpha2\cdot B02 + F01/v \\ &= \alpha2\cdot N02 + F01/v \end{aligned} \tag{73}$$

Here, α2 denotes the mixture ratio of the second pixel from the left in the frame #n. N02 denotes the pixel value of the second pixel from the left in the frame #n+1.

The foreground component sum of the second pixel from the left in the frame #n, f02, is represented in Expression (74) based upon Expression (73).

$$\begin{aligned} f02 &= F01/v \\ &= C02 - \alpha2\cdot N02 \end{aligned} \tag{74}$$

Similarly, the foreground component sum of the third pixel from the left in the frame #n, f03, is represented in Expression (75), and the foreground component sum of the fourth pixel from the left in the frame #n, f04, is represented in Expression (76).

$$f03=C03-\alpha3\cdot N03 \tag{75}$$

$$f04=C04-\alpha4\cdot N04 \tag{76}$$

As described above, the foreground component fu contained in the pixel value C of the pixel belonging to the uncovered background region is calculated by Expression (77).

$$fu=C-\alpha\cdot N \tag{77}$$

N denotes the pixel value of the corresponding pixel in the following frame.

As described above, the separation unit 601 can separate the foreground components and the background components from the pixel belonging to the mixed region based upon the information indicating the covered background region and the information indicating the uncovered background region, which is included in the region information, and the mixture ratio α for each pixel.

Figure 82:
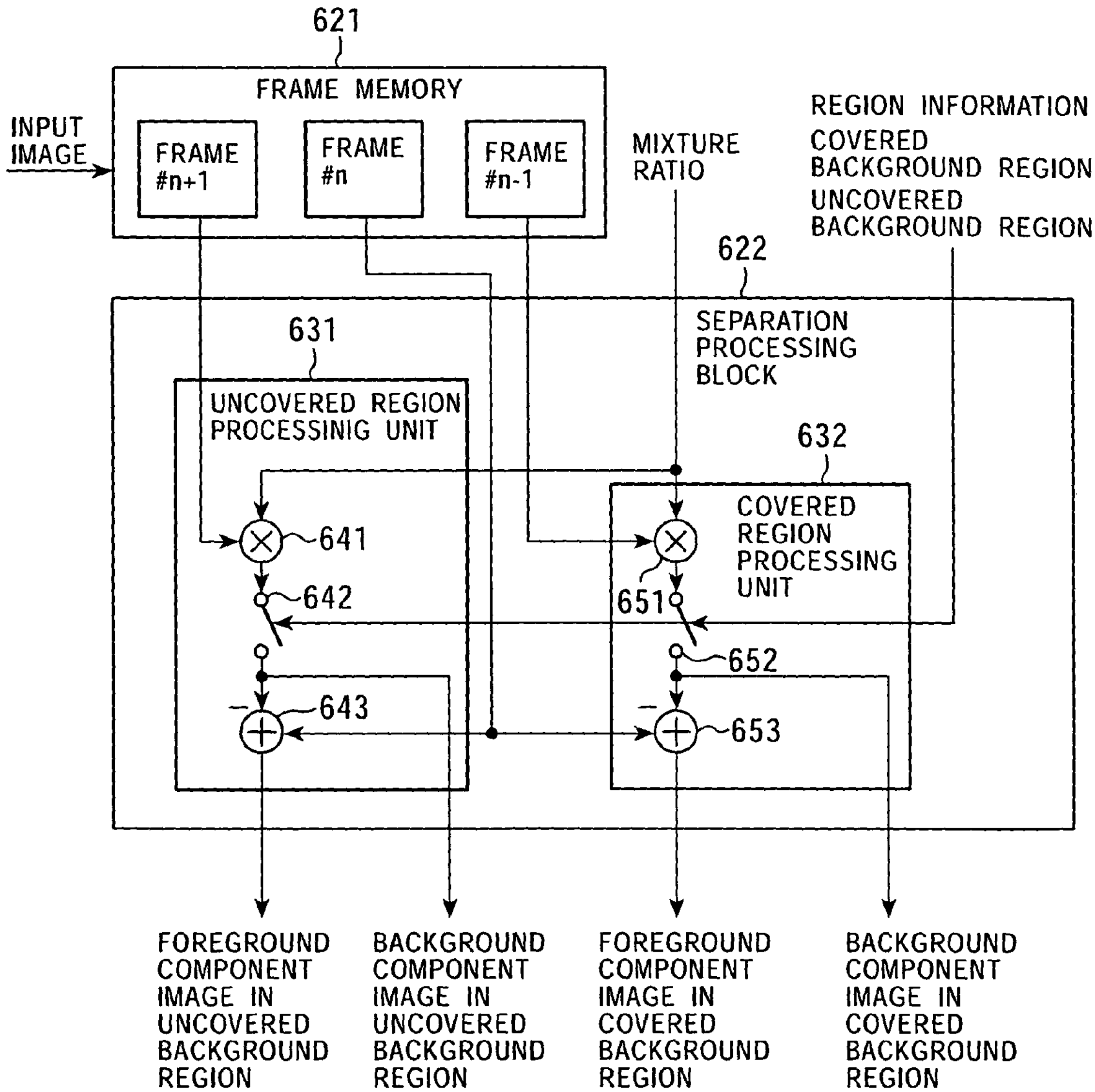
FIG. 82 is a block diagram illustrating an example of the configuration of the separating unit 601.

FIG. 82 is a block diagram which illustrates an example of the configuration of the separation unit 601 for performing the processing described above. The image input to the separation unit 601 is supplied to frame memory 621, and the region information indicating the covered background region and the uncovered background region supplied from the mixture ratio calculating unit 104, and the mixture ratio α is input to a separation processing block 622.

The frame memory 621 stores the input image in increments of frames. In the event that the object of processing is the frame #n, the frame memory 621 stores the frame #n−1 which is the frame previous to the frame #n, frame #n, and the frame #n+1 which is the frame following the frame #n.

The frame memory 621 supplies the corresponding pixels in the frame #n−1, the frame #n, and the frame #n+1 to the separation processing block 622.

The separation processing block 622 separates the foreground components and the background components from the pixel belonging to the mixed region in the frame #n by applying the computation described with reference to FIG. 80 and FIG. 81 to the pixel values of the pixels corresponding to the frame #n−1, the frame #n, and the frame #n+1 supplied from the frame memory 621 based upon the region information which indicates the covered background region and the uncovered background region and the mixture ratio α.

The separation processing block 622 comprises an uncovered region processing unit 631 and a covered region processing unit 632.

A multiplication device 641 of the uncovered region processing unit 631 multiplies the pixel value of the pixel of the frame #n+1 supplied from the frame memory 621 by the mixture ratio α, and outputs to a switch 642. In the event that the pixel (corresponding to the pixel in the frame #n+1) in the frame #n supplied from the frame memory 621 belongs to the uncovered background region, the switch 642 is closed, and supplies the pixel value multiplied by the mixture ratio α supplied from the multiplication device 641 to a computation device 643. The value wherein the pixel value of the pixel in the frame #n+1 is multiplied by the mixture ratio α supplied from the switch 642, is the same as the background component of the pixel value of the pixel corresponding to the frame #n, and is output as a background component image in the uncovered background region.

The computation device 643 obtains the foreground components by subtracting the background components supplied from the switch 642 from the pixel value of the pixel of the frame #n supplied from the frame memory 621. The computation device 643 outputs the foreground component image made up of pixels in the frame #n belonging to the uncovered background region.

A multiplication device 651 of the covered region processing unit 632 multiplies the pixel value of the pixel of the frame #n−1 supplied from the frame memory 621 by the mixture ratio α, and outputs to a switch 652. In the event that the pixel (corresponding to the pixel in the frame #n−1) in the frame #n supplied from the frame memory 621 belongs to the covered background region, the switch 652 is closed, and supplies the pixel value multiplied by the mixture ratio α supplied from the multiplication device 651 to a computation device 653. The value wherein the pixel value of the pixel in the frame #n−1 is multiplied by the mixture ratio α supplied from the switch 652, is the same as the background component of the pixel value of the corresponding pixel in the frame #n, and is output as a background component image in the covered background region.

The computation device 653 obtains the foreground components by subtracting the background components supplied from the switch 652 from the pixel value of the pixel of the frame #n supplied from the frame memory 621. The computation device 653 outputs the foreground component image made up of pixels in the frame #n belonging to the covered background region.

Using the mixture ratio α which is the amount of features enables entire separation of the foreground component and background component, contained in the pixel value.

Figure 83:
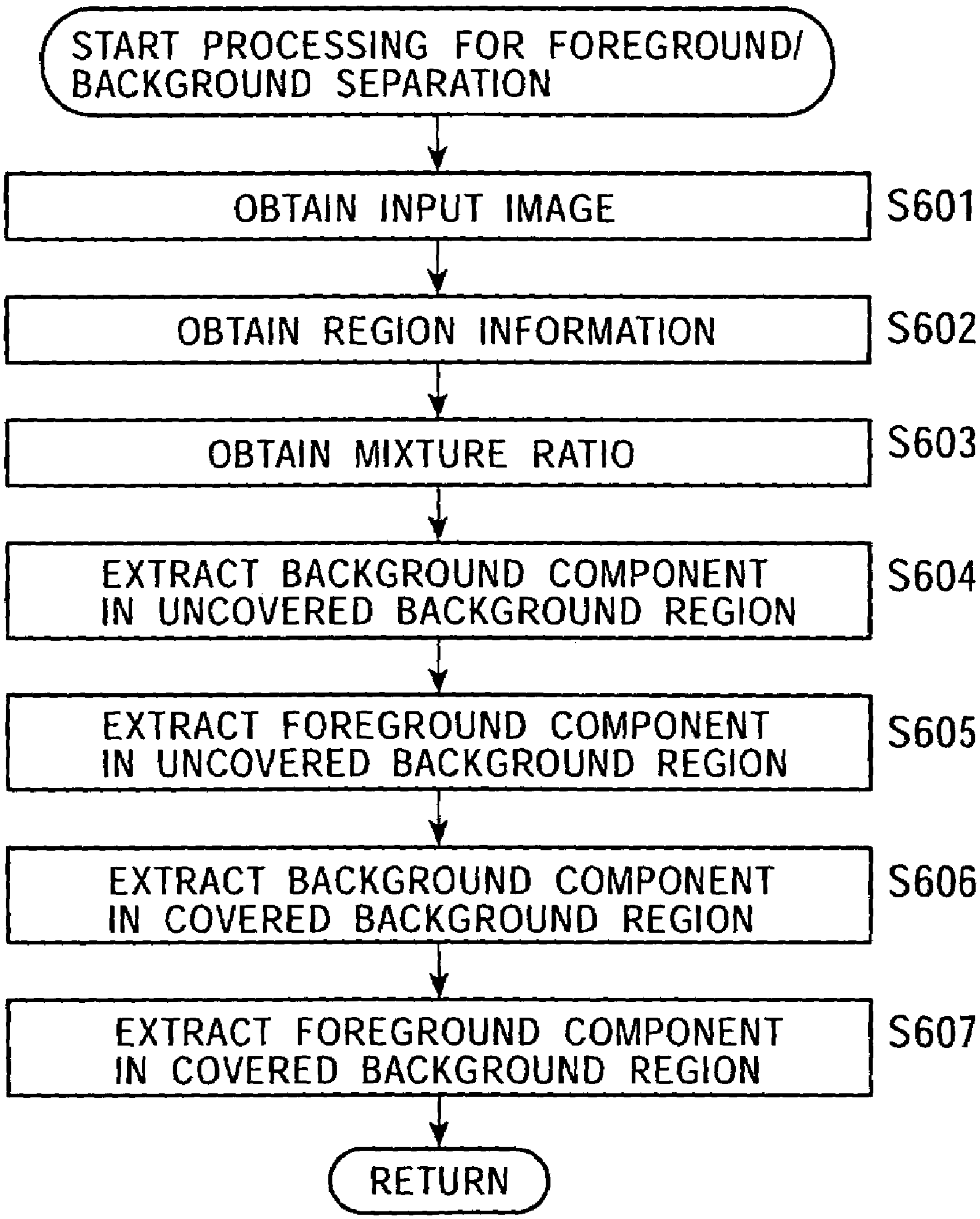
FIG. 83 is a flowchart describing the processing for separating the foreground and the background.

The separation processing for the foreground and the background by the foreground/background separation unit 105 will now be described, with reference to the flowchart shown in FIG. 83. In Step S601, the frame memory 621 of the separation unit 601 obtains the input image, and stores the frame #n which is the object of the separation of the foreground and the background, as well as the previous frame #n−1 and the following frame #n+1.

In Step S602, the separation processing block 622 of the separation unit 601 obtains the region information supplied from the mixture ratio calculation unit 104. In Step S603, the separation processing block 622 of the separation unit 601 obtains the mixture ratio α supplied from the mixture ratio calculation unit 104.

In Step S604, the uncovered region processing unit 631 extracts the background components from the pixel value of the pixel belonging to the uncovered background region supplied from the frame memory 621 based upon the region information and the mixture ratio α, and outputs as the background component image in the uncovered background region.

In Step S605, the uncovered region processing unit 631 extracts the foreground components from the pixel value of the pixel belonging to the uncovered background region supplied from the frame memory 621 based upon the region information and the mixture ratio α, and outputs as the foreground component image in the uncovered background region.

In Step S606, the covered region processing unit 632 extracts the background components from the pixel value of the pixel belonging to the covered background region supplied from the frame memory 621 based upon the region information and the mixture ratio α, and outputs as the background component image in the covered background region.

In Step S607, the covered region processing unit 632 extracts the foreground components from the pixel value of the pixel belonging to the covered background region supplied from the frame memory 621 based upon the region information and the mixture ratio α, outputs as the foreground component image in the covered background region, and the processing ends.

As described above, the foreground/background separation unit 105 can separate the foreground components and the background components from the input image based upon the region information and the mixture ratio α, and output the foreground component image which is made up of only the foreground components, and the background component image which is made up of only the background components.

Figure 84:
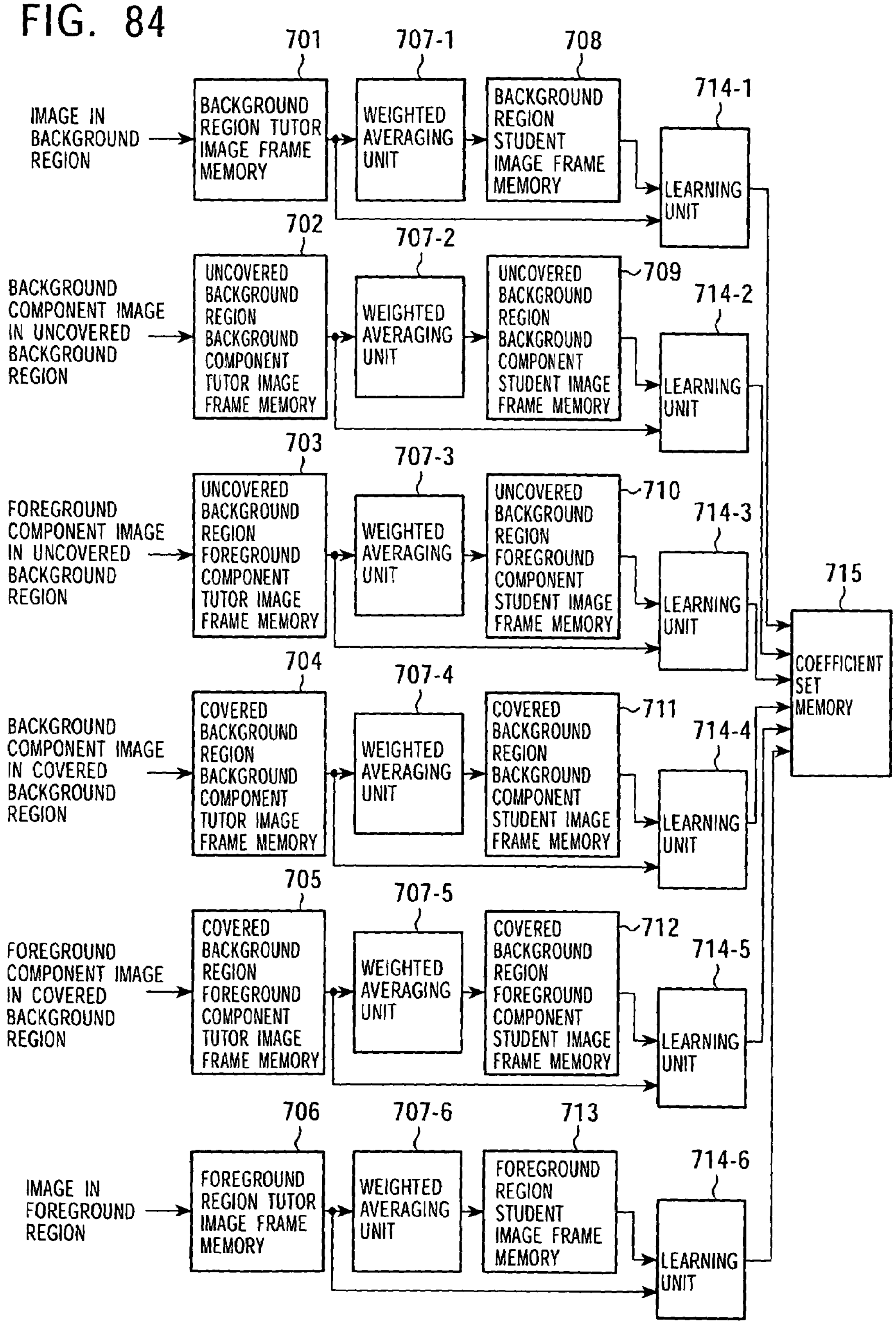
FIG. 84 is a block diagram illustrating the configuration of a separated image processing unit 106 which generates coefficient sets.

FIG. 84 is a block diagram which illustrates the configuration of the separated image processing unit 106 for generating a coefficient set which is used for the class classification adaptation processing for generating an even higher resolution image in the spatial direction. For example, the separated image processing unit 106 of which configuration is shown in FIG. 84 generates a coefficient set which is used for the class classification adaptation processing for generating an HD image from an SD image based upon the input HD image.

Background region tutor image frame memory 701 stores the image in the background region in the tutor image supplied from the foreground/background separation unit 105. The background region tutor image frame memory 701 supplies the stored image in the background region in the tutor image to a weighted averaging unit 707-1 and a learning unit 714-1.

Uncovered background region background component tutor image frame memory 702 stores the background component image in the uncovered background region in the tutor image supplied from the foreground/background separation unit 105. The uncovered background region background component tutor image frame memory 702 supplies the stored background component image in the uncovered background region in the tutor image to a weighted averaging unit 707-2 and a learning unit 714-2.

Uncovered background region foreground component tutor image frame memory 703 stores the foreground component image in the uncovered background region in the tutor image supplied from the foreground/background separation unit 105. The uncovered background region foreground component tutor image frame memory 703 supplies the stored foreground component image in the uncovered background region in the tutor image to a weighted averaging unit 707-3 and a learning unit 714-4.

Covered background region background component tutor image frame memory 704 stores the background component image in the covered background region in the tutor image supplied from the foreground/background separation unit 105. The covered background region background component tutor image frame memory 704 supplies the stored background component image in the covered background region in the tutor image to a weighted averaging unit 707-4 and a learning unit 714-4.

Covered background region foreground component tutor image frame memory 705 stores the foreground component image in the covered background region in the tutor image supplied from the foreground/background separation unit 105. The covered background region foreground component tutor image frame memory 705 supplies the stored foreground component image in the covered background region in the tutor image to a weighted averaging unit 707-5 and a learning unit 714-5.

Foreground region tutor image frame memory 706 stores the image in the foreground region in the tutor image supplied from the foreground/background separation unit 105. The foreground region tutor image frame memory 706 supplies the stored foreground image in the tutor image to a weighted averaging unit 707-6 and a learning unit 714-6.

The weighted averaging unit 707-1 generates an SD image which is a student image by ¼ weighted-averaging the image in the background region in the tutor image which is an HD image, for example, supplied from the background region tutor image frame memory 701, and supplies the generated SD image to background region student image frame memory 708.

Figure 85:
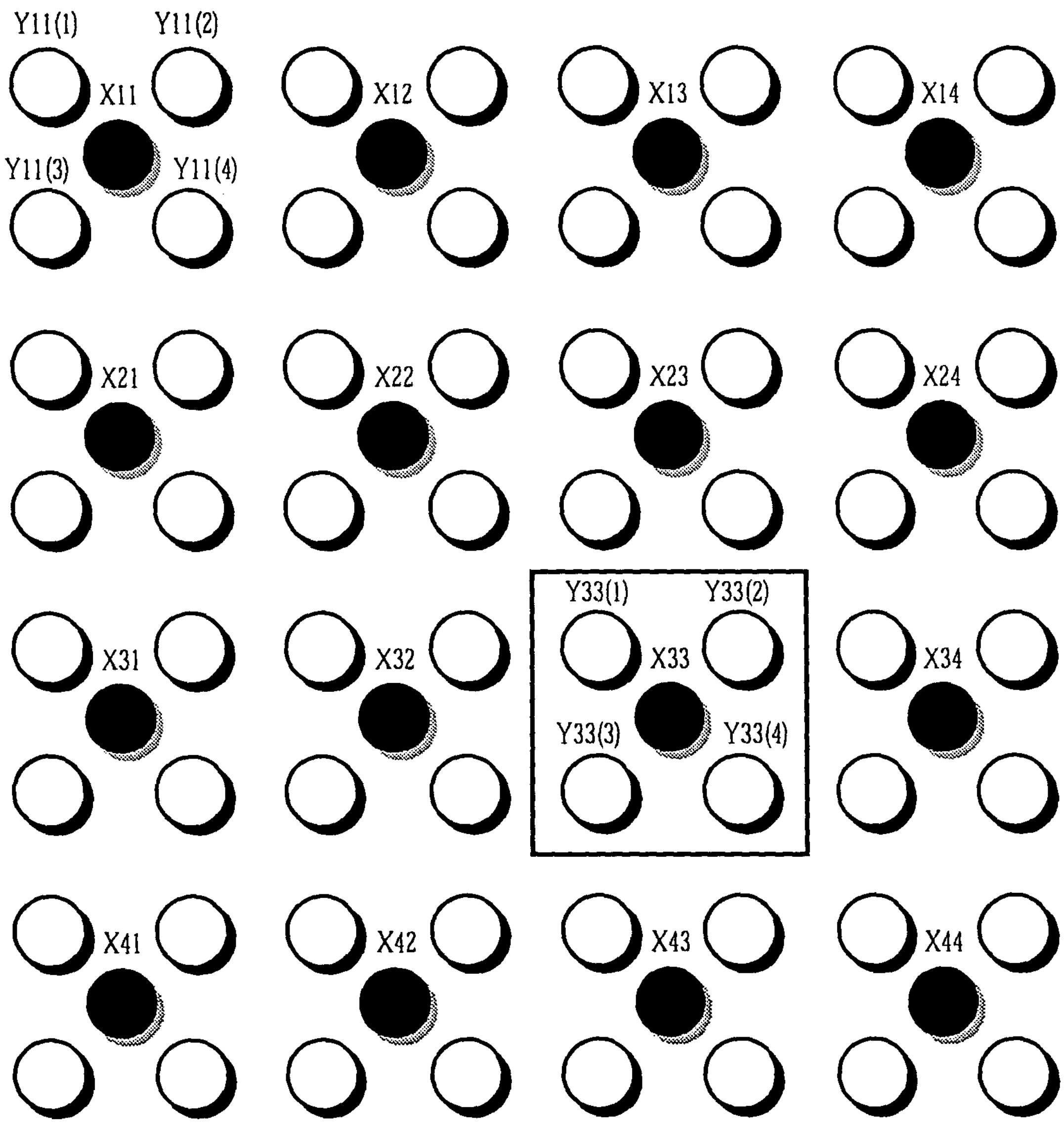
FIG. 85 is a diagram explaining the relation between a tutor image and a student image.

For example, the weighted averaging unit 707-1 takes four pixels of 2×2 (width×height) (which are portions represented by white circles in the drawing) as one increment in the tutor image as shown in FIG. 85, adds the pixel values of four pixels in each increment, and the sum is divided by 4. The weighted averaging unit 707-1 sets the ¼ weighted averaged results described above for the pixel of the student image positioned at the center of each increment (which are the portions represented by solid circles in the drawing).

The background region student image frame memory 708 stores the student image corresponding to the image in the background region in the tutor image supplied from the weighted averaging unit 707-1. The background region student image frame memory 708 supplies the stored student image corresponding to the image in the background region in the tutor image to the learning unit 714-1.

The weighted averaging unit 707-2 generates an SD image which is a student image by ¼ weighted-averaging the background component image in the uncovered background region in the tutor image which is an HD image, for example, supplied from the uncovered background region background component tutor image frame memory 702, and supplies the generated SD image to uncovered background region background component student image frame memory 709.

The uncovered background region background component student image frame memory 709 stores the student image, which is an SD image, corresponding to the background component image in the uncovered background region in the tutor image supplied from the weighted averaging unit 707-2. The uncovered background region background component student image frame memory 709 supplies the stored student image corresponding to the background component image in the uncovered background region in the tutor image to the learning unit 714-2.

The weighted averaging unit 707-3 generates an SD image which is a student image by ¼ weighted-averaging the foreground component image in the uncovered background region in the tutor image which is an HD image, for example, supplied from the uncovered background region foreground component tutor image frame memory 703, and supplies the generated SD image to uncovered background region foreground component student image frame memory 710.

The uncovered background region foreground component student image frame memory 710 stores the student image, which is an SD image, corresponding to the foreground component image in the uncovered background region in the tutor image supplied from the weighted averaging unit 707-3. The uncovered background region foreground component student image frame memory 710 supplies the stored student image corresponding to the foreground component image in the uncovered background region in the tutor image to the learning unit 714-3.

The weighted averaging unit 707-4 generates an SD image, which is a student image, by ¼ weighted-averaging the background component image in the covered background region in the tutor image, for example, supplied from the covered background region background component tutor image frame memory 704, and supplies the generated SD image to covered background region background component student image frame memory 711.

The covered background region background component student image frame memory 711 stores the student image, which is an SD image, corresponding to the background component image in the covered background region in the tutor image supplied from the weighted averaging unit 707-4. The covered background region background component student image frame memory 711 supplies the stored student image corresponding to the background component image in the covered background region in the tutor image to the learning unit 714-4.

The weighted averaging unit 707-5 generates an SD image, which is a student image, by ¼ weighted-averaging the foreground component image in the covered background region in the tutor image, for example, supplied from the covered background region foreground component tutor image frame memory 705, and supplies the generated SD image to covered background region foreground component student image frame memory 712.

The covered background region foreground component student image frame memory 712 stores the student image, which is an SD image, corresponding to the foreground component image in the covered background region in the tutor image supplied from the weighted averaging unit 707-5. The covered background region foreground component student image frame memory 712 supplies the stored student image corresponding to the foreground component image in the covered background region in the tutor image to the learning unit 714-5.

The weighted averaging unit 707-6 generates an SD image which is a student image by ¼ weighted-averaging the image in the foreground region in the tutor image which is an HD image, for example, supplied from the foreground region tutor image frame memory 706, and supplies the generated SD image to foreground region student image frame memory 713.

The foreground region student image frame memory 713 stores the student image, which is an SD image, corresponding to the image in the foreground region in the tutor image supplied from the weighted averaging unit 707-6. The foreground region student image frame memory 713 supplies the stored student image corresponding to the image in the foreground region in the tutor image to the learning unit 714-6.

The learning unit 714-1 generates a coefficient set corresponding to the background region based upon the image in the background region in the tutor image supplied from the background region tutor image frame memory 701 and the student image corresponding to the image in the background region in the tutor image supplied from the background region student image frame memory 708, and supplies the generated coefficient set to coefficient set memory 715.

The learning unit 714-2 generates a coefficient set corresponding to the background component image in the uncovered background region based upon the background component image in the uncovered background region in the tutor image supplied from the uncovered background region background component tutor image frame memory 702 and the student image corresponding to the background component image in the uncovered background region in the tutor image supplied from the uncovered background region background component student image frame memory 709, and supplies the generated coefficient set to the coefficient set memory 715.

The learning unit 714-3 generates a coefficient set corresponding to the foreground component image in the uncovered background region based upon the foreground component image in the uncovered background region in the tutor image supplied from the uncovered background region foreground component tutor image frame memory 703 and the student image corresponding to the foreground component image in the uncovered background region in the tutor image supplied from the uncovered background region foreground component student image frame memory 909, and supplies the generated coefficient set to the coefficient set memory 715.

The learning unit 714-4 generates a coefficient set corresponding to the background component image in the covered background region based upon the background component image in the covered background region in the tutor image supplied from the covered background region background component tutor image frame memory 704 and the student image corresponding to the background component image in the covered background region in the tutor image supplied from the covered background region background component student image frame memory 711, and supplies the generated coefficient set to the coefficient set memory 715.

The learning unit 714-5 generates a coefficient set corresponding to the foreground component image in the covered background region based upon the foreground component image in the covered background region in the tutor image supplied from the covered background region foreground component tutor image frame memory 705 and the student image corresponding to the foreground component image in the covered background region in the tutor image supplied from the covered background region foreground component student image frame memory 712, and supplies the generated coefficient set to the coefficient set memory 715.

The learning unit 714-6 generates a coefficient set corresponding to the foreground region based upon the image in the foreground region in the tutor image supplied from the foreground region tutor image frame memory 706 and the student image corresponding to the image in the foreground region in the tutor image supplied from the foreground region student image frame memory 713, and supplies the generated coefficient set to the coefficient set memory 715.

The coefficient set memory 715 stores the coefficient set corresponding to the background region supplied from the learning unit 714-1, the coefficient set corresponding to the background component image in the uncovered background region supplied from the learning unit 714-2, the coefficient set corresponding to the foreground component image in the uncovered background region supplied from the learning unit 714-3, the coefficient set corresponding to the background component image in the covered background region supplied from the learning unit 714-4, the coefficient set corresponding to the foreground component image in the covered background region supplied from the learning unit 714-5, and the coefficient set corresponding to the foreground region supplied from the learning unit 714-6.

In the event that there is no need to differentiate between the learning unit 714-1 through the learning unit 714-6, individually, these will be simply referred to as a learning unit 714 below.

Figure 86:
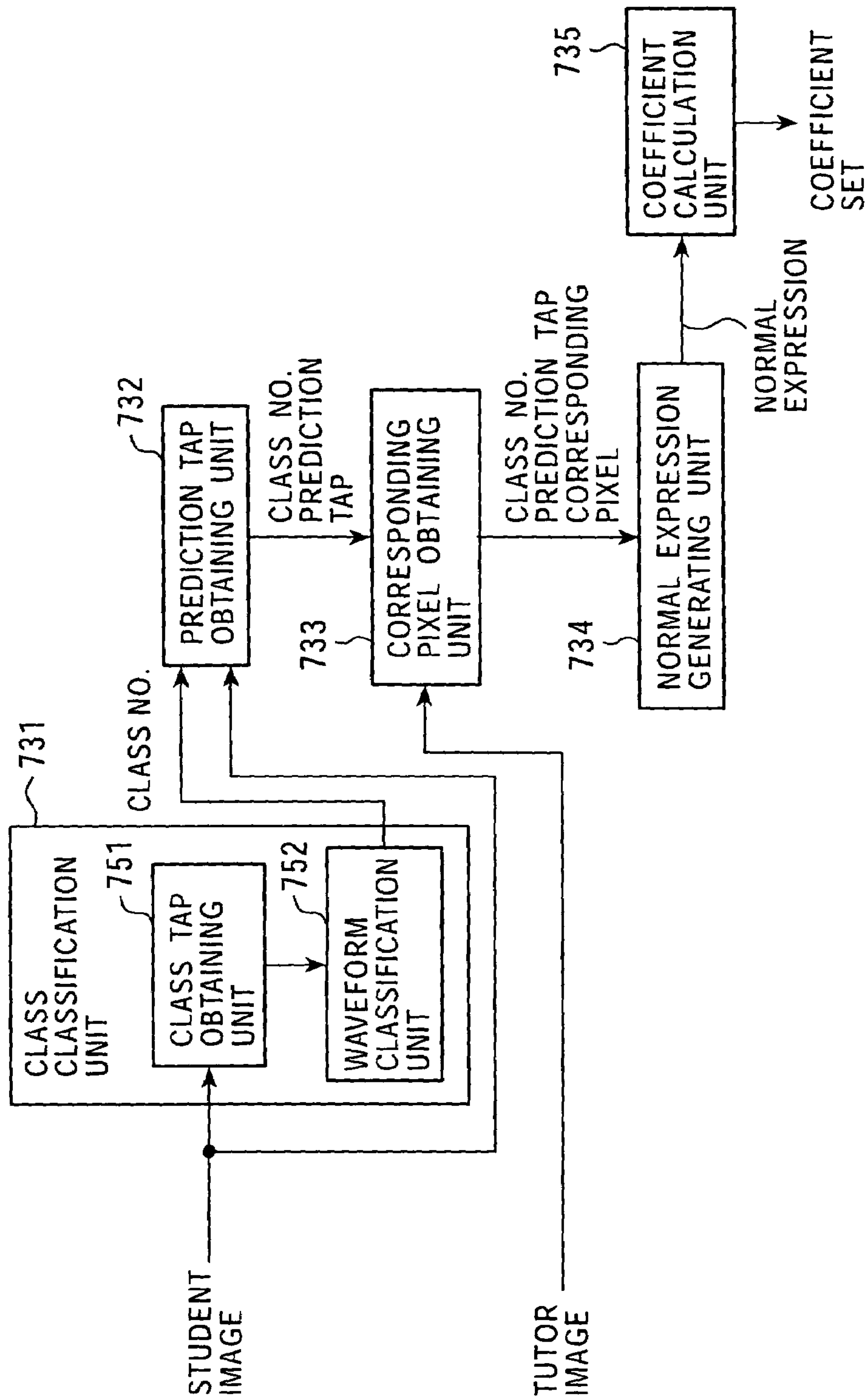
FIG. 86 is a block diagram illustrating the configuration of a learning unit 14.

FIG. 86 is a block diagram which illustrates the configuration of the learning unit 714.

A class classification unit 731 comprises a class tap obtaining unit 751 and a waveform classification unit 752, and classifies the pixel of interest of the input student image. The class tap obtaining unit 751 obtains a predetermined number of class taps which are pixels of the student image corresponding to the pixel of interest, and supplies the obtained class taps to the waveform classification unit 752.

For example, in FIG. 85, in the event that the pixel which is the i'th from the top and the j'th from the left in the student image (which is a portion indicated by a solid circle in the drawing) is represented by $X_{ij}$, the class tap obtaining unit 751 obtains a class tap which consists of nine pixels in total, i.e., the eight pixels at left-top, right-top, left, right, bottom-left, bottom, and right-bottom, adjacent to the pixel of interest $X_{ij}$, $X_{(i-1)(j-1)}$, $X_{(i-1)j}$, $X_{(i-1)(j+1)}$, $X_{i(j-1)}$, $X_{i(j+1)}$, $X_{(i-1)(j-1)}$, $X_{(i-1)j}$, and $X_{(i+1)(j+1)}$, and also the pixel of interest. The class tap is supplied to the waveform classification unit 752.

Note that in this case, while the class tap consists of a square-shaped block made up of 3×3 pixels, this needs not be a square; rather other arbitrary shapes may be used, for example, a rectangle-shape, a cross-shape, or the like. Also, the number of pixels making up the class tap is not restricted to nine pixels of 3×3 pixels.

The waveform classification unit 752 performs class classification processing wherein the input signals are classified into several classes based upon the features thereof, and classifies the pixel of interest into one class based upon the class taps. For example, the waveform classification unit 752 classifies the pixel of interest into one of 512 classes, and supplies the class No. corresponding to the classified class to a prediction tap obtaining unit 732.

Here, the class classification processing will now be described briefly.

Figure 87A:
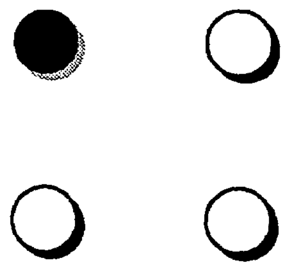
FIG. 87A is a diagram explaining class classification processing.
Figure 87B:
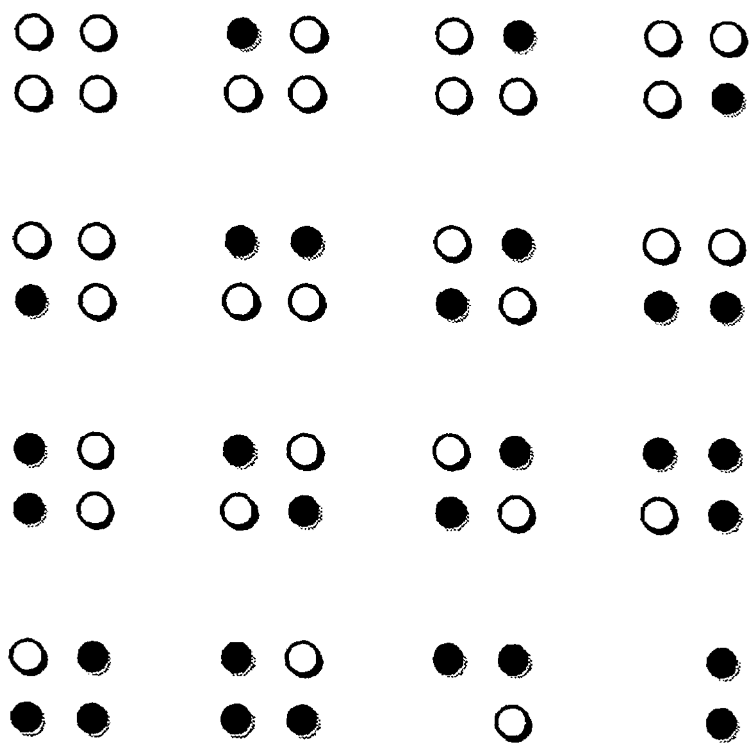
FIG. 87B is a diagram explaining class classification processing.

Now, let us say that a given pixel of interest and three adjacent pixels make up a class tap which consists of 2×2 pixels as shown in FIG. 87A, and each pixel is represented by 1 bit (has a level of either 0 or 1). In FIG. 87A, the solid circle denotes the pixel of interest. In this case, four pixel block of 2×2 pixels containing the pixel of interest can be classified into $16(=(2^1)^4)$ patterns by the level distribution for each pixel as shown in FIG. 87B. In FIG. 87B, white circles denote 0, and solid circles denote 1. Accordingly, in this case, the pixel of interest can be classified into sixteen patterns, wherein pattern-classification is the class-classification processing, and the processing is performed by the class classification unit 731.

Here, each pixel is generally appropriated around 8 bits. Also, with the present embodiment, the class tap consists of nine pixels of 3×3 pixels as described above. Accordingly, performing class classification processing for such a class tap as an object, the class tap would result the class tap being classified into a great number of classes of which number is $(2^8)^9$.

Accordingly, with the present embodiment, the ADCR processing is performed for the class tap by the waveform classification unit 752, and this reduces the number of classes by reducing the number of bits of the pixels making up the class tap.

Figure 88A:
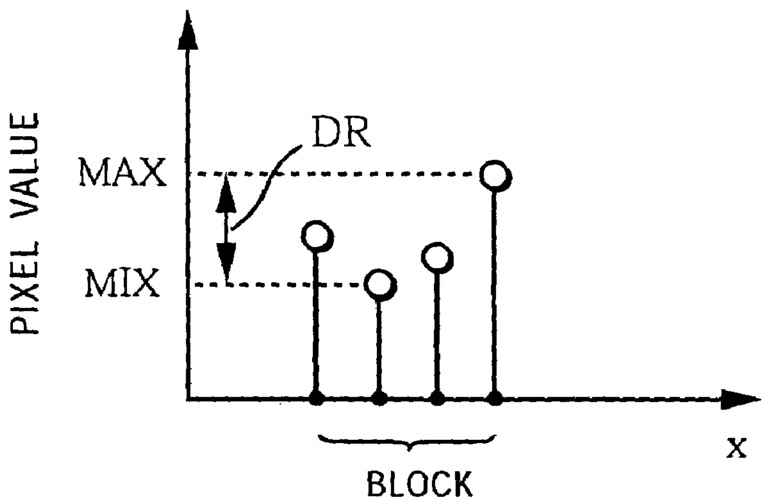
FIG. 88A is a diagram explaining ADRC processing.

In order to simplify description, the maximum value of the pixel value MAX and the minimum value of the pixel value MIN are detected in the ADRC processing with a class tap which consists of four pixels arrayed in a line as shown in FIG. 88A. DR=MAX−MIN is then taken as the local dynamic range in the block which consists of a class tap, and the pixel values of the pixels making up the block of the class tap is re-quantized into K bits based upon the dynamic range DR.

Figure 88B:
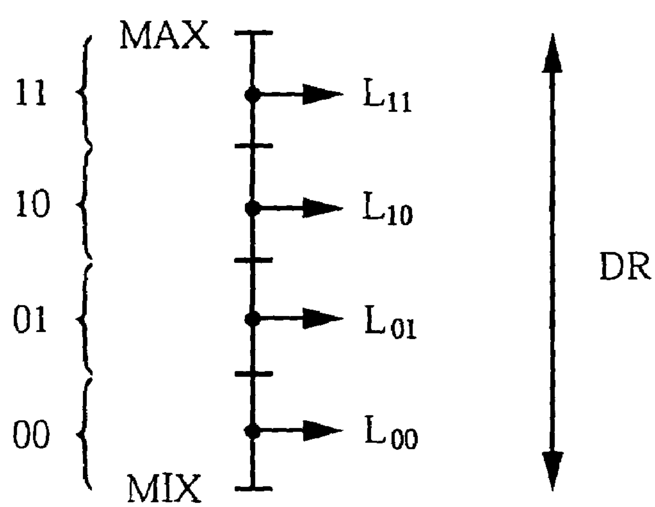
FIG. 88B is a diagram explaining ADRC processing.

That is to say, the minimum value MIN is subtracted from each pixel value within the block, and the subtraction value is divided by $DR/2^k$. The division value obtained as a result is converted into the code (ADRC code) corresponding thereto. Specifically, for example, in the event of taking K as 2, judgment is made which of ranges obtained by dividing the dynamic range DR into four $(=2^2)$ equal parts the division value belongs to, as shown in FIG. 88B, and upon the division value belonging to the range of the bottom-most level, the range of the second level from the bottom, the range of the third level from the bottom, or the range of upper-most level, the division value is encoded into 2-bit code such as 00B, 01B, 10B, or 11B (B indicates a binary number), respectively, for example. Decoding is then performed on the decoding side by the ADRC code 00B, 01B, 10B, or 11B being converted into the median in the range of the most-bottom level $L_{00}$, the median in the range of the second level from the bottom $L_{01}$, the median in the range of the third level from the bottom $L_{10}$, or the median in the range of the most-upper level $L_{11}$, wherein the ranges are obtained by dividing the dynamic range DR into four equal parts, and the minimum value MIN being added to the converted value.

Here, the ADRC processing described above is referred to as non-edge-matching.

Note that details with regard to the ADRC processing are disclosed in Japanese Unexamined Patent Application Publication No. 3-53778, which has been applied by the present applicant, and so forth, for example.

The class No. can be reduced by performing the ADRC processing which performs re-quantizing with the number of bits less than the number of bits appropriated to pixels making up the class tap as described above, and the ADRC processing described above is performed by the waveform classifying unit 752.

While the class classification processing is performed based upon the ADRC code by the waveform classification unit 752 in the present embodiment, an arrangement may be made wherein the class classification processing is performed with regard to the data which has been subjected to DPCM (Predictive Coding), BTC (Block Truncation Coding), VQ (Vector Quantizing), DCT (Disperse Cosine Transformation), Hadamard transformation, or the like.

The prediction tap obtaining unit 732 obtains the prediction tap which is the increment for calculation of the predicted value of the original image (tutor image) corresponding to the class based upon the class No. from pixels of the student image, and supplies the obtained prediction tap and the class No. to a corresponding pixel obtaining unit 733.

For example, in FIG. 85, let us say that pixel values of nine pixels of 2×2 centered on the pixel $X_{ij}$ in the student image (which is denoted by a solid circle in the drawing) in the original image (tutor image) are represented as $Y_{ij}(1)$, $Y_{ij}(2)$, $Y_{ij}(3)$, and $Y_{ij}(4)$, respectively, in the direction from the far left to the right, and in the direction from the top to the bottom, the prediction tap obtaining unit 732 obtains a square-shaped prediction tap which consists of nine pixels of 3×3, $X_{(i-1)(j-1)}$, $X_{(i-1)j}$, $X_{(i-1)(j+1)}$ $X_{i(j-1)}$, $X_{ij}$, $X_{i(j+1)}$, $X_{(i+1)(j-1)}$, $X_{(i+1)j}$, and $X_{(i+1)(j+1)}$, centered on the pixel $X_{ij}$ in the student image, for example, for calculating the coefficients which are necessary for calculation of the predicted values of the pixels $Y_{ij}(1)$ through $Y_{ij}(4)$.

Specifically, for example, the pixels $X_{22}$, $X_{23}$, $X_{24}$, $X_{32}$, $X_{33}$, $X_{34}$, $X_{42}$, $X_{43}$, and $X_{44}$ make up the prediction tap for calculating the coefficients which are necessary for calculation of the predicted values of four pixels of $Y_{33}(1)$ through $Y_{33}(4)$ in the tutor image, which are enclosed by a quadrangle in FIG. 85, (in this case, the pixel of interest is $X_{33}$).

The corresponding pixel obtaining unit 733 obtains pixel values of the pixels in the tutor image corresponding to the pixel values which are to be predicted based upon the prediction tap and the class No., and supplies the prediction tap, the class No., and the obtained pixel values of the pixels in the tutor image corresponding to the pixel values which are to be predicted to a normal equation generating unit 734.

For example, in the event of calculating the coefficients necessary for calculation of the predicted values of four pixels of $Y_{33}(1)$ through $Y_{33}(4)$ in the tutor image, the corresponding pixel obtaining unit 733 obtains the pixel values of the pixels, $Y_{33}(1)$ through $Y_{33}(4)$ as the pixels in the tutor image corresponding to the pixel values which are to be predicted.

The normal equation generating unit 734 generates normal equations for calculating a coefficient set which is used in the adaptation processing, corresponding to the correlation between the prediction tap and the pixel values which are to be predicted, based upon the prediction tap, the class No., and the obtained pixel values which are to be predicted, and supplies the generated normal equations to a coefficient calculation unit 735 along with the class No.

The coefficient calculation unit 735 calculates a coefficient set which is used in the adaptation processing, corresponding to the classified class, by solving the normal equations supplied from the normal equation generating unit 734. The coefficient calculation unit 735 supplies the calculated coefficient set to the coefficient set memory 715 along with the class No.

An arrangement may be made wherein the normal equation generating unit 734 generates a matrix corresponding to such normal equations, and the coefficient calculation unit 735 calculates a coefficient set based upon the generated matrix.

Here, the adaptation processing will be described.

For example, let us now consider obtaining predicted value E[y] of the pixel value y in the tutor image from a linear one-dimensional combination model defined by linear combination of pixel values of several nearby pixels $x_1$, $x_2$, . . . (which will be referred to as student data as appropriate) and predetermined prediction coefficients $w_1$, $w_2$, . . . . In this case, the predicted value E[y] may be represented in the following Expression.

$$E[y]=w_1x_1+w_2x_2+ \tag{78}$$

Accordingly, for generalization, upon defining the matrix W which consists of a set of the prediction coefficients w, the matrix X which consists of a set of the student data, and the matrix Y' which consists of a set of the predicted values E[y] as $$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$$

$$W = \begin{bmatrix} w_1 \\ w_2 \\ \cdots \\ w_n \end{bmatrix},$$

$$Y' = \begin{bmatrix} E[y_1] \\ E[y_2] \\ \cdots \\ E[y_m] \end{bmatrix},$$

the following observation expression holds.

$$XW=Y' \tag{79}$$

Let us now consider obtaining the predicted value E[y] near the pixel value y of the original image by applying the least square method to the observation expression. In this case, upon defining the matrix Y which consists of a set of pixel values y in the original image (which will be referred to as tutor data as appropriate) and the matrix E which consists of a set of the residuals e of the predicted values E[y] with regard to the pixel values y in the original image as $$E = \begin{pmatrix} e_1 \\ e_2 \\ \cdots \\ e_m \end{pmatrix},$$

$$Y = \begin{pmatrix} y_1 \\ y_2 \\ \cdots \\ y_m \end{pmatrix},$$

the following residual expression holds from Expression (79).

$$XW=Y+E \quad (80)$$

In this case, the prediction coefficients $w_i$ for obtaining the predicted value E[y] near the pixel value y in the original image can be obtained by minimizing the squared margin of error $$\sum_{i=1}^{m} e_i^2.$$

Accordingly, in a case that the derivative of the above-described squared margin of error from the prediction coefficient $w_i$ is 0, that is to say, in a case that the prediction coefficient $w_i$ satisfies the following expression, the prediction coefficient $w_i$ is the optimal value for obtaining the predicted values E[y] near the pixel value y in the original image.

$$e_1\frac{\partial e_1}{\partial w_i}+e_2\frac{\partial e_2}{\partial w_i}+\ldots+e_m\frac{\partial e_m}{\partial w_i}=0\ (i=1,2,\ldots,n) \quad (81)$$

Here, the following expression holds by differentiating Expression (80) by the prediction coefficient $w_i$.

$$\frac{\partial e_i}{\partial w_1}=x_{i1},\ \frac{\partial e_i}{\partial w_2}=x_{i2},\ldots\ \frac{\partial e_i}{\partial w_n}=x_{in},\ (i=1,2,\ldots,m) \quad (82)$$

Expression (83) is obtained from Expression (81) and Expression (82).

$$\sum_{i=1}^{m} e_i x_{i1}=0,\ \sum_{i=1}^{m} e_i x_{i2}=0,\ldots\ \sum_{i=1}^{m} e_i x_{in}=0 \quad (83)$$

Moreover, taking the relationship between the student data x, the prediction coefficient w, the tutor data y, and the residuals e in the residual expression (80), into consideration, the following normal equations can be obtained from Expression (83).

$$\begin{cases}\left(\sum_{i=1}^{m} x_{i1}x_{i1}\right)w_1+\left(\sum_{i=1}^{m} x_{i1}x_{i2}\right)w_2+\ldots+\left(\sum_{i=1}^{m} x_{i1}x_{in}\right)w_n=\left(\sum_{i=1}^{m} x_{i1}y_i\right)\\ \left(\sum_{i=1}^{m} x_{i2}x_{i1}\right)w_1+\left(\sum_{i=1}^{m} x_{i2}x_{i2}\right)w_2+\ldots+\left(\sum_{i=1}^{m} x_{i2}x_{in}\right)w_n=\left(\sum_{i=1}^{m} x_{i2}y_i\right)\\ \qquad\ldots\\ \left(\sum_{i=1}^{m} x_{in}x_{i1}\right)w_1+\left(\sum_{i=1}^{m} x_{in}x_{i2}\right)w_2+\ldots+\left(\sum_{i=1}^{m} x_{in}x_{in}\right)w_n=\left(\sum_{i=1}^{m} x_{in}y_i\right)\end{cases} \quad (84)$$

As many normal equations represented in Expression (84) can be formed as the number of the prediction coefficients w which are to be obtained, and accordingly the optimal prediction coefficients w can be obtained by solving Expression (84). Note that Expressions (84) can be solved by applying the sweeping method (Gauss-Jordan elimination), for example.

The adaptation processing consists of the optimal prediction coefficients w being obtained for each class, and the predicted values E[y] near the pixel values y in the tutor image being obtained by Expression (78) using the prediction coefficients w.

The normal equation generating unit 734 generates the normal equations for calculating the optimal prediction coefficients w for each class, and the coefficient calculation unit 735 calculates the prediction coefficients w based upon the generated normal equations.

Note that the adaptation processing is different from the interpolation processing with regard to the components which are not contained in the thinned out image and are contained in the original image being reproduced. That is to say, while in the event of taking only Expression (78) into consideration, the adaptation processing is the same as the interpolation processing using the interpolation filter, the prediction coefficients w corresponding to the tap coefficients of the interpolation filter is obtained by learning as if it were, using the tutor data y, and accordingly the adaptation processing can reproduce the components contained in the original image. Accordingly, it can be said that the adaptation processing acts to create an image, as if it were.

Figure 89:
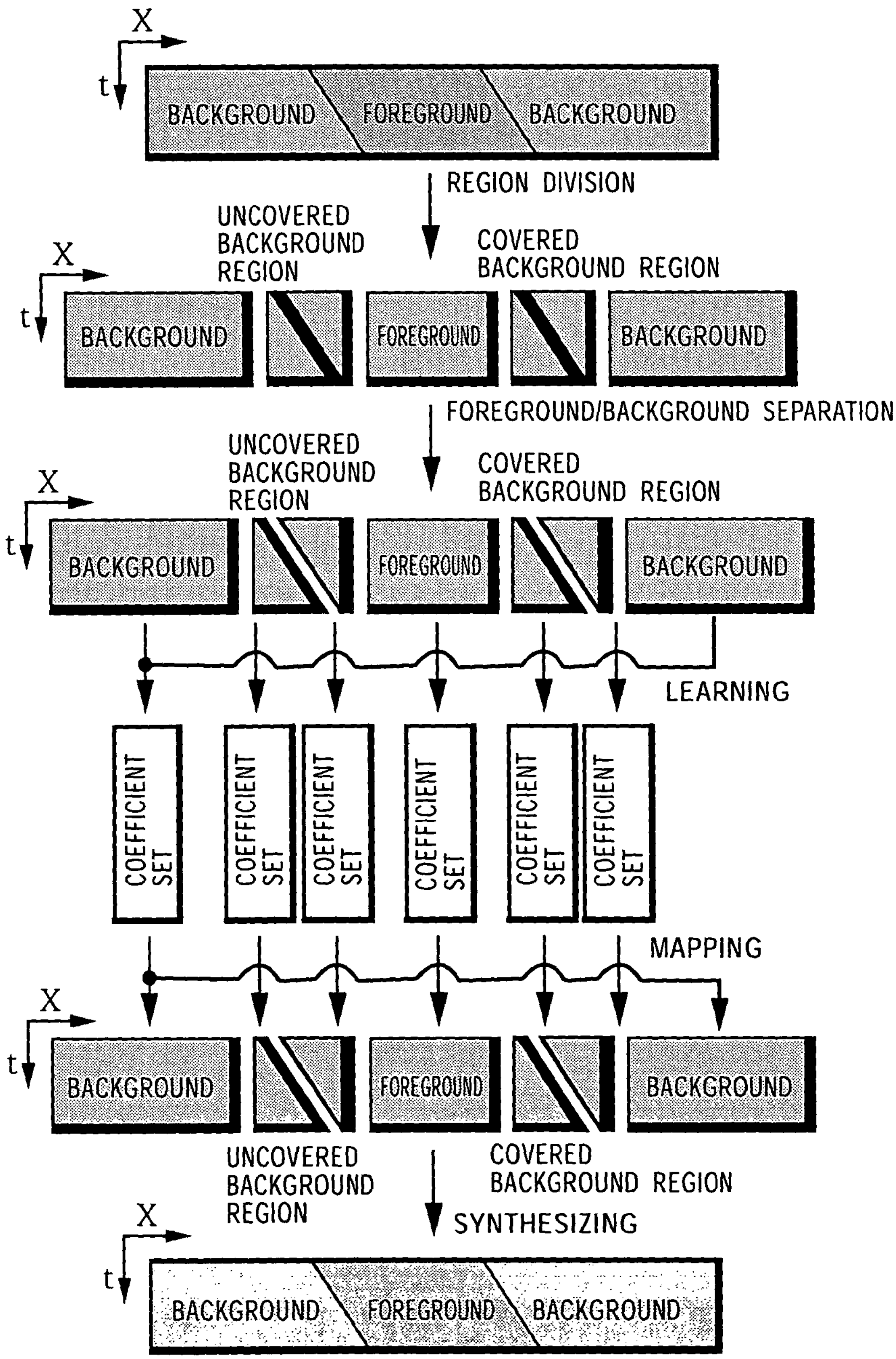
FIG. 89 is a diagram explaining coefficient sets which the separated image processing unit 106 generates.

FIG. 89 is a diagram which describes a coefficient set generated by the separated image processing unit 106 of which configuration is shown in FIG. 84. The region specifying unit 103 specifies the foreground region, the background region, the covered background region, and the uncovered background region in the input image.

The input image wherein the regions have been specified and the mixture ratio α has been detected by the mixture ratio calculation unit 104, is separated into the image in the foreground region, the image in the background region, the foreground component image in the covered background region, the background component image in the covered background region, the foreground component image in the uncovered background region, and the background component image in the uncovered background region, by the foreground/background separation unit 105.

The separated image processing unit 106 calculates a coefficient set corresponding to the image in the foreground region, a coefficient set corresponding to the image in the background region, a coefficient set corresponding to the foreground component image in the covered background region, a coefficient set corresponding to the background component image in the covered background region, a coefficient set corresponding to the foreground component image in the uncovered background region, and a coefficient set corresponding to the background component image in the uncovered background region individually, based upon the separated images, i.e., the image in the foreground region, image in the background region, foreground component image in the covered background region, background component image in the covered background region, foreground component image in the uncovered background region, and background component image in the uncovered background region.

That is to say, the learning unit 714-1 calculates a coefficient set corresponding to the background region based upon the separated image in the background region, the learning unit 714-2 calculates a coefficient set corresponding to the background component image in the uncovered background region based upon the separated background component image in the uncovered background region, the learning unit 714-3 calculates a coefficient set corresponding to the foreground component image in the uncovered background region based upon the separated foreground component image in the uncovered background region, the learning unit 714-4 calculates a coefficient set corresponding to the background component image in the covered background region based upon the separated background component image in the covered background region, the learning unit 714-5 calculates a coefficient set corresponding to the foreground component image in the covered background region based upon the separated foreground component image in the covered background region, and the learning unit 714-6 calculates a coefficient set corresponding to the foreground region based upon the separated image in the foreground region.

The coefficient set corresponding to the background region is used for prediction of the pixel value in the background region in the class classification adaptation processing for predicting pixel values. The coefficient set corresponding to the background component image in the uncovered background region is used for prediction of the pixel value corresponding to the background component image in the uncovered background region in the class classification adaptation processing for predicting pixel values. The coefficient set corresponding to the foreground component image in the uncovered background region is used for prediction of the pixel value corresponding to the foreground component image in the uncovered background region in the class classification adaptation processing for predicting pixel values.

The coefficient set corresponding to the background component image in the covered background region is used for prediction of the pixel value corresponding to the background component image in the covered background region in the class classification adaptation processing for predicting pixel values. The coefficient set corresponding to the foreground component image in the covered background region is used for prediction of the pixel value corresponding to the foreground component image in the covered background region in the class classification adaptation processing for predicting pixel values.

The coefficient set corresponding to the foreground region is used for prediction of the pixel value in the foreground region in the class classification adaptation processing for predicting pixel values.

The predicted image corresponding to the image in the background region, the predicted image corresponding to the background component image in the uncovered background region, the predicted image corresponding to the foreground component image in the uncovered background region, the predicted image corresponding to the background component image in the covered background region, the predicted image corresponding to the foreground component image in the covered background region, and the predicted image corresponding to the image in the foreground region, are synthesized into a single predicted image.

Figure 90:
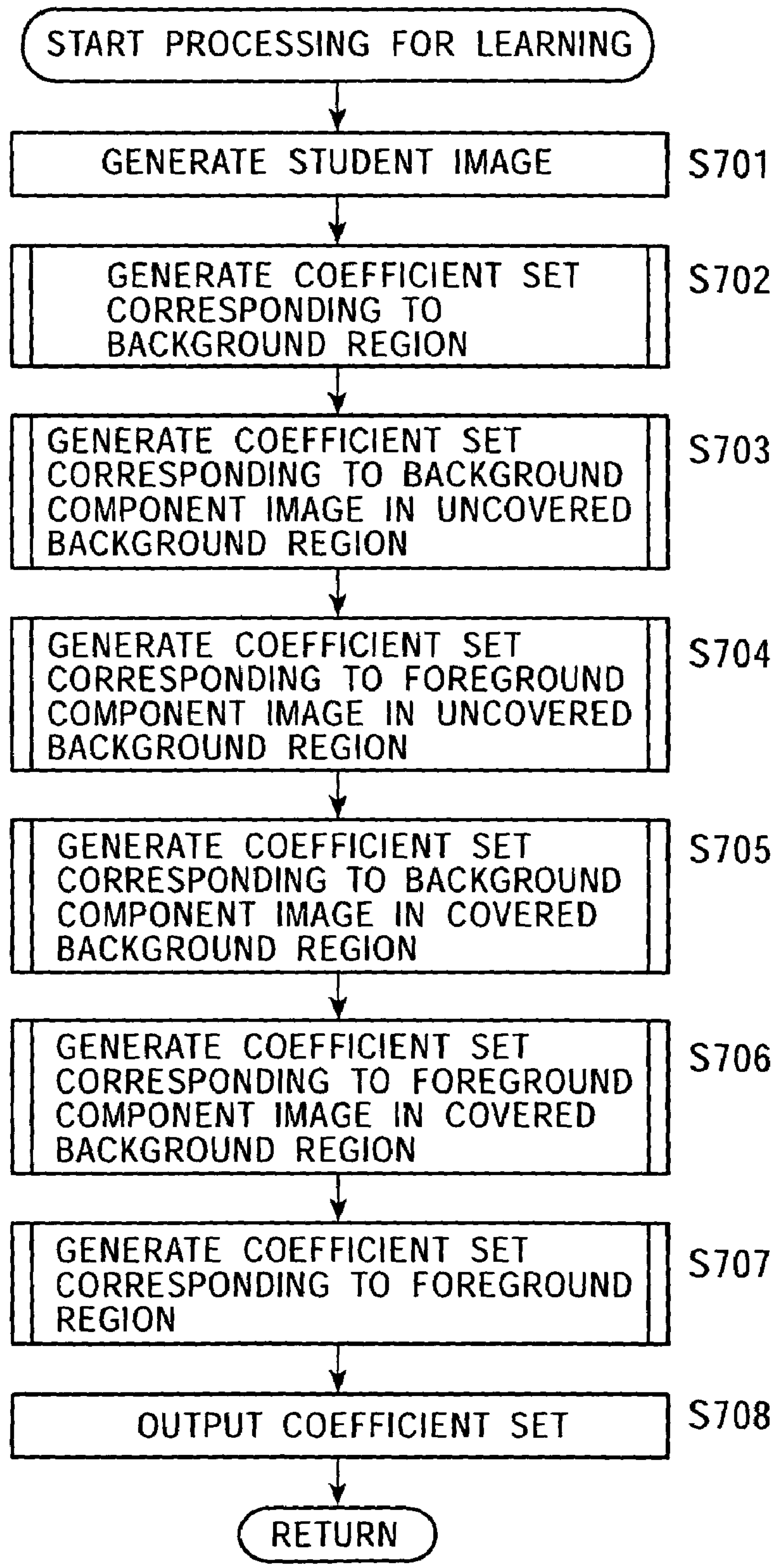
FIG. 90 is a flowchart explaining the learning processing for generating coefficient sets with the separated image processing unit 106.

Referring to the flowchart shown in FIG. 90, description will be made with regard to the processing of learning for generating a coefficient set which is used for prediction of pixel values based upon the class classification adaptation processing by the separated image processing unit 106 of which configuration is shown in FIG. 84.

In Step S701, the weighted averaging units 707-1 through 707-6 generate a student images of the image in the background region, the image in the foreground region, the background component image in the uncovered background region, the foreground component image in the uncovered background region, the background component image in the covered background region, and the foreground component image in the covered background region. That is to say, the weighted averaging unit 707-1 generates a student image corresponding to the image in the background region in the tutor image by ¼ weighted-averaging of the image in the background region in the tutor image stored in the background region tutor image frame memory 701, for example.

The weighted averaging unit 707-2 generates a student image corresponding to the background component image in the uncovered background region in the tutor image by ¼ weighted-averaging of the background component image in the uncovered background region in the tutor image stored in the uncovered background region background component tutor image frame memory 702, for example.

The weighted averaging unit 707-3 generates a student image corresponding to the foreground component image in the uncovered background region in the tutor image by ¼ weighted-averaging of the foreground component image in the uncovered background region in the tutor image stored in the uncovered background region foreground component tutor image frame memory 703, for example.

The weighted averaging unit 707-4 generates a student image corresponding to the background component image in the covered background region in the tutor image by ¼ weighted-averaging of the background component image in the covered background region in the tutor image stored in the covered background region background component tutor image frame memory 704, for example.

The weighted averaging unit 707-5 generates a student image corresponding to the foreground component image in the covered background region in the tutor image by ¼ weighted-averaging of the foreground component image in the covered background region in the tutor image stored in the covered background region foreground component tutor image frame memory 705, for example.

The weighted averaging unit 707-6 generates a student image corresponding to the image in the foreground region in the tutor image by ¼ weighted-averaging of the image in the foreground region in the tutor image stored in the foreground region tutor image frame memory 706, for example.

In Step S702, the learning unit 714-1 generates a coefficient set corresponding to the background region based upon the image in the background region in the tutor image stored in the background region tutor image frame memory 701 and the student image corresponding to the image in the background region in the tutor image stored in the background region student image frame memory 708. Details of the processing for generating of a coefficient set in Step S702 will be described later with reference to the flowchart shown in FIG. 91.

In Step S703, the learning unit 714-2 generates a coefficient set corresponding to the background component image in the uncovered background region based upon the background component image in the uncovered background region in the tutor image stored in the uncovered background region background component tutor image frame memory 702 and the student image corresponding to the background component image in the uncovered background region in the tutor image stored in the uncovered background region background component student image frame memory 709.

In Step S704, the learning unit 714-3 generates a coefficient set corresponding to the foreground component image in the uncovered background region based upon the foreground component image in the uncovered background region in the tutor image stored in the uncovered background region foreground component tutor image frame memory 703 and the student image corresponding to the foreground component image in the uncovered background region in the tutor image stored in the uncovered background region foreground component student image frame memory 710.

In Step S705, the learning unit 714-4 generates a coefficient set corresponding to the background component image in the covered background region based upon the background component image in the covered background region in the tutor image stored in the covered background region background component tutor image frame memory 704 and the student image corresponding to the background component image in the covered background region in the tutor image stored in the covered background region background component student image frame memory 711.

In Step S706, the learning unit 714-5 generates a coefficient set corresponding to the foreground component image in the covered background region based upon the foreground component image in the covered background region in the tutor image stored in the covered background region foreground component tutor image frame memory 705 and the student image corresponding to the foreground component image in the covered background region in the tutor image stored in the covered background region foreground component student image frame memory 712.

In Step S707, the learning unit 714-6 generates a coefficient set corresponding to the foreground region based upon the image in the foreground region in the tutor image stored in the foreground region tutor image frame memory 706 and the student image corresponding to the image in the foreground region in the tutor image stored in the foreground region student image frame memory 713.

In Step S708, the learning units 714-1 through the learning unit 712-4 output a coefficient set corresponding to the background region, a coefficient set corresponding to the background component image in the uncovered background region, a coefficient set corresponding to the foreground component image in the uncovered background region, a coefficient set corresponding to the background component image in the covered background region, a coefficient set corresponding to the foreground component image in the covered background region, or a coefficient set corresponding to foreground region, to the coefficient set memory 715, respectively. The coefficient set memory 715 stores the coefficient sets each of which corresponds to the background region, the foreground region, the background component image in the uncovered background region, the foreground component image in the uncovered background region, the background component image in the covered background region, and the foreground component image in the covered background region, and then the processing ends.

As described above, the separated image processing unit 106 of which configuration is shown in FIG. 84 can generate a coefficient set corresponding to the image in the background region, a coefficient set corresponding to the background component image in the uncovered background region, a coefficient set corresponding to the foreground component image in the uncovered background region, a coefficient set corresponding to the background component image in the covered background region, a coefficient set corresponding to the foreground component image in the covered background region, and a coefficient set corresponding to the image in the foreground region.

Note that it is needless to say that the processing in Step S702 through Step S707 may be performed serially or in parallel.

Figure 91:
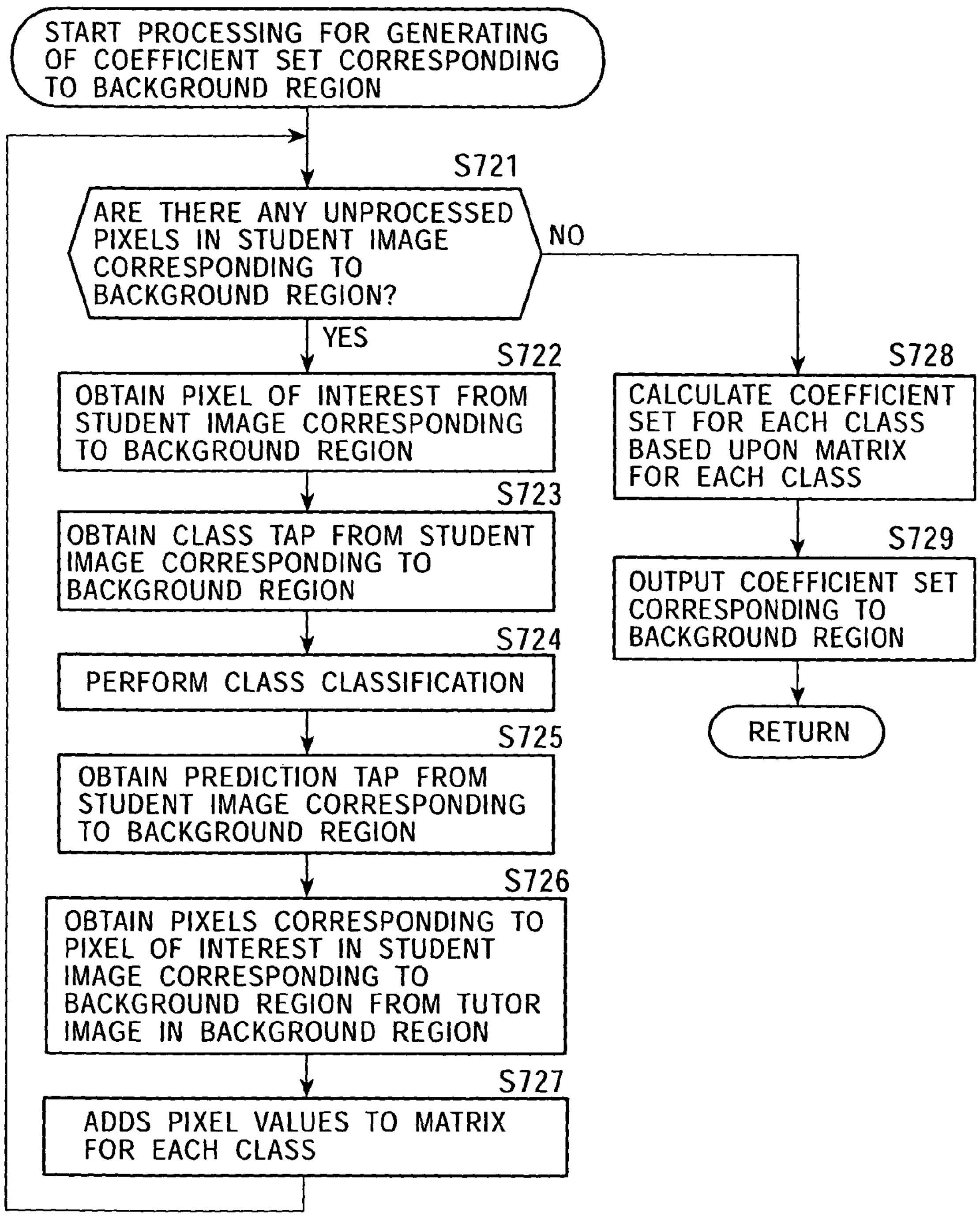
FIG. 91 is a flowchart for explaining the processing for generating coefficient sets corresponding to the background region.

Referring to the flowchart shown in FIG. 91, the processing for generating of a coefficient set corresponding to the background region performed by the learning unit 714-1, corresponding to the processing in Step S702, will now be described.

In Step S721, the learning unit 714-1 judges whether or not there are any unprocessed pixels in the student image corresponding to the background region, and in the event that judgment is made that there are unprocessed pixels in the student image corresponding to the background region, the flow proceeds to Step S722, and the pixel of interest is obtained from the student image corresponding to the background region in raster scan sequence.

In Step S723, the class tap obtaining unit 751 of the class classification unit 731 obtains a class tap corresponding to the pixel of interest from the student image stored in the background region student image frame memory 708. In Step S724, the waveform classification unit 752 of the class classification unit 731 applies the ADRC processing to the class tap, this reduces the number of bits of pixels making up the class tap, and the pixel of interest is classified. In Step S725, the prediction tap obtaining unit 732 obtains a prediction tap corresponding to the pixel of interest from the student image stored in the background region student image frame memory 708 based upon the classified class.

In Step S726, the corresponding pixel obtaining unit 733 obtains pixels corresponding to the pixel value which is to be predicted from the background region image of the tutor image stored in the background region tutor image frame memory 701 based upon the classified class.

In Step S727, the normal equation generating unit 734 adds the pixel values of pixels corresponding to the prediction tap and the pixel value which is to be predicted to the matrix for each class based upon the classified class, the flow returns to Step S721, and the separated image processing unit 106 repeats judgment whether or not unprocessed pixels exist. The prediction tap and the matrix for each class to which the pixel values of pixels corresponding to the prediction tap and the pixel value which is to be predicted is added, corresponds to the normal equations for calculating a coefficient set for each class.

In Step S721, in the event that judgment is made that there are no unprocessed pixels in the student image, the flow proceeds to Step S728, and the normal equation generating unit 734 supplies the matrix for each class for which the pixel values of the pixels corresponding to the prediction tap and the pixel value which is to be predicted are set, to the coefficient calculation unit 735. The coefficient calculation unit 735 calculates a coefficient set for each class corresponding to the background region by solving the matrix for each class, wherein the pixel values of pixels corresponding to the prediction tap and the pixel value which is to be predicted are set.

Note that the coefficient set is not restricted to predicting the pixel values by linear prediction, rather, an arrangement may be made wherein the coefficient calculation unit 735 calculates a coefficient set for predicting the pixel values by non-linear prediction.

In Step S729, the coefficient calculation unit 735 outputs the coefficient set for each class, corresponding to the background region to the coefficient set memory 715, and the processing ends.

As described above, the learning unit 714-1 can generate a coefficient set corresponding to the background region.

The processing for generating the coefficient set corresponding to the background component image in the uncovered background region by the learning unit 714-2 corresponding to Step S703 is the same as the processing described with reference to the flowchart shown in FIG. 91 except for using the background component image in the uncovered background region stored in the uncovered background region background component tutor image frame memory 702 and the student image corresponding to the background component image in the uncovered background region stored in the uncovered background region background component student image frame memory 709, and accordingly, description thereof will be omitted.

The processing for generating of the coefficient set corresponding to the foreground component image in the uncovered background region by the learning unit 714-3 corresponding to Step S704 is the same as the processing described with reference to the flowchart shown in FIG. 91 except for using the foreground component image in the uncovered background region stored in the uncovered background region foreground component tutor image frame memory 703 and the student image corresponding to the foreground component image in the uncovered background region stored in the uncovered background region foreground component student image frame memory 710, and accordingly, description thereof will be omitted.

The processing for generating of the coefficient set corresponding to the background component image in the covered background region by the learning unit 714-4 corresponding to Step S705 is the same as the processing described with reference to the flowchart shown in FIG. 91 except for using the background component image in the covered background region stored in the covered background region background component tutor image frame memory 704 and the student image corresponding to the background component image in the covered background region stored in the covered background region background component student image frame memory 711, and accordingly, description thereof will be omitted.

The processing for generating of the coefficient set corresponding to the foreground component image in the covered background region by the learning unit 714-5 corresponding to Step S706 is the same as the processing described with reference to the flowchart shown in FIG. 91 except for using the foreground component image in the covered background region stored in the covered background region foreground component tutor image frame memory 705 and the student image corresponding to the foreground component image in the covered background region stored in the covered background region foreground component student image frame memory 712, and accordingly, description thereof will be omitted.

The processing for generating of the coefficient set corresponding to the foreground region by the learning unit 714-6 corresponding to Step S707 is the same as the processing described with reference to the flowchart shown in FIG. 91 except for using the image in the foreground region stored in the foreground region tutor image frame memory 706 and the student image corresponding to the image in the foreground region stored in the foreground region student image frame memory 713, and accordingly, description thereof will be omitted.

As described above, the separated image processing unit 106 of which configuration is shown in FIG. 84 can generate a coefficient set corresponding to the background region, a coefficient set corresponding to the background component image in the uncovered background region, a coefficient set corresponding to the foreground component image in the uncovered background region, a coefficient set corresponding to the background component image in the covered background region, a coefficient set corresponding to the foreground component image in the covered background region, and a coefficient set corresponding to the foreground region, individually.

Figure 92:
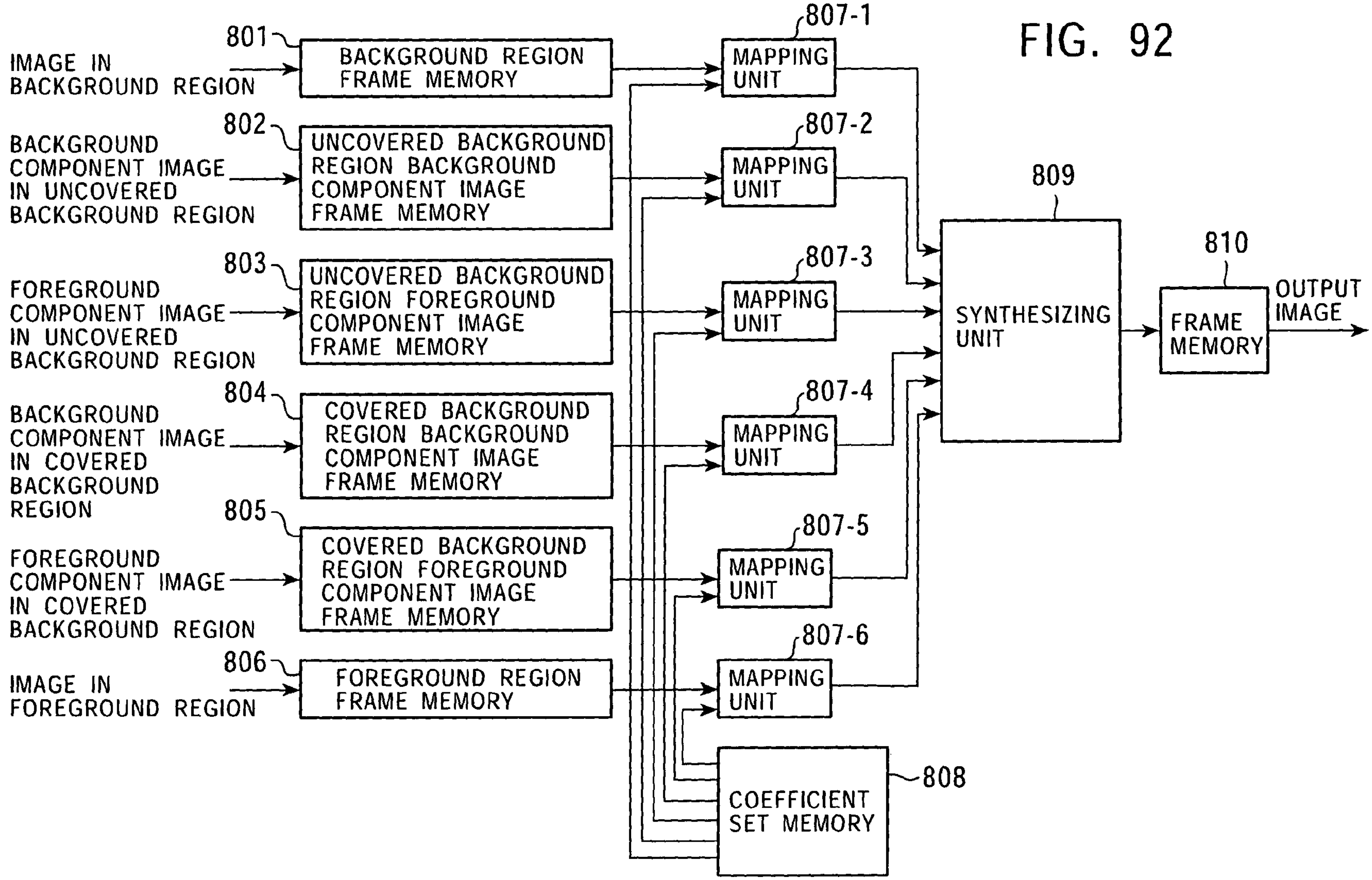
FIG. 92 is a block diagram illustrating the configuration of the separated image processing unit 106 which generates a higher resolution image in the spatial direction by executing class classification adaptation processing.

FIG. 92 is a block diagram which illustrates the configuration of the separated image processing unit 106 for generating an even higher resolution image in the spatial direction by performing the class classification adaptation processing. For example, the separated image processing unit 106 of which configuration is shown in FIG. 92 generates an HD image by performing the class classification processing based upon the input image which is an SD image.

Background region frame memory 801 stores the image in the background region made up of pixels belonging to the background region supplied from the foreground/background separation unit 105. The background region frame memory 801 supplies the stored image in the background region to a mapping unit 807-1.

Uncovered background region background component image frame memory 802 stores the background component image in the uncovered background region supplied from the foreground/background separation unit 105. The uncovered background region background component image frame memory 802 supplies the stored background component image in the uncovered background region to a mapping unit 807-2.

Uncovered background region foreground component image frame memory 803 stores the foreground component image in the uncovered background region supplied from the foreground/background separation unit 105. The uncovered background region foreground component image frame memory 803 supplies the stored foreground component image in the uncovered background region to a mapping unit 807-3.

Covered background region background component image frame memory 804 stores the background component image in the covered background region supplied from the foreground/background separation unit 105. The covered background region background component image frame memory 804 supplies the stored background component image in the covered background region to a mapping unit 807-4.

Covered background region foreground component image frame memory 805 stores the foreground component image in the covered background region supplied from the foreground/background separation unit 105. The covered background region foreground component image frame memory 805 supplies the stored foreground component image in the covered background region to a mapping unit 807-5.

Foreground region frame memory 806 stores the image in the foreground region made up of pixels belonging to the foreground region supplied from the foreground/background separation unit 105. The foreground region image frame memory 806 supplies the stored image in the foreground region to a mapping unit 807-6.

The mapping unit 807-1 generates a predicted image corresponding to the image in the background region stored in the background region frame memory 801 by the class classification adaptation processing based upon the coefficient set corresponding to the background region stored in coefficient set memory 808. The mapping unit 807-1 supplies the generated predicted image to a synthesizing unit 809.

The mapping unit 807-2 generates a predicted image corresponding to the background component image in the uncovered background region stored in the uncovered background region background component image frame memory 802 by the class classification adaptation processing based upon the coefficient set corresponding to the background component image in the uncovered background region stored in the coefficient set memory 808. The mapping unit 807-2 supplies the generated predicted image to the synthesizing unit 809.

The mapping unit 807-3 generates a predicted image corresponding to the foreground component image in the uncovered background region stored in the uncovered background region foreground component image frame memory 803 by the class classification adaptation processing based upon the coefficient set corresponding to the foreground component image in the uncovered background region stored in the coefficient set memory 808. The mapping unit 807-3 supplies the generated predicted image to the synthesizing unit 809.

The mapping unit 807-4 generates a predicted image corresponding to the background component image in the covered background region stored in the covered background region background component image frame memory 804 by the class classification adaptation processing based upon the coefficient set corresponding to the background component image in the covered background region stored in the coefficient set memory 808. The mapping unit 807-4 supplies the generated predicted image to the synthesizing unit 809.

The mapping unit 807-5 generates a predicted image corresponding to the foreground component image in the covered background region stored in the covered background region foreground component image frame memory 805 by the class classification adaptation processing based upon the coefficient set corresponding to the foreground component image in the covered background region stored in the coefficient set memory 808. The mapping unit 807-5 supplies the generated predicted image to the synthesizing unit 809.

The mapping unit 807-6 generates a predicted image corresponding to the image in the foreground region stored in the foreground region frame memory 806 by the class classification adaptation processing based upon the coefficient set corresponding to the foreground region stored in the coefficient set memory 808. The mapping unit 807-6 supplies the generated predicted image to the synthesizing unit 809.

The synthesizing unit 809 synthesizes the predicted image corresponding to the image in the background region supplied from the mapping unit 807-1, the predicted image corresponding to the background component image in the uncovered background region supplied from the mapping unit 807-2, the predicted image corresponding to the foreground component image in the uncovered background region supplied from the mapping unit 807-3, the predicted image corresponding to the background component image in the covered background region supplied from the mapping unit 807-4, the predicted image corresponding to the foreground component image in the covered background region supplied from the mapping unit 807-5, and the predicted image corresponding to the image in the foreground region supplied from the mapping unit 807-6, and supplies the synthesized predicted image to frame memory 810.

The frame memory 810 stores the predicted image. supplied from the synthesizing unit 809, and also outputs the stored image as an output image.

In the event that there is no need to differentiate the mapping unit 807-1 through the mapping unit 807-6 individually, these will be simply referred to as the mapping unit 807.

Figure 93:
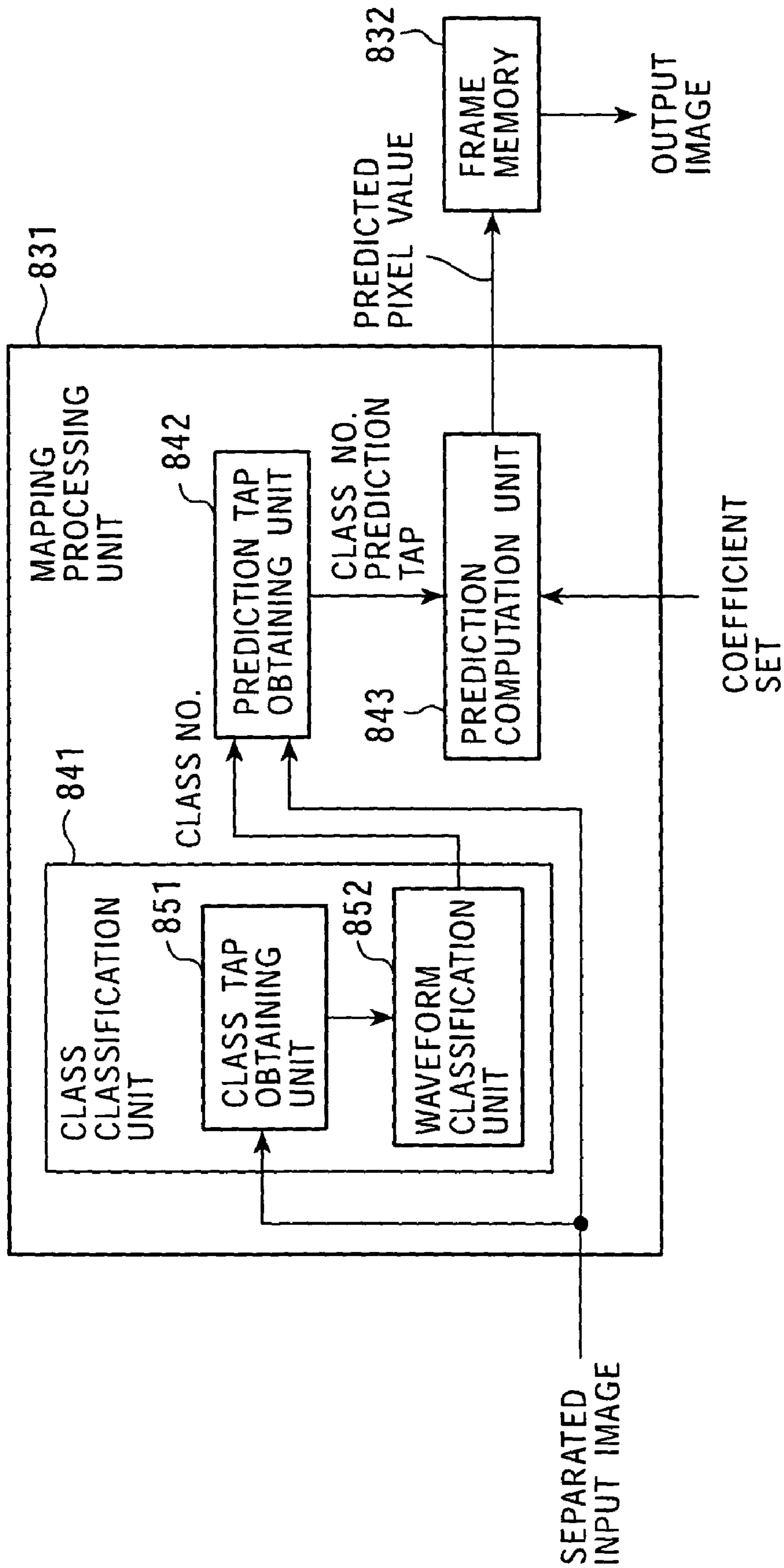
FIG. 93 is a block diagram illustrating the configuration of a mapping unit 807.

FIG. 93 is a block diagram which illustrates the configuration of the mapping unit 807.

The mapping processing unit 831 comprises a class classification unit 841 for performing the class classification processing, a prediction tap obtaining unit 842 for performing the adaptation processing, and a prediction computation unit 843.

The class classification unit 841 comprises a class tap obtaining unit 851 and a waveform classification unit 852, and classifies the pixel of interest in the separated input image which is one of the image in the background region, the background component image in the uncovered background region, the foreground component image in the uncovered background region, the background component image in the covered background region, the foreground component image in the covered background region, or the image in the foreground region.

The class tap obtaining unit 851 obtains a predetermined number of class taps corresponding to the pixel of interest of the separated input image, and supplies the obtained class taps to the waveform classification unit 852. For example, the class tap obtaining unit 851 obtains nine class taps, and supplies the obtained class taps to the waveform classification unit 852.

The waveform classification unit 852 reduces the number of bits of the pixels making up the class taps by applying the ADRC processing to the class taps, classifies the pixel of interest into one of the predetermined number of classes, and supplies the class No. corresponding to the classified class to the prediction tap obtaining unit 842. For example, the waveform classification unit 852 classifies the pixel of interest to one of 512 classes, and supplies the class No. corresponding to the classified class to the prediction tap obtaining unit 842.

The prediction tap obtaining unit 842 obtains the predetermined number of prediction taps corresponding to the class from the separated input image which is one of the image in the background region, the background component image in the uncovered background region, the foreground component image in the uncovered background region, the background component image in the covered background region, the foreground component image in the covered background region, or the image in the foreground region, based upon the class No., and supplies the obtained class taps and class No. to the prediction computation unit 843.

The prediction computation unit 843 obtains a coefficient set corresponding to the class and corresponding to the image which is to be predicted, from the coefficient sets corresponding to the background region, the background component image in the uncovered background region, the foreground component image in the uncovered background region, the background component image in the covered background region, the foreground component image in the covered background region, and the foreground region, stored in the coefficient set memory 808, based upon the class No. The prediction computation unit 843 predicts a pixel value in the predicted image by linear prediction based upon the coefficient set and the prediction taps corresponding to the class, and corresponding to the image which is to be predicted. The prediction computation unit 43 supplies the predicted pixel value to the frame memory 832.

Note that an arrangement may be made wherein the prediction computation unit 843 predicts the pixel value in the predicted image by non-linear prediction.

The frame memory 832 stores the predicted pixel values supplied from the mapping processing unit 831, and outputs the image made up of the predicted pixel values.

Referring to the images shown in FIG. 94A through FIG. 99B, description will be made with regard to the results of the processing of the image processing device according to the present invention having the separated image processing unit 106 of which configuration is shown in FIG. 92.

In the processing for generating results shown by way of examples, the sum of the number of classes in the class classification adaptation processing in the image processing device of the present invention is approximately the same as the number of classes in the conventional class classification adaptation processing. That is to say, the number of classes in the conventional class classification adaptation processing is 2048, and the number of the classes in the class classification adaptation processing in the image processing device of the present invention corresponding to the images in each region is arranged to be 512.

Also, the number of the prediction taps in the conventional class classification adaptation processing and the number of the prediction taps in the class classification adaptation processing for each region in the image processing device of the present invention, are 9, i.e., the same.

Referring to FIG. 94A through FIG. 96B, the results of the prediction in the covered background region will be described.

Figure 94A:
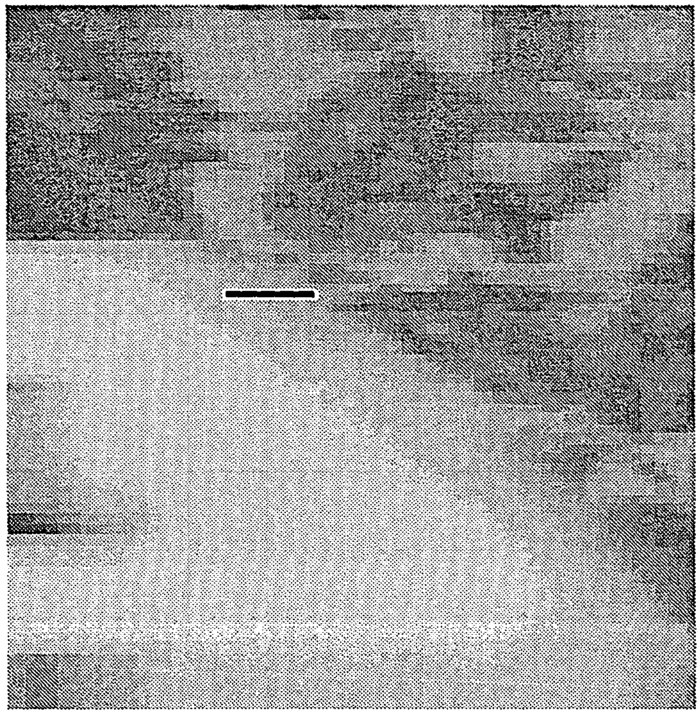
FIG. 94A is a diagram illustrating an example of an image in the mixed region of a tutor image.
Figure 94B:
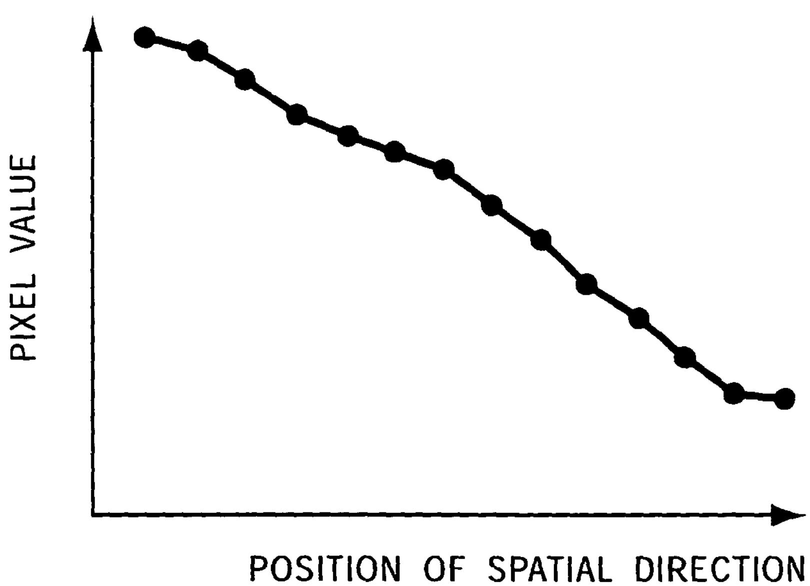
FIG. 94B is a diagram illustrating change in pixel values corresponding to the position in the spatial direction of an image in the mixed region of a tutor image.

FIG. 94A is a diagram which illustrates an example of the image in the mixed region of the tutor image. FIG. 94B is a diagram which indicates the change in pixel value corresponding to the position in the spatial direction in the image in the mixed region of the tutor image.

Figure 95A:
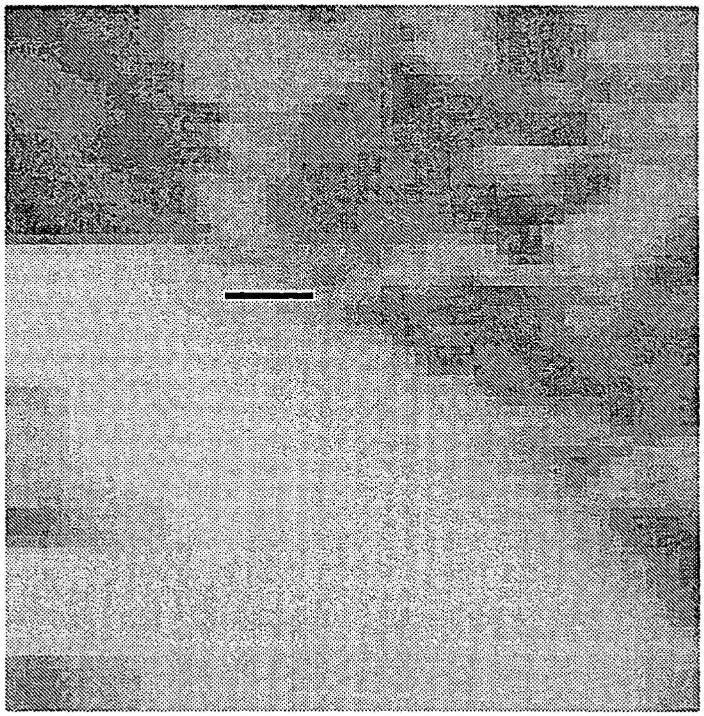
FIG. 95A is a diagram illustrating an example of an image in a mixed region, generated by conventional class classification adaptation processing.
Figure 95B:
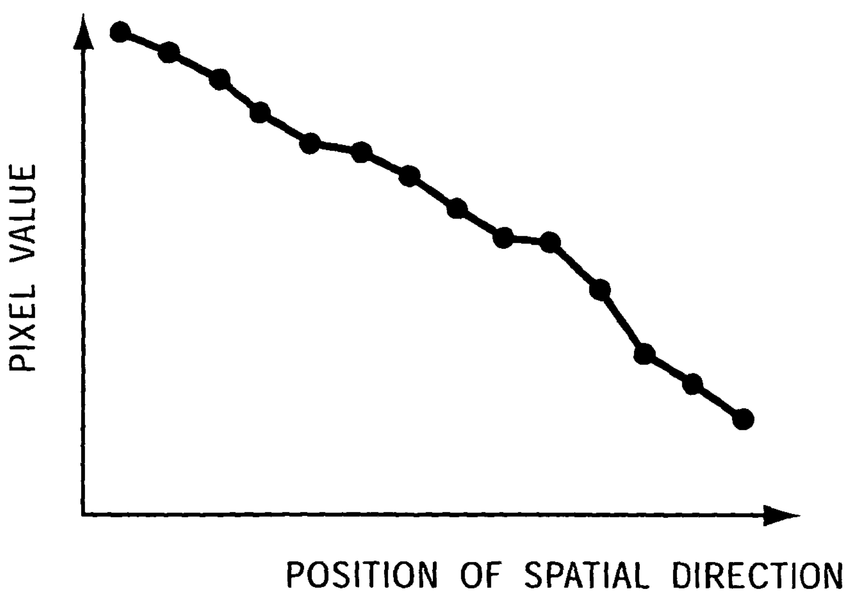
FIG. 95B is a diagram illustrating change in the pixel values corresponding to position in the spatial direction of an image in a mixed region, generated by conventional class classification adaptation processing.

FIG. 95A is a diagram which illustrates an example of the image in the mixed region generated by the conventional class classification adaptation processing corresponding to the tutor image illustrated in FIG. 94A. FIG. 95B is a diagram which indicates the change in pixel value corresponding to the position in the spatial direction in the image in the mixed region, generated by the conventional class classification adaptation processing, corresponding to the tutor image illustrated in FIG. 94.

Figure 96A:
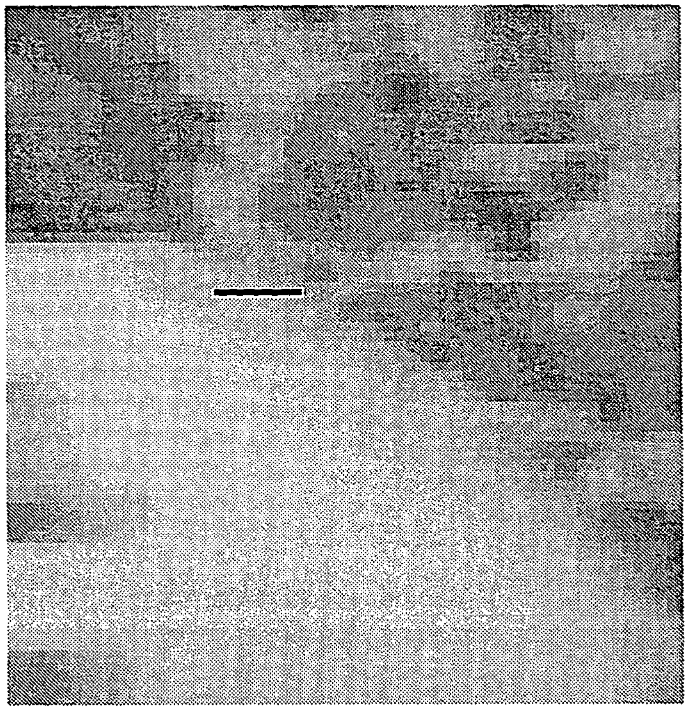
FIG. 96A is a diagram illustrating an example of an image in a mixed region, generated by the image processing device according to the present invention.
Figure 96B:
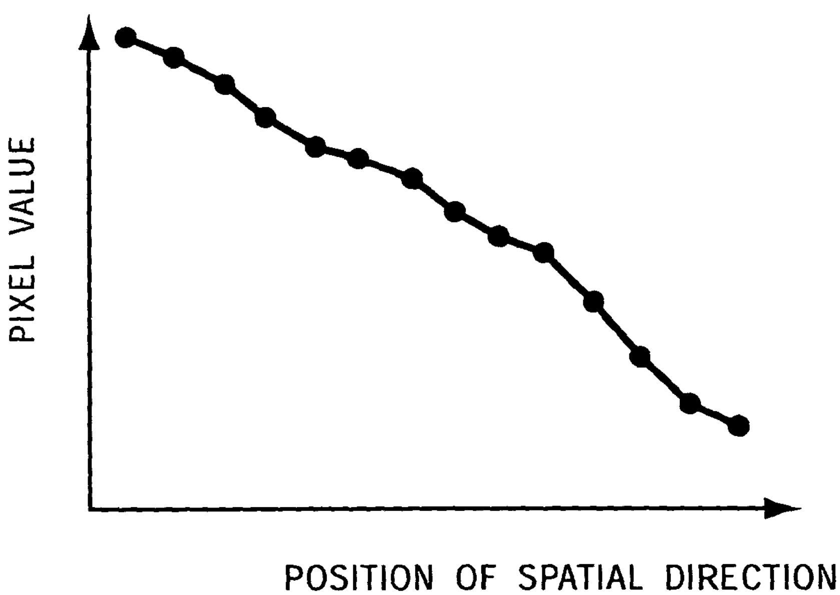
FIG. 96B is a diagram illustrating change in the pixel values corresponding to the position in the spatial direction of a mixed region image, generated by the image processing device according to the present invention.

FIG. 96A is a diagram which illustrates an example of the image in the mixed region, generated by the separated image processing unit 106 of which configuration is shown in FIG. 92, corresponding to the tutor image shown in FIG. 94A. FIG. 95B is a diagram which indicates the change in pixel value corresponding to the position in the spatial direction in the image in the mixed region, generated by the separated image processing unit 106 of which configuration is shown in FIG. 92, corresponding to the tutor image shown in FIG. 94A.

The pixel values in the image in the mixed region, generated by the conventional class classification adaptation processing, change in a stepped manner, as compared with the tutor image, and also are visually confirmed to change in a stepped manner in the actual generated image.

Conversely, the pixel values in the image in the mixed region, generated by the separated image processing unit 106 of which configuration is shown in FIG. 92, change more smoothly as compared with conventional arrangement, and indicates change even closer to the tutor image. Also, in the event of visually confirming the image generated by the separated image processing unit 106, the image is confirmed to be an even smoother image as compared with conventional arrangement.

The image in the mixed region, generated by the separated image processing unit 106 of which configuration is shown in FIG. 92, changes more smoothly as compared with the image generated by the input image being divided into the foreground region, mixed region, or background region.

Referring to FIG. 97A through FIG. 99B, description will be made with regard to the results of the prediction in the foreground region wherein the pixel values change generally linearly with regard to the pixel position.

Figure 97A:
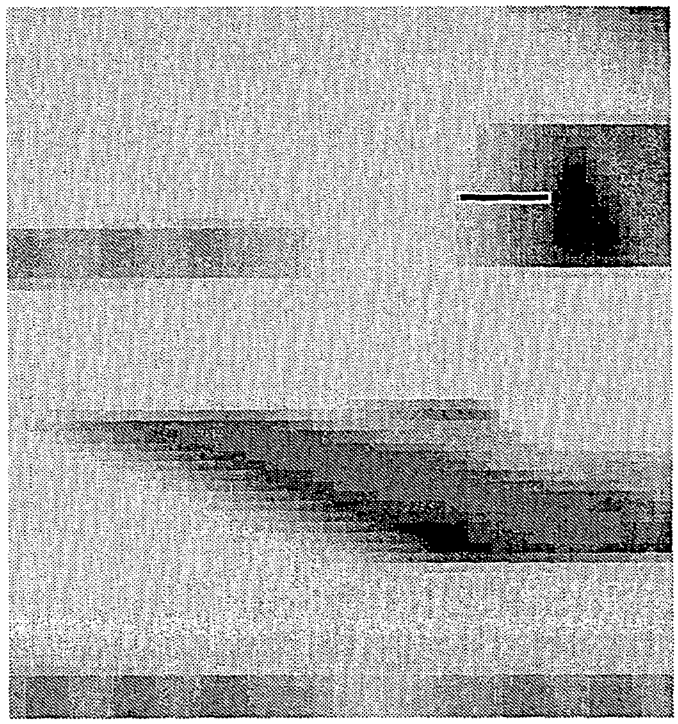
FIG. 97A is a diagram illustrating an example of an image in a foreground region of a tutor image.
Figure 97B:
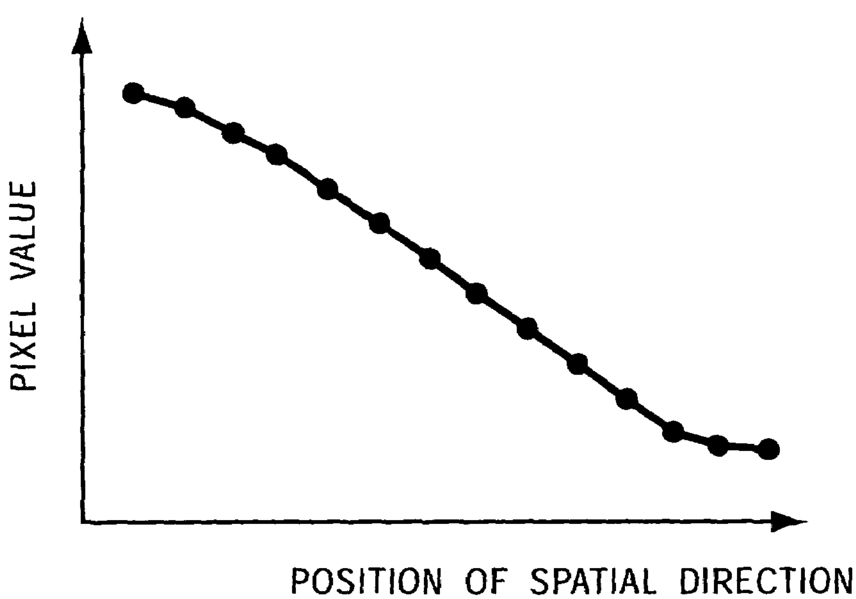
FIG. 97B is a diagram illustrating change in pixel values of an image in the foreground region of a tutor image.

FIG. 97A is a diagram which illustrates an example of the image in the foreground region in the tutor image wherein the pixel values change generally linearly. FIG. 97B is a diagram which indicates change in pixel value corresponding to the position in the spatial direction in the image in the foreground region of the tutor image wherein the pixel values change generally linearly.

Figure 98A:
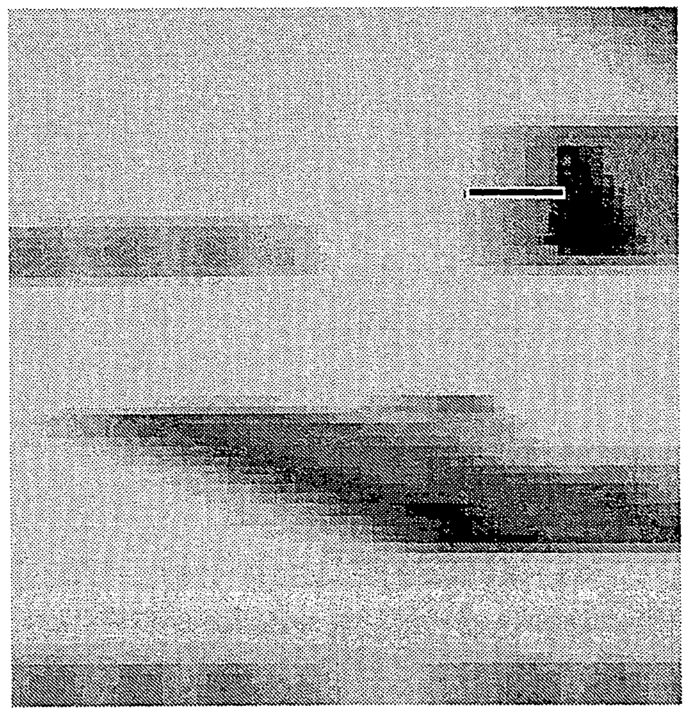
FIG. 98A is a diagram illustrating an example of an image in a foreground region, generated by conventional class classification adaptation processing.
Figure 98B:
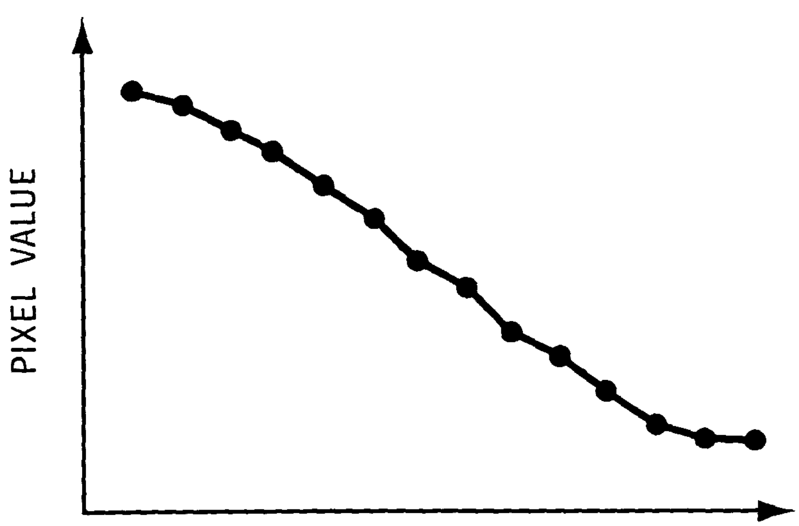
FIG. 98B is a diagram illustrating change in the pixel values of an image in a foreground region, generated by conventional class classification adaptation processing.

FIG. 98A is a diagram which illustrates an example of the image in the foreground region, corresponding to the image shown in FIG. 97A, generated by the conventional class classification adaptation processing. FIG. 98B is a diagram which indicates the change in pixel value corresponding to the position in the spatial direction, in the image in the foreground region, corresponding to the image shown in FIG. 97A, generated by the conventional class classification adaptation processing.

Figure 99A:
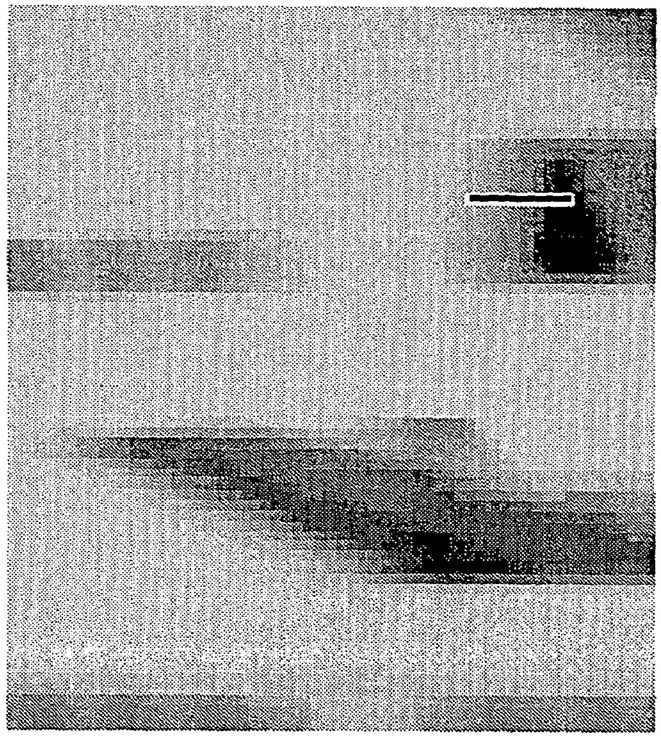
FIG. 99A is a diagram illustrating an example of an image in a foreground region, generated by the image processing device according to the present invention.
Figure 99B:
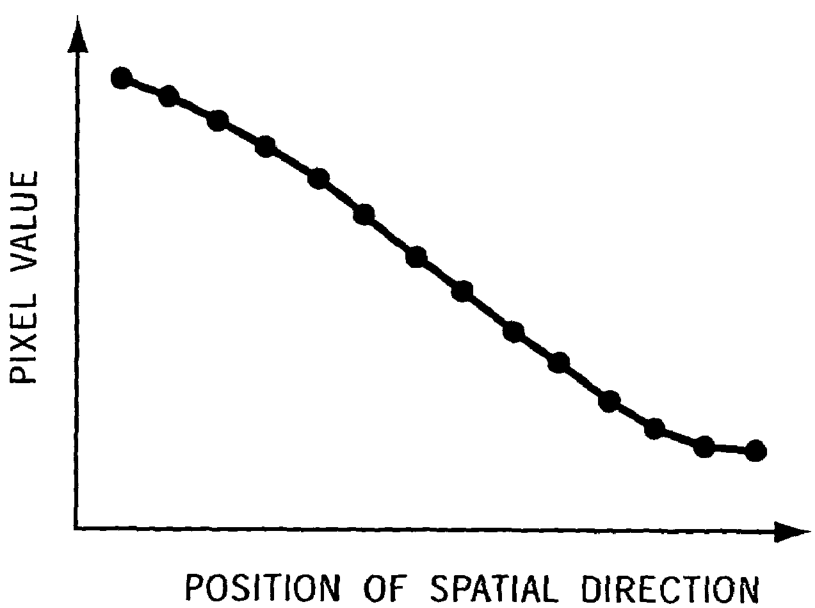
FIG. 99B is a diagram illustrating change in the pixel values corresponding to position in the spatial direction of a foreground region image, generated by the image processing device according to the present invention.

FIG. 99A is a diagram which illustrates an example of the image in the foreground region corresponding to the image shown in FIG. 97A, generated by the separated image processing unit 106 of which configuration is shown in FIG. 92. FIG. 99B is a diagram which indicates the change in pixel value, corresponding to the position in the spatial direction, in the image in the foreground region, corresponding to the image shown in FIG. 97A, generated by the separated image processing unit 106 of which configuration is shown in FIG. 92.

The pixel values in the image in the foreground region generated by the conventional class classification adaptation processing change in a stepped manner as compared with the tutor image in the same manner as the mixed region, and the change in a stepped manner can be visually recognized in the actual image.

Conversely, the pixel values in the image in the foreground region generated by the separated image processing unit 106 of which configuration is shown in FIG. 92, change more smoothly as compared with conventional arrangement, and are extremely close to the values in the tutor image. In visual confirmation of the image generated by the separated image processing unit 106, the difference between the image and the tutor image could not be observed.

Figure 100:
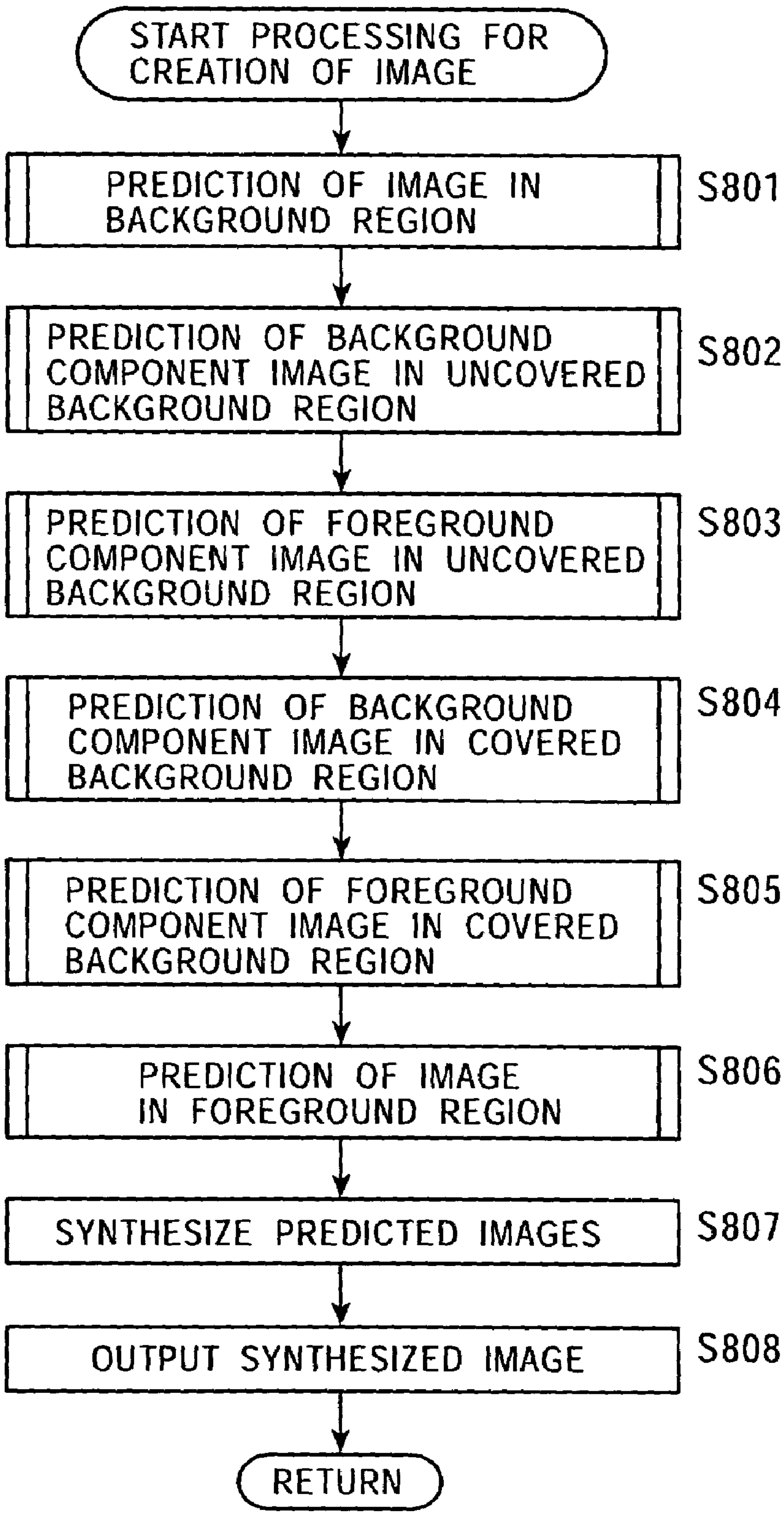
FIG. 100 is a flowchart explaining the processing for creating images with the separated image processing unit 106.

Referring to the flowchart shown in FIG. 100, description will now be made with regard to the processing for creation of an image by the separated image processing unit 106 of which configuration is shown in FIG. 92.

In Step S801, the mapping unit 807-1 predicts an image corresponding to the image in the background region stored in the background region frame memory 801 by the class classification adaptation processing based upon the coefficient set corresponding to the background region stored in the coefficient set memory 808.

Figure 101:
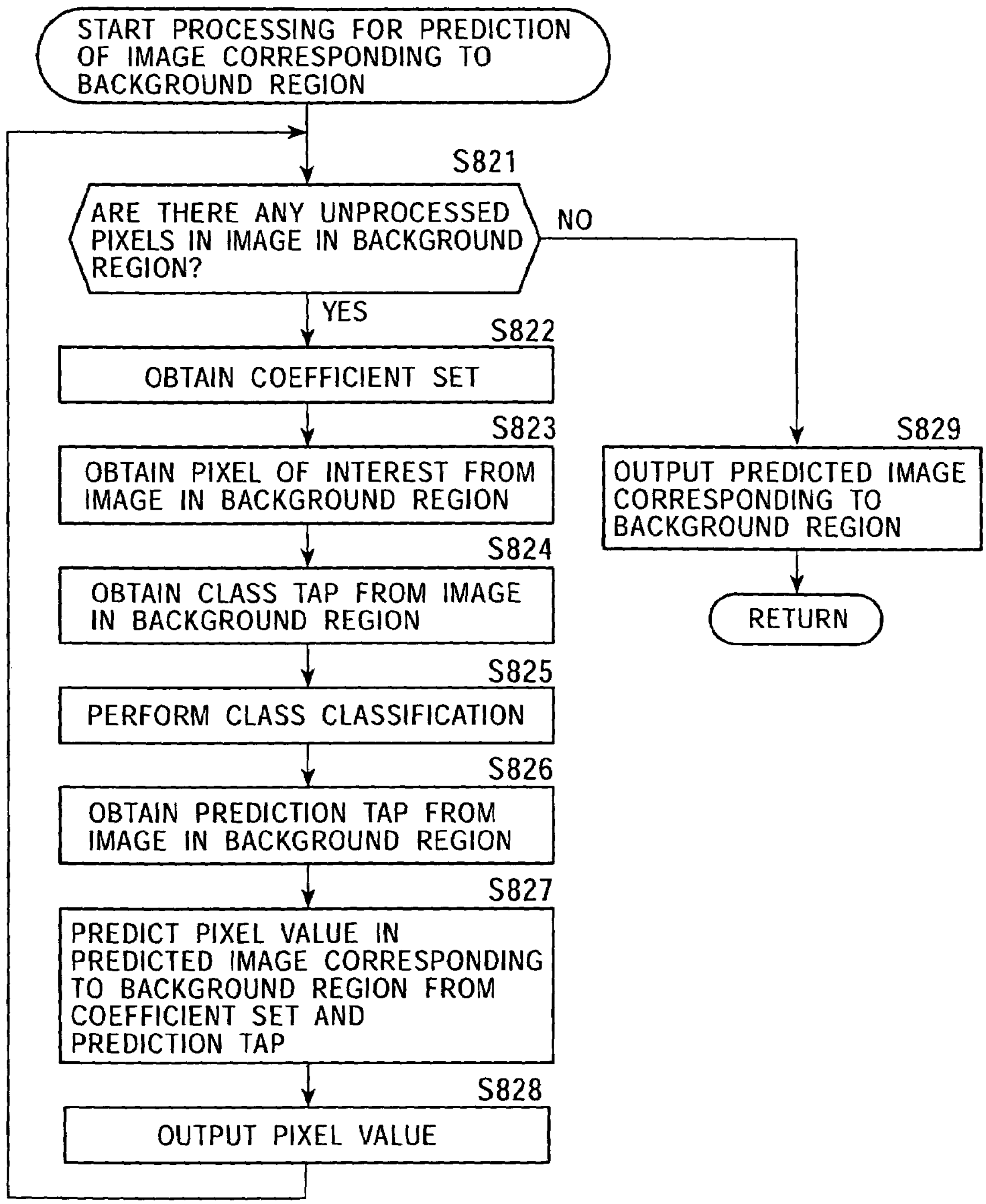
FIG. 101 is a flowchart describing processing for predicting images corresponding to the background region.

Details of the processing for prediction of the image corresponding to the image in the background region will be described later with reference to the flowchart shown in FIG. 101.

In Step S802, the mapping unit 807-2 predicts an image corresponding to the background component image in the uncovered background region stored in the uncovered background region background component image frame memory 802 by the class classification adaptation processing based upon the coefficient set corresponding to the background component image in the uncovered background region stored in the coefficient set memory 808.

In Step S803, the mapping unit 807-3 predicts an image corresponding to the foreground component image in the uncovered background region stored in the uncovered background region foreground component image frame memory 803 by the class classification adaptation processing based upon the coefficient set corresponding to the foreground component image in the uncovered background region stored in the coefficient set memory 808.

In Step S804, the mapping unit 807-4 predicts an image corresponding to the background component image in the covered background region stored in the covered background region background component image frame memory 804 by the class classification adaptation processing based upon the coefficient set corresponding to the background component image in the covered background region stored in the coefficient set memory 808.

In Step S805, the mapping unit 807-5 predicts an image corresponding to the foreground component image in the covered background region stored in the covered background region foreground component image frame memory 805 by the class classification adaptation processing based upon the coefficient set corresponding to the foreground component image in the covered background region stored in the coefficient set memory 808.

In Step S806, the mapping unit 807-6 predicts an image corresponding to the image in the foreground region stored in the foreground region frame memory 806 by the class classification adaptation processing based upon the coefficient set corresponding to the foreground region stored in the coefficient set memory 808.

In Step S807, the synthesizing unit 809 synthesizes the predicted image corresponding to the image in the background region, the predicted image corresponding to the background component image in the uncovered background region, the predicted image corresponding to the foreground component image in the uncovered background region, the predicted image corresponding to the background component image in the covered background region, the predicted image corresponding to the foreground component image in the covered background region, and the predicted image corresponding to the foreground region. The synthesizing unit 809 supplies the synthesized image to the frame memory 810. The frame memory 810 stores the image supplied from the synthesizing unit 809.

In Step S808, the frame memory 810 outputs the stored synthesized image, and the processing ends.

As described above, the image processing device having the separated image processing unit 106 of which configuration is shown in FIG. 92 can generate a predicted image for each of separated images, i.e., the image in the background region, the background component image in the uncovered background region, the foreground component image in the uncovered background region, the background component image in the covered background region, the foreground component image in the covered background region, and the image in the foreground region.

Note that it is needless to say that the processing in Step S801 through Step S806 may be performed in serial manner, as well as in a parallel manner.

Referring to the flowchart shown in FIG. 101, the processing for prediction of the image corresponding to the background region by the mapping unit 807-1 corresponding to Step S801 will be described.

In Step S821, the mapping unit 807-1 judges whether or not there are any unprocessed pixels in the background region, and in the event that judgment is made that there are unprocessed pixels in the background region image, the flow proceeds to Step S822, and the mapping processing unit 831 obtains the coefficient set corresponding to the background region stored in the coefficient set memory 808. In Step S823, the mapping processing unit 831 obtains a pixel of interest from the image of the background region stored in the background region frame memory 801 in raster scan sequence.

In Step S824, the class tap obtaining unit 851 of the class classification unit 841 obtains the class tap corresponding to the pixel of interest from the image in the background region stored in the background region frame memory 801. In Step S825, the waveform classification unit 852 of the class classification unit 841 reduces the number of bits of pixels making up the class tap by applying the ADRC processing to the class tap, and performs class classification for the pixel of interest. In Step S826, the predication tap obtaining unit 842 obtains the prediction tap corresponding to the pixel of interest from the image in the background region stored in the background region frame memory 801 based upon the classified class.

In Step S827, the prediction computation unit 843 predicts pixel values of the predicted image by linear prediction based upon the coefficient set and the prediction tap, corresponding to the background region and the classified class.

Note that the prediction computation unit 843 may predict the pixel values of the predicted image by non-linear prediction, as well as by linear prediction.

In Step S828, the prediction computation unit 843 outputs the predicted pixel value to the frame memory 832. The frame memory 832 stores the pixel value supplied from the prediction computation unit 843. The procedure returns to Step S821, and judgment whether or not any unprocessed pixels exist is repeated.

In Step S821, in the event that judgment is made that there is no unprocessed pixel in the image in the background region, the flow proceeds to Step S829, the frame memory 832 outputs the stored predicted image corresponding to the image in the background region, and processing ends.

As described above, the mapping unit 807-1 can predict the image corresponding to the image in the background region based upon the image in the background region of the separated input image.

The processing for generating of the predicted image corresponding to the background component image in the uncovered background region by the mapping unit 807-2 corresponding to Step S802 is the same as the processing described with reference to the flowchart shown in FIG. 101 except for using the background component image in the uncovered background region stored in the uncovered background region background component image frame memory 802 and the coefficient set corresponding to the background component image in the uncovered background region, and accordingly, description thereof will be omitted.

The processing for generating of the predicted image corresponding to the foreground component image in the uncovered background region by the mapping unit 807-3 corresponding to Step S803 is the same as the processing described with reference to the flowchart shown in FIG. 101 except for using the foreground component image in the uncovered background region stored in the uncovered background region foreground component image frame memory 803 and the coefficient set corresponding to the foreground component image in the uncovered background region, and accordingly, description thereof will be omitted.

The processing for generating of the predicted image corresponding to the background component image in the covered background region by the mapping unit 807-4 corresponding to Step S804 is the same as the processing described with reference to the flowchart shown in FIG. 101 except for using the background component image in the covered background region stored in the covered background region background component image frame memory 804 and the coefficient set corresponding to the background component image in the covered background region, and accordingly, description thereof will be omitted.

The processing for generating of the predicted image corresponding to the foreground component image in the covered background region by the mapping unit 807-5 corresponding to Step S805 is the same as the processing described with reference to the flowchart shown in FIG. 101 except for using the foreground component image in the covered background region stored in the covered background region foreground component image frame memory 805 and the coefficient set corresponding to the foreground component image in the covered background region, and accordingly, description thereof will be omitted.

The processing for generating of the predicted image corresponding to the image in the foreground region by the mapping unit 807-6 corresponding to Step S806 is the same as the processing described with reference to the flowchart shown in FIG. 101 except for using the image in the foreground region stored in the foreground region frame memory 806 and the coefficient set corresponding to the foreground region, and accordingly, description thereof will be omitted.

As described above, the separated image processing unit 106 of which configuration is shown in FIG. 92 can generate a predicted image for each of images, i.e., the image in the background region, the background component image in the uncovered background region, the foreground component image in the uncovered background region, the background component image in the covered background region, the foreground component image in the covered background region, or the image in the foreground region.

Figure 102:
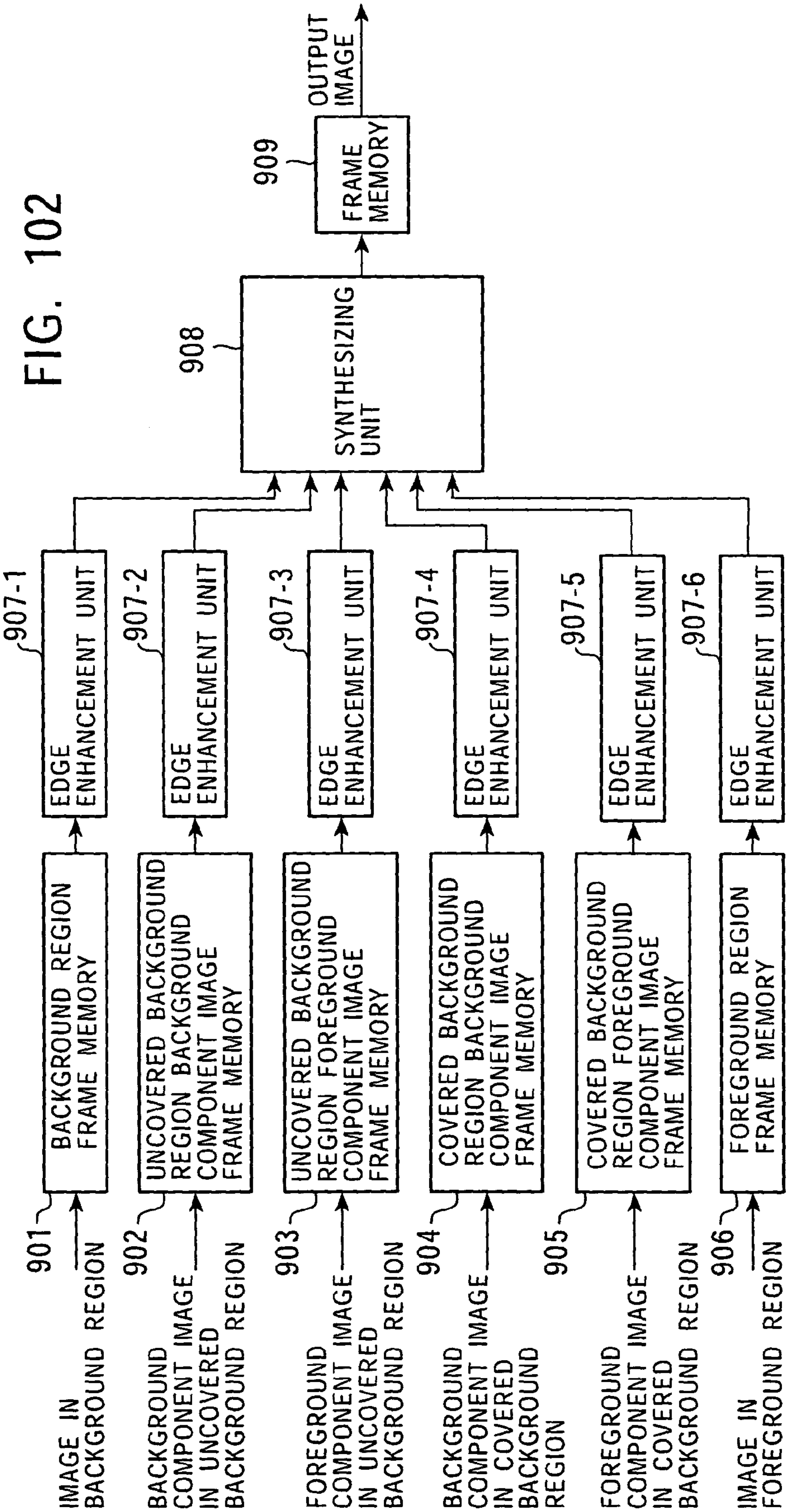
FIG. 102 is a block diagram illustrating the configuration of the separated image processing unit 106 wherein edge enhancing processing with difference effects is applied for each region.

FIG. 102 is a block diagram which illustrates the configuration of the separated image processing unit 106 for applying the edge enhancement processing having different effects to each of images, i.e., the image in the background region, the background component image in the uncovered background region, the foreground component image in the uncovered background region, the background component image in the covered background region, the foreground component image in the covered background region, or the image in the foreground region.

Background region frame memory 901 stores the image in the background region made up of the pixels belonging to the background region supplied from the foreground/background separation unit 105. The background region frame memory 901 supplies the stored image in the background region to an edge enhancing unit 907-1.

Uncovered background region background component image frame memory 902 stores the background component image in the uncovered background region supplied from the foreground/background separation unit 105. The uncovered background region background component image frame memory 902 supplies the stored background component image in the uncovered background region to an edge enhancing unit 907-2.

Uncovered background region foreground component image frame memory 903 stores the foreground component image in the uncovered background region supplied from the foreground/background separation unit 105. The uncovered background region foreground component image frame memory 903 supplies the stored foreground component image in the uncovered background region to an edge enhancing unit 907-3.

Covered background region background component image frame memory 904 stores the background component image in the covered background region supplied from the foreground/background separation unit 105. The covered background region background component image frame memory 904 supplies the stored background component image in the covered background region to an edge enhancing unit 907-4.

Covered background region foreground component image frame memory 905 stores the foreground component image in the covered background region supplied from the foreground/background separation unit 105. The covered background region foreground component image frame memory 905 supplies the stored foreground component image in the covered background region to an edge enhancing unit 907-5.

Foreground region frame memory 906 stores the image in the foreground region made up of the pixels belonging to the foreground region supplied from the foreground/background separation unit 105. The foreground region frame memory 906 supplies the stored image in the foreground region to an edge enhancing unit 907-6.

The edge enhancing unit 907-1 supplies the image in the background region, which has been subjected to edge enhancement by applying the edge enhancement processing suitable for the image in the background region, to the image in the background region stored in the background region frame memory 901, to a synthesizing unit 908.

For example, the edge enhancing unit 907-1 performs the edge enhancement processing which further enhances edges for the image in the background region which is the still image, as compared with the foreground region. Thus the sense-of-resolution of the image in the background region can be improved without unnatural degradation of the image occurring in the event of applying the processing of edge enhancement to a moving image.

The edge enhancing unit 907-2 applies the edge enhancement processing suitable for the background component image in the uncovered background region, to the image stored in the uncovered background region background component image frame memory 902, and supplies the image which has been subjected to edge enhancement to the synthesizing unit 908.

For example, the edge enhancing unit 907-2 performs the edge enhancement processing which further enhances edges for the background component image in the uncovered background region which is the still image, as compared with the foreground region. Thus the sense-of-resolution of the image in the background region can be improved without unnatural degradation of the image occurring in the event of applying the processing of edge enhancement to a moving image.

The edge enhancing unit 907-3 applies edge enhancement processing suitable to the foreground component image of the uncovered background region, to the image stored in the uncovered background region foreground component image frame memory 903, and supplies the image which has been subjected to edge enhancement to the synthesizing unit 908.

For example, the edge enhancing unit 907-3 performs the processing of edge enhancement, which enhances the edge for the foreground component image of the covered background region made up of moving foreground components less than as compared with the background region. Thus, the sense-of-resolution of the foreground component image of the covered background region can be improved without unnatural degradation of the image occurring in the event of applying the processing of edge enhancement to a moving image.

The edge enhancing unit 907-4 applies edge enhancement processing suitable to the background component image of the covered background region, to the image stored in the covered background region background component image frame memory 904, and supplies the image which has been subjected to edge enhancement to the synthesizing unit 908.

For example, the edge enhancing unit 907-4 performs the processing of edge enhancement, which further enhances the edge for the background component image of the covered background region which is a still image, as compared with the foreground region. Thus, the sense-of-resolution of the background region image can be improved without unnatural degradation of the image occurring in the event of applying the processing of edge enhancement to a moving image.

The edge enhancing unit 907-5 applies edge enhancement processing suitable to the foreground component image of the covered background region, to the image stored in the covered background region foreground component image frame memory 905, and supplies the image which has been subjected to edge enhancement to the synthesizing unit 908.

For example, the edge enhancing unit 907-5 performs the processing of edge enhancement, which enhances the edge for the foreground component image of the covered background region made up of moving foreground components less than as compared with the background region. Thus, the sense-of-resolution of the foreground region image of the covered background region can be improved without unnatural degradation of the image occurring in the event of applying the processing of edge enhancement to a moving image.

The edge enhancing unit 907-6 applies edge enhancement processing suitable to the foreground region image, to the foreground region image stored in the foreground region frame memory 906, and supplies the foreground region image which has been subjected to edge enhancement to the synthesizing unit 908.

For example, the edge enhancing unit 907-6 performs the processing of edge enhancement, which enhances the edge of the moving foreground region image less than as compared with the background region. Thus, the sense-of-resolution of the foreground region image can be improved without unnatural degradation of the image occurring in the event of applying the processing of edge enhancement to a moving image.

The synthesizing unit 908 synthesizes the background region image subjected to edge enhancing that has been supplied from the edge enhancing unit 907-1, the background component image of the uncovered background region subjected to edge enhancing that has been supplied from the edge enhancing unit 907-2, the foreground component image of the uncovered background region subjected to edge enhancing that has been supplied from the edge enhancing unit 907-3, the background component image of the covered background region subjected to edge enhancing that has been supplied from the edge enhancing unit 907-4, the foreground component image of the covered background region subjected to edge enhancing that has been supplied from the edge enhancing unit 907-5, and the foreground region image subjected to edge enhancing that has been supplied from the edge enhancing unit 907-6, and supplies the synthesized image to the frame memory 909.

The frame memory 909 stores the synthesized image supplied from the synthesizing unit 908, and also outputs the stored image as an output image.

Thus, the separated image processing unit 106 of which configuration is shown in FIG. 74 applies edge enhancement processing corresponding to the nature of each image of each of regions, i.e., the background region, uncovered background region, covered background region, or the foreground region, so the sense-of-resolution of the image can be improved without unnatural degradation of the image occurring.

In the event that there is no need to differentiate the edge enhancing units 907-1 through 907-6, these will be simply referred to as the edge enhancing unit 907.

Figure 103:
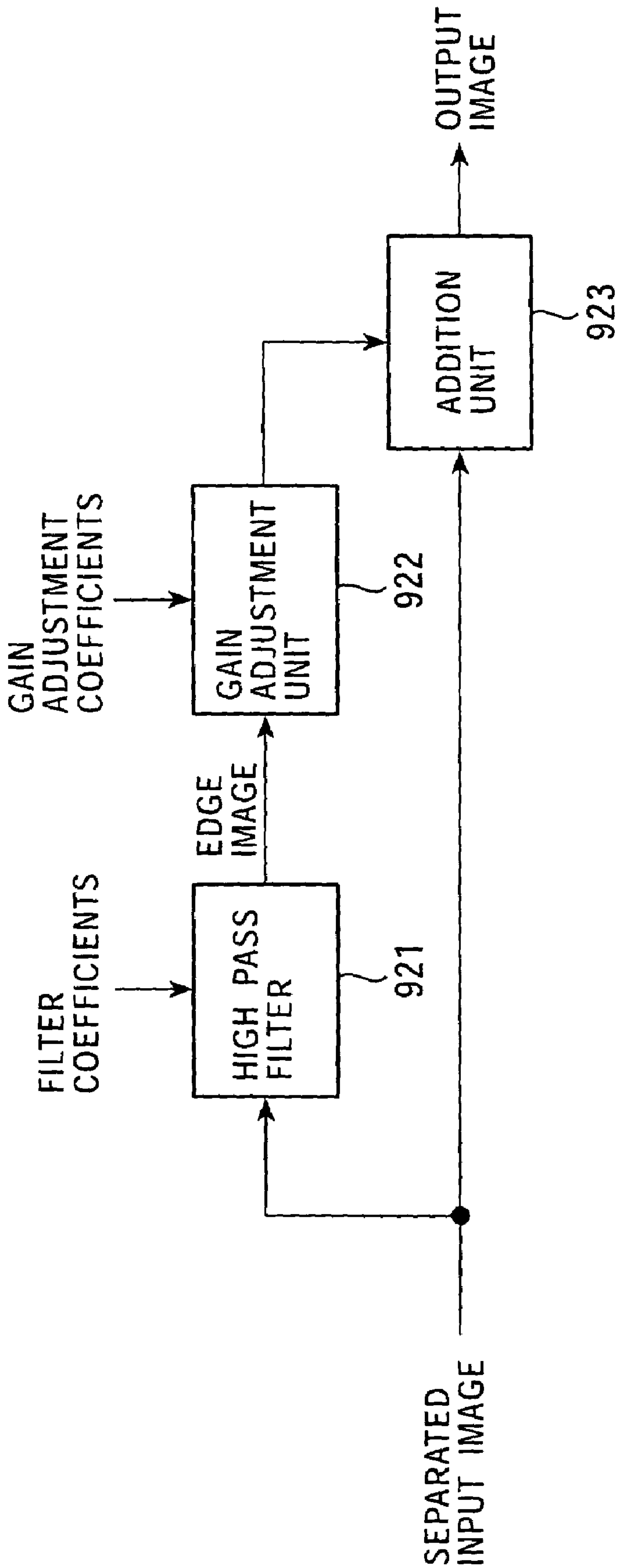
FIG. 103 is a block diagram illustrating the configuration of an edge enhancing unit 907.

FIG. 103 is a block diagram which illustrates the configuration of the edge enhancing unit 907. The separated input image is input to a high pass filter 921 and an addition unit 923.

The high pass filter 921 extracts the components wherein the pixel value changes drastically with regard to pixel position, i.e., the high image frequency components from the input image based upon the input filter coefficients, and removes the components wherein the change of the pixel value is small with regard to the pixel position, i.e., the low image frequency components, and generates an edge image.

Figure 104A:
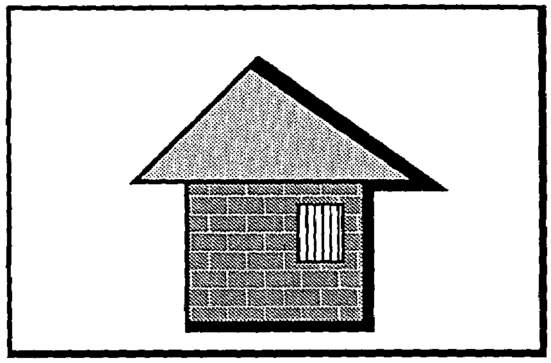
FIG. 104A is a diagram describing the processing for edge enhancement.
Figure 104B:
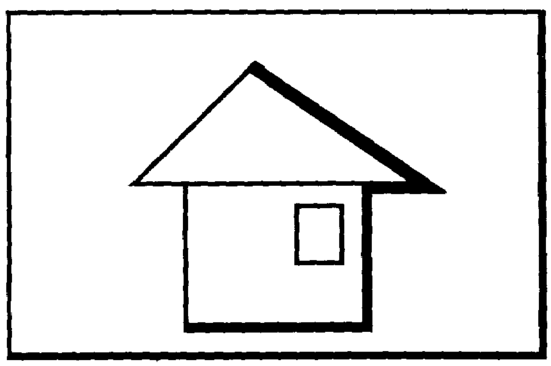

For example, in the event of inputting the image shown in FIG. 104A, the high pass filter 921 generates the edge image shown in FIG. 104B.

In the event that the input filter coefficients change, the high pass filter 921 changes the image frequencies which are to be extracted, the image frequencies which are to be removed, and the gain for the image which is to be extracted.

Referring to FIG. 105 through FIG. 108, the relationship between the filter coefficients and the edge image will be described.

FIG. 105 is a diagram which illustrates the first example of the filter coefficients. In FIG. 105, E indicates the exponent of 10. For example, E-04 indicates $10^{-4}$, and E-02 indicates $10^{-2}$.

For example, the high pass filter 921 multiplies each of pixel values, i.e., the pixel value of the pixel of interest, the pixel values of the pixels distanced from the pixel of interest by 1 pixel to 15 pixels in a predetermined direction in the spatial direction Y, and the pixel values of pixels distanced from the pixel of interest by 1 pixel to 15 pixels in another direction in the spatial direction Y, by the corresponding coefficient of the filter coefficients shown in FIG. 105. The high pass filter 921 calculates the sum of the results obtained by multiplying each pixel value of the pixels by the coefficient corresponding thereto, and sets the calculated sum for the pixel value of the pixel of interest.

For example, in the event of using the filter coefficients shown in FIG. 105, the high pass filter 921 multiplies the pixel value of the pixel of interest by 1.2169396, multiplies the pixel value of the pixel distanced from the pixel of interest by 1 pixel in the upper direction in the screen by −0.52530356, and multiplies the pixel value of the pixel distanced from the pixel of interest by 2 pixels in the upper direction in the screen by −0.22739914.

In the same way, in the event of using the filter coefficients shown in FIG. 105, the high pass filter 921 multiplies each of pixels distanced from the pixel of interest by 3 pixels to 13 pixels in the upper direction in the screen by the corresponding coefficient, multiplies the pixel value of the pixel distanced from the pixel of interest by 14 pixels in the upper direction in the screen by −0.00022540586, and multiplies the pixel value of the pixel distanced from the pixel of interest by 15 pixels in the upper direction in the screen by −0.00039273163.

In the event of using the filter coefficients shown in FIG. 105, in the same way, the high pass filter 921 multiplies each of pixels distanced from the pixel of interest by 1 pixel to 15 pixels in the bottom direction in the screen by the corresponding coefficient.

The high pass filter 921 calculates the sum of results obtained by multiplying the pixel value of the pixel of interest, each pixel value of pixels distanced from the pixel of interest by 1 pixel to 15 pixels in the top direction in the screen, and each pixel value of pixels distanced from the pixel of interest by 1 pixel to 15 pixels in the bottom direction in the screen, by the corresponding coefficient. The high pass filter 921 sets the calculated sum to the pixel value of the pixel of interest.

The high pass filter 921 moves the position of the pixel of interest in sequence in the spatial direction X, repeats the above-described processing, and calculates pixel values for the entire screen.

The high pass filter 921 then multiplies the pixel value of the interest, each pixel value of pixels distanced from the pixel of interest by 1 pixel to 15 pixels in a predetermined direction in the spatial direction X, and each pixel value of pixels distanced from the pixel of interest by 1 pixel to 15 pixels in another direction in the spatial direction X, in the image of which pixel values are calculated based upon the coefficients described above, by the corresponding coefficient of the filter coefficients shown in FIG. 105. The high pass filter 921 calculates the sum of the results obtained by multiplying each pixel value of pixels by the corresponding coefficient, and sets the calculated sum to the pixel value of the pixel of interest.

The high pass filter 921 moves the position of the pixel of interest in sequence in the spatial direction Y, repeats the above-described processing, and calculates pixel values of pixels for the entire image.

That is to say, in this case, the high pass filter 921 is a so-called one-dimensional filter using the coefficients shown in FIG. 105.

Figure 106:
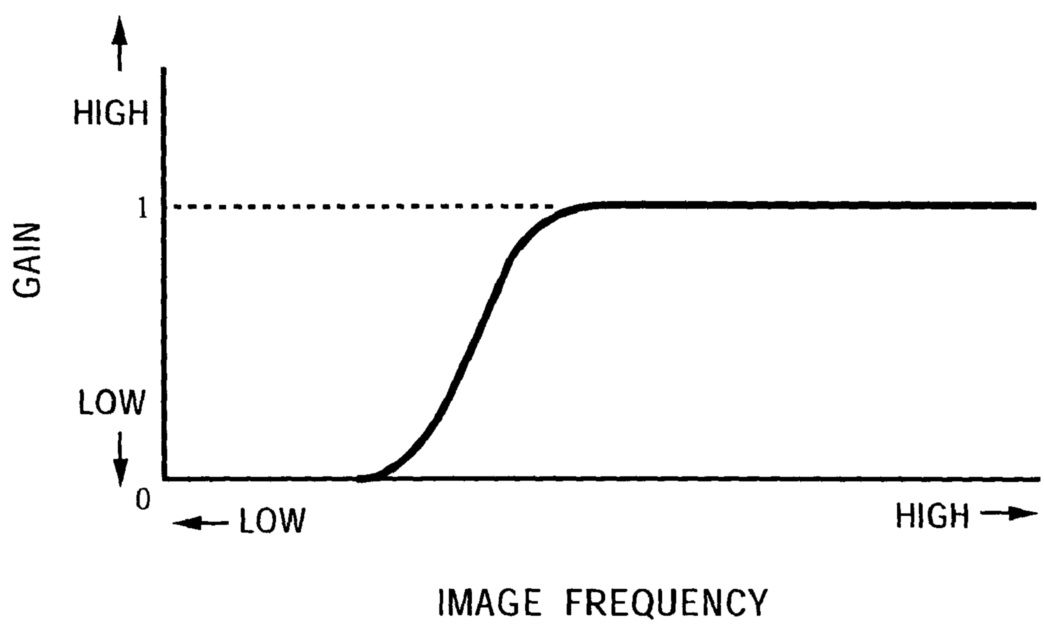

FIG. 106 is a diagram which illustrates the operation of the high pass filter 921 in the event of using the coefficients shown in FIG. 105. As shown in FIG. 106, the maximum gain for the extracted image component at the high pass filter 921 is 1 in the event of using the coefficients shown in FIG. 105.

FIG. 107 is a diagram which illustrates the second example of the filter coefficients.

Figure 108:
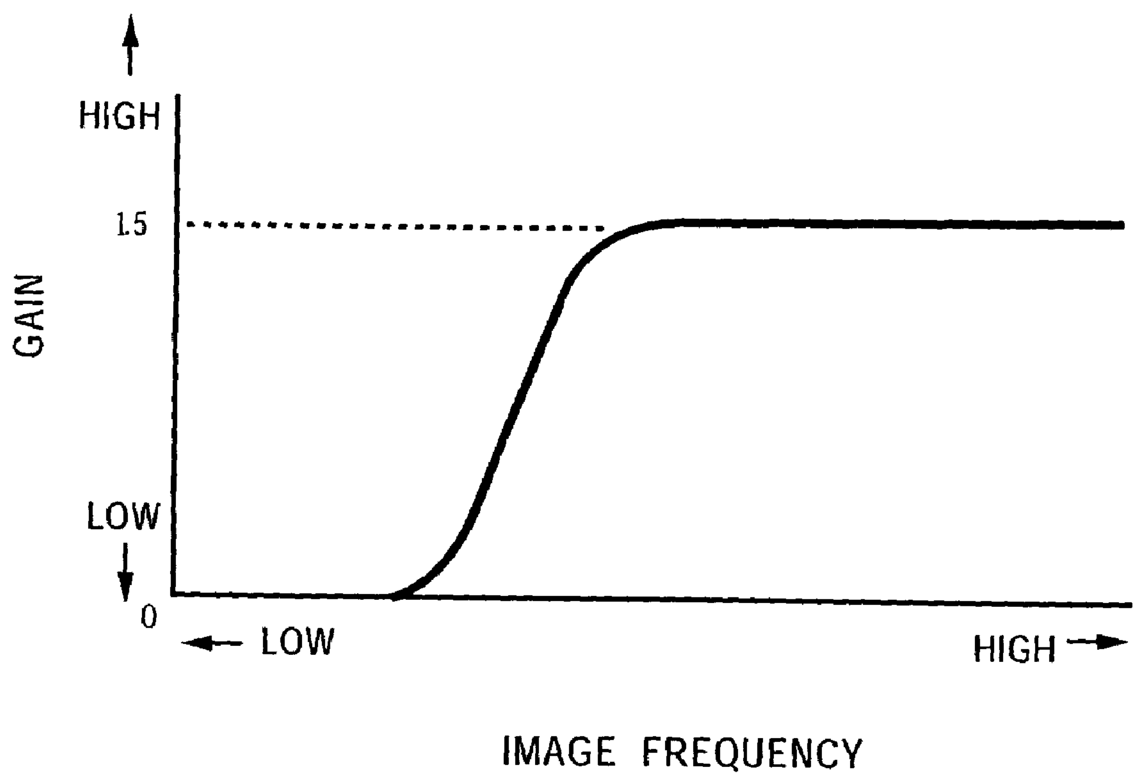

FIG. 108 is a diagram which illustrates the operation of the high pass filter 921 in the event that the same processing as the processing using the filter coefficients shown in FIG. 105, is performed using the coefficients shown in FIG. 107. As shown in FIG. 108, in the event of using the coefficients shown in FIG. 107, the maximum gain for extracted image component at the high pass filter 921 is 1.5.

As described above, the high pass filter 921 changes the gain for the extracted image component by the supplied filter coefficients.

While examples are not shown here, in the event of supplying different filter coefficients, the high pass filter 921 can change the extracted image frequencies and the removed image frequencies in the same way.

Returning to FIG. 103, the high pass filter 921 supplies the generated edge image to a gain adjustment unit 922.

The gain adjustment unit 922 amplifies or decays the edge image supplied from the high pass filter 921 based upon the input gain adjustment coefficients. In the event that the input gain adjustment coefficient is altered, the gain adjustment unit 922 changes the amplification ratio (or decay ratio) of the edge image. For example, in the event of inputting the gain adjustment coefficients designating an amplification ratio which is equal to or more than 1, the gain adjustment unit 922 amplifies the edge image, and in the event of inputting the gain adjustment coefficients designating the amplification ratio which is less than 1, the gain adjustment unit 922 decays the edge image.

The gain adjustment unit 922 supplies the edge image, which has been subjected to gain adjustment, to the addition unit 923.

The addition unit 923 adds the divided input image and the edge image which has been subjected to gain adjustment supplied from the gain adjustment unit 922, and outputs the added image.

Figure 104C:
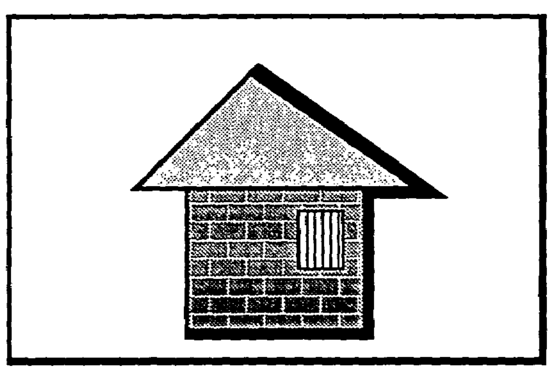

For example, in the event of inputting the input image shown in FIG. 104A, and supplying the edge image shown in FIG. 104B from the high pass filter 921, the addition unit 923 adds the input image shown in FIG. 104A and the edge image shown in FIG. 104B, and outputs the image shown in FIG. 104C.

As described above, the edge enhancing unit 907 applies the edge enhancement processing for the divided image.

For example, the edge enhancing unit 907-1 of which configuration is shown in FIG. 103 applies the edge enhancement processing of which degree is even higher, to the image in the background region using the coefficients shown in FIG. 107. The edge enhancing unit 907-6 of which configuration is shown in FIG. 103 applies the edge enhancement processing of which degree is relatively lower, to the image in the foreground region using the coefficients shown in FIG. 105

Figure 109:
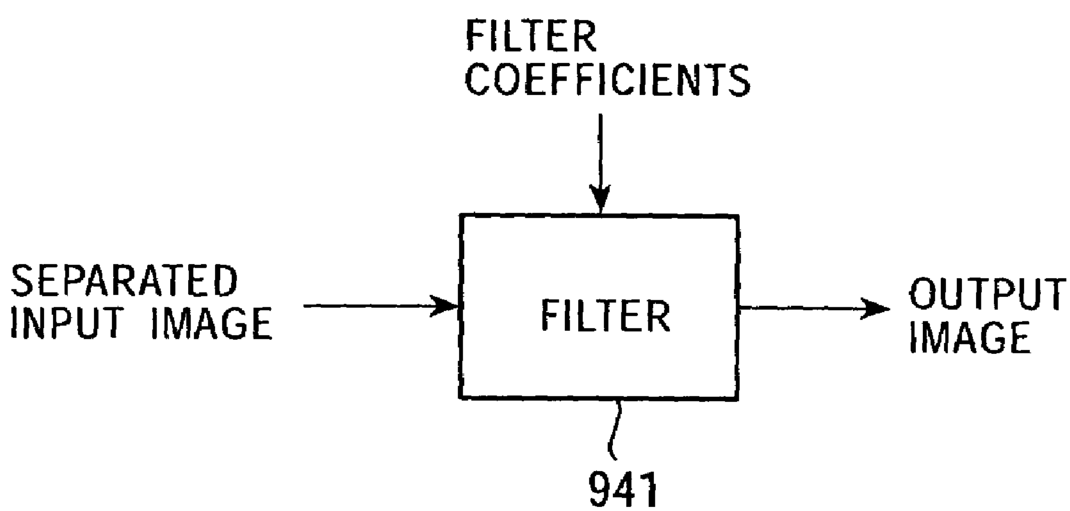

FIG. 109 is a block diagram which illustrates another configuration of the edge enhancing unit 907. In the example shown in FIG. 109, the edge enhancing unit 907 comprises a filter 941.

The filter 941 generates an edge enhancement image by amplifying the components wherein the pixel value changes drastically with regard to the pixel position, i.e., the high image frequency components in the input image, based upon the input filter coefficients.

For example, in the event of supplying the coefficients shown by way of an example in FIG. 110, the filter 941 performs the same processing as the processing described with regard to the high pass filter 921, based upon the coefficients shown by way of an example in FIG. 110.

Figure 111:
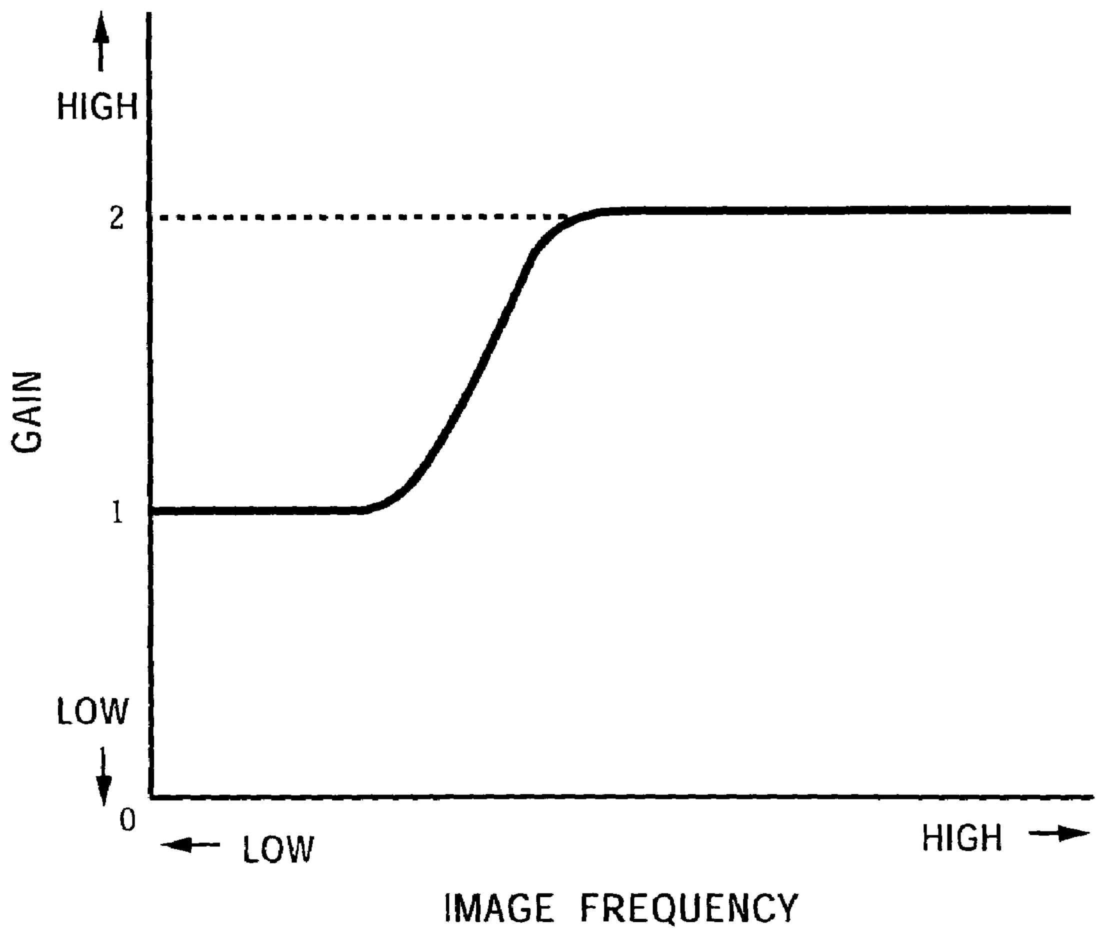

FIG. 111 is a diagram which illustrates the operation of the filter 941 in the event of using the coefficients shown in FIG. 110. As described in FIG. 111, in the event of using the coefficients shown in FIG. 110, the filter 941 amplifies the high image frequency components to double, passes the low image frequency components as they are, and generates an edge enhancement image.

In the event of using the coefficients shown in FIG. 110, the filter 941 outputs the same output image as the output image from the edge enhancing unit 907 of which configuration is shown in FIG. 103 wherein that the coefficients shown in FIG. 105 are used and the gain at the gain adjustment unit 922 is 1.

FIG. 112 is a diagram which illustrates the second example of the filter coefficients supplied to the filter 941.

Figure 113:
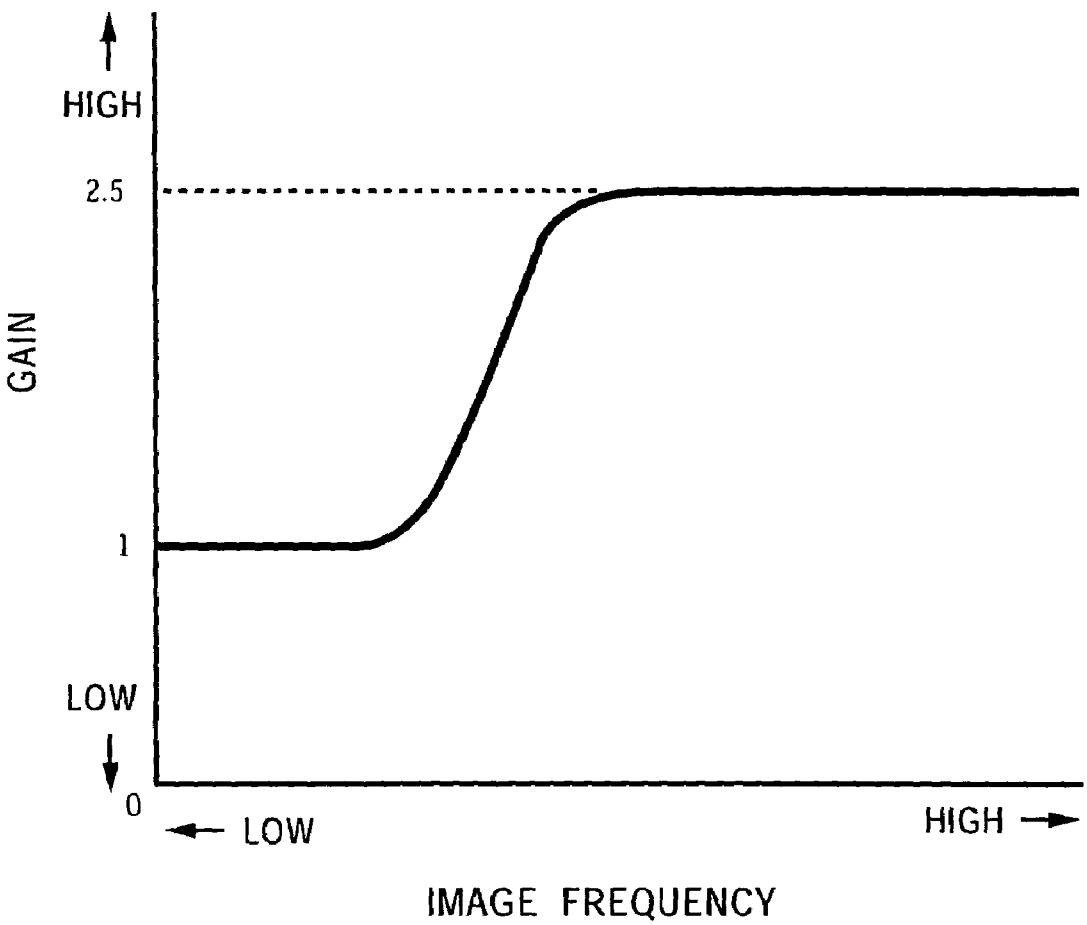

FIG. 113 is a diagram which illustrates the operation of the filter 941 in the event of using the coefficients shown in FIG. 112. As shown in FIG. 113, in the event of using the coefficients shown in FIG. 112, the filter 941 amplifies the high image frequency components to 2.5 times, allows the low image frequency components to pass as they are, and generates an edge enhancement image.

In the event of using the coefficients shown in FIG. 112, the filter 941 outputs the same output image as the output image from the edge enhancing unit 907 of which configuration is shown in FIG. 103 in the event that the coefficients shown in FIG. 107 are used and the gain of the gain adjustment unit 922 is 1.

As described above, the edge enhancing unit 907 of which configuration is shown in FIG. 109 can change the degree of edge enhancement in the image by altering the gain of the high frequency components in the image, by the input filter coefficients.

For example, the edge enhancing unit 907-1 of which configuration is shown in FIG. 109 applies the edge enhancement processing of which degree is even higher, using the coefficients shown in FIG. 112, to the image in the background region. The edge enhancing unit 907-6 of which configuration is shown in FIG. 109 applies the edge enhancement processing of which degree is relatively lower, using the coefficients shown in FIG. 110, to the image in the foreground region.

As described above, the edge enhancing unit 907-1 through the edge enhancing unit 907-6 perform edge enhancement processing corresponding to the nature of the divided image based upon different filter coefficients or different gain adjustment coefficients, for example.

Figure 114:
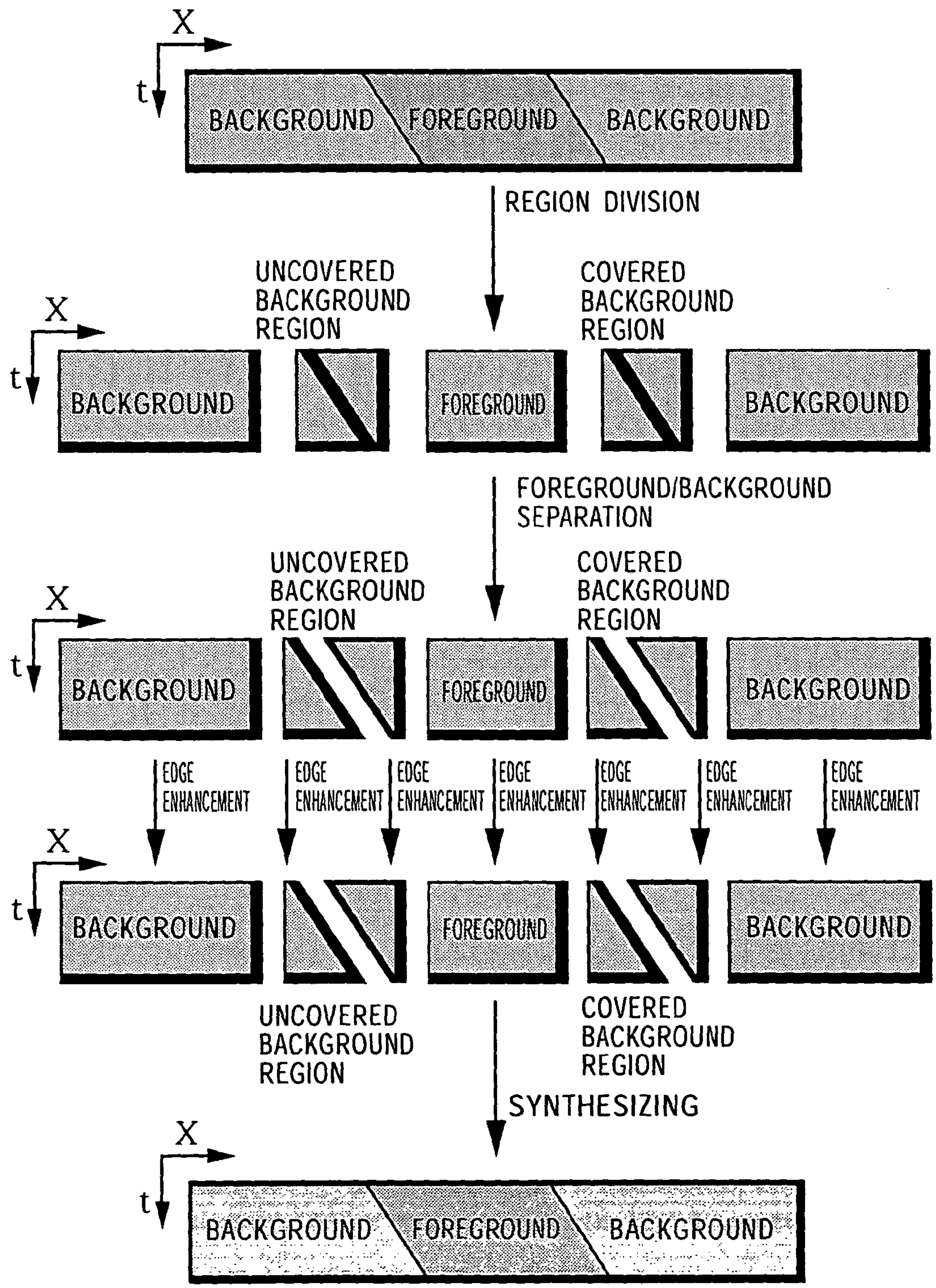

FIG. 114 is a diagram which describes the processing of the separated image processing unit 106 of which configuration is shown in FIG. 102.

The foreground region, uncovered background region, covered background region, and background region, in the input image are specified by the region specifying unit 103. The input image wherein regions are specified is separated into the image in the background region, the background component image in the uncovered background region, the foreground component image in the uncovered background region, the background component image in the covered background region, the foreground component image in the covered background region, and the image in the foreground region, by the foreground/background separation unit 105.

The separated image processing unit 106 of which configuration is shown in FIG. 102 performs edge enhancement processing for each of the image in the background region, the background component image in the uncovered background region, the foreground component image in the uncovered background region, the background component image in the covered background region, the foreground component image in the covered background region, and the image in the foreground region, corresponding to the nature of each image.

The image in the background region, the background component image in the uncovered background region, the foreground component image in the uncovered background region, the background component image in the covered background region, the foreground component image in the covered background region, and the image in the foreground region, each of which has been subjected to edge enhancement, are synthesized.

Referring to the flowchart shown in FIG. 115, the processing for edge enhancement by the separated image processing unit 106 of which configuration is shown in FIG. 102 will now be described.

In Step S901, the edge enhancing unit 907-1 performs edge enhancement of the background region image stored in the background region frame memory 901, by edge enhancement processing corresponding to the nature of the background region image.

In Step S902, the edge enhancing unit 907-2 performs edge enhancement of the background component image of the uncovered background region, stored in the uncovered background region background component image frame memory 902, by edge enhancement processing corresponding to the nature of the background component image of the uncovered background region.

In Step S903, the edge enhancing unit 907-3 performs edge enhancement of the foreground component image of the uncovered background region, stored in the uncovered background region foreground component image frame memory 903, by edge enhancement processing corresponding to the nature of the foreground component image of the uncovered background region.

In Step S904, the edge enhancing unit 907-4 performs edge enhancement of the background component image of the covered background region, stored in the covered background region background component image frame memory 904, by edge enhancement processing corresponding to the nature of the background component image of the covered background region.

In Step S905, the edge enhancing unit 907-5 performs edge enhancement of the foreground component image of the covered background region, stored in the covered background region foreground component image frame memory 905, by edge enhancement processing corresponding to the nature of the foreground component image of the covered background region.

In Step S906, the edge enhancing unit 907-6 performs edge enhancement of the foreground region image stored in the foreground region frame memory 906, by edge enhancement processing corresponding to the nature of the foreground region image.

In Step S907, the synthesizing unit 908 synthesizes the foreground region image, background region image, foreground component image of the covered background region, background component image of the covered background region, foreground component image of the uncovered background region, and background component image of the uncovered background region, regarding which each has been subjected to edge enhancement. The synthesizing unit 908 supplies the synthesized image to the frame memory 909. The frame memory 909 stores the image supplied from the synthesizing unit 908.

In Step S908, the frame memory 909 outputs the synthesized image stored therein, and the processing ends.

Thus, the separated image processing unit 106 of which the configuration shown in FIG. 102 can execute edge enhancement processing corresponding to the nature of each of the foreground region image, background region image, foreground component image of the covered background region, background component image of the covered background region, foreground component image of the uncovered background region, and background component image of the uncovered background region, so the sense-of-resolution can be improved without causing unnatural distortion in moving images.

Note that it is needless to say that the processing in Step S901 through Step S906 can be performed in a serial manner or in a parallel manner.

Also, the processing performed by the separated image processing unit 106 is not restricted to the generating of the coefficients corresponding to an SD image and an HD image, or the processing for generating of an HD image from an SD image, an arrangement may be made wherein an even higher resolution image in the spatial direction is generated by generating the coefficients for generating an even higher resolution image in the spatial direction, for example. Moreover, an arrangement may be made wherein the separated image processing unit 106 performs the processing for generating an even higher resolution image in the time direction.

Note that an arrangement may be made wherein the separated image processing unit 106 performs other processing, e.g., image size conversion into a desired size, extracting of color signals such as RGB, removal of noise, image compression, encoding, or the like, as well as the processing for creation of resolution by the class classification adaptation processing, or edge enhancement processing, for each image of the specified region. For example, the compression ratio can be increased with little deterioration of the image over conventional arrangements by the separated image processing unit 106 compressing images of each of the regions with low compression ratio in directions following movement vectors and high compression ratio in directions orthogonal to movement vectors, based on movement vectors corresponding to images of each of the regions.

FIG. 116 is a block diagram illustrating another configuration of the functions of the image processing device for separating an input image and processing each separated image. While the image processing device shown in FIG. 11 performs region specification and calculation of the mixture ratio α serially, the image processing device shown in FIG. 116 performs region specification and calculation of the mixture ratio α in parallel.

The same portions as the functions shown in the block diagram in FIG. 11 are denoted by the same reference numerals, and description thereof will be omitted.

The input image is supplied to the object extracting unit 101, region specifying unit 103, mixture ratio calculating unit 1101, and foreground/background separation unit 1102.

Based on an input image, the mixture ratio calculating unit 1101 calculates an estimated mixture ratio in a case wherein a pixel is assumed to belong to the covered background region, and an estimated mixture ratio in a case wherein the pixel is assumed to belong to the uncovered background region, for each of the pixels contained in the input image, and supplies the estimated mixture ratio in a case wherein the pixel is assumed to belong to the covered background region and the estimated mixture ratio in a case wherein the pixel is assumed to belong to the uncovered background region, thus calculated, to the foreground/background separation unit 1102.

FIG. 117 is a block diagram which illustrates one example of the configuration of the mixture ratio calculation unit 1101.

The estimated mixture ratio processing unit 401 shown in FIG. 117 is the same as the estimated mixture ratio processing unit 401 shown in FIG. 59. The estimated mixture ratio processing unit 402 shown in FIG. 117 is the same as the estimated mixture ratio processing unit 402 shown in FIG. 59.

The estimated mixture ratio processing unit 401 calculates the estimated mixture ratio for each pixel by the computation corresponding to the model of the covered background region based upon the input image, and outputs the calculated estimated mixture ratio.

The estimated mixture ratio processing unit 402 calculates the estimated mixture ratio for each pixel by the computation corresponding to the model of the uncovered background region based upon the input image, and outputs the calculated estimated mixture ratio.

Based on the estimated mixture ratio in a case wherein the pixel is assumed to belong to the covered background region and the estimated mixture ratio in a case wherein the pixel is assumed to belong to the uncovered background region, supplied from the mixture ratio calculating unit 1101, and the region information supplied from the region specifying unit 103, the foreground/background separation unit 1102 separates the input image into a foreground region image, background region image, foreground component image of the covered background region, background component image of the covered background region, foreground component image of the uncovered background region, and background component image of the uncovered background region, and supplies the separated images to the separated image processing unit 106.

FIG. 118 is a block diagram which illustrates one example of the configuration of the foreground/background separation unit 1102.

The same portions as the foreground/background separation unit 105 shown in FIG. 77 are denoted by the same reference numerals, and description thereof will be omitted.

A selection unit 1121 selects either of the estimated mixture ratio wherein an assumption is made that the pixel belongs to the covered background region, or the estimated mixture ratio wherein an assumption is made that the pixel belongs to the uncovered background region, supplied from the mixture ratio calculation unit 1101 based upon the region information supplied from the region specifying unit 103, and supplies the selected estimated mixture ratio as a mixture ratio α to the separation unit 601.

The separation unit 601 extracts the foreground components and the background components from the pixel values of the pixels belonging to the mixed region based upon the mixture ratio α supplied from the selection unit 1121 and the region information, and separates into the background component image in the uncovered background region, the foreground component image in the uncovered background region, the background component image in the covered background region, and the foreground component image in the covered background region.

The configuration of the separation unit 601 may be the same as the configuration shown in FIG. 82.

As described above, the image processing device of which configuration is shown in FIG. 116 can perform processing for each of images, i.e., the image in the background region, the background component image in the uncovered background region, the foreground component image in the uncovered background region, the background component image in the covered background region, the foreground component image in the covered background region, and the image in the foreground region, corresponding to the nature of each image.

As described above, the image processing device of the present invention separates the input image into the image in the background region, the background component image in the uncovered background region, the foreground component image in the uncovered background region, the background component image in the covered background region, the foreground component image in the covered background region, and the image in the foreground region, and performs processing suitable to each of separated images, and accordingly, generates an even higher resolution image, for example.

FIG. 119 is a block diagram which illustrates another configuration of the image processing device.

The same portions as shown in FIG. 11 are denoted by the same reference numerals, and description thereof will be omitted.

The input image supplied to the image processing device is supplied to the object extracting unit 101, the region specifying unit 103, the mixture ratio calculation unit 104, and the foreground/background separation unit 2001.

The foreground/background separating unit 2001 separates the input images into foreground component images which consist of only the foreground components corresponding to the foreground object and background component images which consist of only the background components based upon the region information supplied from the region specifying unit 103 and the mixture ratio α supplied from the mixture ratio calculating unit 104, supplies the foreground component image to the movement blurring removal unit 2002, and supplies the background component image to a correction unit 2003.

The movement blurring removal unit 2002 decides the increment of processing, which indicates one or more pixels included in the foreground component images, based upon the movement amount v which is led from the movement vector, and the region information. An increment of processing is the data which designates one group of the pixels which are the object for adjustment processing for the movement blurring amount.

The movement blurring removal unit 2002 removes movement blurring contained in the foreground component image based upon the foreground component image supplied from the foreground/background separation unit 2001, the movement vector and the position information thereof supplied from the movement detecting unit 102, and the processing increment, and outputs the foreground component image which has been subjected to removal of movement blurring, to a movement-blurring-removed-image processing unit 2004.

The correction unit 2003 corrects the pixel value of a pixel corresponding to the mixed region in the background component image. The pixel value of a pixel corresponding to the mixed region in the background component image is calculated by subtracting the foreground component from the pixel value of a pixel in the mixed region prior to separation. Accordingly, the pixel value of a pixel corresponding to the mixed region in the background component image decreases corresponding to the mixture ratio α, as compared to the pixel value of a pixel in the adjacent background region.

The correction unit 2003 corrects the decrease of the gain corresponding to the mixture ratio α of the pixel value of a pixel corresponding to the mixed region in the background component image, as described above, and supplies the corrected background component image to the movement-blurring-removed-image processing unit 2004.

The movement-blurring-removed-image processing unit 2004 individually performs processing for the foreground component image which has been subjected to removal of movement blurring and the corrected background component image.

For example, the movement-blurring-removed-image processing unit 2004 generates coefficients which are used in the classifying adaptation processing for generating an even higher resolution image, for each foreground component image which has been subjected to removal of movement blurring, and for each corrected background component image.

For example, the movement-blurring-removed-image processing unit 2004 creates an even higher resolution image by applying the classifying adaptation processing to each foreground component image which has been subjected to removal of movement blurring, and for each corrected background component image.

Also, for example, the movement-blurring-removed-image processing unit 2004 applies edge enhancement processing of which degree is different using different coefficients for each of images, i.e., the foreground component image subjected to removal of movement blurring, and the background component image subjected to correction.

FIG. 120 is a diagram which illustrates the correspondence of the image divided into pixels each of which belongs to the foreground region, background region, covered background region, or uncovered background region, to a model diagram wherein the pixel values of pixels develop over the time direction.

As shown in FIG. 120, the region specifying unit 103 specifies the foreground region, background region, covered background region, and uncovered background region, of the input image.

As shown in FIG. 121, the separated background component image is corrected for the pixel values of the mixed region, and the separated foreground component image is subjected to removal of movement blurring.

As shown in FIG. 122, the input image is divided into regions, and is separated into foreground components and background components. The separated input image is synthesized into the background component image and the foreground component image. Movement blurring contained in the foreground component image is removed. The background component image is corrected with regard to the pixel values corresponding to the mixed region.

The foreground component image subjected to removal of movement blurring and the background component image subjected to correction are individually processed.

FIG. 123 is a flowchart which describes the image processing of the image processing device according to the present invention.

In Step S2001, the region specifying unit 103 specifies the foreground region, background region, covered background region, and uncovered background region, in the input image based upon the movement vector and the position information thereof supplied from the movement detecting unit 102 and the input image. The processing of region specification in Step S2001 is the same as the processing shown in Step S101, so detailed description of the processing will be omitted.

In Step S2002, the mixture ratio calculation unit 104 calculates the mixture ratio α based upon the region information supplied from the region specifying unit 103 and the input image. The processing for calculation of the mixture ratio α in Step S2002 is the same as the processing in Step S102, so detailed description of the processing will be omitted.

In Step S2003, the foreground/background separation unit 2001 separates the input image into the image in the foreground region, the image in the background region, the foreground component image in the covered background region, the background component image in the covered background region, the foreground component image in the uncovered background region, and the background component image in the uncovered background region, based upon the region information supplied from the region specifying unit 103 and the mixture ratio α supplied from the mixture ratio calculation unit 104. Details of the processing for separation of the image by the foreground/background separation unit 2001 will be described later.

In Step S2004, the movement blurring removal unit 2002 removes movement blurring from the foreground component image supplied from the foreground/background separation unit 2001, based upon the movement vector and the position information thereof supplied from the movement detecting unit 102 and the region information supplied from the region specifying unit 103.

Details of the processing for removal of movement blurring by the movement blurring removal unit 2002 will be described later.

In Step S2005, the correction unit 2003 corrects the pixel values corresponding to the mixed region of the background component image supplied from the foreground/background separation unit 2001.

In Step S2006, the movement-blurring-removed-image processing unit 2004 performs image processing for each foreground component image which has been subjected to removal of movement blurring and each background component image which has been corrected, and the processing ends. Details of the image processing performed by the movement-blurring-removed-image processing unit 2004 will be described later.

As described above, the image processing device according to the present invention separates the input image into the foreground component image and the background component image, removes movement blurring from the foreground component image, and performs image processing for each of the foreground component image subjected to removal of movement blurring, and the background component image.

A description will now be made with regard to the foreground/background separation unit 2001. FIG. 124 is a block diagram which illustrates an example of the configuration of the foreground/background separation unit 2001. The input image supplied to the foreground/background separation unit 2001 is supplied to a separation unit 2601, a switch 2602, and a switch 2604. The region information supplied from the region specifying unit 103, which indicates the covered background region and the uncovered background region, is supplied to the separation unit 2601. The region information which indicates the foreground region is supplied to the switch 2602. The region information which indicates the background region is supplied to the switch 2604.

The mixture ratio α supplied from the mixture ratio calculation unit 104 is supplied to the separation unit 2601.

The separation unit 2601 separates the foreground components from the input image based upon the region information indicating the covered background region, the region information indicating the uncovered background region, and the mixture ratio α, and supplies the separated foreground components to a synthesizing unit 2603, as well as separating the background components from the input image, and supplying the separated background components to the synthesizing unit 2605.

In the event that the pixel corresponding to the foreground is input, the switch 2602 is closed based upon the region information indicating the foreground region, and supplies only the pixels corresponding to the foreground included in the input image to the synthesizing unit 2603.

In the event that the pixel corresponding to the background is input, the switch 2604 is closed based upon the region information indicating the background region, and supplies only the pixels corresponding to the background included in the input image to the synthesizing unit 2605.

The synthesizing unit 2603 synthesizes the foreground component image based upon the components corresponding to the foreground supplied from the separation unit 2601, and the pixels corresponding to the foreground supplied from the switch 2602, and outputs the synthesized foreground component image. Since the foreground region and the mixed region are not overlapped, the synthesizing unit 2603 synthesizes the foreground component image, for example, by applying the logical sum computation to the components corresponding to the foreground, and the pixels corresponding to the foreground.

In the initialization processing which is performed in the first stage of the foreground component image synthesizing processing, the synthesizing unit 2603 stores the image, wherein all the pixel values are 0, in built-in frame memory, and in the foreground component image synthesizing processing, the synthesizing unit 2603 stores (or overwrites) the foreground component image. Accordingly, the pixel corresponding to the background region, which is the foreground component image output from the synthesizing unit 2603, stores 0 as a pixel value.

The synthesizing unit 2605 synthesizes the background component image based upon the components corresponding to the background supplied from the separation unit 2601, and the pixels corresponding to the background supplied from the switch 2604, and outputs the synthesized background component image. Since the background region and the mixed region are not overlapped, the synthesizing unit 2605 synthesizes the background component image, for example, by applying the logical sum computation to the components corresponding to the background, and the pixels corresponding to the background.

In the initialization processing which is performed in the first stage of the background component image synthesizing processing, the synthesizing unit 2605 stores the image, wherein all the pixel values are 0, in built-in frame memory, and in the background component image synthesizing processing, the synthesizing unit 2605 stores (or overwrites) the background component image. Accordingly, the pixel corresponding to the foreground region, which is the background component image output from the synthesizing unit 2605, stores 0 as a pixel value.

FIG. 125A and FIG. 125B are diagrams which illustrate the input image input to the foreground/background separation unit 2001, and the foreground component image and the background component image output from the foreground/background separation unit 2001.

FIG. 125A is a schematic diagram which illustrates the displayed image, and FIG. 125B is a model diagram wherein one line of pixels including pixels belonging to the foreground region, pixels belonging to the background region, and pixels belonging to the mixed region, corresponding to FIG. 125A, develop over the time direction.

As shown in FIG. 125A and FIG. 125B, the background component image output from the foreground/background separation unit 2001 is made up of pixels belonging to the background region and background components contained in pixels in the mixed region.

As shown in FIG. 125A and FIG. 125B, the foreground component image output from the foreground/background separation unit 2001 is made up of pixels belonging to the foreground region and foreground components contained in pixels in the mixed region.

The pixel value of the pixel in the mixed region is separated into the background components and the foreground components by the foreground/background separation unit 2001. The separated background components make up a background component image along with pixels belonging to the background region. The separated foreground components make up a foreground component image along with pixels belonging to the foreground region.

As described above, in the foreground component image, the pixel values of the pixels corresponding to the background region are set to 0, and the pixels corresponding to the foreground region and the pixels corresponding to the mixed region are set to valid pixel values. Similarly, in the background component image, the pixel values of the pixels corresponding to the foreground region are set to 0, and the pixels corresponding to the background region and the pixels corresponding to the mixed region are set to valid pixel values.

A description will now be made regarding the separation processing of the foreground components and the background components from the pixel belonging to the mixed region performed by the separation unit 2601.

FIG. 126 is a model of an image which indicates two frames of the foreground components and the background components, including the foreground corresponding to the object which moves from the left to the right in the drawing. In the model of the image shown in FIG. 126, the movement amount v of the foreground is 4, and the virtual dividing number is 4.

In the frame #n, the left-most pixel and the fourteenth through eighteenth pixels from the left are made up of only the background components, and belong to the background region. In the frame #n, the second through fourth pixels from the left are made up of the background components and the foreground components, and belong to the uncovered background region. In the frame #n, the eleventh through thirteenth pixels from the left are made up of the background components and the foreground components, and belong to the covered background region. In the frame #n, the fifth through tenth pixels from the left are made up of only the foreground components, and belong to the foreground region.

In the frame #n+1, the first through fifth pixels from the left and the eighteenth pixel from the left are made up of only the background components, and belong to the background region. In the frame #n+1, the sixth through eighth pixels from the left contain the background components and the foreground components, and belong to the uncovered background region. In the frame #n+1, the fifteenth through seventeenth pixels from the left contain the background components and the foreground components, and belong to the covered background region. In the frame #n+1, the ninth through fourteen pixels from the left are made up of only the foreground components, and belong to the foreground region.

FIG. 127 is a diagram which describes the processing for separation of the foreground components from the pixel belonging to the covered background region. In FIG. 127, α1 through α18 are the mixture ratios corresponding to the pixels in the frame #n, respectively. In FIG. 127, the fifteenth through seventeenth pixels from the left belongs to the covered background region.

The pixel value C15 of the fifteenth pixel from the left in the frame #n is represented in Expression (85).

$$\begin{aligned} C15 &= B15/v + F09/v + F08/v + F07/v \\ &= \alpha 15 \cdot B15 + F09/v + F08/v + F07/v \\ &= \alpha 15 \cdot P15 + F09/v + F08/v + F07/v \end{aligned} \tag{85}$$

Here, α15 denotes the mixture ratio of the fifteenth pixel from the left in the frame #n. P15 denotes the pixel value of the fifteenth pixel from the left in the frame #n−1.

The sum f15 of the foreground components of the fifteenth pixel from the left in the frame #n is represented in Expression (86) based upon Expression (85).

$$\begin{aligned} f15 &= F09/v + F08/v + F07/v \\ &= C15 - \alpha 15 \cdot P15 \end{aligned} \tag{86}$$

Similarly, the sum f16 of the foreground components of the sixteenth pixel from the left in the frame #n is represented in Expression (87), and the sum f17 of the foreground components of the seventeenth pixel from the left in the frame #n is represented in Expression (88).

$$f16 = C16 - \alpha 16 \cdot P16 \tag{87}$$

$$f17 = C17 - \alpha 17 \cdot P17 \tag{88}$$

As described above, the foreground component fc contained in the pixel value C of the pixel belonging to the covered background region is calculated by Expression (89).

$$fc = C - \alpha \cdot P \tag{89}$$

P denotes the pixel value of the corresponding pixel in the previous frame.

FIG. 128 is a diagram which describes the processing for separating the foreground components from the pixel belonging to the uncovered background region. In FIG. 128, α1 through α18 denote the mixture ratio corresponding to the pixels in the frame #n, respectively. In FIG. 128, the second through fourth pixels from the left belong to the uncovered background region.

The pixel value C02 of the second pixel from the left in the frame #n is represented in Expression (90).

$$\begin{aligned} C02 &= B02/v + B02/v + B02/v + F01/v \\ &= \alpha 2 \cdot B02 + F01/v \\ &= \alpha 2 \cdot N02 + F01/v \end{aligned} \tag{90}$$

Here, α2 denotes the mixture ratio of the second pixel from the left in the frame #n. N02 denotes the pixel value of the second pixel from the left in the frame #n+1.

The foreground component sum of the second pixel from the left in the frame #n, f02, is represented in Expression (91) based upon Expression (90).

$$\begin{aligned} f02 &= F01/v \\ &= C02 - \alpha 2 \cdot N02 \end{aligned} \tag{91}$$

Similarly, the foreground component sum of the third pixel from the left in the frame #n, f03, is represented in Expression (92), and the foreground component sum of the fourth pixel from the left in the frame #n, f04, is represented in Expression (93).

$$f03 = C03 - \alpha 3 \cdot N03 \tag{92}$$

$$f04 = C04 - \alpha 4 \cdot N04 \tag{93}$$

As described above, the foreground component fu contained in the pixel value C of the pixel belonging to the uncovered background region is calculated by Expression (94).

$$fu = C - \alpha \cdot N \tag{94}$$

N denotes the pixel value of the corresponding pixel in the following frame.

As described above, the separation unit 2601 can separate the foreground components and the background components from the pixel belonging to the mixed region based upon the information indicating the covered background region and the information indicating the uncovered background region, which is included in the region information, and the mixture ratio α for each pixel.

FIG. 129 is a block diagram which illustrates an example of the configuration of the separation unit 2601 for performing the processing described above. The image input to the separation unit 2601 is supplied to frame memory 2621, and the region information indicating the covered background region and the uncovered background region and the mixture ratio α, supplied from the mixture ratio calculating unit 104, are input to a separation processing block 2622.

The frame memory 2621 stores the input image in increments of frames. In the event that the frame #n is the object of processing, the frame memory 2621 stores the frame #n−1 which is the frame previous to the frame #n, frame #n, and the frame #n+1 which is the frame following the frame #n.

The frame memory 2621 supplies the corresponding pixels in the frame #n−1, the frame #n, and the frame #n+1 to the separation processing block 2622.

The separation processing block 2622 separates the foreground components and the background components from the pixel belonging to the mixed region in the frame #n by applying the computation described with reference to FIG. 127 and FIG. 128 to the pixel values of corresponding pixels in the frame #n−1, the frame #n, and the frame #n+1, supplied from the frame memory 2621, based upon the region information indicating the covered background region and the uncovered background region, and the mixture ratio α, and supplies to the frame memory 2623.

The separation processing block 2622 comprises an uncovered region processing unit 2631, a covered region processing unit 2632, a synthesizing unit 2633, and a synthesizing unit 2634.

A multiplication device 2641 of the uncovered region processing unit 2631 multiplies the pixel value of the pixel of the frame #n+1 supplied from the frame memory 2621 by the mixture ratio α, and outputs to a switch 2642. In the event that the pixel in the frame #n supplied from the frame memory 2621 (which is corresponding to the pixel of the frame #n+1) belongs to the uncovered background region, the switch 2642 is closed, and the pixel value which has been multiplied by the mixture ratio α supplied from the multiplication device 2641 is supplied to a computing device 2643 and the synthesizing unit 2634. The value wherein the pixel value of the pixel of the frame #n+1 output from the switch 2642 is multiplied by the mixture ratio α is the same as the background component of the pixel value of the corresponding pixel in the frame #n.

The computing device 2643 obtains the foreground components by subtracting the background components supplied from the switch 2642 from the pixel value of the pixel of the frame #n supplied from the frame memory 2621. The computing device 2643 supplies the foreground components of the pixel in the frame #n belonging to the uncovered background region, to the synthesizing unit 2633.

A multiplication device 2651 of the covered region processing unit 2632 multiplies the pixel value of the pixel of the frame #n−1 supplied from the frame memory 2621 by the mixture ratio α, and outputs to a switch 2652. In the event that the pixel in the frame #n supplied from the frame memory 2621 (corresponding to the pixel of the frame #n−1) belongs to the covered background region, the switch 2652 is closed, and the pixel value which has been multiplied by the mixture ratio α supplied from the multiplication device 2651 is supplied to a computing device 2653 and the synthesizing unit 2634. The value wherein the pixel value of the pixel of the frame #n−1 has been multiplied by the mixture ratio α, which is output from the switch 2652, is the same as the background component of the pixel value of the corresponding pixel in the frame #n.

The computing device 2653 obtains the foreground components by subtracting the background components supplied from the switch 2652 from the pixel value of the pixel of the frame #n supplied from the frame memory 2621. The computing device 2653 supplies the foreground components of the pixel in the frame #n belonging to the covered background region, to the synthesizing unit 2633.

The synthesizing unit 2633 synthesizes the foreground components of the pixel belonging to the uncovered background region supplied from the computing device 2643, and the foreground components of the pixel belonging to the covered background region supplied from the computing device 2653, in the frame #n, and supplies to the frame memory 2623.

The synthesizing unit 2634 synthesizes the background components of the pixel belonging to the uncovered background region supplied from the switch 2642, and the background components of the pixel belonging to the covered background region supplied from the switch 2652, in the frame #n, and supplies to the frame memory 2623.

The frame memory 2623 stores the foreground components and the background components of the pixels in the mixed region in the frame #n, supplied from the separation processing block 2622, respectively.

The frame memory 2623 outputs the foreground components of the pixels in the mixed region in the frame #n stored therein, and the background components of the pixels in the mixed region in the frame #n stored therein.

Using the mixture ratio α which is the feature amount enables complete separation of the foreground components and the background components, contained in the pixel value.

The synthesizing unit 2603 generates a foreground component image by synthesizing the foreground components of the pixel in the mixed region in the frame #n output from the separation unit 2601, and the pixels belonging to the foreground region. The synthesizing unit 2605 generates a background component image by synthesizing the background components of the pixels in the mixed region in the frame #n output from the separation unit 2601, and pixels belonging to the background region.

FIG. 130A is a diagram which illustrates an example of the foreground component image corresponding to the frame #n shown in FIG. 126. FIG. 130B is a diagram which illustrates an example of the background component image corresponding to the frame #n shown in FIG. 126.

FIG. 130A illustrates an example of the foreground component image corresponding to the frame #n shown in FIG. 126. Since the left-most pixel and the fourteenth pixel from the left are made up of only the background components before separation of the foreground and the background, the pixel values are 0.

The second through fourth pixels from the left belong to the uncovered background region prior to the foreground and the background being separated, with the background components being 0, and the foreground components being left as they are. The eleventh through thirteenth pixels belong to the covered background region before separation of the foreground and the background, and the background components are 0, and the foreground components are left as they are. Since the fifth through tenth pixels from the left are made up of only the foreground components, those are left as they are.

FIG. 130B illustrates an example of the background component image corresponding to the frame #n shown in FIG. 126. The left-most pixel and the fourteenth pixel from the left are made up of only the background components prior to the foreground and the background being separated, and accordingly, those are left as they are.

The second through fourth pixels from the left belong to the uncovered background region prior to the foreground and the background being separated, with the foreground components being 0, and the background components being left as they are. The eleventh through thirteenth pixels belong to the covered background region prior to the foreground and the background being separated, the foreground components being 0, and the background components being left as they are. The fifth through tenth pixels from the left are made up of only the foreground components prior to the foreground and the background being separated, and accordingly the pixel values are 0.

The separation processing for the foreground and the background by the foreground/background separation unit 2001 will now be described, with reference to the flowchart shown in FIG. 131. In Step S2601, the frame memory 2621 of the separation unit 2601 obtains the input image, and stores the frame #n which is the object for separation of the foreground and the background, as well as the previous frame #n−1 and the following frame #n+1.

In Step S2602, the separation processing block 2622 of the separation unit 2601 obtains the region information supplied from the mixture ratio calculating unit 104. In Step S2603, the separation processing block 2622 of the separation unit 2601 obtains the mixture ratio α supplied from the mixture ratio calculating unit 104.

In Step S2604, the uncovered region processing unit 2631 extracts the background components from the pixel value of the pixel belonging to the uncovered background region supplied from the frame memory 2621 based upon the region information and the mixture ratio α.

In Step S2605, the uncovered region processing unit 2631 extracts the foreground components from the pixel value of the pixel belonging to the uncovered background region supplied from the frame memory 2621 based upon the region information and the mixture ratio α.

In Step S2606, the covered region processing unit 2632 extracts the background components from the pixel value of the pixel belonging to the covered background region supplied from the frame memory 2621 based upon the region information and the mixture ratio α.

In Step S2607, the covered region processing unit 2632 extracts the foreground components from the pixel value of the pixel belonging to the covered background region supplied from the frame memory 2621 based upon the region information and the mixture ratio α.

In Step S2608, the synthesizing unit 2633 synthesizes the foreground components of the pixel belonging to the uncovered background region extracted in the processing in Step S2605, and the foreground components of the pixel belonging to the covered background region extracted in the processing in Step S2607. The synthesized foreground components are supplied to the synthesizing unit 2603. Moreover, the synthesizing unit 2603 synthesizes the pixels belonging to the foreground region supplied via the switch 2602, and the foreground components supplied from the separation unit 2601, and generates a foreground component image.

In Step S2609, the synthesizing unit 2634 synthesizes the background components of the pixel belonging to the uncovered background region extracted in the processing in Step S2604, and the background components of the pixel belonging to the covered background region extracted in the processing in Step S2606. The synthesized background components are supplied to the synthesizing unit 2605. Moreover, the synthesizing unit 2605 synthesizes the pixels belonging to the background region supplied via the switch 2604, and the background components supplied from the separation unit 2601, and generates the background component image.

In Step S2610, the synthesizing unit 2603 outputs the foreground component image. In Step S2611, the synthesizing unit 2605 outputs the background component image, and the processing ends.

As described above, the foreground/background separation unit 2001 can separate the foreground components and the background components from the input image based upon the region information and the mixture ratio α, and output the foreground component image which is made up of only the foreground components, and the background component image which is made up of only the background components.

The removal of movement blurring from the foreground component image will now be described.

FIG. 132 is a block diagram which illustrates an example of the configuration of the movement blurring removal unit 2002. The movement vector and the position information thereof supplied from the movement detecting unit 102, and the region information supplied from the region specifying unit 103 are supplied to a processing increment decision unit 2801 and the modeling unit 2802. The foreground component image supplied from the foreground/background separation unit 2001 is supplied to the addition unit 2804.

The processing increment decision unit 2801 supplies the processing increment generated based upon the movement vector, the position information thereof, and the region information, along with the movement vector, to the modeling unit 2802. The processing increment decision unit 2801 supplies the generated processing increment to the addition unit 2804.

The processing increment generated by the processing increment decision unit 2801 denoted by A in FIG. 133, as illustrated by an example in FIG. 133, indicates the pixels arrayed sequentially in a movement direction beginning at the pixel corresponding to the covered background region of the foreground component image up to the pixel corresponding to the uncovered background region, or the pixels arrayed sequentially in a movement direction beginning at the pixel corresponding to the uncovered background region up to the pixel corresponding to the covered background region. The processing increment is made up of, for example, two pieces of data of the upper-left point (the left-most or the top-most position of the pixel, which is the pixel designated by the processing increment) and the bottom-right point.

The modeling unit 2802 performs modeling based upon the movement vector and the input processing increment. More specifically, for example, an arrangement may be made wherein the modeling unit 2802 stores the number of pixels included in the processing increment, the virtual dividing number of the pixel value in the time direction, and multiple models corresponding to the number of the foreground components for each pixel beforehand, and selects a model which designates the correspondence of the pixel value to the foreground components as shown in FIG. 134, based upon the processing increment and the virtual dividing number of the pixel value in the time direction.

For example, in the event that the number of pixels corresponding to the processing increment is 12, and the movement amount v in the shutter period is 5, the modeling unit 2802 sets the virtual dividing number to 5, and selects a model made up of eight foreground components overall, wherein the left-most positioned pixel contains one foreground component, the second pixel from the left contains two foreground components, the third pixel from the left contains three foreground components, the fourth pixel from the left contains four foreground components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Note that an arrangement may be made wherein the modeling unit 2802 does not select a model from the models stored beforehand, but rather generates a model based upon the movement vector and the processing increment in the event that the movement vector and the processing increment are supplied.

The modeling unit 2802 supplies the selected model to an expression generating unit 2803.

The expression generating unit 2803 generates a expression based upon a model supplied from the modeling unit 2802. The expression generated by the expression generating unit 2803 will be described in a case wherein the number of the foreground components is 8, the number of pixels corresponding to the processing increment is 12, the movement amount v is 5, and the virtual dividing number is 5, with reference to the model for the foreground component image shown in FIG. 134.

In the event that the foreground components corresponding to the shutter period/v contained in the foreground component image are F01/v through F08/v, the relationships between F01/v through F08/v and the pixel values C01 through C12 are represented in Expression (95) through Expression (106).

$$C01=F01/v \quad (95)$$

$$C02=F02/v+F01/v \quad (96)$$

$$C03=F03/v+F02/v+F01/v \quad (97)$$

$$C04=F04/v+F03/v+F02/v+F01/v \quad (98)$$

$$C05=F05/v+F04/v+F03/v+F02/v+F01/v \quad (99)$$

$$C06=F06/v+F05/v+F04/v+F03/v+F02/v \quad (100)$$

$$C07=F07/v+F06/v+F05/v+F04/v+F03/v \quad (101)$$

$$C08=F08/v+F07/v+F06/v+F05/v+F04/v \quad (102)$$

$$C09=F08/v+F07/v+F06/v+F05/v \quad (103)$$

$$C10=F08/v+F07/v+F06/v \quad (104)$$

$$C11=F08/v+F07/v \quad (105)$$

$$C12=F08/v \quad (106)$$

The expression generating unit 2803 generates expressions by transforming the generated expressions. The expressions generated by the expression generating unit 2803 are represented in Expression (107) through Expression (118).

$$C01=1\cdot F01/v+0\cdot F02/v+0\cdot F03/v+0\cdot F04/v+0\cdot F05/v+0\cdot F06/v+0\cdot F07/v+0\cdot F08/v \quad (107)$$

$$C02=1\cdot F01/v+1\cdot F02/v+0\cdot F03/v+0\cdot F04/v+0\cdot F05/v+0\cdot F06/v+0\cdot F07/v+0\cdot F08/v \quad (108)$$

$$C03=1\cdot F01/v+1\cdot F02/v+1\cdot F03/v+0\cdot F04/v+0\cdot F05/v+0\cdot F06/v+0\cdot F07/v+0\cdot F08/v \quad (109)$$

$$C04=1\cdot F01/v+1\cdot F02/v+1\cdot F03/v+1\cdot F04/v+0\cdot F05/v+0\cdot F06/v+0\cdot F07/v+0\cdot F08/v \quad (110)$$

$$C05=1\cdot F01/v+1\cdot F02/v+1\cdot F03/v+1\cdot F04/v+1\cdot F05/v+0\cdot F06/v+0\cdot F07/v+0\cdot F08/v \quad (111)$$

$$C06=0\cdot F01/v+1\cdot F02/v+1\cdot F03/v+1\cdot F04/v+1\cdot F05/v+1\cdot F06/v+0\cdot F07/v+0\cdot F08/v \quad (112)$$

$$C07=0\cdot F01/v+0\cdot F02/v+1\cdot F03/v+1\cdot F04/v+1\cdot F05/v+1\cdot F06/v+1\cdot F07/v+0\cdot F08/v \quad (113)$$

$$C08=0\cdot F01/v+0\cdot F02/v+0\cdot F03/v+1\cdot F04/v+1\cdot F05/v+1\cdot F06/v+1\cdot F07/v+1\cdot F08/v \quad (114)$$

$$C09=0\cdot F01/v+0\cdot F02/v+0\cdot F03/v+0\cdot F04/v+1\cdot F05/v+1\cdot F06/v+1\cdot F07/v+1\cdot F08/v \quad (115)$$

$$C10=0\cdot F01/v+0\cdot F02/v+0\cdot F03/v+0\cdot F04/v+0\cdot F05/v+1\cdot F06/v+1\cdot F07/v+1\cdot F08/v \quad (116)$$

$$C11=0\cdot F01/v+0\cdot F02/v+0\cdot F03/v+0\cdot F04/v+0\cdot F05/v+0\cdot F06/v+1\cdot F07/v+1\cdot F08/v \quad (117)$$

$$C12=0\cdot F01/v+0\cdot F02/v+0\cdot F03/v+0\cdot F04/v+0\cdot F05/v+0\cdot F06/v+0\cdot F07/v+1\cdot F08/v \quad (118)$$

Expression (107) through Expression (118) may be represented as with Expression (119).

$$Cj = \sum_{i=01}^{08} aij \cdot Fi/v \quad (119)$$

In Expression (119), j denotes the pixel position. In this example, j has one of the values between 1 and 12. Also, i denotes the position of the foreground value. In this example, i has one of the values between 1 and 8. Corresponding to the values of i and j, aij has one of the values of 0 or 1.

Taking margin of error into consideration, Expression (119) may be represented as with Expression (120).

$$Cj = \sum_{i=01}^{08} aij \cdot Fi/v + ej \quad (120)$$

In Expression (120), ej denotes the margin of error contained in the pixel of interest, Cj.

Expression (120) can be rewritten into Expression (121)

$$ej = Cj - \sum_{i=01}^{08} aij \cdot Fi/v \quad (121)$$

Note that in order to use the least square method, the squared-sum of the margin of error E is defined as represented in Expression (122).

$$E = \sum_{j=01}^{12} ej^2 \quad (122)$$

To minimize margin of error, the value of the partial derivative of the squared-sum of the margin of error E from the variable Fk should become 0. Fk is obtained so as to satisfy Expression (123).

$$\begin{aligned} \frac{\partial E}{\partial Fk} &= 2 \cdot \sum_{j=01}^{12} ej \cdot \frac{\partial ej}{\partial Fk} \\ &= 2 \cdot \sum_{j=01}^{12} \left\{ \left( Cj - \sum_{i=01}^{08} aij \cdot Fi/v \right) \cdot (-akj/v) = 0 \right. \end{aligned} \quad (123)$$

In Expression (123), the movement amount v is a fixed value, so Expression (124) can be derived.

$$\sum_{j=01}^{12} akj \cdot \left( Cj - \sum_{i=01}^{08} aij \cdot Fi/v \right) = 0 \quad (124)$$

Developing Expression (124) and transposing arguments, Expression (125) is obtained.

$$\sum_{j=01}^{12}\left(akj\cdot\sum_{i=01}^{08}aij\cdot Fi\right)=v\cdot\sum_{j=01}^{12}akj\cdot Cj \tag{125}$$

Expression (125) is developed into eight expressions, each of which is obtained by substituting one of the integers between 1 and 8 for k in Expression (125). The obtained eight expressions may be represented in one expression by a matrix. The expression is referred to as a normal equation.

An example of the normal equation generated by the expression generating unit 2803 based upon such the least square method is represented in Expression (126).

$$\begin{bmatrix}5&4&3&2&1&0&0&0\\4&5&4&3&2&1&0&0\\3&4&5&4&3&2&1&0\\2&3&4&5&4&3&2&1\\1&2&3&4&5&4&3&2\\0&1&2&3&4&5&4&3\\0&0&1&2&3&4&5&4\\0&0&0&1&2&3&4&5\end{bmatrix}\begin{bmatrix}F01\\F02\\F03\\F04\\F05\\F06\\F07\\F08\end{bmatrix}=v\cdot\begin{bmatrix}\sum_{i=08}^{12}Ci\\\sum_{i=07}^{11}Ci\\\sum_{i=06}^{10}Ci\\\sum_{i=05}^{09}Ci\\\sum_{i=04}^{08}Ci\\\sum_{i=03}^{07}Ci\\\sum_{i=02}^{06}Ci\\\sum_{i=01}^{05}Ci\end{bmatrix} \tag{126}$$

In the event that Expression (126) is represented by A F=v·C, then C, A, and v are known, and F is unknown. Also, while A and v are known at the point of modeling, C becomes known by inputting the pixel value in addition operation.

The margin of error contained in the pixel C is dispersed by calculating the foreground components by the normal equation based upon the least square method.

The expression generating unit 2803 supplies the normal equation generated as described above, to the addition unit 2804.

The addition unit 2804 sets the pixel value C contained in the foreground component image for the expression of the matrix supplied from the expression generating unit 2803 based upon the processing increment supplied from the processing increment decision unit 2801. The addition unit 2804 supplies the matrix which the pixel value C is set for, to the computing unit 2805.

The computing unit 2805 calculates the foreground component Fi/v which has been subjected to removal of the movement blurring by the processing based upon the method such as the sweeping method (Gauss-Jordan elimination), calculates Fi corresponding to one of the integers i between 0 and 8, which is the pixel value of the foreground which has been subjected to removal of the movement blurring, and outputs the foreground component image which has been subjected to removal of the movement blurring, which is made up of Fi which is the pixel value which has been subjected to removal of the movement blurring as shown by way of an example, shown in FIG. 135.

Note that in the foreground component image which has been subjected to removal of the movement blurring shown in FIG. 135, each of C03 through C10 is set to each of F01 through F08 so as not to change the position of the foreground component image with regard to the screen, which can correspond to an arbitrary position.

Also, as shown in FIG. 136, for example, in the event that the number of pixel corresponding to the processing increment is 8 and the movement amount v is 4, the movement blurring removal unit 2002 generates a matrix expression represented in Expression (127).

$$\begin{bmatrix}4&3&2&1&0\\3&4&3&2&1\\2&3&4&3&2\\1&2&3&4&3\\0&1&2&3&4\end{bmatrix}\begin{bmatrix}F01\\F02\\F03\\F04\\F05\end{bmatrix}=v\cdot\begin{bmatrix}\sum_{i=05}^{08}Ci\\\sum_{i=04}^{07}Ci\\\sum_{i=03}^{06}Ci\\\sum_{i=02}^{05}Ci\\\sum_{i=01}^{04}Ci\end{bmatrix} \tag{127}$$

The movement blurring removal unit 2002 calculates Fi which is the pixel value which has been subjected to adjustment of movement blurring by forming expressions of which number corresponds to the length of the processing increment. In the same way, in the event that the number of pixel contained in the processing increment is one hundred, Fi is calculated by generating expressions corresponding to the one hundred pixels.

As described above, the movement blurring removal unit 2002 generates expressions corresponding to the movement amount v and the processing increment, sets pixel values of the foreground component image for the generated expressions, and calculates an foreground component image which has been subjected to removal of movement blurring.

The processing for removal of movement blurring contained in the foreground component image by the movement blurring removal unit 2002 will now be descried with reference to the flowchart shown in FIG. 137.

In Step S2801, the processing increment decision unit 2801 of the movement blurring removal unit 2002 generates the processing increment based upon the movement vector and the region information, and supplies the generated processing increment to the modeling unit 2802.

In Step S2802, the modeling unit 2802 of the movement blurring removal unit 2002 performs selecting or generating of the model corresponding to the movement amount v and the processing increment. In Step S2803, the expression generating unit 2803 creates the normal equation based upon the selected model.

In Step S2804, the addition unit 2804 sets the pixel values of the foreground component image for the created normal equation. In Step S2805, the addition unit 2804 judges whether or not the pixel values of all the pixels corresponding to the processing increment are set, and in the event that judgment is made that not all the pixel values of the pixels corresponding to the processing increment have been set, the flow returns to Step S2804 and repeats the processing of setting the pixel values for the normal equation.

In the event that judgment is made that all the pixel values of the pixels of the processing increment have been set in Step S2805, the flow proceeds to Step S2806, the computing unit 2805 calculates the pixel values of the foreground which has been subjected to removal of movement blurring based upon the normal equation wherein the pixel values supplied from the addition unit 2804 are set, and the processing ends.

As described above, the movement blurring removal unit 2002 can remove movement blurring from the foreground image containing the movement blurring based upon the movement vector and the region information.

That is to say, movement blurring contained in the pixel values which are the sampled data, can be removed.

Next, correction of the background component image will be described.

FIG. 138 is a diagram which illustrates an example of the model of the background component image corresponding to the model of the foreground component image shown by way of an example shown in FIG. 134.

As shown in FIG. 138, the foreground components have been removed, so pixel values of the pixels of the background component image corresponding to the mixed region in the original input image are made up of a small number of background components as compared with the pixels corresponding to the background region in the original input image, corresponding to the mixture ratio α.

For example, in the background component image shown by way of an example shown in FIG. 138, the pixel value C01 is made up of four background components B02/Vs, the pixel value C02 is made up of three background components B03/Vs, the pixel value C03 is made up of two background components B04/Vs, and the pixel value C04 is made up of one background component B05/V.

Also, with the background component image shown by way of an example shown in FIG. 138, the pixel value C09 is made up of one background component B10/V, the pixel value C10 is made up of two background components B11/Vs, the pixel value C11 is made up of three background components B12/Vs, and the pixel value C12 is made up of four background components B13/Vs.

As described above, the pixel value of a pixel corresponding to the mixed region in the original input image is made up of a small number of background components as compared with the pixel corresponding to the background region in the original input image, and accordingly the image corresponding to the mixed region in the foreground component image becomes a dark image, for example, as compared with the image of the background region.

The correction unit 2003 corrects pixel values of the pixels corresponding to the mixed region in the background component image by multiplying each of pixel values of the pixels corresponding to the mixed region in the background component image by a constant corresponding to the mixture ratio α.

For example, in the event that the background component image shown in FIG. 138 is input, the correction unit 2003 multiplies the pixel value C01 by 5/4, multiplies the pixel value C02 by 5/3, multiplies the pixel value C11 by 5/3, and multiplies the pixel value C12 by 5/4. In order to match with the pixel position of the foreground component image which has been subjected to removal of movement blurring shown by way of an example shown in FIG. 135, the correction unit 2003 sets the pixel value C03 through pixel value C11 to 0.

As described above, the correction unit 2003 corrects pixel values of the pixels corresponding to the mixed region in the background component image, and also adjusts the pixel position with regard to the foreground component image which has been subjected to removal of movement blurring.

FIG. 140 is a block diagram which illustrates the configuration of the movement-blurring-removed-image processing unit 2004 for generating a coefficient set which is used in class classification adaptation processing for generating an even higher resolution image in the spatial direction. For example, the movement-blurring-removed-image processing unit 2004 of which the configuration is shown in FIG. 140 generates a coefficient set which is used in class classification adaptation processing for generating a HD image from a SD image based upon the input HD image.

Background component tutor image frame memory 3001 stores the corrected background component image of the tutor image supplied from the correction unit 2003. The background component tutor image frame memory 3001 supplies the stored background component image of the tutor image to a weighted averaging unit 3003-1 and a learning unit 3006-1.

Foreground component tutor image frame memory 3002 stores the foreground component image of the tutor image, which has been subjected to removal of movement blurring, supplied from the movement blurring removal unit 2002. The foreground component tutor image frame memory 3002 supplies the stored foreground component image of the tutor image to a weighted averaging unit 3003-2 and a learning unit 3006-2.

The weighted averaging unit 3003-1 generates a SD image which is a student image by ¼ weighted-averaging the background component image of a tutor image which is a HD image, and supplies the generated SD image to background component student image frame memory 3004.

For example, the weighted averaging unit 3003-1 takes four pixels of 2×2 (width×height) (portions represented by white circles in the drawing) as one increment in the tutor image as shown in FIG. 85, adds pixel values of four pixel of each increment, and the sum is divided by 4. The weighted averaging unit 3003-1 sets the ¼ weighted averaged results described above for the pixel of the student image positioned at the center of each increment (which are the portions represented by solid circles in the drawing).

The background component student image frame memory 3004 stores the student image corresponding to the background component image of the tutor image supplied from the weighted averaging unit 3003-1. The background component student image frame memory 3004 supplies the student image corresponding to the background component image of the tutor image stored therein to the learning unit 3006-1.

The weighted averaging unit 3003-2 generates a SD image which is a student image by ¼ weighted-averaging the foreground component image of a tutor image which is a HD image supplied from the foreground component tutor image frame memory 3002, for example, and supplies the generated SD image to foreground component student image frame memory 3005.

The foreground component student image frame memory 3005 stores the student image which is a SD image, corresponding to the foreground component image of the tutor image supplied from the weighted averaging unit 3003-2. The foreground component student image frame memory 3005 supplies the student image corresponding to the foreground component image of the tutor image stored therein to the learning unit 3006-2.

The learning unit 3006-1 generates coefficient sets corresponding to the background component image based upon the background component image of the tutor image supplied from the background component tutor image frame memory 3001 and the student image corresponding to the background component image of the tutor image supplied from the background component student image frame memory 3004, and supplies the generated coefficient sets to coefficient set memory 3007.

The learning unit 3006-2 generates coefficient sets corresponding to the foreground component image based upon the foreground component image of the tutor image supplied from the foreground component tutor image frame memory 3002 and the student image corresponding to the foreground component image of the tutor image supplied from the foreground component student image frame memory 3005, and supplies the generated coefficient sets to coefficient set memory 3007.

The coefficient set memory 3007 stores the coefficient sets corresponding to the background component image supplied from the learning unit 3006-1 and the foreground component image supplied from the learning unit 3006-2.

In the event that there is no need to differentiate the learning unit 3006-1 and the learning unit 3006-2 individually, these will be simply referred to as a learning unit 3006 below.

FIG. 141 is a block diagram illustrating the configuration of the learning unit 3006.

The class classification unit 3031 is configured of a class tap obtaining unit 3051 and a waveform classification unit 3052, and performs class classification of the pixels of interest, which are the pixels at interest, in the input student image. The class tap obtaining unit 3051 obtains a predetermined number of class taps which are pixels in the student image corresponding to the pixel of interest, and supply the obtained class taps to the waveform classification unit 3052.

The waveform classification unit 3052 executes class classification processing for classifying input signals into several classes based on the characteristics thereof, and classify the pixel of interest into one class of the 512 classes, based on the class tap, and supplies class Nos. corresponding to the classes into which classification has been made, to a prediction tap obtaining unit 3032.

The prediction tap obtaining unit 3032 obtains from the pixels of the student image a prediction tap which is an increment for calculating predicted values for the original image (tutor image) corresponding to the class, based on the class No., and supplies the obtained prediction tap and class No. to a corresponding pixel obtaining unit 3033.

The corresponding pixel obtaining unit 3033 obtains the pixel value of the pixel in the tutor image corresponding to the pixel value to be predicted, based on the prediction tap and the class No., and supplies the prediction tap, class No., and pixel value of the pixel in the tutor image corresponding to the pixel value to be predicted, to a normal equation generating unit 3034.

The normal equation generating unit 3034 generates a normal equation for calculating a coefficient set used in adaptation processing, corresponding to the relation between the prediction tap and the pixel value to be predicted, based on the prediction tap, class No., and pixel value of the pixel in the tutor image corresponding to the pixel value to be predicted, and supplies the generated normal equation to a coefficient calculation unit 3035, along with the class No.

The coefficient calculation unit 3035 solves the normal equation supplied from the normal equation generating unit 3034, and calculates a coefficient set to be used in the adaptation processing, corresponding to the class into which classification has been made.

The coefficient calculation unit 3035 supplies the calculated coefficient set to coefficient set memory 7025, along with the class No.

An arrangement may be made wherein the normal equation generating unit 3034 generates a matrix corresponding to such a normal equation, and the coefficient calculation unit 3035 calculates the coefficient set, based on the generated matrix.

FIG. 142 is a diagram which describes a coefficient set generated by the movement-blurring-removed-image processing unit 2004 of which configuration is shown in FIG. 140. The region specifying unit 103 specifies the foreground region, the background region, the covered background region, and the uncovered background region in the input image.

The input image, wherein the regions have been specified and the mixture ratio α has been detected by the mixture ratio calculation unit 104, is separated into the foreground component image and the background component image by the foreground/background separation unit 2001.

The movement blurring is removed from the separated foreground component image by the movement blurring removal unit 2002. The pixel values corresponding to the mixed region in the separated background component image are corrected by the correction unit 2003 corresponding to the removal of the movement blurring of the foreground component image.

The movement-blurring-removed-image processing unit 2004 calculates a coefficient set corresponding to the foreground component image and a coefficient set corresponding to the background component image, respectively, based upon the foreground component image which has been subjected to removal of movement blurring and the background component image which has been subjected to correction.

That is to say, the learning unit 3006-1 calculates a coefficient set corresponding to the background component image based upon the separated and corrected background component image, and the learning unit 3006-2 calculates a coefficient set corresponding to the foreground component image based upon the foreground component image which has been subjected to separation and removal of movement blurring.

The coefficient set corresponding to the background component image is used for predicting the pixel values of the image corresponding to the background component image in the class classification adaptation processing for predicting the pixel values, which is to be applied to the separated and corrected background component image.

The coefficient set corresponding to the foreground component image is used for predicting the pixel values of the image corresponding to the foreground component image in the class classification adaptation processing for predicting the pixel values, which is to be applied to the foreground component image which has been subjected to separation and removal of movement blurring.

The movement blurring is added to the predicted image corresponding to the foreground component image. The predicted image corresponding to the background component image is corrected corresponding to addition of the movement blurring to the foreground component image.

The predicted image corresponding to the corrected background component image and the predicted image corresponding to the foreground component image which has been subjected to addition of the movement blurring, are synthesized into a single predicted image.

Referring to the flowchart shown in FIG. 143, description will be made with regard to the processing of learning for generating a coefficient set which is used in prediction of the pixel values by the class classification adaptation processing in the movement-blurring-removed-image processing unit 2004 of which configuration is shown in FIG. 140.

In Step S3001, the weighted averaging unit 3003-1 and the weighted averaging unit 3003-2 generate a student image corresponding to the background component image and a student image corresponding to the foreground component image. That is to say, the weighted averaging unit 3003-1 generates a student image corresponding to the background component image of the tutor image by ¼ weighted-averaging of the background component image of the tutor image stored in the background component tutor image frame memory 3001, for example.

The weighted averaging unit 3003-2 generates a student image corresponding to the foreground component image of the tutor image by ¼ weighted-averaging of the foreground component image of the tutor image stored in the foreground component tutor image frame memory 3002, for example.

In Step S3002, the learning unit 3006-1 generates a coefficient set corresponding to the background component image based upon the background component image of the tutor image stored in the background component tutor image frame memory 3001 and the student image corresponding to the background component image of the tutor image stored in the background component student image frame memory 3004. Details of the processing for generating of a coefficient set in Step S3002 will be described later with reference to the flowchart shown in FIG. 144.

In Step S3003, the learning unit 3006-2 generates a coefficient set corresponding to the foreground component image based upon the foreground component image of the tutor image stored in the foreground component tutor image frame memory 3002 and the student image corresponding to the foreground component image of the tutor image stored in the foreground component student image frame memory 3005.

In Step S3004, the learning unit 3006-1 and the learning unit 3006-2 output a coefficient set corresponding to the background component image and a coefficient set corresponding to the foreground component image to the coefficient set memory 3007, respectively. The coefficient set memory 3007 stores the coefficient set corresponding to the background component image, or the coefficient set corresponding to the foreground component image, and then the processing ends.

As described above, the movement-blurring-removed-image processing unit 2004 of which configuration is shown in FIG. 140 can generate a coefficient set corresponding to the background component image and a coefficient set corresponding to the foreground component image.

Note that it is needless to say that the processing in Step S3002 and Step S3003 may be performed serially or in parallel.

Next, referring to FIG. 144, the processing for generating a coefficient set corresponding to the background component image performed by the learning unit 3006-1, corresponding to Step S3002, will now be described.

In Step S3021, the learning unit 3006-1 judges whether or not there are any unprocessed pixels in the student image corresponding to the background component image, and in the event that judgment is made that there are unprocessed pixels in the student image corresponding to the background component image, the flow proceeds to Step S3022, and the pixel of interest is obtained from the student image corresponding to the background component image in raster scan sequence.

In Step S3023, the class tap obtaining unit 3051 of the class tap classification unit 3031 obtains a class tap corresponding to the pixel of interest from the student image stored in the background component student image frame memory 3004. In Step S3024, the waveform classification unit 3052 of the class classification unit 3031 applies the ADRC processing to the class tap, this reduces the number of bits of pixels making up the class tap, and the pixel of interest is classified. In Step S3025, the prediction tap obtaining unit 3032 obtains a prediction tap corresponding to the pixel of interest from the student image stored in the background component student image frame memory 3004 based upon the classified class.

In Step S3026, the corresponding pixel obtaining unit 3033 obtains pixels corresponding to the pixel value which is to be predicted from the background component image of the tutor image stored in the background component tutor image frame memory 3001 based upon the classified class.

In Step S3027, the normal equation generating unit 3034 adds the pixel values of pixels corresponding to the prediction tap and the pixel value which is to be predicted to the matrix for each class based upon the classified class, the flow returns to Step S3021, and the learning unit 3006-1 repeats judgment whether or not unprocessed pixels exist. The matrix for each class to which the pixel values of pixels corresponding to the prediction tap and the pixel value which is to be predicted is added, corresponds to the normal equations for calculating a coefficient set for each class.

In Step S3021, in the event that judgment is made that there are no unprocessed pixels in the student image, the flow proceeds to Step S3028, and the normal equation generating unit 3034 supplies the matrix for each class for which the pixel values of the pixel corresponding to the prediction tap and the pixel value which is to be predicted is set, to the coefficient calculation unit 3035. The coefficient calculation unit 3035 calculates a coefficient set for each class corresponding to the background component image by solving the matrix for each class, wherein the pixel values of pixels corresponding to the prediction tap and the pixel value which is to be predicted are set.

Note that the coefficient set is not restricted to predicting the pixel values by linear prediction, rather, an arrangement may be made wherein the coefficient calculation unit 3035 calculates a coefficient set for predicting the pixel values by non-linear prediction.

In Step S3029, the coefficient calculation unit 3035 outputs the coefficient set for each class, corresponding to the background component image to the coefficient set memory 3007, and the processing ends.

As described above, the learning unit 3006-1 can generate the coefficient set corresponding to the background component image.

The processing for generating of the coefficient set corresponding to the foreground component image by the learning unit 3006-2 corresponding to Step S3003 is the same as the processing described with reference to the flowchart shown in FIG. 144 except for using the foreground component image stored in the foreground component tutor image frame memory 3002 and the student image corresponding to the foreground component image stored in the foreground component student image frame memory 105, and accordingly, description thereof will be omitted.

As described above, the movement-blurring-removed-image processing unit 2004 of which the configuration is shown in FIG. 140 can generate a coefficient set corresponding to the background component image which has been subjected to correction and a coefficient set corresponding to the foreground component image which has been removal of movement blurring individually.

FIG. 145 is a block diagram which illustrates the configuration of the movement-blurring-removed-image processing unit 2004 for generating an even higher resolution image in the spatial direction by performing the class classification adaptation processing. For example, the movement blurring removal processing unit 2004 of which the configuration is shown in FIG. 145 generates an HD image by performing the class classification adaptation processing based upon the input image which is a SD image.

Background component image frame memory 3101 stores the background component image which has been subjected to correction supplied from the correction unit 2003. The background component image frame memory 3101 supplies the stored background component image to a mapping unit 3103-1.

Foreground component image frame memory 3102 stores the foreground component image made up of pixels belonging to the foreground region, supplied from the movement blurring removal unit 2002. The foreground component image frame memory 3102 supplies the stored foreground component image to a mapping unit 3103-2.

The mapping unit 3103-1 generates a predicted image corresponding to the background component image stored in the background component image frame memory 3101 by the class classification adaptation processing based upon the coefficient set corresponding to the background component image stored in the coefficient set memory 3104. The mapping unit 3103-1 supplies the generated predicted image to a correction unit 3105.

The correction unit 3105 sets the pixel value of the predetermined pixel in the predicted image corresponding to the mixed region in the background component image corresponding to the movement blurring, which the movement blurring addition unit 3106 adds, to 0; or divides the pixel value of the predetermined pixel in the predicted image by the predetermined value corresponding to the movement blurring which is added. The correction unit 3105 supplies the predicted image which has been subjected to correction described above to a synthesizing unit 3107.

The mapping unit 3103-2 generates a predicted image corresponding to the foreground component image stored in the foreground component image frame memory 3102 by the class classification adaptation processing based upon the coefficient set corresponding to the foreground component image stored in the coefficient set memory 3104. The mapping unit 3103-2 supplies the generated predicted image to the movement blurring addition unit 3106.

The movement blurring addition unit 3106 adds movement blurring to the predicted image by providing the desired movement blurring adjustment amount v', e.g., the movement blurring adjustment amount v' of which value is the half value of the movement amount v of the input image or the movement blurring adjustment amount v' having no relationship with the movement amount v. The movement blurring addition unit 3106 calculates the foreground component Fi/v' by dividing the pixel value Fi in the predicted image in the foreground component image which has subjected to removal of movement blurring by the movement blurring adjustment amount v', calculates the sum of the foreground components Fi/v's, and generates the pixel value which movement blurring is added to.

For example, in the event that the predicted image shown in FIG. 146 is input, and the movement blurring adjustment amount v' is 3, the pixel value C02 is (F01)/v', the pixel value C03 is (F01+F02)/v', the pixel value C04 is (F01+F02+F03)/v', and the pixel value C05 is (F02+F03+F04)/v' as shown in FIG. 147.

The movement blurring addition unit 3106 supplies the predicted image of the foreground component image which has been subjected to addition of movement blurring, to the synthesizing unit 3107.

The synthesizing unit 3107 synthesizes the predicted image corresponding to the background component image which has been subjected to correction supplied from the correction unit 3105, and the predicted image corresponding to the foreground component image which has been subjected to addition of movement blurring supplied from the movement blurring addition unit 3106, and supplies synthesized predicted image to the frame memory 3108.

The frame memory 3108 stores the predicted image supplied from the synthesizing unit 3107, and also outputs the stored image as an output image.

In the event that there is no need to differentiate the mapping unit 3103-1 and the mapping unit 3103-2 individually, these will be simply referred to as the mapping unit 3103 below.

FIG. 148 is a block diagram which illustrates the configuration of the mapping unit 3103.

The mapping unit 3131 comprises a class classification unit 3141 for performing class classification processing, and a prediction tap obtaining unit 3142 and a prediction computation unit 3143 for performing the adaptation processing.

The class classification unit 3141 comprises a class tap obtaining unit 3151 and a waveform classification unit 3152, and performs class classification for pixel of interest in the input image of either background component image or foreground component image.

The class tap obtaining unit 3151 obtains a predetermined number of class taps corresponding to pixel of interest in the input image, and supplies the obtained class taps to the waveform classification unit 3152. For example, the class tap obtaining unit 3151 obtains nine class taps, and supplies the obtained class taps to the waveform classification unit 3152.

The waveform classification unit 3152 reduces the number of bits of the pixels making up the class taps by applying the ADRC processing to the class taps, classifies the pixel of interest into one of the predetermined number of classes, and supplies the class No. corresponding to the classified class to the prediction tap obtaining unit 3142. For example, the waveform classification unit 3152 classifies the pixel of interest to one of 512 classes, and supplies the class No. corresponding to the classified class to the prediction tap obtaining unit 3142.

The prediction tap obtaining unit 3142 obtains the predetermined number of prediction taps corresponding to the class from the input image based upon the class No., and supplies the obtained prediction taps and class No. to the prediction computation unit 3143.

The prediction computation unit 3143 obtains the coefficient set corresponding to the class, and corresponding to the input image, from the coefficient set corresponding to the background component image and coefficient set corresponding to the foreground component image, stored in the coefficient set memory 3104 based upon the class No. The prediction computation unit 3143 predicts a pixel value in the predicted image by linear prediction based upon the coefficient set and the prediction taps corresponding to the class, and corresponding to the input image. The prediction computation unit 3143 supplies the predicted pixel value to the frame memory 3132.

Note that an arrangement may be made wherein the prediction computation unit 3143 predicts the pixel value in the predicted image by non-linear prediction.

The frame memory 3132 stores the predicted pixel values supplied from the mapping processing unit 3131, and outputs the image made up of the predicted pixel values.

Referring to the flowchart shown in FIG. 149, the processing for creation of the image by the movement-blurring-removed-image processing unit 2004 of which configuration is shown in FIG. 149 will be now described.

In Step S3101, the mapping unit 3103-1 predicts the image corresponding to the background component image stored in the background component image frame memory 3101 by the class classification adaptation processing based upon the coefficient set corresponding to the background component image stored in the coefficient set memory 3104. Details of the processing for prediction of the image corresponding to the background component image will be described later with reference to the flowchart shown in FIG. 150.

In Step S3102, the mapping unit 3103-2 predicts the image corresponding to the foreground component image stored in the foreground component image frame memory 3102 by the class classification adaptation processing based upon the coefficient set corresponding to the foreground component image stored in the coefficient set memory 3104.

In Step S3103, the correction unit 3105 corrects the predicted image corresponding to the background component image.

In Step S3104, the movement blurring addition unit 3106 adds movement blurring to the predicted image corresponding to the foreground component image.

In Step S3105, the synthesizing unit 3107 synthesizes the predicted image corresponding to the background component image with the predicted image corresponding to the foreground region. The synthesizing unit 3107 supplies the synthesized image to the frame memory 3108. The frame memory 3108 stores the image supplied from the synthesizing unit 3107.

In Step S3106, the frame memory 3108 outputs the stored and synthesized image, and the processing ends.

As described above, the image processing device having the movement-blurring-removed-image processing unit 2004 of which configuration is shown in FIG. 145 generates a predicted image corresponding to the background component image and a predicted image corresponding to the foreground component image which has been subjected to removal of movement blurring individually.

Note that it is needless to say that the processing in Step S3101 and the processing in Step S3102 may be performed in a serial manner, as well as in a parallel manner.

Referring to the flowchart shown in FIG. 150, the processing for prediction of the image corresponding to the background component image by the mapping unit 3103-1 corresponding to Step S3101 will be described.

In Step S3121, the mapping unit 3103-1 judges whether or not there are any unprocessed pixels in the background component image, and in the event that judgment is made that there are unprocessed pixels in the background component image, the flow proceeds to Step S3122, and the mapping processing unit 3131 obtains the coefficient set corresponding to the background component image stored in the coefficient set memory 3104. In Step S3123, the mapping processing unit 3131 obtains a pixel of interest from the background component image stored in the background component image frame memory 3101 in raster scan sequence.

In Step S3124, the class tap obtaining unit 3151 of the class classification unit 3141 obtains the class tap corresponding to the pixel of interest from the background component image stored in the background component image frame memory 3101. In Step S3125, the waveform classification unit 3152 of the class classification unit 3141 reduces the number of bits of pixels making up the class tap by applying the ADRC processing to the class tap, and performs class classification for the pixel of interest. In Step S3126, the predication tap obtaining unit 3142 obtains the prediction tap corresponding to the pixel of interest from the background component image stored in the background component image frame memory 3101 based upon the classified class.

In Step S3127, the prediction computation unit 3143 predicts pixel values of predicted image by linear prediction based upon the coefficient set and the prediction tap, corresponding to the background component image and the classified class.

Note that the prediction computation unit 3143 may predict the pixel values of the predicted image by non-linear prediction, as well as to by linear prediction.

In Step S3128, the prediction computation unit 3143 outputs the predicted pixel value to the frame memory 3132. The frame memory 3132 stores the pixel value supplied from the prediction computation unit 3143. The procedure returns to Step S3121, and judgment whether or not any unprocessed pixels exist is repeated.

In Step S3121, in the event that judgment is made that there is no unprocessed pixel in the background component image, the flow proceeds to Step S3129, the frame memory 3132 outputs the stored predicted image corresponding to the background component image, and processing ends.

As described above, the mapping unit 3103-1 can predict the image corresponding to the background component image based upon the corrected background component image.

The processing for generating of the predicted image corresponding to the foreground component image by the mapping unit 3103-2 corresponding to Step S3102 is the same as the processing described with reference to the flowchart shown in FIG. 150 except for using the foreground component image stored in the foreground component image frame memory 3102 and the coefficient set corresponding to the foreground component image, and accordingly, description thereof will be omitted.

As described above, the movement-blurring-removed-image processing unit 2004 of which configuration is shown in FIG. 145 can generate a predicted image corresponding to the background component image and a predicted image corresponding to the foreground component image which has been subjected to removal of movement blurring individually.

FIG. 151 is a block diagram which illustrates the configuration of the movement-blurring-removed-image processing unit 2004 for applying edge enhancement processing with different effects for each background component image, or each foreground component image.

Background component image frame memory 3201 stores the corrected background component image supplied from the correction unit 2003. The background component image frame memory 3201 supplies the stored background component image to an edge enhancing unit 3203-1.

Foreground component image frame memory 3202 stores the foreground component image which has been subjected to removal of movement blurring, supplied from the movement blurring removal unit 2002. The foreground component image frame memory 3202 supplies the stored foreground component image to an edge enhancing unit 3203-2.

The edge enhancing unit 3203-1 applies the processing of edge enhancement suitable for the background component image to the background component image stored in the background component image frame memory 3201.

For example, the edge enhancing unit 3203-1 performs the processing of edge enhancement which further enhances the edge for the background component image which is a still image as compared with the foreground component image. Thus the sense-of-resolution of the background component image can be improved without unnatural degradation of the image occurring in the event of applying the processing of edge enhancement to images containing noise.

The edge enhancing unit 3203-1 supplies the background component image which has been subjected to edge enhancement to a correction unit 3204.

The correction unit 3204 sets the pixel value of pixel in the mixed region in the background component image to 0, or divides the pixel value of the pixel in the mixed region by the predetermined value corresponding to the movement blurring which is to be added, corresponding to the movement blurring added by a movement blurring addition unit 3205. The correction unit 3204 supplies the image corrected as described above, to a synthesizing unit 3206.

The edge enhancing unit 3203-2 applies the processing of edge enhancement suitable for the foreground component image, to the foreground component image stored in the foreground component image frame memory 3202.

For example, the edge enhancing unit 3203-2 compares the foreground component image with the background component image, and performs the processing of edge enhancement of which degree is less than that for the background component image. Thus the unnatural degradation in the image can be reduced as well as improving the sense-of-resolution in the foreground component image even if the foreground component image which has been subjected to removal of movement blurring contains noise.

The edge enhancing unit 3203-2 supplies the foreground component image which has been subjected to edge enhancement to the movement blurring addition unit 3205.

The movement blurring addition unit 3205 adds movement blurring to the foreground component image which has been subjected to edge enhancement, and supplies the foreground component image which has been subjected to addition of movement blurring to a synthesizing unit 3206.

The synthesizing unit 3206 synthesizes the background component image which has been subjected to edge enhancement and correction, supplied from the correction unit 3204, with the foreground component image which has been subjected to edge enhancement and addition of movement blurring, supplied from the movement blurring addition unit 3205, and supplies the synthesized predicted image to frame memory 3207.

The frame memory 3207 stores the synthesized predicted image supplied from the synthesizing unit 3206, and also outputs the stored image as an output image.

As described above, the movement-blurring-removed-image processing unit 2004 of which configuration is shown in FIG. 151 applies the edge enhancement processing corresponding to the nature of each image, for each background component image or each foreground component image, and accordingly the sense-of-resolution of the image is improved without degrading the image unnaturally.

In the event that there is no need to differentiate the edge enhancing unit 3203-1 and the edge enhancing unit 3203-2 individually, these will be referred to as the edge enhancing unit 3203 below.

For example, the edge enhancing unit 3203-1 has the same configuration as the edge enhancing unit 907, and applies edge enhancement processing with a greater degree of edge enhancement to the background component image. The edge enhancing unit 3203-2 has the same configuration as the edge enhancing unit 907, and applies edge enhancement processing with a relatively weaker degree of edge enhancement to the foreground component image.

As described above, the edge enhancing unit 3203-1 and the edge enhancing unit 3203-2 applies the edge enhancement processing corresponding to the nature of the foreground component image or the background component image, to each foreground component image or each background component image, based upon the different filter coefficients or the gain adjustment coefficients, for example.

FIG. 152 is a diagram which describes the processing in the movement-blurring-removed-image processing unit 2004 of which configuration is shown in FIG. 151.

The specifying unit 103 specifies the foreground region, uncovered background region, covered background region, and background region in the input image. The input image of which regions are specified, is separated into the background component image and foreground component image by the foreground/background separation unit 2001.

The movement blurring removal unit 2002 removes movement blurring from the separated foreground component image. The correction unit 2003 corrects pixel values of the pixels corresponding to the mixed region in the separated background component image.

The movement-blurring-removed-image processing unit 2004 of which configuration is shown in FIG. 151 performs edge enhancement for each of the corrected background component image and the foreground component image which has been subjected to removal of movement blurring, corresponding to the nature of each image.

The background component image which has been subjected to edge enhancement is corrected, corresponding to addition of the movement blurring to the foreground component image. The desired movement blurring is added to the foreground component image which has been subjected to edge enhancement.

The background component image which has been subjected to edge enhancement and correction, and the foreground component image which has been subjected to edge enhancement and addition of movement blurring, are synthesized.

Referring to the flowchart shown in FIG. 153, the processing for edge enhancement by the movement-blurring-removed-image processing unit 2004 of which configuration is shown in FIG. 151 will be now described.

In Step S3201, the edge enhancing unit 3203-1 performs edge enhancement for the background component image stored in the background component image frame memory 3201 by edge enhancement processing corresponding to the nature of the background component image.

In Step S3202, the edge enhancing unit 3203-2 performs edge enhancement for the foreground component image stored in the foreground component image frame memory 3202 by the edge enhancement processing corresponding to the nature of the foreground component image.

In Step S3203, the correction unit 3204 corrects pixel values of pixels in the background component image corresponding to addition of the movement blurring to the foreground component image.

In Step S3204, the movement blurring addition unit 3205 adds the desired movement blurring to the foreground component image.

In Step S3205, the synthesizing unit 3206 synthesizes the background component image which has been subjected to edge enhancement and correction, with the foreground component image which has been subjected to edge enhancement and addition of movement blurring. The synthesizing unit 3206 supplies the synthesized image to the frame memory 3207. The frame memory 3207 stores the image supplied from the synthesizing unit 3206.

In Step S3206, the frame memory 3207 outputs the stored and synthesized image, and the processing ends.

As described above, the movement-blurring-removed-image processing unit 2004 of which configuration is shown in FIG. 151 can perform the edge enhancement processing for each background component image and each foreground component image corresponding to the nature of each, and accordingly the sense-of-resolution can be improved without unnatural degradation in the image occurring.

Note that it is needless to say that the processing in Step S3201 and Step S3202 may be performed serially or in parallel.

Also, the processing which the movement-blurring-removed-image processing unit 2004 executes is not restricted to generating coefficients corresponding to SD images and HD images, or generating HD images from SD images, and may be arranged to generate coefficients for generating images with higher resolution in the spatial direction, and generate images with higher resolution in the spatial direction, for example. Further, the movement-blurring-removed-image processing unit 2004 may execute processing for generating images with higher resolution in the time direction.

Note that the movement-blurring-removed-image processing unit 2004 is not restricted to class classification adaptation processing or edge enhancement processing, and may be arranged to execute other processing, such as, for example, conversion to an image size of a desired size, extracting color signals such as RGB, removing noise, compressing images, encoding, and so forth, for each image of specified regions. For example, the compression ratio can be increased with little deterioration of the image over conventional arrangements by the movement-blurring-removed-image processing unit 2004 compressing images of each of the regions with low compression ratio in directions following movement vectors and high compression ratio in directions orthogonal to movement vectors, based on movement vectors corresponding to images of each of the regions.

Also, an arrangement may be made wherein, in the event that the background object is moving, the image processing device removes the movement blurring contained in the background component image, so as to execute processing on a background component image from which movement blurring has been removed.

FIG. 154 is a block diagram illustrating another configuration of the functions of the image processing device for separating an input image and processing each separated image. While the image processing device shown in FIG. 119 performs region specification and calculation of the mixture ratio α serially, the image processing device shown in FIG. 154 performs region specification and calculation of the mixture ratio α in parallel.

Portions which are the same as the function in the block diagram shown in FIG. 119 are denoted with the same numerals, and description thereof will be omitted.

The input image is supplied to the object extracting unit 101, region specifying unit 103, mixture ratio calculating unit 1101, and foreground/background separation unit 3501.

Based on an input image, the mixture ratio calculating unit 1101 calculates an estimated mixture ratio in a case wherein a pixel is assumed to belong to the covered background region, and an estimated mixture ratio in a case wherein the pixel is assumed to belong to the uncovered background region, for each of the pixels contained in the input image, and supplies the estimated mixture ratio in a case wherein the pixel is assumed to belong to the covered background region and the estimated mixture ratio in a case wherein the pixel is assumed to belong to the uncovered background region, thus calculated, to the foreground/background separation unit 3501.

FIG. 155 is a block diagram which illustrates one example of the configuration of the foreground/background separation unit 3501.

The same portions as the movement blurring removal unit 2002 shown in FIG. 124 are denoted by the same reference numerals, and description thereof will be omitted.

A selecting unit 3521 selects one or the other of the estimated mixture ratio in a case wherein the pixel is assumed to belong to the covered background region and the estimated mixture ratio in a case wherein the pixel is assumed to belong to the uncovered background region, supplied from the mixture ratio calculating unit 1101, based on the region information supplied from the region specifying unit 103, and supplies the selected estimated mixture ratio to the separating unit 2601 as mixture ratio α.

The separation unit 2601 extracts the foreground components and the background components from the pixel values of the pixels belonging to the mixed region based upon the mixture ratio α supplied from the selection unit 3521 and the region information, and separates into the background components in the uncovered background region, the foreground components in the uncovered background region, the background components in the covered background region, and the foreground components in the covered background region.

The configuration of the separation unit 2601 may be the same as the configuration shown in FIG. 129.

As described above, the image processing device of which configuration is shown in FIG. 154 can perform processing for each background component image and each foreground component image, corresponding to the nature of each image.

As described above, with the image processing device according to the present invention, an input image is separated into a background component image and a foreground component image, and processing suitable for the separated images is executed, so images with higher resolution can be generated without generating unnatural images, for example.

Note that while the movement of the object which is the foreground has been described as being from the left to the right, it is needless to say that this is not restricted to that direction.

In the above, an example has been given of a case of projecting images in real space having three-dimensional space and time-axis information onto time-space having two-dimensional space and time-axis information, using a video camera, but the present invention is not restricted to this example, and may be applied to cases of projecting a greater amount of first information of a first dimension onto less second information of a second dimension.

Note that the sensor is not restricted to a CCD, and may be a sensor which is a solid-state image-taking device, e.g., a CMOS (Complementary Metal Oxide Semiconductor (complementary metal oxide film semiconductor)), BBD (Bucket Brigade Device), CID (Charge Injection Device), or CPD (Charge Priming Device) or the like, and is not restricted to a sensor wherein detecting elements are arrayed in a matrix fashion, but may rather be a sensor wherein the detecting elements are arrayed in a row.

The recording medium storing the program for executing the signal processing of the present invention is not only configured of packaged media such as a magnetic disk 91 (including Floppy (Registered Trademark) disks), optical disk 92 (including CD-ROMs (Compact Disc-Read Only Memory), DVDs (Digital Versatile Disc)), magneto-optical disk 93 (including MDs (Mini-Disc) (Registered Trademark)), or semiconductor memory 94 or the like, storing the program, to be distributed separately from the computer as shown in FIG. 10 for providing the program to users, but is configured of ROM 72 or a hard disk included in the storage unit 78 or the like storing the program, provided to the user in the state of being assembled into the computer beforehand.

Also, in the present Specification, the steps describing the program recorded in the recording medium includes processing which is executed in the time-sequence following the described order, of course, and also processing which is executed in parallel or individually, even if not processed in time-sequence.

INDUSTRIAL APPLICABILITY

According to the present invention, images can be processed corresponding to the mixing of background images and images of moving objects.

The invention claimed is:

1. An image processing device for processing input image data made up of a predetermined number of pieces of pixel data obtained by an image-taking device having a predetermined number of pixels having time-integration effects, said image processing device comprising:

a region specifying unit that is configured to specify, based on said input image data, a mixed region including a foreground object component configuring foreground objects and a background object component configuring background objects, and a non-mixed region including one of a foreground region made up of said foreground object component and a background region made up of said background object component, and to output region specifying information corresponding to the results of specifying;

a separating unit that is configured to separate at least said mixed region into said foreground object component and said background object component, corresponding to said region specifying information and output a foreground object component image containing only the foreground object component and a background object component image containing only the background object component; and a processor that is configured to individually process, according to different methods and for the purpose of converting an input image into an image with enhanced resolution, said foreground object component image and said background object component image, corresponding to the results of separation, wherein each of the processed foreground object component image and the background object component has a higher resolution in a spatial direction than before processing.

2. An image processing device according to claim 1, further comprising a blur-removal unit that is configured to remove movement blurring of at least one of said foreground object component and said background object component;

wherein said processor is configured to individually process said foreground object component and said background object component which have been subjected to movement blurring removal by said blur-removal unit.

3. An image processing device according to claim 1, wherein said region specifying unit is further configured to specify a covered background region and an uncovered background region, and to output said region specifying information corresponding to the results of specifying; and wherein said separating unit separates said input image data into said foreground object component and said background object component in said covered background region and said uncovered background region.

4. An image processing device according to claim 1, wherein said processor generates coefficients used for class classification adaptation processing, for each of said foreground object component and said background object component.

5. An image processing device according to claim 1, wherein said processor generates output image data for each of said foreground object component and said background object component, by class classification adaptation processing.

6. An image processing device according to claim 1, wherein said processor performs edge enhancement for each of said foreground object component and said background object component.

7. An image processing device according to claim 1, further comprising:

a foreground component image generator that is configured to generate a foreground component image by synthesizing said foreground object component separated in said mixed region and said pixel data of said foreground region; and a background component image generator that is configured to generate a background component image by synthesizing said background object component separated in said mixed region and said pixel data of said background region;

wherein said processor is configured to individually process said foreground component image and said background component image which are generated.

8. An image processing method, executed by an image processing apparatus, for processing input image data made up of a predetermined number of pieces of pixel data obtained by an image-taking device having a predetermined number of pixels having time-integration effects, said method comprising:

a region specifying step, executed by a specifying unit, for specifying, based on said input image data, a mixed region including a foreground object component configuring foreground objects and a background object component configuring background objects, and a non-mixed region including one of a foreground region made up of said foreground object component and a background region made up of the background object component, and outputting region specifying information corresponding to the results of specifying;

a separating step, executed by a separating unit, for separating at least said mixed region into said foreground object component and said background object component, corresponding to said region specifying information and output a foreground object component image containing only the foreground object component and a background object component image containing only the background object component; and a processing step, executed by a processor, for individually processing, according to different methods and for the purpose of converting an input image into an image with enhanced resolution, said foreground object component image and said background object component image, corresponding to the results of separation, wherein each of the processed foreground object component image and the background object component has a higher resolution in a spatial direction than before processing.

9. An image processing method according to claim 8, further comprising a removing step for removing movement blurring of at least one of said foreground object component and said background object component;

wherein, in said processing step, said foreground object component and said background object component which have been subjected to movement blurring removal are individually processed.

10. An image processing method according to claim 8, wherein, in said region specifying step, a covered background region and an uncovered background region are further specified, and said region specifying information corresponding to the results of specifying is output; and wherein, in said separating step, said input image data is separated into said foreground object component and said background object component in said covered background region and said uncovered background region.

11. An image processing method according to claim 8, wherein, in said processing step, coefficients used for class classification adaptation processing are generated, for each of said foreground object component and said background object component.

12. An image processing method according to claim 8, wherein, in said processing step, output image data is generated for each of said foreground object component and said background object component, by class classification adaptation processing.

13. An image processing method according to claim 8, wherein, in said processing step, edge enhancement is performed for each of said foreground object component and said background object component.

14. An image processing method according to claim 8, further comprising:

a foreground component image generating step for generating a foreground component image by synthesizing said foreground object component separated in said mixed region and said pixel data of said foreground region; and a background component image generating step for generating a background component image by synthesizing said background object component separated in said mixed region and said pixel data of said background region;

wherein, in said processing step, said foreground component image and said background component image which are generated, are individually processed.

15. A computer-readable medium storing an executable program, when executed, causing a computer to process input image data made up of a predetermined number of pieces of pixel data obtained by an image-taking device having a predetermined number of pixels having time-integration effects, said program comprising:

a region specifying step for specifying, based on said input image data, of a mixed region including a foreground object component configuring foreground objects and a background object component configuring background objects, and a non-mixed region including one of a foreground region made up of said foreground object component and a background region made up of the background object component, and outputting region specifying information corresponding to the results of specifying;

a separating step for separating at least said mixed region into said foreground object component and said background object component, corresponding to said region specifying information and output a foreground object component image containing only the foreground object component and a background object component image containing only the background object component; and a processing step for individually processing, according to different methods and for the purpose of converting an input image into an image with enhanced resolution, said foreground object component image and said background object component image, corresponding to the results of separation, wherein each of the processed foreground object component image and the background object component has a higher resolution in a spatial direction than before processing.

16. A recording medium according to claim 15, said program further comprising a removing step for removing movement blurring of at least one of said foreground object component and said background object component;

wherein, in said processing step, said foreground object component and said background object component which have been subjected to movement blurring removal are individually processed.

17. A recording medium according to claim 15, wherein, in said region specifying step, a covered background region and an uncovered background region are further specified, and said region specifying information corresponding to the results of specifying is output; and wherein, in said separating step, said input image data is separated into said foreground object component and said background object component in said covered background region and said uncovered background region.

18. A recording medium according to claim 15, wherein, in said processing step, coefficients used for class classification adaptation processing are generated, for each of said foreground object component and said background object component.

19. A recording medium according to claim 15, wherein, in said processing step, output image data is generated for each of said foreground object component and said background object component, by class classification adaptation processing.

20. A recording medium according to claim 15, wherein, in said processing step, edge enhancement is performed for each of said foreground object component and said background object component.

21. A recording medium according to claim 15, said program further comprising:

a foreground component image generating step for generating a foreground component image by synthesizing said foreground object component separated in said mixed region and said pixel data of said foreground region; and a background component image generating step for generating a background component image by synthesizing said background object component separated in said mixed region and said pixel data of said background region;

wherein, in said processing step, said foreground component image and said background component image which are generated, are individually processed.

22. An image-taking device, comprising:

an image-taking unit that is configured to output a subject image taken by an image-taking device having a predetermined number of pixels having time-integration effects as taken image data made up of a predetermined number of pieces of pixel data;

a region specifying unit that is configured to specify, based on said taken image data, a mixed region including a foreground object component configuring foreground objects and a background object component configuring background objects, and a non-mixed region including one of a foreground region made up of said foreground object component and a background region made up of the background object component, and to output region specifying information corresponding to the results of specifying;

a separating unit that is configured to separate at least said mixed region into said foreground object component and said background object component, corresponding to said region specifying information and output a foreground object component image containing only the foreground object component and a background object component image containing only the background object component; and a processor that is configured to individually process, according to different methods and for the purpose of converting an input image into an image with enhanced resolution, said foreground object component image and said background object component image, corresponding to the results of separation, wherein each of the processed foreground object component image and the background object component has a higher resolution in a spatial direction than before processing.

23. An image-taking device according to claim 22, further comprising a blur-removal unit that is configured to remove movement blurring of at least one of said foreground object component and said background object component;

wherein said processor is configured to individually process said foreground object component and said background object component which have been subjected to movement blurring removal by said blur-removal unit.

24. An image-taking device according to claim 22, wherein said region specifying unit is further configured to specify a covered background region and an uncovered background region, and to output said region specifying information corresponding to the results of specifying; and wherein said separating unit separates said taken image data into said foreground object component and said background object component in said covered background region and said uncovered background region.

25. An image-taking device according to claim 22, wherein said processor generates coefficients used for class classification adaptation processing, for each of said foreground object component and said background object component.

26. An image-taking device according to claim 22, wherein said processor generates output image data for each of said foreground object component and said background object component, by class classification adaptation processing.

27. An image-taking device according to claim 22, wherein said processor performs edge enhancement for each of said foreground object component and said background object component.

28. An image-taking device according to claim 22, further comprising:

a foreground component image generator that is configured to generate a foreground component image by synthesizing said foreground object component separated in said mixed region and said pixel data of said foreground region; and a background component image that is configured to generate a background component image by synthesizing said background object component separated in said mixed region and said pixel data of said background region;

wherein said processor is configured to individually process said foreground component image and said background component image which are generated.

29. An image processing device for processing input image data made up of a predetermined number of pieces of pixel data obtained by an image-taking device having a predetermined number of pixels having time-integration effects, said image processing device comprising:

a region unit that is configured to specify, based on said input image data, a mixed region including a foreground object component configuring foreground objects and a background object component configuring background objects, and a non-mixed region including one of a foreground region made up of said foreground object component and a background region made up of said background object component, and to output region specifying information corresponding to the results of specifying;

a separating unit that is configured to separate at least said mixed region into said foreground object component and said background object component, corresponding to said region specifying information and output a foreground object component image containing only the foreground object component and a background object component image containing only the background object component; and a processor that is configured to individually process, according to different methods and for the purpose of converting an input image into an image with enhanced resolution, said foreground object component image and said background object component image, corresponding to the results of separation, wherein the region specifying unit specifies the mixed region of a predetermined frame of the input image data based on at least two consecutive frames preceding the predetermined frame or at least two consecutive frames succeeding the predetermined frame, and wherein each of the processed foreground object component image and the background object component has a higher resolution in a spatial direction than before processing.

* * * * *